(12) United States Patent
Fujiwara et al.

(10) Patent No.: US 7,212,719 B2
(45) Date of Patent: May 1, 2007

(54) OPTICAL CONNECTOR CLEANING TOOL, CLEANING TAPE, OPTICAL CONNECTOR CLEANING METHOD, OPTICAL COMPONENT CLEANING TOOL

(75) Inventors: Kunihiko Fujiwara, Sakura (JP); Takaaki Ishikawa, Sakura (JP); Yuwa Tanaka, Sakura (JP); Hiroshi Furukawa, Sakura (JP)

(73) Assignee: Fujikura, Ltd., Tokyo (JP)

( * ) Notice: Subject to any disclaimer, the term of this patent is extended or adjusted under 35 U.S.C. 154(b) by 0 days.

(21) Appl. No.: 11/216,211

(22) Filed: Sep. 1, 2005

(65) Prior Publication Data

US 2005/0286853 A1 Dec. 29, 2005

Related U.S. Application Data

(63) Continuation of application No. PCT/JP04/02736, filed on Mar. 4, 2004.

(30) Foreign Application Priority Data

| Mar. 6, 2003 | (JP) | ............................. P2003-060684 |
| Mar. 6, 2003 | (JP) | ............................. P2003-060685 |
| May 21, 2003 | (JP) | ............................. P2003-143557 |
| May 22, 2003 | (JP) | ............................. P2003-144809 |
| Sep. 25, 2003 | (JP) | ............................. P2003-333482 |
| Sep. 25, 2003 | (JP) | ............................. P2003-333483 |
| Jan. 27, 2004 | (JP) | ............................. P2004-018513 |

(51) Int. Cl.
*G02B 6/00* (2006.01)

(52) U.S. Cl. ........................ 385/134; 385/135; 385/147

(58) Field of Classification Search ................ 385/134, 385/147
See application file for complete search history.

(56) References Cited

U.S. PATENT DOCUMENTS

| 5,757,997 A * | 5/1998 | Birrell et al. ................. 385/60 |
| 5,836,031 A | 11/1998 | Cox |
| 6,209,163 B1 | 4/2001 | Clairadin et al. |
| 6,905,251 B2 * | 6/2005 | Fujiwara et al. .............. 385/53 |
| 2001/0033728 A1 | 10/2001 | Miyake et al. |
| 2002/0108636 A1 | 8/2002 | Childers et al. |
| 2002/0131748 A1 | 9/2002 | Sato |

(Continued)

FOREIGN PATENT DOCUMENTS

JP 09-197182 A 7/1997

(Continued)

*Primary Examiner*—Jennifer Doan
(74) *Attorney, Agent, or Firm*—Sughrue Mion, PLLC

(57) ABSTRACT

An optical connector cleaning tool includes a tool body, a driving mechanism that moves a cleaning member, an insertion portion that protrudes from the tool body, with a cleaning member disposed at the projected distal end from the tool body and able, by insertion in a connector housing, to cause the portion of the cleaning member disposed at the projected distal end to abut against the connection end face of the optical connector housed in the connector housing, and a connector cleaning guide that positions an optical connector outside the connector housing and the insertion portion and causes the cleaning member and the connection end face of the optical connector to abut, a connector cleaning guide having a first port in which the optical connector can be inserted and a second port in which the insertion portion can be inserted.

16 Claims, 92 Drawing Sheets

U.S. PATENT DOCUMENTS

2002/0166190 A1    11/2002    Miyake et al.

FOREIGN PATENT DOCUMENTS

| | | |
|---|---|---|
| JP | 09-285766 A | 11/1997 |
| JP | 10-230233 A | 9/1998 |
| JP | 2000-203780 A | 3/2000 |
| JP | 2000-503780 | 3/2000 |
| JP | 2000-284147 A | 10/2000 |
| JP | 2001-005326 A | 1/2001 |
| JP | 2001-33654 A | 2/2001 |
| JP | 2001-129505 A | 5/2001 |
| JP | 2001-246343 | 9/2001 |
| JP | 2001-346343 A | 9/2001 |
| JP | 2002-156552 A | 5/2002 |
| JP | 2002-219421 A | 8/2002 |
| JP | 2002-277681 A | 9/2002 |
| JP | 2002-350679 A | 12/2002 |
| JP | 2002-372645 A | 12/2002 |
| JP | 2003-050338 A | 2/2003 |
| JP | 2003-050668 A | 2/2003 |
| WO | WO 97/23792 A1 | 7/1997 |

\* cited by examiner

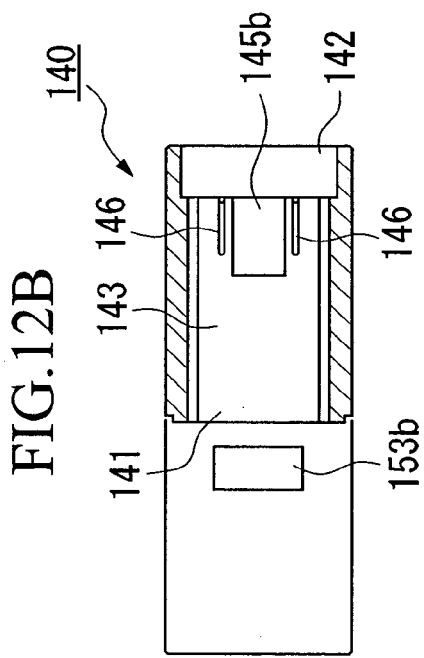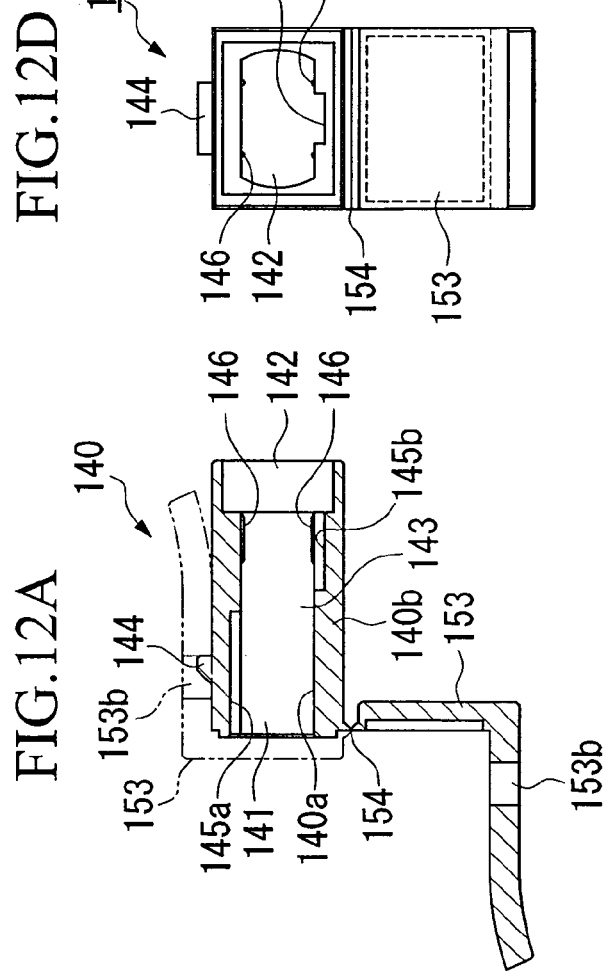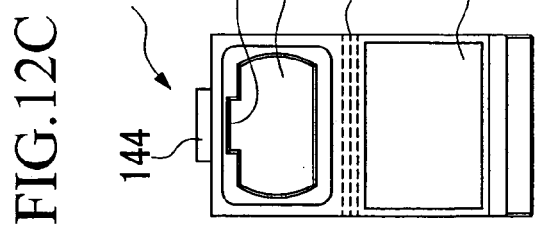

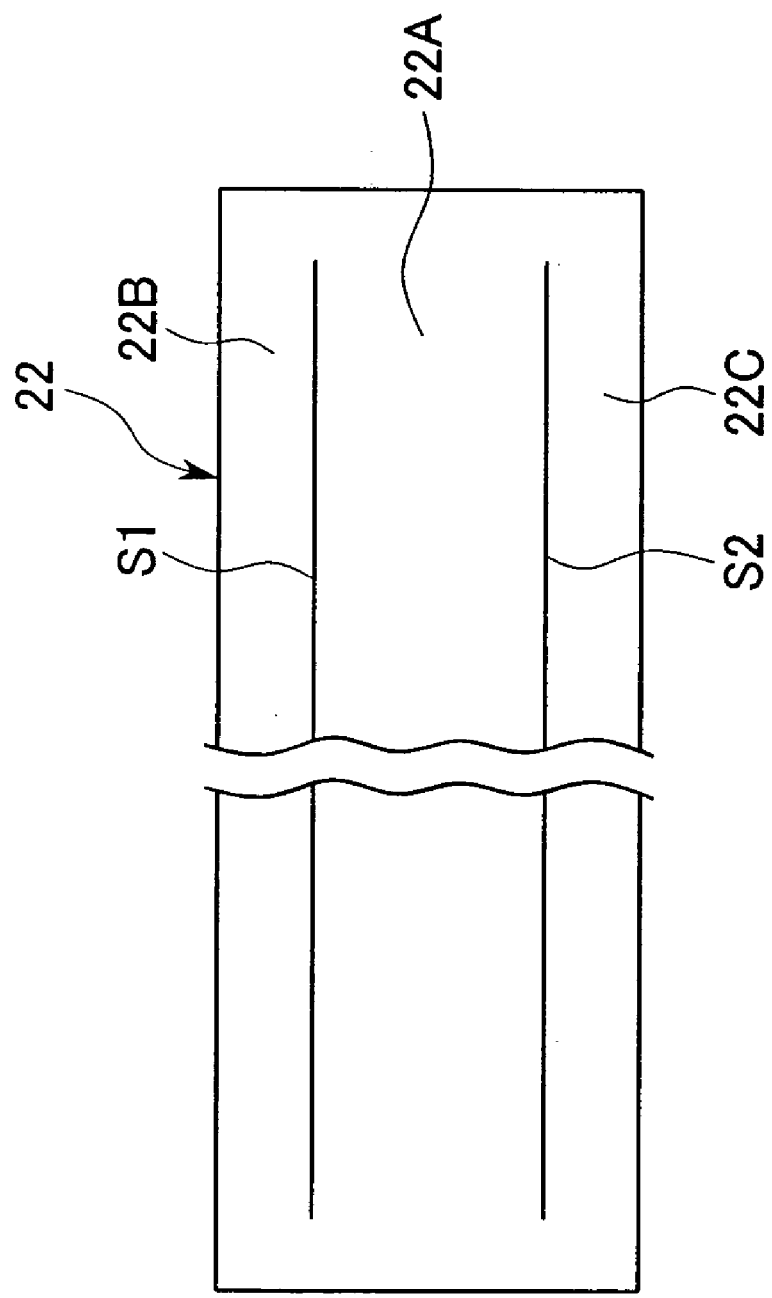

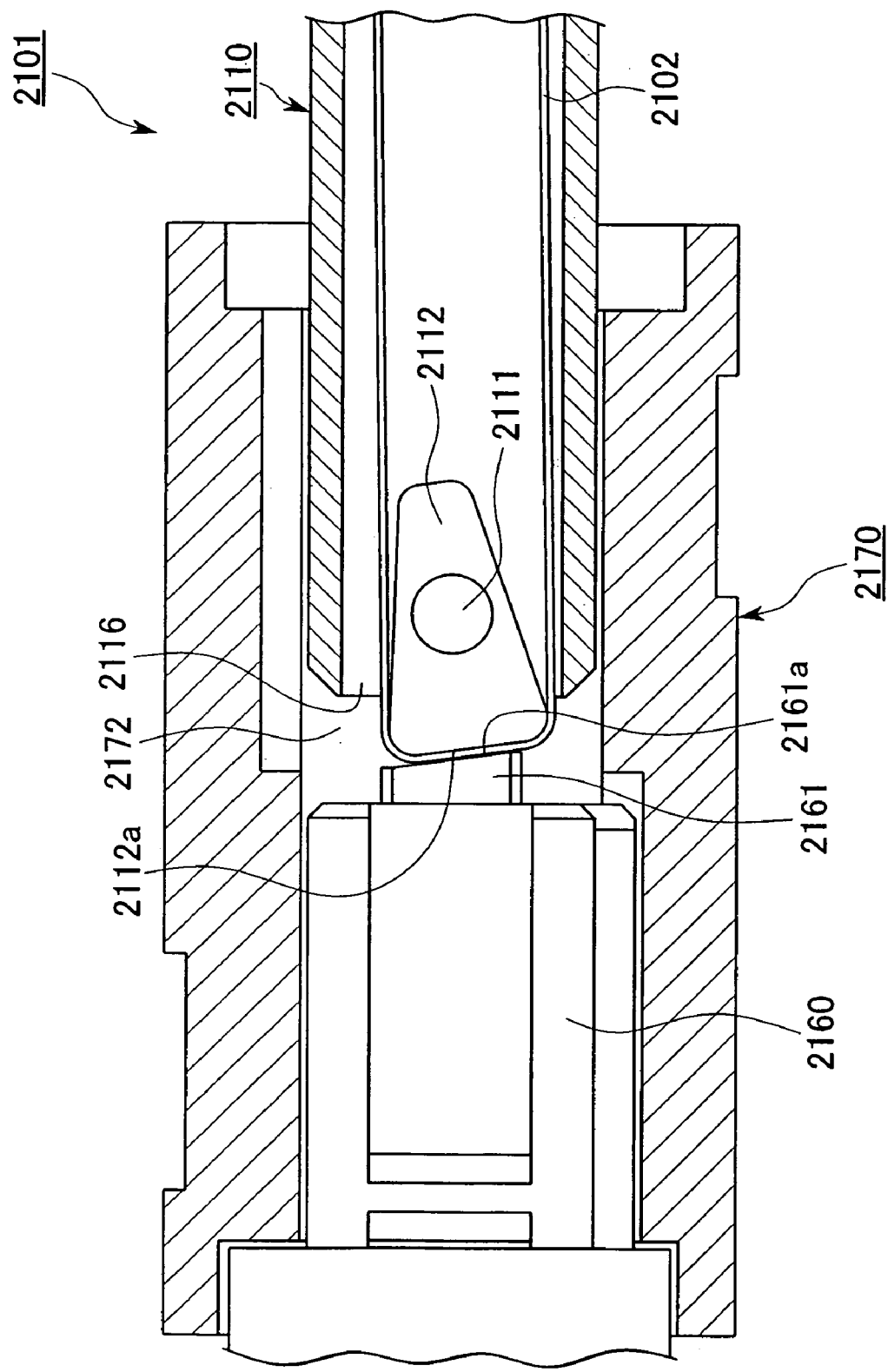

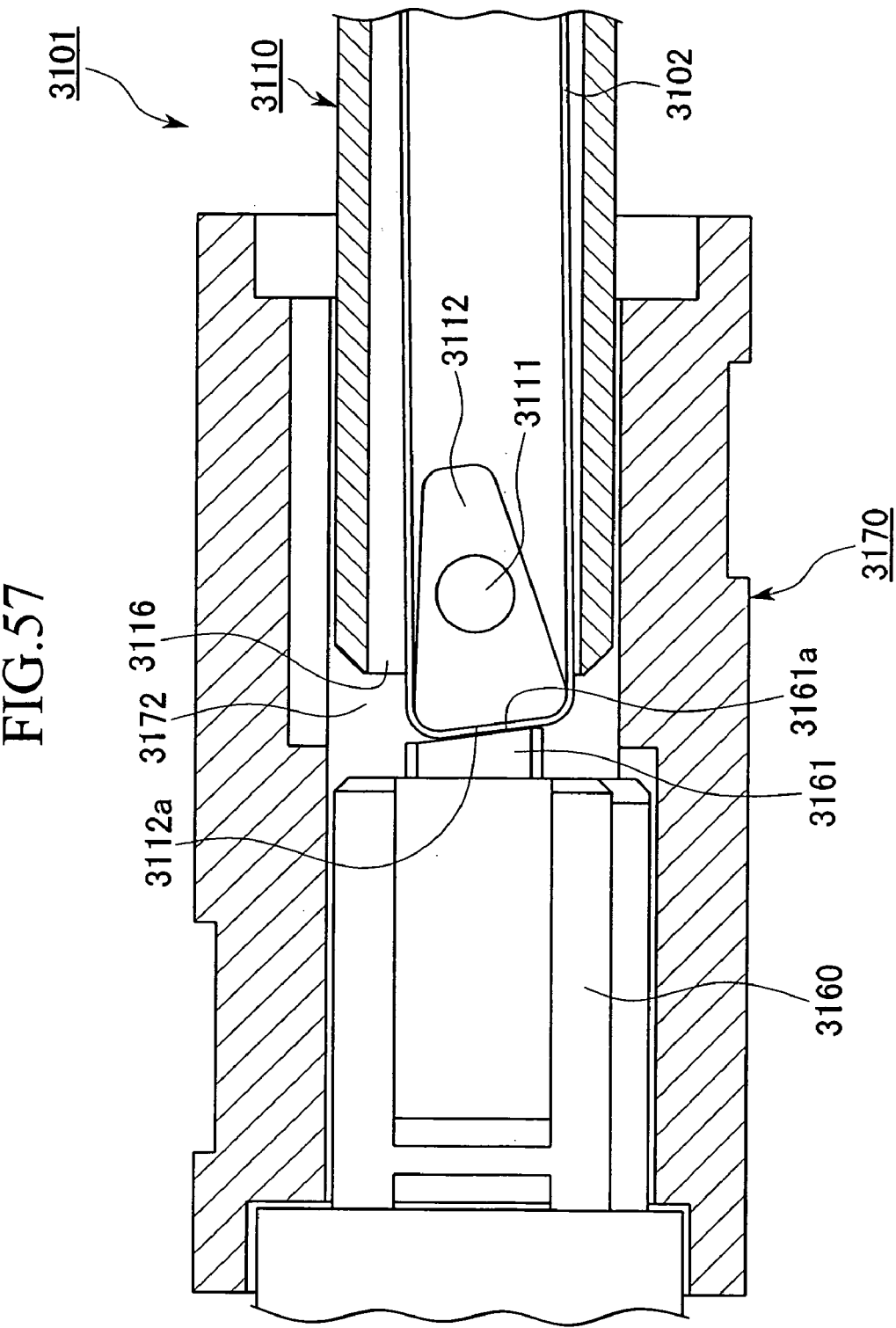

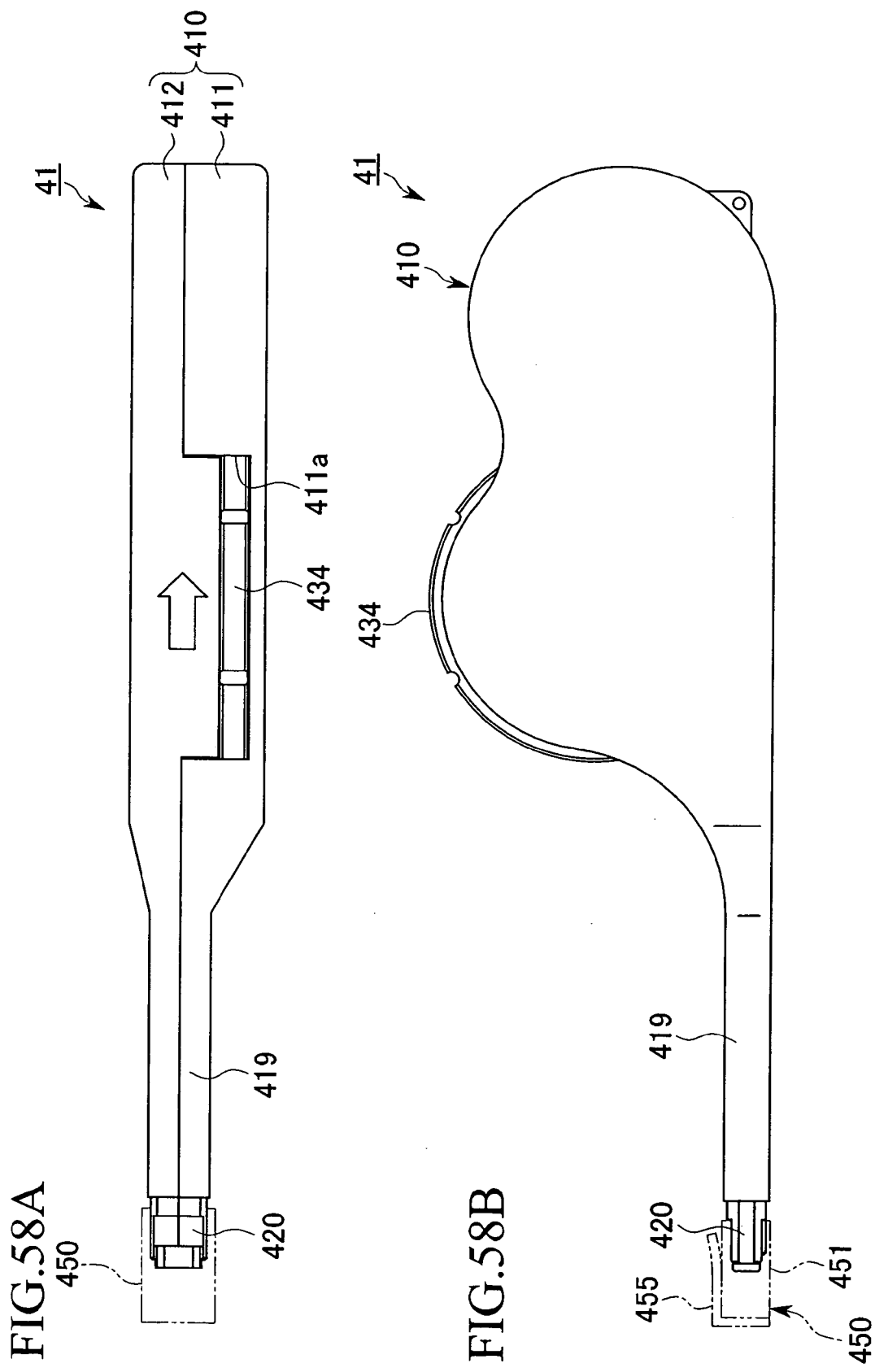

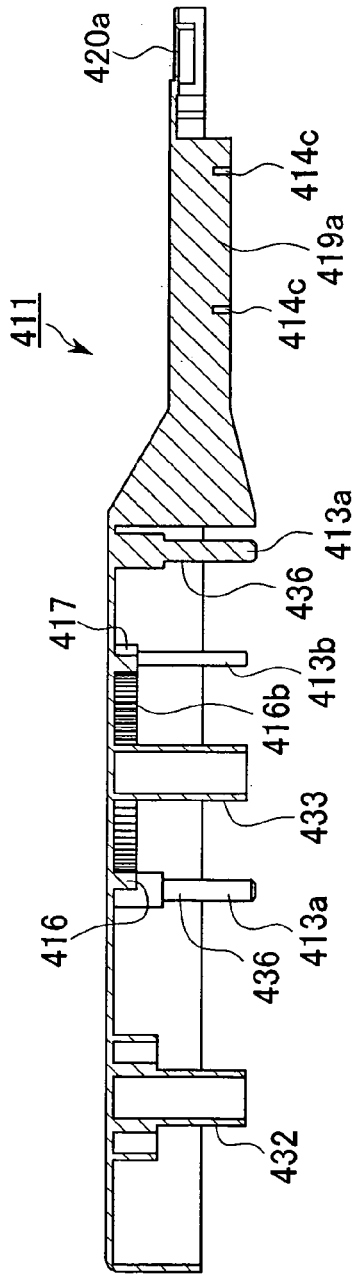
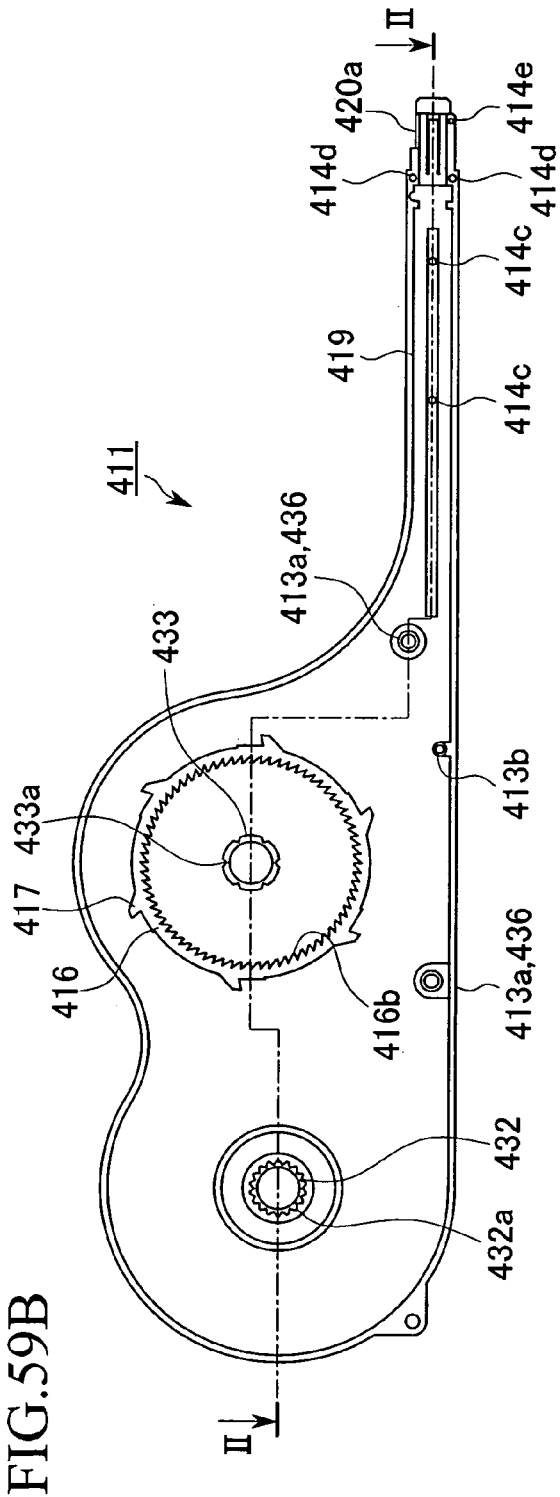
FIG.59A
FIG.59B

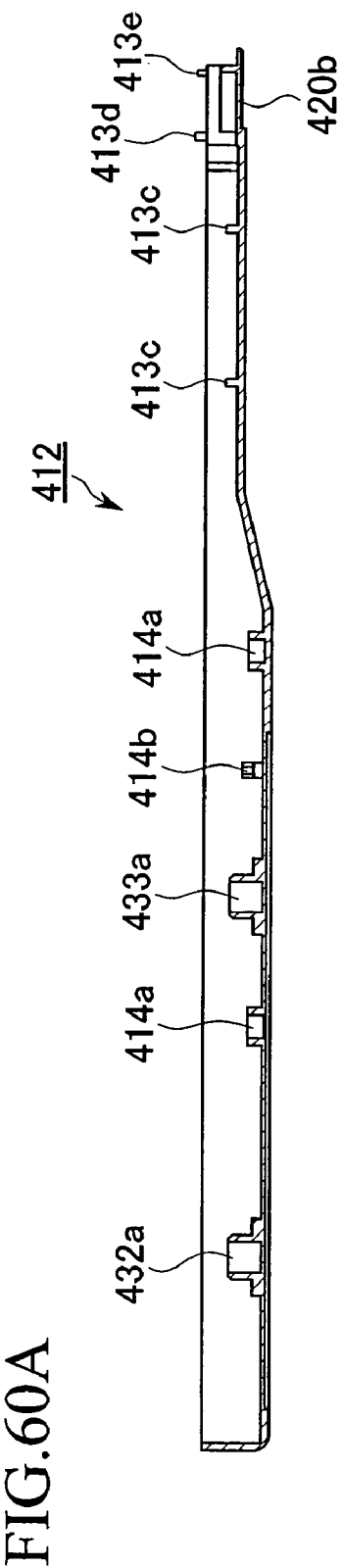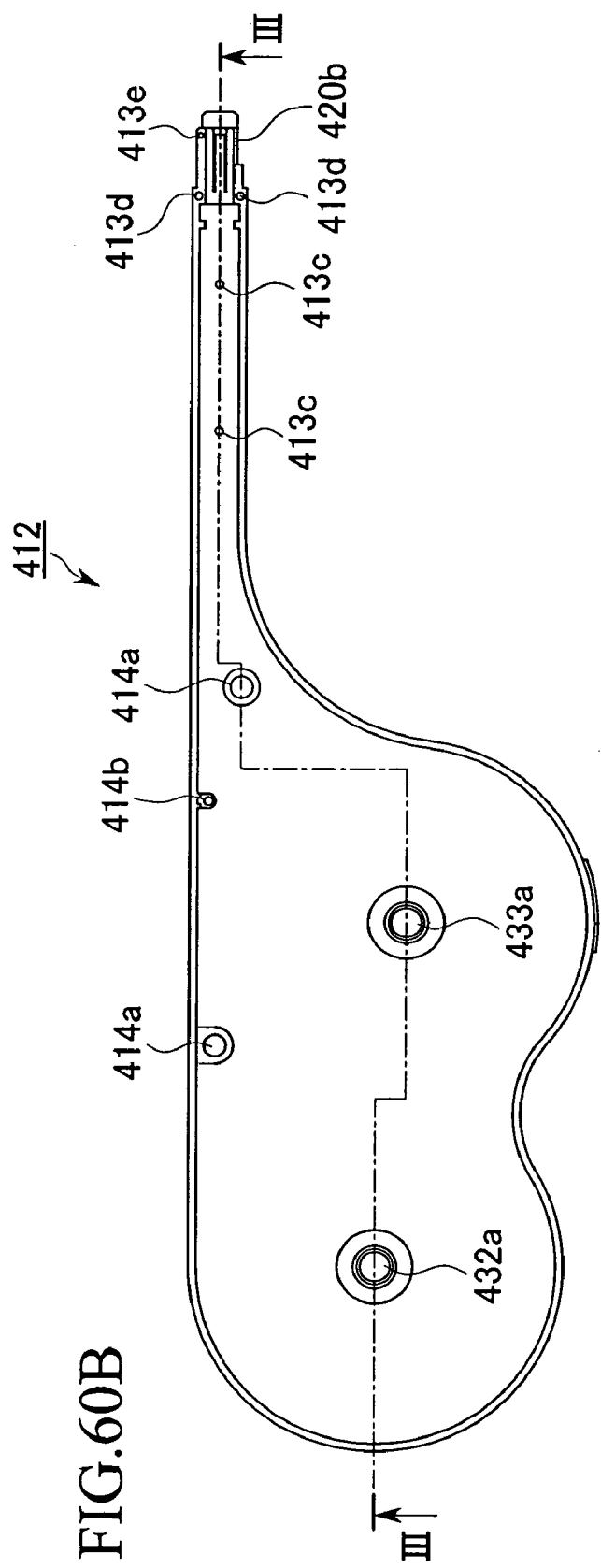
FIG.60A
FIG.60B

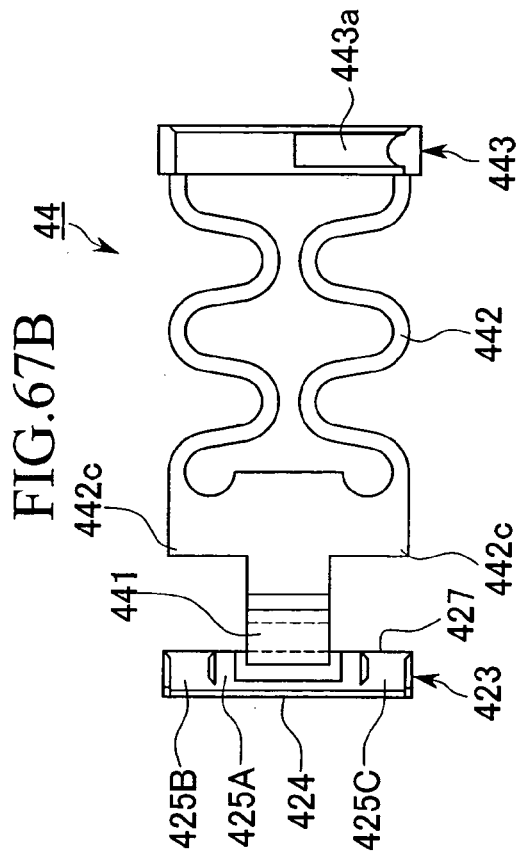
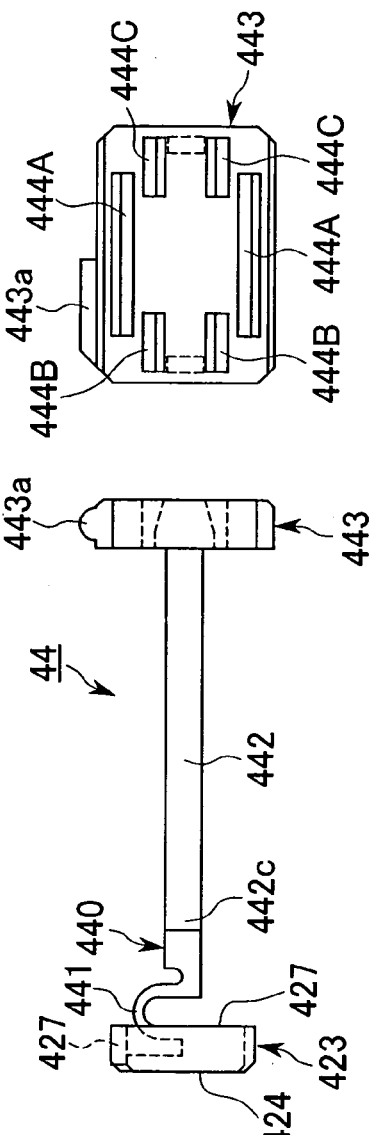
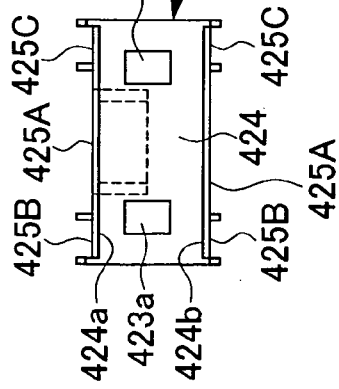

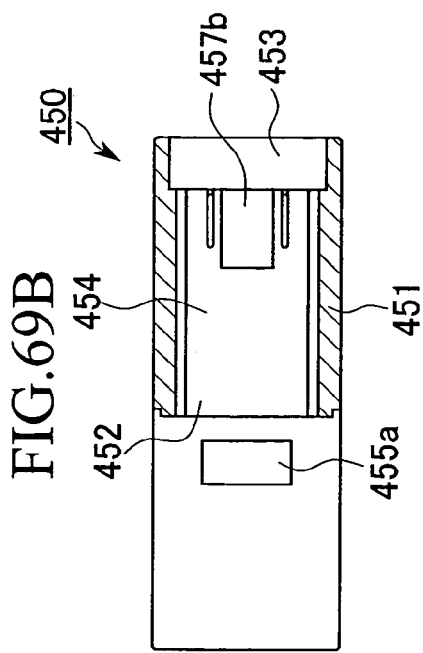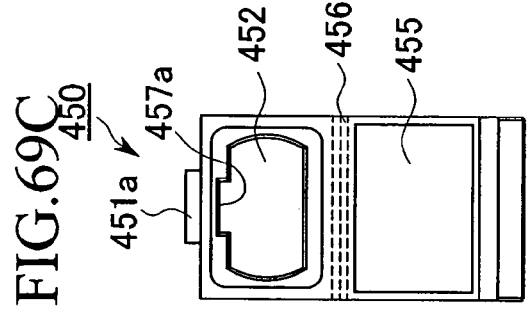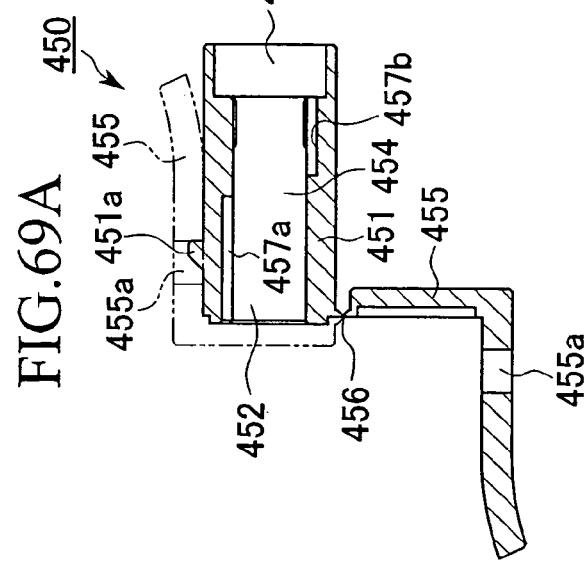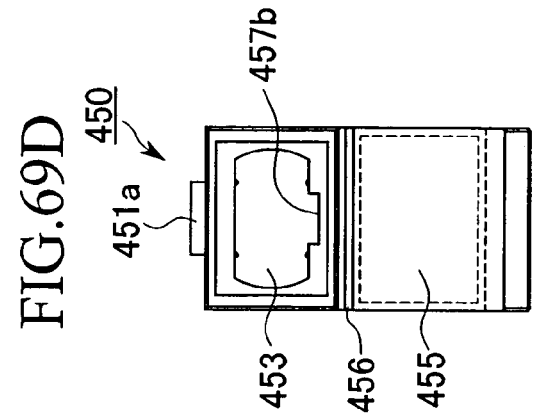

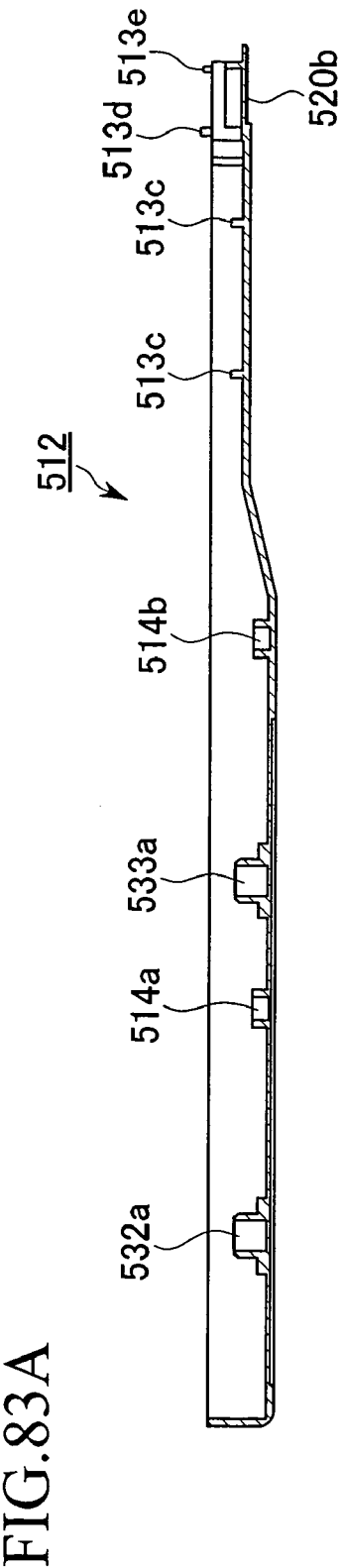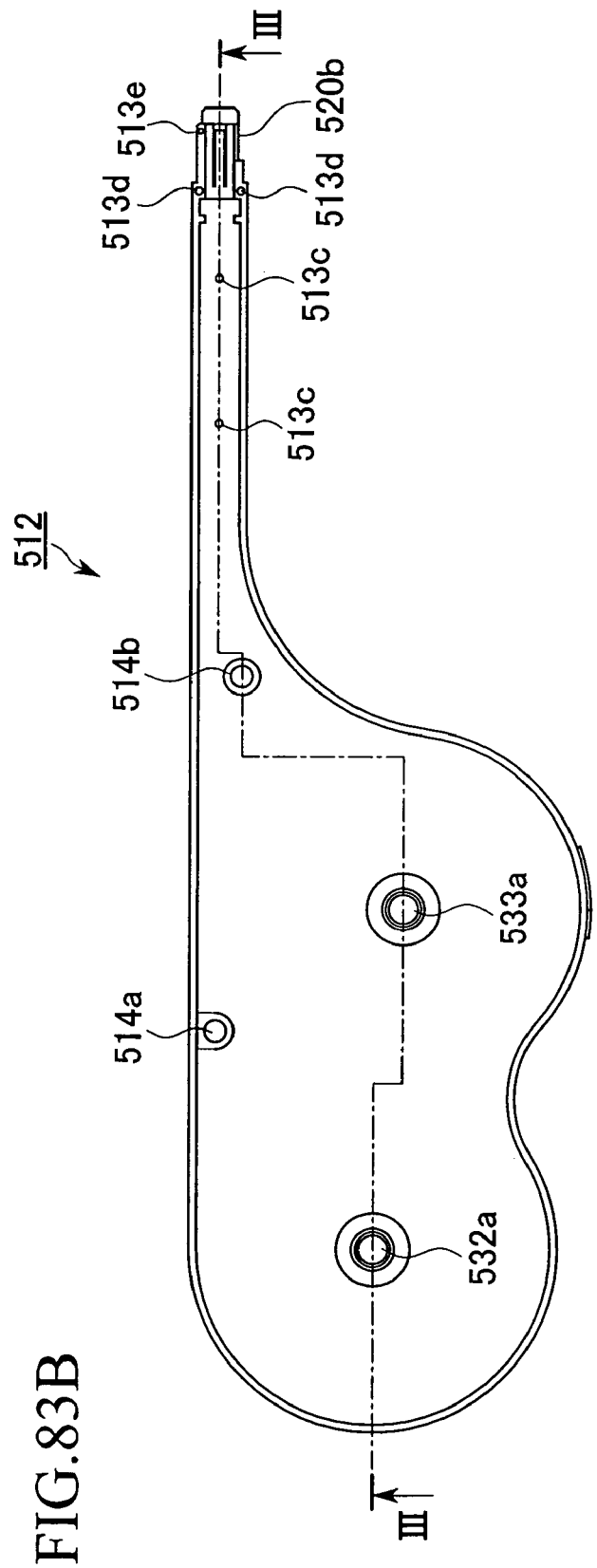
FIG.83A
FIG.83B

OPTICAL CONNECTOR CLEANING TOOL, CLEANING TAPE, OPTICAL CONNECTOR CLEANING METHOD, OPTICAL COMPONENT CLEANING TOOL

CROSS-REFERENCE TO RELATED APPLICATION

This is a Continuation Application of International Application No. PCT/JP2004/002736, filed Mar. 4, 2004, which claims priority to Japanese Patent Application No. 2003-60684, filed Mar. 6, 2003, Japanese Patent Application No. 2003-60685, filed Mar. 6, 2003, Japanese Patent Application No. 2003-143557, filed May 21, 2003, Japanese Patent Application No. 2003-144809 filed May 22, 2003, Japanese Patent Application No.2003-333482 filed Sep. 25, 2003, Japanese Patent Application No. 2003-333483 filed Sep. 25, 2003, and Japanese Patent Application No. 2004-18513 filed Jan. 27, 2004. The content of which is incorporated herein by reference.

BACKGROUND OF THE INVENTION

1. Field of the Invention

The present invention relates to an optical connector cleaning tool for cleaning the connection end face of an optical connector and an optical connector plug cleaning method. It also relates to an optical component cleaning tool for cleaning the end face of an optical component such as an optical connector, a cleaning tape, and a guide for cleaning optical components.

2. Description of Related Art

As is well known, connections between optical connectors in connector housings such as optical connector adaptors and optical connector receptacles are realized by butt-coupling of optical fiber end faces situated at the connection end faces of optical connectors.

Contamination such as debris, dust and oil that adheres to the connection end face of an optical connector from insertion of the optical connector into a connector housing for butt connection can cause damage during attaching/detaching and an increase in transmission loss, and so prior to butt connection the connection end face must be cleaned.

Conventionally, cleaning of a connection end face has generally been performed with a cotton swab soaked in alcohol or a tape-type cleaner, with wiping and cleaning performed by placing the cleaner, gripped directly by hand, up against the connection end face of the optical connector.

As a cleaner employed for such a use, there has been proposed one comprises a projection portion having an opening in a distal end thereof where cleaning tape is exposed, and by inserting the projection portion into a space (connector housing hole) in an optical connector adaptor (optical adaptor), the cleaning tape is disposed to face and abut the connection end face of a ferrule of an optical connector housed in the optical connector adaptor, with wiping and cleaning of the connection end face of the optical plug performed by feeding the tape (refer, for example, to Japanese Unexamined Patent Application No. 2000-284147).

During butt connection by insertion of the optical connector into the connector housing, it is necessary to clean not only the optical connector in the connector housing, but also the connection end face of the optical connector (optical connector plug) inserted into the connector housing.

However, with the aforementioned cleaner, in the case of the optical connector not being housed in the connector housing, since the projection portion of the cleaner would be at a position removed from the operator's hands, when the cleaning tape in the projection portion is abutted with the optical connector connection end face jiggling easily occurs, resulting in bad cleaning operability.

It is conceivable to separately prepare a cleaner for cleaning the optical cleaner prior to insertion in the connector housing. However, together with the cleaner for cleaning the optical connector in the connector housing, this would require two types of cleaners during cleaning work, thereby leading to an increase in the number of accessories and inconvenience in keeping track of items, which has caused inconvenience.

Accordingly, the problem to be solved of the present invention is to provide an optical connector cleaning tool that can easily and reliably clean both an optical connector in a connector housing and an optical connector plug outside the connector housing. Another problem to be solved of the present invention is to provide an optical component cleaning tool and an optical component cleaning guide for cleaning the end face of optical components.

Also, as a cleaner to be used for cleaning optical connectors, as shown in FIG. 44, there has been proposed one including a projection portion 2110 having an opening 2116 in a distal end thereof where cleaning tape 2102 is exposed, and by inserting the projection portion 2110 into a space (connector housing hole 2172) in an optical connector adaptor 2170 (optical adaptor), the tape 2102 is disposed to face and abut the connection end face 2161a of a ferrule 2161 of an optical connector plug 2160 (optical plug) housed in the optical connector adaptor 2170, with wiping and cleaning of the connection end face 2161a of the optical plug 2160 performed by feeding the tape 2102. In this cleaner 2101, the tape 2102 that performs wiping and cleaning of the connection end face 2161a of the optical plug 2160 is provided so as to pass over the top of the distal end surface 2112a (abutting surface) of the head portion 2112 that is pivotally mounted on pivot 2111, with the direction of the head portion 2112 varying by pivotal rotation centered on the pivot 2111 so as to be able to accommodate varying angles of the connection end face 2161a of the ferrule 2161 (for example, see Japanese Patent No. 3350850).

As an optical connector ferrule, there exist those with protruding members protruding from the connection end face as in MT (Mechanically Transferable) type optical connector ferrules (for example, those defined according to JIS C 5981). In the case of this type of ferrule, there is the problem that the protruding members act as obstacles that give rise to uncleaned areas on the connection end face. In the case of the aforementioned MT type optical connector ferrule, as is widely known, there is the constitution of two guide pins for positioning during butting connection protruding from the connection end face, with the region between the two guide pins (hereafter, the central region) being difficult to clean. Where there are uncleaned areas, debris and the like left behind becomes sandwiched during butting connection of the optical connector, giving rise to problems such as an increase in loss due to minute misalignment of the optical axis.

Most technology for cleaning the connection end face of an MT type optical connector ferrule conventionally cleans the central region positioned between the two center pins. And yet as a result of concerted study, the inventors have come to realize that the presence of debris and the like on the portion positioned outside the central region (hereafter, the outer region) on the connection end face has a considerable impact on the optical properties during butt connection. In addition, uncleaned areas easily form near the bases of the two guide pins (that is, the protrusion bases of the guide pins from the connection end face), and in particular, among debris that accumulates near the bases of the guide pins, that which is located on the side of the outer region of the connection end face is considered to have a considerable impact on the optical properties during butt connection. However, suitable technology for effectively and efficiently cleaning the outside region has until now been limited. In addition, after cleaning the central region with a cleaning tool such as the cleaner shown in the aforementioned FIG. 44, separate cleaning of the outer region involves additional effort and, moreover, cleaning of the outer region can cause debris and the like in the outside region to be pushed into the central region, and so a sufficient effect may not be achieved in proportion to the effort spent cleaning.

In view of the aforementioned problems, a problem to be solved by the present invention is to provide an optical connector cleaning tool, a cleaning tape, and an optical connector cleaning method that (1) can effectively clean the connection end face even when protruding members exist on the connection end face of the optical connector, (2) can effectively clean near the bases of the protruding members (the base ends of the protrusions from the connection end face), (3) for optical connectors of a constitution having two guide pins protruding from the connection end face can also effectively clean outside the region positioned between the two guide pins on the connection end face, and (4) can efficiently clean simultaneously the region positioned between the two guide pins (central region) and the region that is outside thereof.

In addition, as a cleaner to be used for cleaning optical connectors, as shown in FIG. 57, there has been proposed one including a projection portion 3110 having an opening 3116 in a distal end thereof where cleaning tape 3102 is exposed, and by inserting the projection portion 3110 into a space (connector housing hole 3172) in an optical connector adaptor 3170 (optical adaptor), the tape 3102 is disposed to face and abut the connection end face 3161a of a ferrule 3161 of an optical connector plug 3160 (optical plug) housed in the optical connector adaptor 3170, with wiping and cleaning of the connection end face 3161a of the optical plug 3160 performed by feeding the tape 3102. In this cleaner 3101, the tape 3102 that performs wiping and cleaning of the connection end face 3161a of the optical plug 3160 is provided so as to pass over the top of the distal end surface 3112a (abutting surface) of the head portion 3112 that is pivotally mounted on pivot 3111, with the direction of the head portion 3112 varying by pivotal rotation centered on the pivot 3111 so as to be able to accommodate varying angles of the connection end face 3161a of the ferrule 3161 (for example, see Japanese Patent No. 3350850).

However, in the aforementioned cleaner, when the direction of the distal end surface 3112a of the head portion 3112 changes by pivotal rotation of the head portion 3112, the tape 3102 wrapped around the head portion 3112 can end up misaligning in the width direction thereof (the direction perpendicular to the sheet of FIG. 57). As a result, the abutting force of the connection end face 3161a abutting against the tape 3102 becomes uneven, the tape 3102 is not smoothly sent and cleaning is not reliably performed, giving rise to the problem of contaminants partially remaining on the connection end face 3161a.

Accordingly, a problem to be solved by the present invention is to provide an optical connector cleaning tool that can easily and reliably clean the connection end face of an optical connector in a state of the optical connector being inserted in a connector housing.

In addition, as a cleaner to be used for cleaning optical connectors, as shown in FIG. 80, there has been proposed one including a projection portion 4110 having an opening 4116 in a distal end thereof where a tape for cleaning 4102 (cleaning tape) is exposed, and by inserting the projection portion 4110 into a space (connector housing hole 4172) in an optical connector adaptor 4170 (optical adaptor), the tape 4102 is disposed to face and abut the connection end face 4161a of a ferrule 4161 of an optical connector plug 4160 (optical plug) housed in the optical connector adaptor 4170, with wiping and cleaning of the connection end face 4161a of the optical plug 4160 performed by feeding the tape 4102. In this cleaner 4101, the tape 4102 that performs wiping and cleaning of the connection end face 4161a of the optical plug 4160 is provided so as to pass over the top of the distal end surface 4112a of the head portion 4112 that is pivotally mounted on pivot 4111, with the direction of the head portion 4112 varying by pivotal rotation centered on the pivot 4111 so as to be able to accommodate varying angles of the connection end face 4161a of the ferrule 4161 (for example, see Japanese Patent No. 3350850).

However, in the aforementioned cleaner 4101, during pivotal rotation of the head portion 4112, not only does the direction of the distal end surface 4112a of the head portion 4112 change, but the distal end surface 4112a is displaced in a vertical direction that is the tangential projection of the pivotal rotation (vertical direction in FIG. 80). As a result, the center locations of the connection end face 4161a of the optical plug 4160 and the distal end surface 4112a of the head portion 4112 misalign (make uneven contact), the tape 4102 does not make good contact with the connection end face 4161a, the abutting force of the connection end face 4161a abutting the tape 4102 becomes uneven and cleaning is not reliably performed, giving rise to the problem of contaminants partially remaining on the connection end face 4161a.

In addition, as a result of concerted study by the inventors, it was found that when the tape 4102 is pinched between the head portion 4112 and the ferrule 4161 by the pushing pressure of the ferrule 4161 of the optical plug 4160, debris is pushed against the ferrule 4161 and the like and becomes stuck thereon in a state in which it cannot be easily removed.

In addition, when the head portion 4112 is pressed against the ferrule 4161, there is the risk of damage and the like to the connection end face 4161a by strong application of the pressing force directly on the connection end face 4161a. In addition, when the pushing pressure of the head portion 4112 pressing the ferrule 4161 is too strong during cleaning, the connection end face 4161a is excessively cleaned (extracted), which may lead to damage and the like to the connection end face 4161a.

Accordingly, a problem to be solved by the present invention is to provide an optical connector cleaning tool that can easily and reliably clean the connection end face of an optical connector in the state of the optical connector inserted in a connector housing and, moreover, prevent excessive pushing pressure from being applied to the connection end face and relieve it. In addition, a problem to be solved is to provide an optical component cleaning tool that can clean the end face of optical components.

In addition, as a cleaner to be used for cleaning optical connectors, there has been proposed one including a projection portion having an opening in a distal end thereof where a cleaning tape is exposed, and by inserting the projection portion into a space (connector housing hole) in an optical connector adaptor (optical adaptor), the cleaning tape is disposed to face and abut the connection end face of a ferrule of an optical connector plug (optical plug) housed in the optical connector adaptor, with wiping and cleaning of the connection end face of the optical plug performed by feeding the cleaning tape (for example, see Japanese Patent No. 3350850).

However, in a cleaner using the aforementioned cleaning tape, in the event of foreign matter such as airborne dust and fiber refuse generated from the cleaning tape adhering to the cleaning tape, the foreign matter ends up adhering to the connection end face of the ferrule from the cleaning tape when performing wiping and cleaning by causing the cleaning tape to abut against the connection end face of the ferrule, leading to the risk of cleaning not being reliably performed.

In order to remove foreign matter adhering to the cleaning tape, it is conceivable to perform an operation such as washing the cleaning tape or pressing the adhesive face of adhesive tape onto the cleaning tape prior to cleaning the optical connector. However, in the case of washing, there is the risk that fibers in the cleaning tape will break from water absorption of the cleaning tape, which would have the opposite effect of causing a build up foreign matter on the tape. In addition, in the case of removal of foreign matter from the cleaning tape using adhesive tape, if adhesive remains on the cleaning tape, there is the risk of the adhesive ending up remaining on the cleaning tape and moreover adhering to the connection end face of the ferrule.

Accordingly, a problem to be solved by the present invention is to provide an optical connector cleaning tool that can easily and reliably clean the connection end face of an optical connector in the state of the optical connector inserted in a connector housing. Another problem to be solved by the present invention is to provide an optical component cleaning tool that can clean the end face of optical components.

SUMMARY OF THE INVENTION

In order to solve the aforementioned problems, the present invention provides an optical connector cleaning tool that performs wiping and cleaning of a connection end face of an optical connector by movement of a cleaning member, the optical connector cleaning tool including a tool body; a driving mechanism that moves the cleaning member; an insertion portion that protrudes from the tool body, with the cleaning member being disposed at the projected distal end from the tool body, and constituted to position the portion of the cleaning member disposed at the projected distal end so as to be able to abut the connection end face of the optical connector; and a connector cleaning guide that is attached to the insertion portion, the connector cleaning guide having a first port in which the optical connector can be inserted and a second port in which the insertion portion can be inserted and performing the function of positioning the connection end face of the optical connector inserted from the first port at a position to abut the cleaning member of the insertion portion.

In the optical connector cleaning tool, it is preferable that the connector cleaning guide has a lid to cover the first port.

In the case of the optical connector having at least one protruding member that protrudes from the connection end face, it is preferable that the cleaning member be a plurality of cleaning tapes, and the plurality of cleaning tapes be disposed side by side approximately parallel to each other, spaced to escape the protruding member.

The present invention also provides an optical connector plug cleaning method that cleans a connection end face of an optical connector plug outside of a connector housing using an optical connector cleaning tool that, with an insertion portion projected from a tool body inserted in a connector housing, performs wiping and cleaning of a connection end face of an optical connector in the connector housing by movement of a cleaning member disposed on a projected distal end of the insertion portion from the tool body, the optical connector plug cleaning method including a step to attach to the insertion portion a connector cleaning guide having a first port in which an optical connector plug is insertable and a second port in which the insertion portion is insertable; a step of abutting the connection end face of the optical connector plug inserted in the connector cleaning guide and the cleaning member of the insertion portion; and a step of wiping and cleaning of the connection end face by movement of the cleaning member.

The present invention also provides an optical component cleaning tool that performs wiping and cleaning of an end face of an optical component optically connected by a connection housing by movement of a cleaning member, the optical component cleaning tool including a tool body; a driving mechanism that moves the cleaning member; an insertion portion that protrudes from the tool body, with the cleaning member disposed at the projected distal end from the tool body, being formed to be insertable in the connection housing in which the optical component is housed, and constituted to position the portion of the cleaning member disposed at the projected distal end so as to be able to abut the end face of the optical component by insertion in the connection housing; and an optical component cleaning guide that has a first port in which an optical component to be optically connected with an optical component in the connection housing is insertable and a second port in which the insertion portion is insertable, positions the optical component and the insertion portion, and causes the cleaning member and the end face of the optical component to abut facing each other.

The present invention also provides an optical component cleaning guide that positions an optical component and a cleaning member that cleans an end face of the optical component, wherein the cleaning member is provided in an optical component cleaning tool having an on-board driving mechanism that moves the cleaning member; the optical component cleaning tool is provided with a tool body and an insertion portion that protrudes from the tool body, with the cleaning member being disposed at the projected distal end from the tool body, being formed to be insertable in the connection housing in which the optical component is housed, and constituted to position the portion of the cleaning member disposed at the projected distal end so as to be able to abut the end face of the optical component by insertion in the connection housing; and the optical component cleaning guide has a first port in which an optical component to be cleaned is insertable and a second port in which the insertion portion of the optical component cleaning tool is insertable, positions the optical component and the insertion portion, and is constituted to so as to cause the cleaning member and the end face of the optical component to abut facing each other.

In the optical component cleaning guide, it is preferable to provide a lid to cover the first port.

According to the present invention, by inserting the insertion portion in the optical connector housing, the cleaning member disposed at the projected distal end of the insertion portion is positioned to be abuttable against the connection end face of the optical connector housed in the optical connector housing. In addition, by attaching the guide to the insertion portion and inserting the optical connector from the first port of the guide, the insertion portion can be positioned to be abuttable against the connection end face of an optical connector not housed in an optical connector housing. Accordingly, when performing connection of an optical connector, it is possible to easily and securely clean both an optical connector housed in a connector housing and an optical connector prior to insertion in a connector housing with one cleaning tool, thereby improving cleaning workability.

Moreover, in order to solve the aforementioned problems, the present invention also provides an optical connector cleaning tool that performs wiping and cleaning of a connection end face of an optical connector in a connector housing by feeding movement of a cleaning tape, including a tool body and an insertion portion protruding from the tool body and formed to be insertable in the connector housing, and wherein a head portion that has an abutting face for securing at its distal end an abutting area with respect to the connection end face, with a portion of the cleaning tape drawn from the tool body to the insertion portion being wrapped along the abutting face, is provided in the insertion portion and, and in the cleaning tape, a contact cleaning portion pressed against the connection end face of the optical connector by the head portion is disposed in a plurality, side by side, via protruding member escape portions that avoid protruding members protruded from the connection end face of the optical connector and extend in parallel along the lengthwise direction of the cleaning tape.

In this optical connector cleaning tool, it is also possible to adopt a constitution in which concave portions for avoiding interference between the head portion and protruding members that protrude from the connection end face when the insertion portion is inserted in the connector housing are set recessed from the abutting face of the head portion and a positioning mechanism that positions the portion of the cleaning tape moved along the abutting face of the head portion so that the protruding member escape portions correspond to the concave portions is provided in the insertion portion.

The present invention also provides an optical connector cleaning method in which for an optical connector having positioning guide pins protruded from two locations on the connection end face separated from each other, by feeding a cleaning tape pressed against a central region being a portion positioned between the guide pins and an outer region positioned outside the central region via the guide pins on the connection end face, the central region and the outer region are cleaned.

The present invention also provides a cleaning tape that, pressed against a connection end face of an optical connector, cleans the connection end face by being fed, in which a contact cleaning portion pressed against the connection end face of the optical connector is disposed in a plurality, side by side, via protruding member escape portions that avoid protruding members protruded from the connection end face of the optical connector and extend in parallel along the lengthwise direction of the cleaning tape.

As this cleaning tape, it is possible to adopt one in which (1) the protruding member escape portions are slits secured between adjacent contact cleaning portions, (2) the protruding member escape portions are easily breakable portions formed so as to couple contact cleaning portions, and by running the protruding members through the easily breakable portions, the contact cleaning portions can be pressed against the connection end face of the optical connector, and, moreover, feeding of the cleaning tape with respect to the connection end face of the optical connector can be performed while the protruding members passing through the easily breakable portions break the easily breakable portions to separate the contact cleaning portions from each other, and (3) concavity forming portions that form on the inside thereof protruding member housing grooves capable of housing the protruding members are continuously formed along the lengthwise direction of the cleaning tape as the protruding member escape portions. The protruding member escape portion may be one formed by the same member as the contact cleaning portion constituting the cleaning tape (in this case, all of the contact cleaning portions constituting the cleaning tape and the protruding member escape portions are formed by the identical member), but it may also be one formed by a different material from the contact cleaning portion, for example, one formed by a material such as a film weaker than the contact cleaning portion in order to facilitate penetration of the protruding member and breakage along the lengthwise direction of the cleaning tape (the easily breakable portion). Examples of an easily breakable portion formed by the same member as the contact cleaning portion are a thin portion formed by the same member as that forming the contact cleaning portion (including those facilitating cleavage by the formation of fine grooves), a region with small holes such as perforations formed at a high density (this region formed extending along the lengthwise direction of the cleaning tape), and a region with a slit-shaped groove extending along the lengthwise direction of the cleaning tape continuously provided in the lengthwise direction of the cleaning tape via coupling portions that couple the contact cleaning portions, with the region being formed weaker than the contact cleaning portion (to facilitate penetration of the protruding member and breakage along the lengthwise direction of the cleaning tape).

Moreover, adopting this kind of cleaning tape as the cleaning tape to be applied to the optical connector cleaning tool or the optical connector cleaning method according to the present invention can effect an increase in the cleaning efficiency.

Penetration of the protruding member into the protruding member escape portion and housing of the protoruding member with the aforementioned cleaning tape easily enables pressing a plurality of contact cleaning portions of the cleaning tape against respective connection end faces. Also, if the constitution is one that thrusts the protruding member into the protruding member escape portion or houses it, the contact cleaning portion can be disposed on both opposing sides of the protruding member, which by feeding the cleaning tape enables simultaneous cleaning of both opposing sides of the protruding member. In particular, in the constitution that thrusts the protruding member in the protruding member escape portion, thrusting the protruding member also easily enables the contact cleaning portion on both sides of the protruding member escape portion to be brought into contact with the protruding member, and so debris adhering to the protruding member can be easily removed. Moreover, the contact cleaning portion can also easily be brought into contact with the protruding base end portion (base) of the protruding member from the connection end face, enabling efficient cleaning.

In addition, the cleaning tape can be a plurality of tapes each having a contact cleaning portion and being supplied from a plurality of supply reels. Moreover, the plurality of supply reels can be made to rotate separately, in which case, the feeding amount of the cleaning tapes could be made to differ from each other. Therefore, even if the elongation differs depending on thickness and strength of the tapes, variations in tension between the tapes can be restrained to enable stable tape feeding.

In addition, it is preferable that the optical connector cleaning tool be provided with a reverse-feed blocking mechanism to prevent reverse feeding of the cleaning tape. Doing so enables stable feeding of the cleaning tape in the prescribed direction.

In addition, it is preferable that the optical connector cleaning tool be provided with a slack prevention mechanism that prevents slack in the cleaning tape. The slack prevention mechanism can be constituted from a mechanism that prevents reverse rotation of the cleaning tape take-up reel and a rotation resistance imparting mechanism that imparts rotation resistance to rotation of the supply reel.

An optical connector cleaning tool including a slack prevention mechanism is not limited to one with a plurality of contact cleaning portions, and may have one contact cleaning portion.

The optical connector cleaning tool of the present invention can also be used as an optical component cleaning tool for cleaning the end faces of various optical components.

The following superior effects are obtained by the present invention. (a) Even if a protruding member exists on the connection end face of an optical connector, cleaning of the connection end face can be effectively performed. (b) Cleaning can be efficiently performed also near the base of a protruding member (protruding base end portion from the connection end face). (c) For an optical connector of a constitution having two guide pins protruding from the connection end face, outside the region positioned between the two guide pins on the connection end face can also be effectively cleaned. (d) The region positioned between the two guide pins (central region) and the region that is outside thereof can be efficiently cleaned simultaneously.

Moreover, in order to solve the aforementioned problems, the present invention provides an optical connector cleaning tool that performs wiping and cleaning of a connection end face of an optical connector in a connector housing by movement of a cleaning member, the optical connector cleaning tool including a tool body and an insertion portion protruding from the tool body and formed to be insertable in the connector housing, the cleaning member being a tape, a supply reel wound with the tape and a take-up reel that spools and collects the tape after use being rotatably mounted in the tool body, a head portion that has an abutting face for securing at its distal end an abutting area with respect to the connection end face, with tape supplied from the supply reel being wrapped along the abutting face, being provided in the insertion portion, and in the head portion, guide grooves that prevent shifting of the tape being formed in at least one of the upstream side and downstream side with respect to the abutting face in the travel direction of the tape.

The present invention is particularly effective when provided with a head tilting mechanism constituted so as to allow tilting of the head portion with respect to a pushing force on the head portion.

The present invention can be constituted such that concave portions for avoiding interference between the head portion and protruding members that protrude from the connection end face when the insertion portion is inserted in the connector housing are set recessed from the abutting face of the head portion, and the tape guided by the guide grooves allows insertion of the protruding members into the concave portions.

The present invention also provides an optical connector cleaning tool that performs wiping and cleaning of a connection end face of an optical connector in a connector housing by movement of a cleaning member, the optical connector cleaning tool including a tool body and an insertion portion protruding from the tool body and formed to be insertable in the connector housing, the cleaning member being a tape, in the insertion portion there being provided a head portion that has an abutting face for securing at its distal end an abutting area with respect to the connection end face and that is wound along the abutting face with the tape, and in the head portion, guide grooves that prevent shifting of the tape in the width direction being formed in at least one of the upstream side and downstream side with respect to the abutting face in the travel direction of the tape.

In the head portion of the optical connector cleaning tool of the present invention, guide grooves to prevent shifting of the tape in the width direction are provided upstream and/or downstream from the abutting face in the travel direction of the tape. Therefore tape wrapped around the head portion is guided by the guide grooves and shifting in the width direction is restrained. For this reason, the connection end face can abut the tape with a uniform pressing force, and the tape can be smoothly fed. Accordingly, cleaning can be reliably performed so that contaminants do not remain on the connection end face.

In the case of providing a head tilting mechanism constituted to allow tilting of the head portion with respect to a pushing force on the head portion, the tape not making good contact at the connection end face due to shifting of the center location of the connection end face of the optical connector and the abutting face of the head portion and uneven abutting force of the connection end face abutting the tape is restrained to enable reliable removal of contaminants from the connection end face. Moreover, in the event of tilting the head portion, shifting of the tape in the width direction is restrained.

In the case of the constitution in which concave portions for avoiding interference between the head portion and protruding members (for example, guide pins in MPO type optical connectors) that protrude from the connection end face when the insertion portion is inserted in the connector housing are set recessed from the abutting face of the head portion so that the tape guided by the guide grooves allows insertion of the protruding members into the concave portions, even if there are protruding members at the connection end face of the optical connector, cleaning can be performed by abutting the cleaning member to the connection end face.

Moreover, in order to solve the aforementioned problems, the present invention provides an optical connector cleaning tool that performs wiping and cleaning of a connection end face of an optical connector by movement of a cleaning member, the optical connector cleaning tool including a tool body and an insertion portion protruding from the tool body and formed to be insertable in a connector housing for housing and connecting the optical connector, the insertion portion equipped with a head member for securing at its distal end face an abutting area of the cleaning tape with respect to the connection end face, the head member being supported by a support mechanism having a plurality of rotational central axes that rotationally move the head member, and for at least one of the rotational central axes, the rotational axis line of the rotational central axis is in a twisted position with respect to the straight line extending in the insertion direction of the optical connector from the center location of the connection end face of the optical connector when the connection end face of the optical connector is abutted against the distal end face of the head member.

In the present invention "twisted position" refers to any positional relation in the positional relation of two straight lines in a space that neither intersect nor are parallel.

In the optical connector cleaning tool of the present invention, the support mechanism can be one including a waveform spring having a plurality of bending curvature portions.

In the case of the optical connector being one whose connection end face is obliquely polished, when the distal end face of the head member of the optical connector cleaning tool faces the connection end face of the optical connector, it is preferable the angle formed by the feeding direction of the cleaning tape supplied to the head member and the feeding direction of the cleaning tape moving along the distal end face of the head member (first angle) is smaller than the angle formed by the feeding direction of the cleaning tape moving along the distal end face of the head member and the feeding direction of the cleaning tape being sent away from the head member (second angle).

The present invention also provides an optical connector cleaning tool that performs wiping and cleaning of an end face of an optical component by movement of a cleaning tape, the optical component cleaning tool including a tool body and an insertion portion protruding from the tool body and formed to be insertable in a housing for housing the optical component, the insertion portion equipped with a head member for securing at its distal end face an abutting area of the cleaning tape with respect to the connection end face, the head member being supported by a support mechanism having a plurality of rotational central axes that rotationally move the head member, and for at least one of the rotational central axes, when the end face of the optical component is abutted against the distal end face of the head member, the rotational axis line of the rotational central axis is in a twisted position with respect to the straight line extending in the insertion direction of the optical connector from the center location of the end face of the optical component.

According to the cleaning tool of the present invention, due to elastic deformation of a spring portion, the distal end face of the head portion is tiltable and is not substantially displaced in the tilting direction thereof. Therefore, the tape not making good contact at the connection end face due to shifting of the center location of the connection end face of the optical connector and the abutting face of the head portion and uneven abutting force of the connection end face abutting the tape is restrained to enable reliable removal of contaminants from the connection end face. In addition, due to elastic deformation of the spring portion, the head portion can recede in a direction (direction of separation) opposite the ferrule of the optical connector, and so during insertion of the insertion portion or cleaning, an appropriate amount of pushing pressure is applied to the ferrule, which can minimize damage to the connection end face and the optical fiber end face.

Moreover, in order to solve the aforementioned problems, the present invention provides an optical connector cleaning tool that performs wiping and cleaning of a connection end face of an optical connector by movement of a cleaning tape, the optical connector cleaning tool including a tool body and an insertion portion protruding from the tool body and formed to be insertable in a connector housing for housing and connecting the optical connector, in the insertion portion there being disposed a head member for securing at its distal end face an abutting area of the cleaning tape with respect to the connection end face, and a scraper for removing foreign matter adhering to the cleaning tape abutting a portion of the cleaning tape supplied to the head member.

Guide grooves to prevent shifting of the cleaning tape in the width direction can be provided on the scraper.

The cleaning tape can be a plurality of tapes supplied from a plurality of supply reels.

To prevent slack in the cleaning tape, a slack prevention mechanism can be provided.

In addition, the present invention is an optical component cleaning tool that performs wiping and cleaning of an end face of an optical component by movement of a cleaning tape, the optical component cleaning tool including a tool body and an insertion portion set to protrude from the tool body and formed to be insertable in a housing for housing the optical component, in the insertion portion there being disposed a head member for securing at its distal end face an abutting area of the cleaning tape with respect to the connection end face, and a scraper for removing foreign matter adhering to the cleaning tape abutting the portion of the cleaning tape supplied to the head member.

According to the cleaning tool of the present invention, by having a scraper abut the cleaning tape, foreign matter adhering to the cleaning tape can be scraped off and removed by the scraper while the tape is fed for cleaning a connection end face. As a result, the connection end face of the ferrule can always be cleaned with clean cleaning tape, thereby enabling contaminants on the connection end face to be reliably removed.

The present invention also provides an optical connector cleaning tool that performs wiping and cleaning of a connection end face of an optical connector that is connected by a connector housing by movement of a cleaning member, the optical connector cleaning tool including a tool body; a driving mechanism that moves the cleaning member; an insertion portion that protrudes from the tool body, with the cleaning member disposed at the projected distal end from the tool body, being formed to be insertable in the connector housing in which the optical connector is housed, and constituted to position the portion of the cleaning member disposed at the projected distal end so as to be able to abut the connection end face of the optical connector by insertion in the connector housing; and a connector cleaning guide having a first port in which an optical connector to be connected with an optical connector housed in a connector housing is insertable and a second port in which the insertion portion is insertable, positioning the optical connector and the insertion portion, and causing the cleaning member and the connection end face of the optical connector to abut facing each other.

BRIEF DESCRIPTION OF THE DRAWINGS

FIG. 12A is a front view of the guide in the cleaning tool according to the third embodiment of the present invention, FIG. 12B is a plan view thereof, FIG. 12C is a left-side view thereof, and FIG. 12D is a right-side view thereof.

FIG. 27A is a plan view showing an example of the cleaning tape, and FIG. 27B is a sectional view thereof.

FIG. 44 is a sectional view showing an example of the state of a conventional cleaner inserted in the connector housing.

FIG. 57 is a sectional view showing an example of the state of a conventional cleaner inserted in the connector housing.

FIG. 58A is a plan view showing an overview of the optical connector cleaning tool according to the seventh embodiment of the present invention, and FIG. 58B is a front view thereof.

FIG. 59A is a sectional view along line II—II showing the second case half-body according to the cleaning tool of FIGS. 58A and 58B, and FIG. 59B is a front view thereof.

FIG. 60A is a sectional view along line III—III showing the first case half-body according to the cleaning tool of FIGS. 58A and 58B, and FIG. 60B is a front view thereof.

FIG. 67A is a front view of the tape abutting member of the present cleaning tool, FIG. 67B is a plan view thereof, FIG. 67C is a left side view thereof, and FIG. 67D is a right side view thereof.

FIG. 69A is a front view of the guide cap of the present cleaning tool, FIG. 69B is a plan view thereof, FIG. 69C is a left side view thereof, and FIG. 69D is a right side view thereof.

FIG. 83A is a sectional view along line III—III showing the first case half-body according to the cleaning tool of FIGS. 81A and 81B, and FIG. 83B is a front view thereof.

DETAILED DESCRIPTION OF THE INVENTION

Figure 1A:
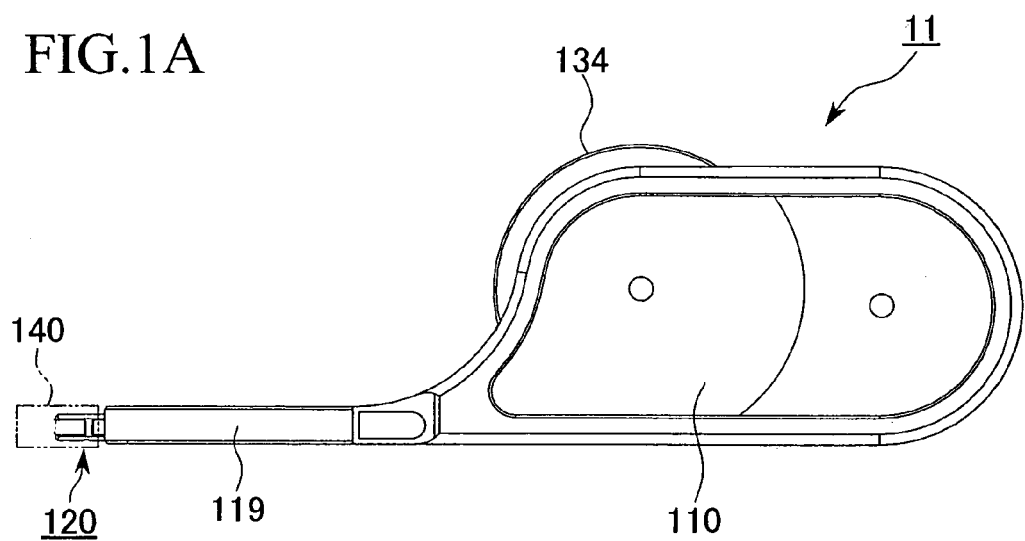
FIG. 1A is a front view showing an overview of the cleaning unit (cleaning tool) according to the first embodiment of the present invention and FIG. 1B is a perspective view thereof.

The first through third embodiments of the present invention are explained below referring to FIGS. 1A through 14.

FIGS. 1A through 6 are views showing the first embodiment of the optical connector cleaning tool of the present invention (hereafter simply referred to as the "cleaning tool"). FIGS. 7 through 10 are views showing an embodiment of an optical connector cleaning method using the cleaning tool.

As will hereinafter be described in detail, a cleaning tool 16 of the present embodiment is equipped with a cleaning unit 11 that integrates a tool body 110 and an insertion portion 120 and has a built-in driving mechanism 13, a connector cleaning guide 140 (an optical connector cleaning guide. Hereafter simply referred to as a guide 140) formed to be mountable on the insertion portion 120 of the cleaning unit 11, and a cap 150 that can be detachably attached to a plug insertion hole (described hereinafter) of the guide 140.

Figure 5:
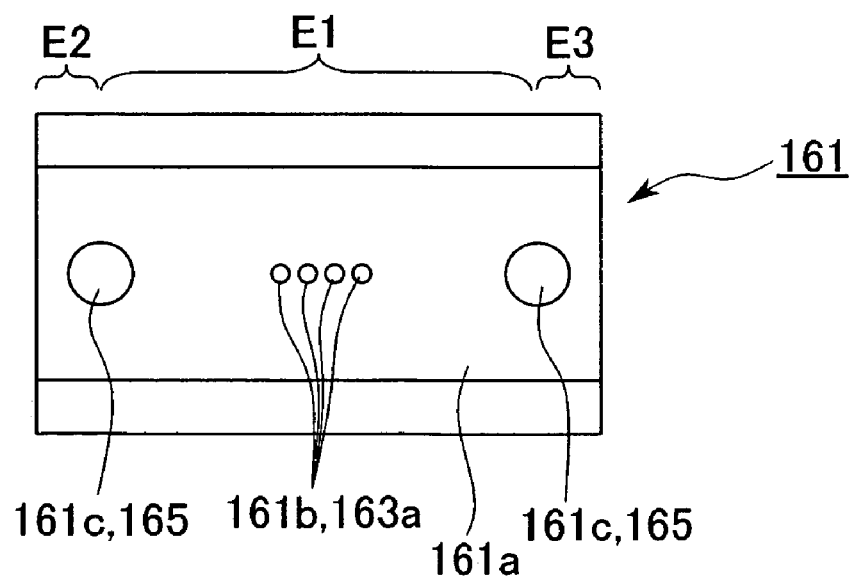
FIG. 5 is front view of an example of a ferrule of an optical connector.
Figure 9:
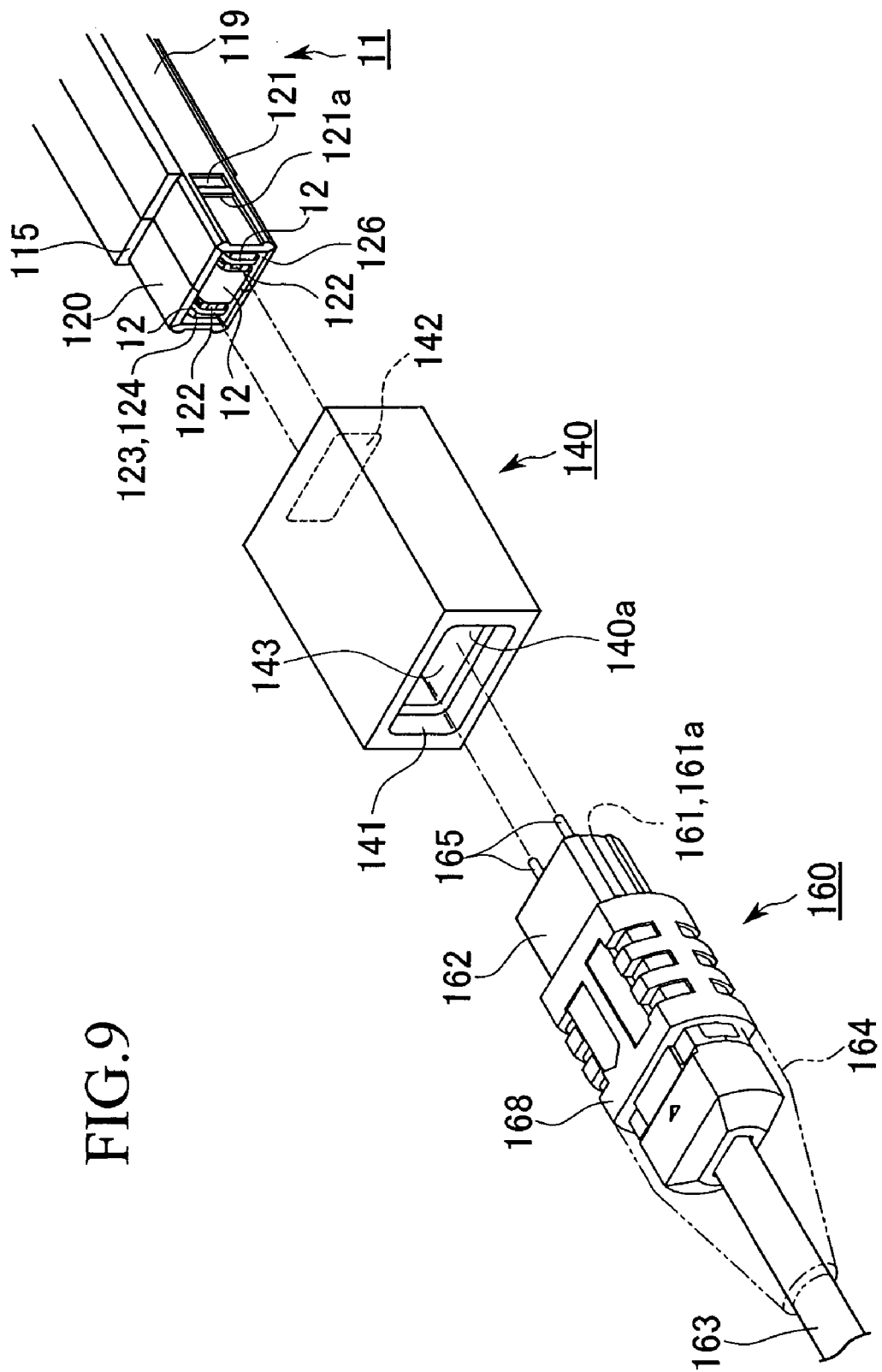
FIG. 9 is an exploded perspective view showing the state of the insertion portion of the cleaning unit shown in FIGS. 1A and 1B and an optical connector to be abutted by the connector cleaning guide.
Figure 10:
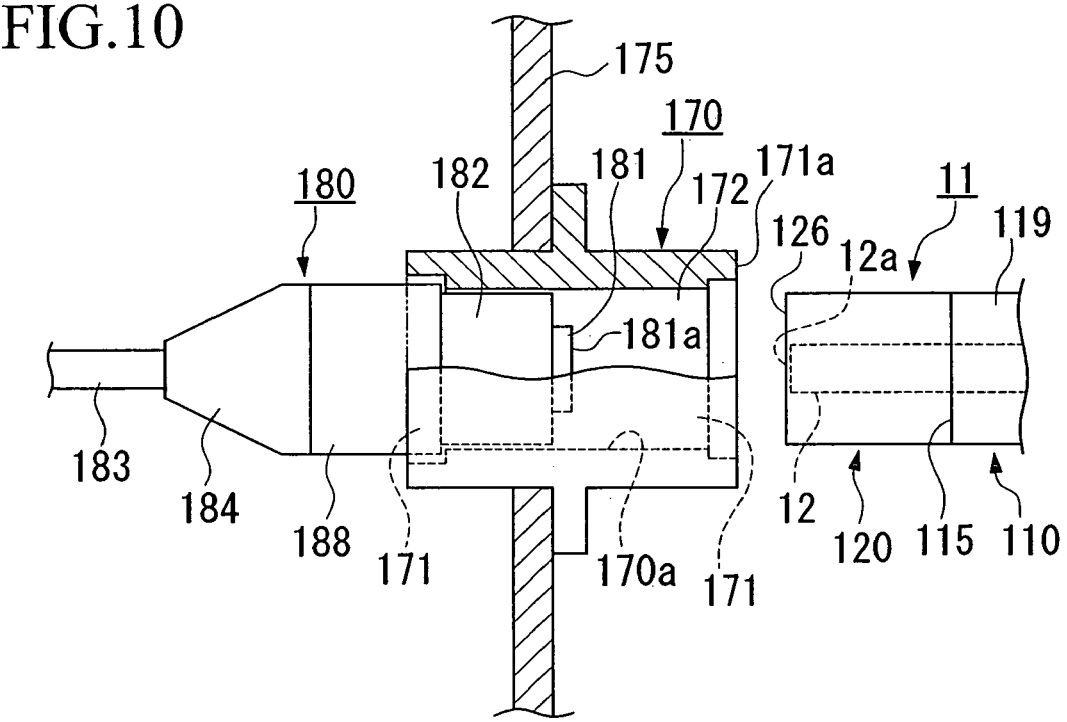
FIG. 10 is a sectional view showing the state of the insertion portion of the cleaning unit shown in FIGS. 1A and 1B to be inserted in the connector insertion hole of a connector housing in which an optical connector is housed.

As shown in FIGS. 5, 9 and 10, optical connectors 160, 180 and connector housing 170 to which the cleaning tool 16 of the first embodiment is applied are Multifiber Push-On (MPO) type optical connectors defined according to JIS C 5982.

The optical connectors 160, 180 are optical connector plugs (sometimes referred to hereafter simply as optical plugs) of a constitution housing Mechanically Transferable (MT) type optical connector ferrules 161, 181 (hereafter simply referred to as ferrules) defined according to JIS C 5981 at a distal end portion of plastic sleeve-shaped housings 162, 182, with the whole plug being formed in a low profile sectional shape in appearance.

In the explanation below, the direction corresponding to the low-profile, short side (vertical direction in FIG. 5) of the optical plugs 160, 180 and the ferrules 161, 181 is referred to as the thickness direction, and the direction corresponding to the long side is referred to as the width direction (horizontal direction in FIG. 5). In addition, thickness direction and width direction are also similarly used for the optical adaptor 170 in which the optical plugs 160, 180 are inserted and the insertion portion 120 of the cleaning unit 11 inserted in the optical adaptor 170 to correspond to the thickness direction and the width direction of the optical plugs 160, 180 and the ferrules 161, 181.

As shown in FIG. 5, optical fiber holes 161b of a prescribed number (here four) are opened so as to be arrayed on a connection end face 161a of the ferrule 161. Here, an optical fiber 163 is a four-fiber optical fiber tape ribbon, with optical fibers 163a having their resin coating removed at the distal end portion thereof (bare optical fibers) inserted into the optical fiber holes 161b (micro holes) in the ferrule 161. By doing so they are terminated to be butt-connectable with another optical connector and penetrate the inside of the optical plug 160 to be drawn out from the back end of the optical plug 160. In addition, guide-pin holes 161c are provided in the connection end face 161a on both sides of the outside of the optical fiber holes 161b in the width direction.

The ferrule 181 of the optical plug 180 is similar to that of FIG. 5.

The ferrules 161, 181 of the optical plugs 160, 180 are aligned to a high degree of accuracy by a positioning mechanism of a widely-known guide-pin fitting system whereby protruding members 165 (guide pins) protruded from the connection end face 161a are inserted into the guide-pin holes 161c, enabling connection by butt-coupling the end faces of the optical fibers 163a.

As shown in FIGS. 9 and 10, by storing the optical fibers 163, 183 drawn out from the back end of the optical plugs 160, 180 in boots 164, 184 provided at the back end of housings 162, 182 in the connection direction (left side in FIGS. 9 and 10), sudden bending and the like near the back end of the optical plugs 160, 180 is prevented.

There are no particular limitations to the optical fibers 163, 183 as long as they are suited to termination by the optical plug. The optical fiber may be one having a single core, one having multi-core, an optical fiber cord having such a single core housed in a tube, an optical fiber cord having such multi-core housed in a tube, or the like. As shown in FIG. 10, the connector housing 170 is an optical connector adaptor (hereafter simply referred to as an optical adaptor) that receives the optical plugs 160, 180 from connector insertion ports 171, 171 on both sides thereon and optically couples them, having a connector housing hole 172 through which connector insertion ports 171, 171 are interconnected and being formed in a sleeve shape.

The optical adaptor 170 as in the present invention is an all-inclusive term for relay equipment that positions, connects and fixes the optical plugs 160, 180 on both sides thereof. Accordingly, the optical plugs 160, 180 on both sides connected to the optical adaptor 170 are not limited to those shaped the same as each other. Even if optical plugs 160, 180 with different shapes are connectable, it is termed an optical adaptor.

By inserting optical plugs 160, 180 from the connector insertion port 171 in the optical adaptor 170, the optical plugs 160, 180 can be housed in the connector housing hole 172. The optical adaptor 170 is installed in a back plane 175 so that the connector insertion ports 171, 171 open to the front and back sides, respectively, of the back plane 175. However, a connector housing such as the optical adaptor 170 being installed in a back plane and the like does not limit the present invention in any way.

Although not particularly illustrated, similarly to the widely known MPO type connector there are provided elastic engaging pieces formed extending toward the connector insertion port 171 along inner walls 170a of the optical adaptor 170 and having engaging claws on the distal end thereof. In addition, engaging recesses capable of engagement with the engaging claws of the elastic engaging pieces of the optical adaptor 170 are provided on the surfaces of both sides in the width direction of the housings 162, 182 of the optical plugs 160, 180.

Moreover, on the periphery of the housings 162, 182, couplings 168, 188 are mounted for pressing the elastic engaging pieces from the outside to prevent release of engagement with the engaging recesses when the engaging claws and the engaging recesses are engaged.

When the optical plug 160, 180 is inserted into the optical adaptor 170 from the connector insertion port 171, it is housed in the connector housing hole 172 while displacement in a direction deviating from the insertion direction is restricted by the engagement of the engaging recesses and the engaging claws.

In the state of both optical plugs 160, 180 being inserted in the optical adaptor 170, the distal ends of the optical fibers 163, 183 fixedly held in the ferrules 161, 181 within the optical adaptor 170 are butted against each other to be optically connected.

The cleaning unit 11 capable of being applied to cleaning of the connection end faces 161a, 181a of the optical plugs 160, 180 is as shown in FIGS. 1A through 3 provided with the roughly case-shaped tool body 110 having a cleaning member 12 housed therein and the insertion portion 120 set to protrude from the tool body 110 and formed to be insertable in the connector housing hole 172 of the optical adaptor 170.

Figure 1B:
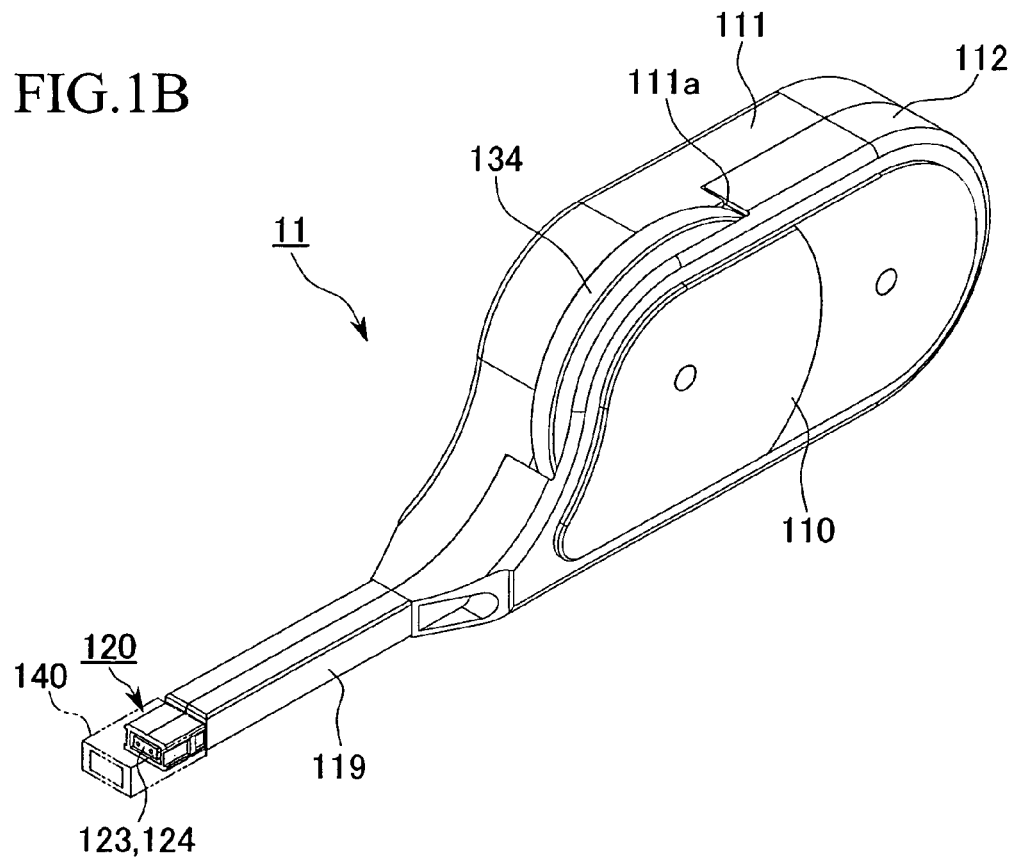

As shown in FIG. 1B, the tool body 110 here is a two-split structure of first and second case half-bodies 111, 112 made of plastic. Although not particularly illustrated, the case half-bodies 111, 112 are constituted to be able to be integrated together by mating fitting pins protrudingly formed on the inner side of the first case half-body 111 with fitting holes set in bosses provided in a protruding manner on the inner side of the second case half-body 112. Note that this is merely one example of the constitution of the tool body 110 and is not meant to particularly limit the present invention.

The cleaning member 12 is here a cleaning tape, the cleaning tape 12 (hereafter simply referred to at times as the tape) is not particularly limited, and one can be adopted in which a publicly known suitable cleaning fabric (unwoven or woven fabric) is processed into a tape shape. For example, those made from an extra-fine fiber such as polyester or nylon are exemplified.

As shown in FIG. 9, in the first embodiment, the tape 12 is disposed in the central portion of the insertion portion 120 in the width direction (the horizontal direction in FIG. 9) and disposed on both side portions of the insertion portion 120 in the width direction. The central tape 12, as shown in FIG. 5, performs wiping and cleaning of region E1 (central region) located between guide-pin holes 161c or guide pins 165 on the ferrules 161, 181, and the tapes 12 on both sides perform wiping and cleaning of the regions E2, E3 outside the guide-pin holes 161c or guide pins 165 (outside regions). This enables efficient cleaning of the central region E1 and the outside regions E2, E3 of the connection end face 161a simultaneously even when the guide pins 165 protrude from the connection end face 161a of the optical plug 160.

In the first embodiment, the number of tapes 12 is not particularly limited, and may be one or more.

Figure 2:
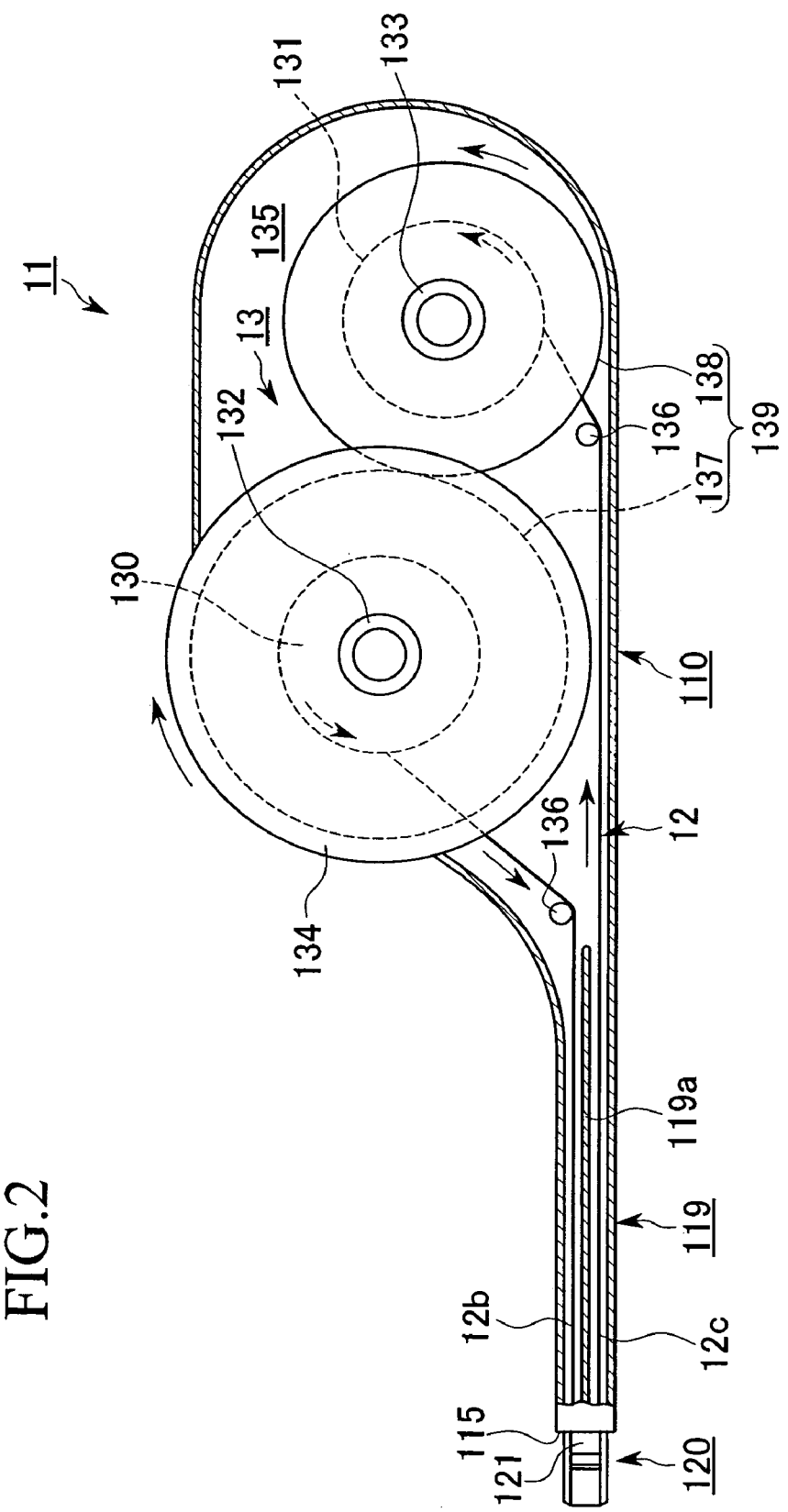
FIG. 2 is a sectional view showing the inside of the cleaning unit shown in FIGS. 1A and 1B.
Figure 3:
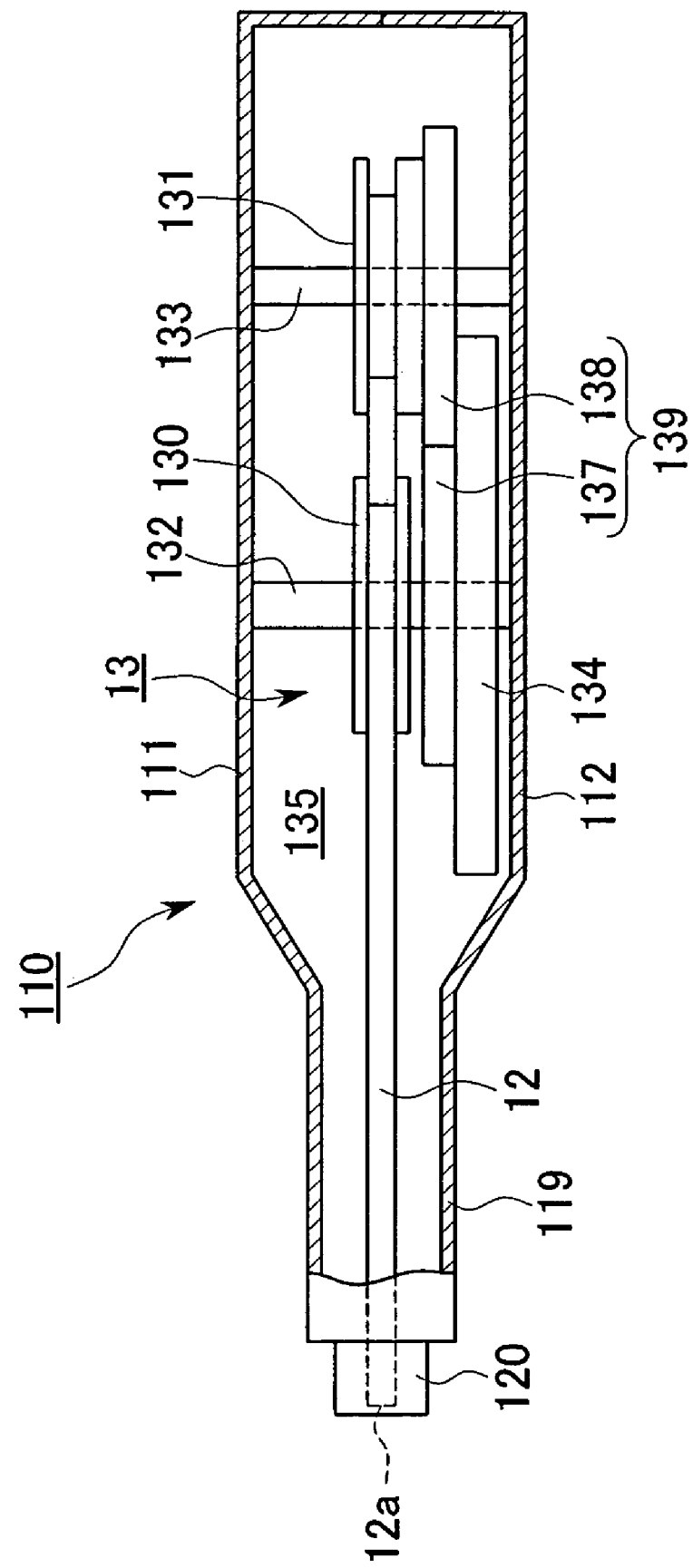
FIG. 3 is a sectional view showing the inside of the cleaning unit shown in FIGS. 1A and 1B.

As shown in FIGS. 2 and 3, a tape feeding mechanism that feeds the tape 12 is provided as the driving mechanism 13 in a storage space 135 of the tool body 110.

This tape feeding mechanism 13 is provided with a supply reel 130 wound with the tape 12, a take-up reel 131 that takes up and collects the tape 12 after use, and an operation dial 134 that operates the tape 12.

On a surface inside (the side facing the storage space 135) of the first case half-body 111, a supply reel support shaft 132 on which the supply reel 130 is rotatably mounted and a take-up reel support shaft 133 on which the take-up reel 131 is rotatably mounted are provided to protrude toward the second case half-body 112.

Here, the supply reel support shaft 132 and the take-up reel support shaft 133 are integrally formed with one case half-body, and by inserting them in holes provided in the other case half-body, both case half-bodies 111, 112 are bridged with the storage space 135.

Between the supply reel 130 and the take-up reel 131, the tape 12 is stretched in the storage space 135 along pin-shaped tape guides 136. Midway, it is wound around a head member 123, to be described hereinafter, housed in the insertion portion 120.

The operation dial 134 is mounted on the outer circumference of the supply reel support shaft 132 so as to be concentric with the supply reel 130.

A gear 137 is integrally provided on the operation dial 134 so as to be coaxial. This gear 137 is meshed with a gear 138 provided coaxially and integrally with the take-up reel 131. These gears 137, 138 transmit driving force due to rotating operation of the operation dial 134 to the take-up reel 131, and function as a driving force transmission mechanism 139 for taking up the tape 12. A portion of the operation dial 134 is exposed to outside the tool body 110 from a window 111a provided on a side surface of the tool body 110.

The radius of the operation dial 134 is greater than the radius of the take-up reel 131. As a result, the length of the tape 12 taken up on the take-up reel 131 is smaller than the amount of operation of the operation dial 134 (displacement amount along the outer circumference of the operation dial 134) by just as much as the radial ratio. For this reason, very small feeding amounts of the tape 12 can be easily achieved.

The tape feeding mechanism 13 can be driven by operating the operation dial 134 by finger or the like to rotate it in the prescribed direction. More specifically, by rotation of the operation dial 134, the take-up reel 131 rotates to take up the tape 12, and the unused tape 12 is unreeled from the supply reel 130 and fed. Since the window 111a opens to the side surface of the tool body 110, even if the cleaning unit 11 is held with one hand, the operation dial 134 can be easily operated by a finger of the hand holding the cleaning unit 11.

Moreover, the cleaning unit 11 is, as shown in FIGS. 1A, 1B and FIG. 2, provided with the insertion portion 120, which is set to protrude from the tool body 110 and formed to be insertable in the optical adaptor 170. By inserting the insertion portion 120 into the optical adaptor 170, an abutting portion 12a of the cleaning member 12 (tape) disposed facing an opening portion 126 in the distal end of the insertion portion 120 is positioned to be abuttable against the connection end face 161a, 181a of the optical plug 160, 180.

That is, the tool body 110 tapers toward the insertion portion 120, with the insertion portion 120 formed at the distal end of a small diameter portion 119 (the left side in FIG. 1A).

As will hereinafter be described, the abutting portion 12a of the tape 12 is the portion positioned on an abutting face 124 of the head member 123, with the abutting portion 12a being replaced along the longitudinal direction of the tape 12 by feeding movement of the tape 12.

As shown in FIG. 2, a projecting wall 119a for reinforcing the small diameter portion 119 is provided in the interior of the small diameter portion 119. Since the path of the upstream side portion 12b of the cleaning tape 12 that should be clean (hereafter referred to as the "upstream portion") heading from the supply reel 130 to the head member 123 and the path of the downstream side portion 12c of the cleaning tape 12 that is soiled from wiping and cleaning (hereafter referred to as the "downstream portion") heading from the head member 123 toward the take-up reel 131 are partitioned by this projecting wall 119a, it exhibits the effect of suppressing migration of contaminants on the cleaning tape 12.

A step 115 with the tool body 110 side is provided on the insertion portion 120. This step 115 is for preventing the depth of entry of the insertion portion 120 into the connector housing hole 172 from becoming too deep by the step 115 abutting the periphery 171a of the connector insertion port 171 in the optical adaptor 170 when the insertion portion 120 is inserted in the connector housing hole 172 of the optical adaptor 170.

Figure 4:
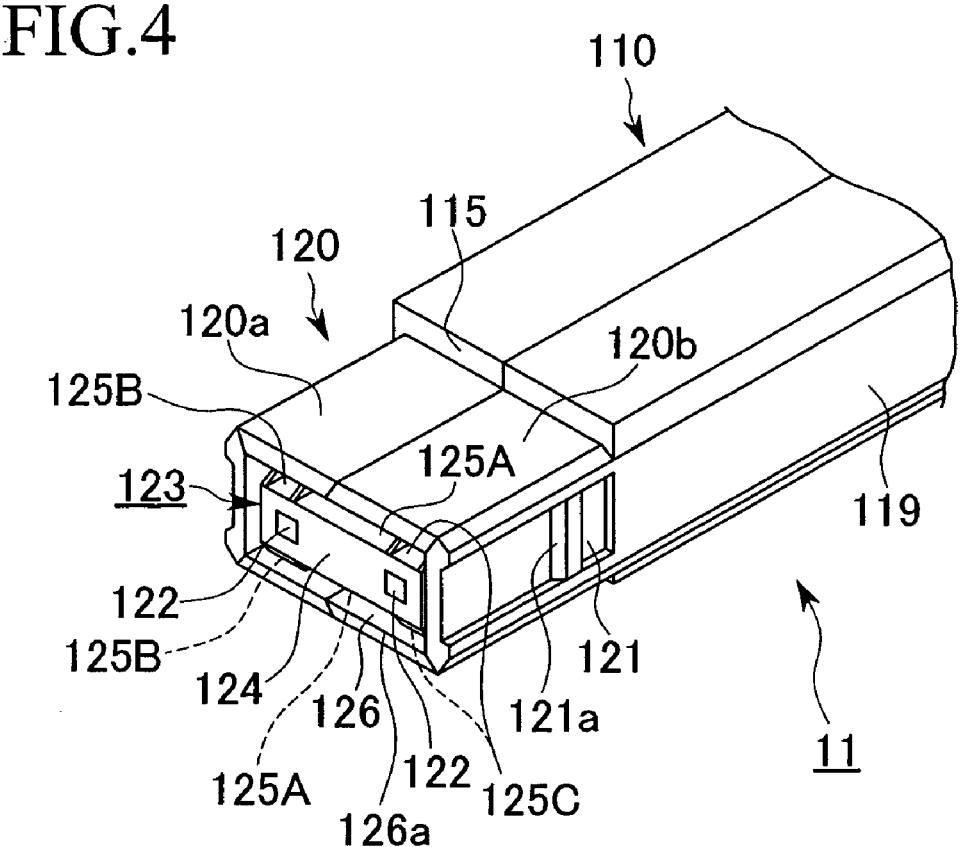
FIG. 4 is a partially enlarged perspective view of the insertion portion of the cleaning unit shown in FIGS. 1A and 1B.

Here, as shown in FIG. 4, the insertion portion 120 is a two-split structure similar to the tool body 110, being formed by integration of insertion portion half-bodies 120a, 120b integrally formed with the case half-bodies 111, 112, respectively, accompanying the integration of the case half-bodies 111, 112.

Engaging recesses 121 formed to be engageable with the engaging claws of the elastic engaging pieces (described above) on the optical adaptor 170 when the insertion portion 120 is inserted in the optical adaptor 170 are formed on both sides in the width direction of the outer surface of the insertion portion 120. Since front edge portions 121a of the engaging recesses 121 (edge portions on the side near the distal end of the insertion portion 120, on the left side in FIG. 4) are oblique faces, in the state of the engaging claws of the optical adaptor 170 engaged with the engaging recesses 121, when the insertion portion 120 is pulled out in the disengagement direction (toward the upper right in FIG. 4), the engaging claws overcome the front edge portions 121a so as to disengage from the engaging recesses 121 with comparatively little force.

The head member 123, which causes the tape 12 to abut the connection end face 161a, 181a of the ferrule 161, 181, is disposed in the insertion portion 120.

The head member 123 has an abutting face 124 disposed facing the connection end face 161a, 181a in the state of the insertion portion 120 of the cleaning unit 11 inserted in the optical adaptor 170. The cleaning tape 12 disposed on the abutting face 124 is exposed to the outside of the insertion portion 120 via an opening portion in the protrusion distal end 126 (hereafter referred to at times as opening portion 126) of the insertion portion 120. The abutting face 124 is provided on the side of the insertion direction of the head member 123 (the left side in FIGS. 7 and 8). The abutting face 124 is of an approximately rectangular shape and is able to effectively secure an abutting area against the connection end face 161a, 181a.

Although the abutting face 124 is positioned inward of an end edge 126a of the opening portion 126 in the insertion portion 120 (right side in FIGS. 7 and 8), depending on conditions such as the shape of the optical connector to be cleaned, the abutting face 124 may be made to protrude to the side of the insertion direction (left side in FIGS. 7 and 8) more than the end edge 126a of the opening portion 126.

Moreover, in the head member 123, as shown in FIG. 4, guide grooves 125A, 125B, 125C to guide the tape 12 are provided to oppose each other via the abutting face 124 on the upstream side (here, the top side in FIG. 4) and the downstream side (here, the bottom side in FIG. 4) in the feeding direction of the tape. These guide groves 125A, 125B, 125C are not essential to the present invention, but function as a tape positioning mechanism.

Three pair of the guide grooves 125A, 125B, 125C are provided, corresponding to the tapes 12, 12, 12. The widths of the guide grooves 125A, 125B, 125C fit the widths of the corresponding tapes 12. The tapes 12 are wrapped around the head member 123 by the upstream side guide grooves 125A, 125B, 125C, the abutting face 124, and the downstream side guide grooves 125A, 125B, 125C, respectively.

Figure 8:
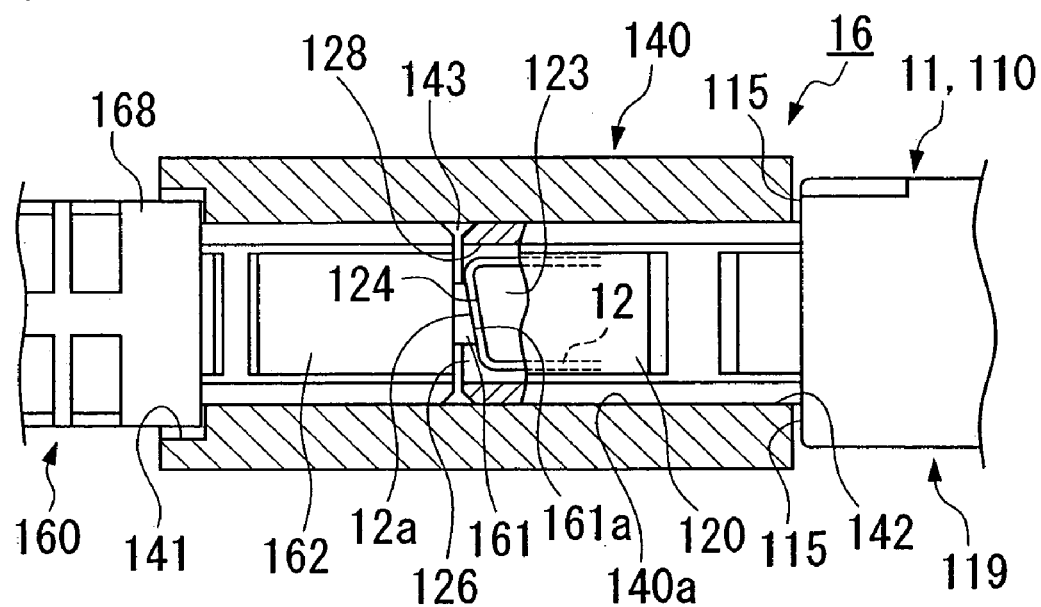
FIG. 8 is a partial sectional view showing an example of the state of the optical connector cleaning tool in FIG. 6 inserted in an optical connector.

Thus, by guiding the tape 12 by the guide grooves 125A, 125B, 125C, as shown in FIG. 8, even when the head member 123 has changed direction by tilting, disadvantages such as the tape 12 being soiled by contacting inner walls 128 (the top and bottom walls in FIG. 8) of the insertion portion 120 in the tilting direction of the head member 123 are prevented, and feeding of the tape 12 is smoothly performed.

The head member 123 has an elastically deformable portion such as a spring portion (not illustrated), and as shown in FIG. 8, and it is preferable for the abutting face 124 to tilt upward or downward (vertically in FIG. 8). In this case, when the connection end face 161a of the optical plug 160 is made to abut on the abutting face 124, the pushing pressure against the head member 123 is transmitted to the spring portion, causing the spring portion to undergo elastic deformation, by which the abutting face 124 tilts in accordance with the slope angle of the connection end face 161a. Accordingly, in the event of the ferrule 161 having a perpendicularly polished connection end face 161a or an obliquely polished connection end face 161a, abutting force of the connection end face 161a abutting on the tape 12 is more uniform, and contaminants on the connection end face 161a can be more securely removed.

In addition, guide pin insertion holes 122 are formed on the abutting face 124 of the head member 123 on both sides in the width direction of the insertion portion 120. The guide pin insertion holes 122 are formed to allow the protruding members (guide pins) 165 which protrudes from the connection end face 161a to be inserted when the head member 123 is inserted into the optical fiber 170 without interference. By this, even when the guide pins 165 protrude on the connection end face 161a, 181a of the optical plug 160, 180, the guide pins 165 are housed in the guide pin insertion holes 122 provided on the head member 123, enabling the insertion portion 120 to be housed in the connector housing hole 172 without interference with the guide pins 165.

The connector cleaning guide 140 (guide) is formed in an approximately sleeve shape (tube shape) from plastic, with a plug insertion port 141 (first port) in which the optical plug 160 is inserted made at one end, and an insertion portion insertion port 142 (second port) in which the insertion portion 120 of the cleaning unit 11 is inserted made at the other end opposite the plug insertion port 141. The plug insertion port 141 and the insertion portion insertion port 142 are interconnected through an internal space 143 of the guide 140.

Here, the optical plug 160 may be one for connection to the optical plug 180 within the connector housing (optical adaptor 170 and the like), but is not particularly limited thereto.

As shown in FIG. 8, by insertion of the optical plug 160 from the plug insertion port 141 and insertion of the insertion portion 120 of the cleaning unit 11 from the insertion portion insertion port 142, the guide 140 can house the distal end portion of the optical plug 160 including the connection end face 161a and the insertion portion 120 of the cleaning unit 11 in the internal space 143 of the guide 140 in a state of facing each other.

The guide 140 is detachably mounted on the insertion portion 120. More specifically, when cleaning of the optical plug 160, 180 is not being carried out, as shown in FIGS. 1A and 1B, the guide 140 can be in a state of the insertion portion 120 of the cleaning unit 11 inserted in the insertion portion insertion port 142.

At this time, it is preferable to attach the cap 150 as a lid for blocking the plug insertion port 141 of the guide 140. The cap 150 shown in FIGS. 6 and 7 has a fitting portion 151 to be fit in the plug insertion port 141 and a knob 152 protruded to the outside (left side in FIGS. 6 and 7) opposite the fitting portion 151. As this cap 150, a conventionally used cap can be used as a plug for blocking the connector insertion port 171 of the optical adaptor 170.

Attaching the cap 150 to block the plug insertion port 141 of the guide 140 can inhibit ingress of debris, dust and water and the like into the internal space 143 of the guide 140, thereby enabling the internal space 143 to be constantly maintained in a clean state.

To curb loss and the like of the cap 150, it is convenient to connect the cap 150 to the guide 140 with a hinge or string.

As an example of the method of using the cleaning unit 11, an example of the procedure of cleaning the connection end face 181a of the optical connector 180 in the optical adaptor 170 is explained.

As shown in FIG. 10, by inserting the insertion portion 120 of the cleaning unit 11 from the connector insertion port 171 of the optical adaptor 170, the insertion portion 120 enters the connector housing hole 172 as its outer surface is aligned by the inner walls 170a of the optical adaptor 170. By pushing the insertion portion 120 until the step 115 runs into the periphery 171a of the connector insertion port 171, the cleaning member 12 is positioned to be abutted on an appropriate position (here, the optical fiber holes and periphery thereof) of the connection end face 181a of the optical plug 180.

By rotating the operation dial 134 by a prescribed amount, the tape 12 moves in conjunction with the rotation of the take-up reel 131, and the connection end face 181a is wiped and cleaned by the tape 12, with contaminants such as debris, dust and oil adhering to the connection end face 181a being securely extracted by the tape 12.

Since extracted contaminants adhere to the tape 12 and move in the direction to be taken up on take-up reel 131, the used tape 12 is not exposed any more from the opening portion 126 of the insertion portion 120, and because there is no risk of the contaminants once again adhering to the connection end face 181a, the connection end face 181a can be thoroughly cleaned.

After cleaning, the insertion portion 120 can be easily removed from the optical adaptor 170 by pulling in the direction opposite to when inserting the cleaning unit 11 (disengagement direction).

Since the insertion portion 120 is positioned in the internal space 143 of the guide 140 by internal walls 140a of the guide 140 during cleaning as well, wiping and cleaning of the connection end face 181a of the optical plug 180 by the abutting portion 12a of the tape 12 can be performed with a uniform pushing pressure without displacement. In addition, the insertion portion 120 can be supported in the guide 140 with an extremely light force, and so has excellent operability.

Next, an example of the procedure of cleaning the connection end face 161a of the optical plug 160 outside the optical adaptor 170 is explained.

Figure 6:
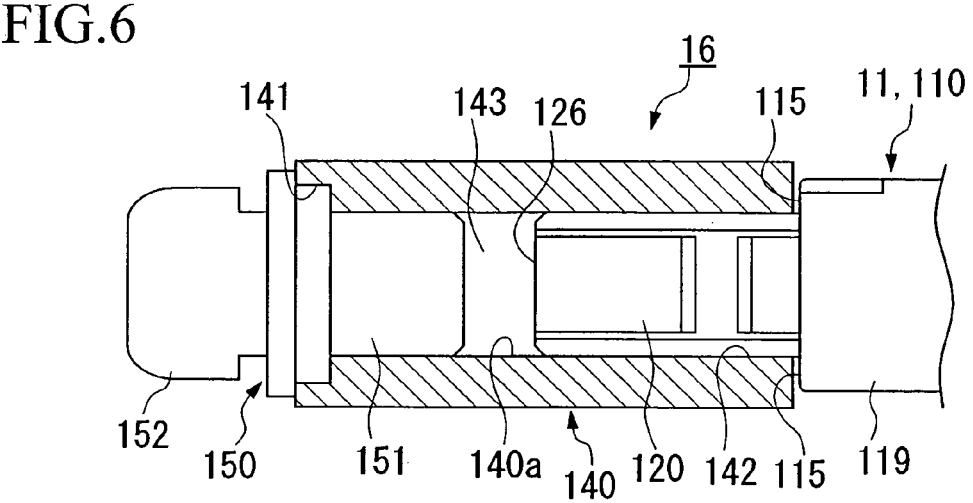
FIG. 6 is a partial longitudinal sectional view of the main portions of the optical connector cleaning tool shown in FIGS. 1A and 1B.
Figure 7:
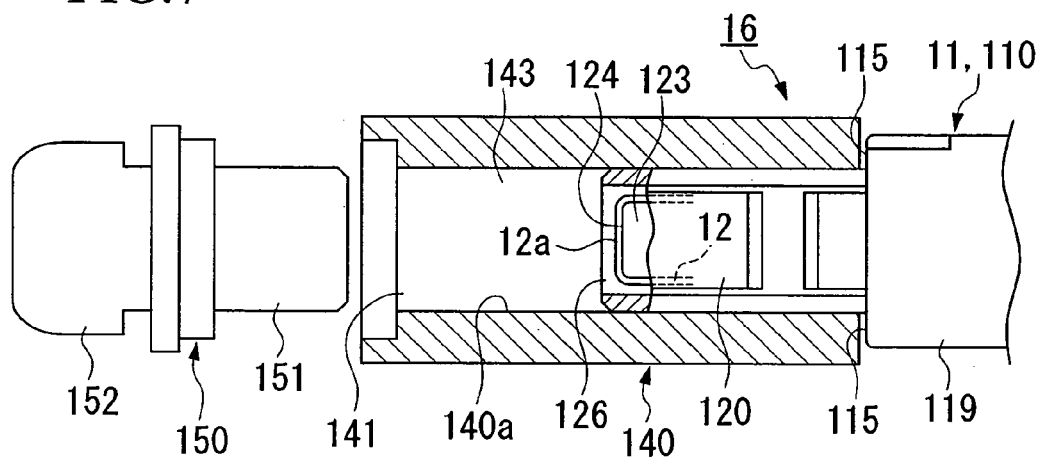
FIG. 7 is a partial sectional view showing the state of the cap in the optical connector cleaning tool in FIG. 6 taken out.

As shown in FIG. 6, in the case of the cap 150 being attached to the insertion portion 120 of the cleaning unit 11, first, as shown in FIG. 7, the cap 150 is removed from the plug insertion port 141 of the guide 140. Next, as shown in FIG. 8, by inserting the optical plug 160 in the plug insertion port 141 of the guide 140, the outer surface of the optical plug 160 advances into the internal space 143 of the guide 140 while being positioned by the internal walls 140a of the guide 140. By pushing the optical plug 160, the cleaning tape 12 is positioned to be abutted on an appropriate position (here, the optical fiber holes 161b and periphery thereof) of the connection end face 161a of the optical plug 160.

In this way, since butting of the connection end face 161a of the optical plug 160 and the abutting portion 12a of the tape 12 of the insertion portion 120 is appropriately guided by the guide 140, cleaning of the connection end face 161a of the optical plug 160 in the guide 140 can be easily carried out similarly to the case of the connection end face 181a of the optical plug 180 in the aforementioned optical adaptor 170.

After cleaning, the plug 160 can be easily removed from the guide 140 by pulling the plug 160 or the cleaning unit 11 in the direction opposite to when inserted in the guide 140 (disengagement direction). At this juncture, in order to inhibit disadvantages such as the insertion portion 120 coming out from the guide 140 before the plug 160, a retaining mechanism may be provided on the cleaning unit 11 and/or the guide 140.

More specifically, according to the cleaning tool 16 of the first embodiment, the connection end face 181a of the optical plug 180 in the optical adaptor 170 can be cleaned in the state of being housed in the optical adaptor 170 and, by mounting the guide 140 on the insertion portion 120, the connection end face 161a of the optical plug 160 outside the optical adaptor 170 can also be cleaned. Since either of the optical plugs 160, 180 can be cleaned by one type of cleaning tool, the number of articles required for cleaning work can be reduced.

By mounting the guide 140 with the attached cap 150 (lid) on the insertion portion 120, the guide 140 functions as a lid (cap) preventing exposure of the cleaning member 12 from the opening portion 126 of the insertion portion 120 when not in use (cleaning work), thereby preventing contamination of the cleaning member 12 and the like during storage or transport of the cleaning tool 16.

Figure 11:
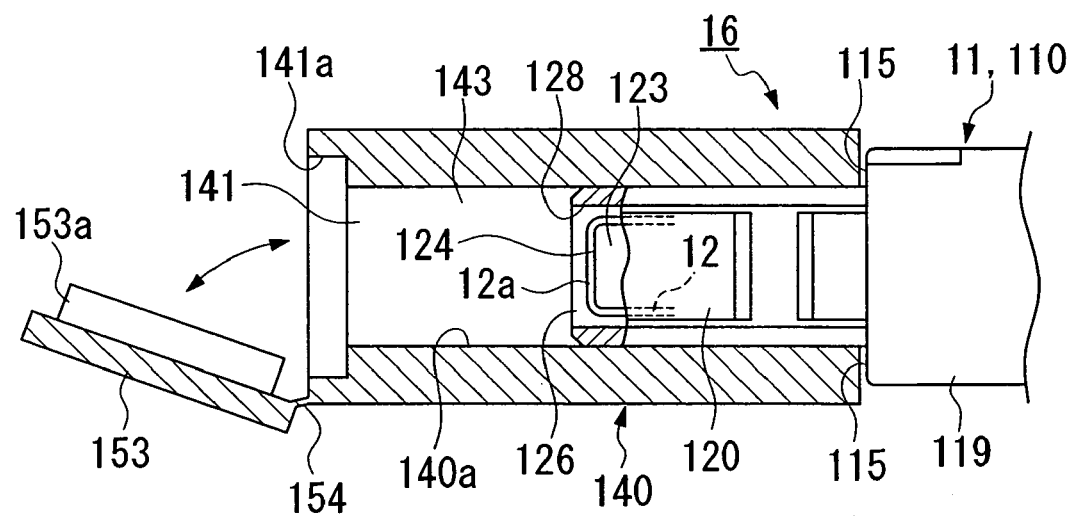
FIG. 11 is a partial longitudinal sectional view showing the optical connector cleaning tool according to the second embodiment of the present invention.

FIG. 11 shows the main portions of the optical connector cleaning tool and connector cleaning guide of the second embodiment of the present invention. In FIG. 11, those reference numerals that are the same as the reference numerals used in FIGS. 1A through 10 indicate identical or similar constitutions as in the optical connector cleaning tool of the first embodiment, and duplicate explanations will be omitted herein.

Except for a lid 153 covering the plug insertion port 141 of the connector cleaning guide 140 being integrally formed with a sleeve-shaped guide body 140b by a hinge 154, the optical connector cleaning tool 16 is constituted similarly to the optical connector cleaning tool of the first embodiment, and the internal walls 140a of the guide body 140b aligning insertion of the insertion portion 120 and the optical connector plug is also as described above.

The lid 153 has a convex portion 153a facing the plug insertion port 141, and by fitting the convex portion 153a to a periphery 141a of the plug insertion portion 141 it is mounted on the plug insertion portion 141. Since the hinge 154 can easily deform elastically, opening and closing of the plug insertion port 141 by the lid 153 can be freely performed. According to this kind of optical connector cleaning tool 16, since the lid 153 is integrated with the connector cleaning guide 140, loss of the lid 153 is prevented and opening and closing of the lid 153 is also simplified.

FIGS. 12A through 14 are views showing the third embodiment of the optical connector cleaning tool of the present invention.

Figure 13:
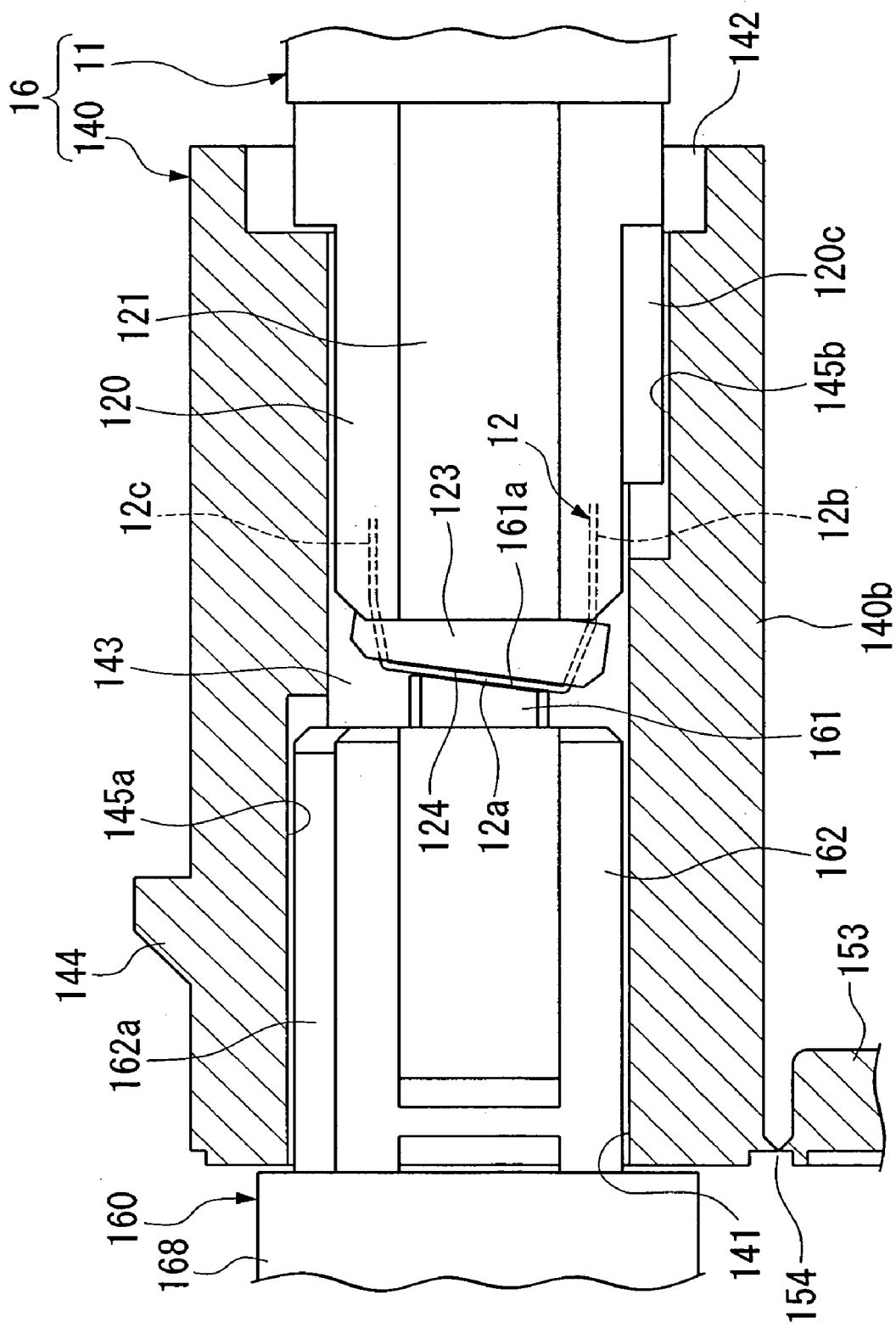
FIG. 13 is a sectional view showing an example of the state of the insertion portion of the cleaning tool shown in FIGS. 12A to 12D and an optical connector plug inserted in a guide cap.
Figure 14:
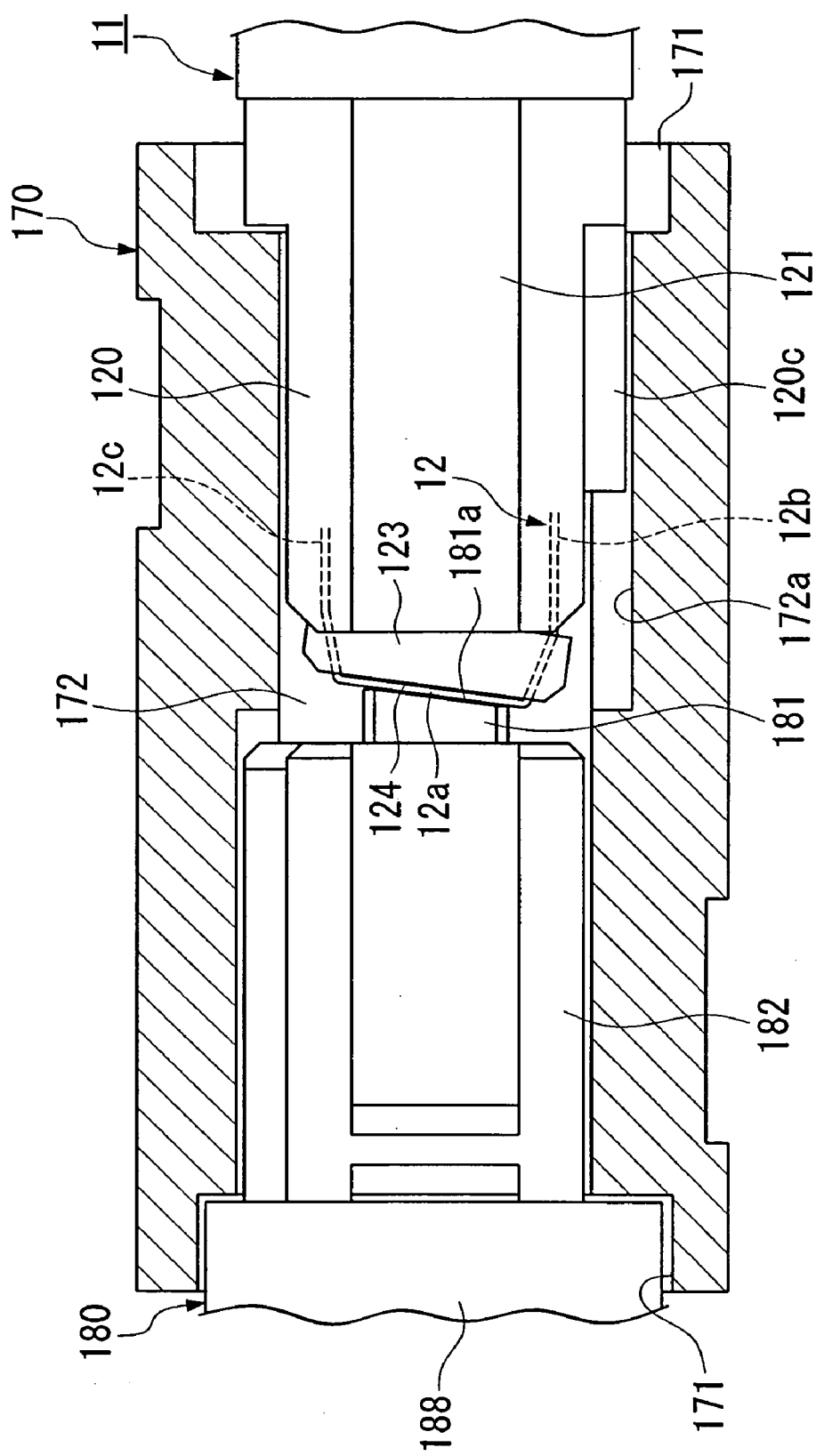
FIG. 14 is a sectional view showing an example of the state of the insertion portion of the cleaning tool shown in FIGS. 12A to 12D and an optical connector plug inserted in an optical connector adaptor.

In FIGS. 12 through 14, those reference numerals that are the same as the reference numerals used in FIGS. 1A through 11 indicate identical or similar constitutions as in the optical connector cleaning tool of the aforementioned first embodiment, and duplicate explanations will be omitted herein.

As shown in FIG. 14, the insertion portion 120 of the cleaning unit 11 used in the optical connector cleaning tool 16 of the third embodiment is provided with a key 120c in a protruding manner to fit a key groove 172a on the optical adaptor 170, thereby blocking reverse insertion in the optical adaptor 170.

As shown in FIGS. 12A through 12D and FIG. 13, the guide 140 has the guide body 140b formed in an approximately sleeve shape (tube shape) from plastic and the lid 153 connected to one end of the guide body 140b by the hinge 154. A fitting hole 153b that fits a projection 144 provided on the guide body 140b is formed in the lid 153, so that by flexing the hinge 154 to fit the fitting hole 153b of the lid 153 with the projection 144 on the guide body 140b, the lid 153 can be maintained in a closed state.

The end of the lid 153 side of the guide body 140b has the plug insertion port 141 in which the optical plug 160 is inserted, and the other end opposite the plug insertion port 141 has the insertion portion insertion port 142 in which the insertion portion 120 of the cleaning unit 11 is inserted. The plug insertion port 141 and the insertion portion insertion port 142 are interconnected through the internal space 143 of the guide 140.

As shown in FIG. 13, similarly to the guide of the first and second embodiments, by insertion of the optical plug 160 from the plug insertion port 141 and insertion of the insertion portion 120 of the cleaning unit 11 from the insertion portion insertion port 142, the guide 140 can house the distal end portion of the optical plug 160 including the connection end face 161a and the insertion portion 120 of the cleaning unit 11 in the internal space 143 of the guide 140 in a state of facing each other.

In addition, projections (ribs) 146 are provided on the inner walls of the insertion portion insertion port 142 of the guide body 140b. The projections 146 abut or chafe on the outer surface of the insertion portion 120 when inserting the insertion portion 120 in the guide 140, thereby hindering the guide 140 from coming off the insertion portion 120 (guide retaining mechanism). Thus, after cleaning with the insertion portion 120 of the cleaning unit 11 and the plug 160 inserted in the guide 140, disadvantages such as the insertion portion 120 falling out of the guide 140 before the plug 160 when pulling the plug 160 from the guide 140 are inhibited, thereby enhancing convenience.

Moreover, in the guide 140 of the third embodiment, a key groove 145a to fit a key 162a provided in a protruding manner on the outer surface of the housing 162 of the optical plug 160 is provided on an inner wall on the plug insertion port 141 side of the guide body 140b. Also, a key groove 145b to fit a key 120c provided in a protruding manner on the outer surface of the insertion portion 120 of the cleaning unit 11 is provided on the inner wall of the insertion portion insertion port 142 side of the guide body 140b.

For this reason, in the guide 140, when the orientation of the keys 162a, 120c and the key grooves 145a, 145b do not match, the optical plug 160 and the insertion portion 120 of the cleaning unit 11 cannot be inserted into the guide body 140b. In the case of the connection end face 161a of the optical plug 160 being obliquely polished, errors of inserting the optical plug 160 in the guide 140 with its orientation in the thickness direction reversed (reverse insertion) are thereby prevented.

The guide 140 is detachably mounted on the insertion portion 120. More specifically, when cleaning of the optical plug 160 is not being carried out, the guide 140 can be in a state of the insertion portion 120 of the cleaning unit 11 inserted in the insertion portion insertion port 142. In addition, as shown by the chain double-dashed line in FIG. 12A, closing the lid 153 that covers up the plug insertion port 141 of the guide 140 can inhibit ingress of debris, dust and water and the like into the internal space 143 of the guide 140, thereby enabling the internal space 143 to be constantly maintained in a clean state.

The present invention based on the preferred first through third embodiments was explained hereinabove, but the present invention is not limited to only the first through third embodiments and can be modified within a range that does not depart from the spirit of the present invention.

(1) The insertion portion has formed in a plurality of locations in its protruding direction unit insertion portions which by insertion into different connector housings are to be positioned within the connector housing, each of the unit insertion portions of the insertion portion able to be formed so as to be insertable in all connector housings capable of housing unit insertion portions positioned relatively to the rear in the protruding direction of the insertion portion. With this kind of cleaning tool, the insertion portion can be inserted so as to be positioned with respect to different connector housings by the unit insertion portions, so that, using a single cleaning tool, cleaning of a connection end face of an optical connector in the connector housing can be carried out in compliance with a plurality of types and sizes of connector housing.

(2) The insertion portion can be constituted as one in which a plurality of kinds of insertion portions are exchangeable with respect to the tool body. This enables cleaning of the connection end face of an optical connector in a connector housing in compliance with the type and size of the connector housing just by changing the insertion portion without changing the tool body.

(3) The driving mechanism for feeding the tape is not limited to one that is manually driven, and may be made to be driven by power from a motor or spring and the like. Also, manual driving and driving by motive power can be made to be used in combination or be switchable as required.

(4) In the cleaning tool of the aforementioned first through third embodiments, the insertion portion is made to completely cover the cleaning member, except for the opening formed at the distal end of the insertion portion, but is not necessarily limited thereto. If the cleaning member is prevented from being contaminated by contact with the inner walls of the connector housing and the like when inserting the insertion portion in the connector housing, the shape or structure is not particularly limited, and does not necessarily need to be sleeve shaped.

(5) In the aforementioned first through third embodiments, the connector housing is the optical adaptor 170 allowing insertion of the optical plugs 160, 180 from both sides thereof, but the present invention is not limited thereto, and may be an optical connector receptacle (receptacle) for optically connecting an optical connector (ferrule) disposed inside of the receptacle with the optical plug 160 inserted therein from one side. Even in this case, the connection end face of the optical connector in the optical connector receptacle can be cleaned by inserting the insertion portion into the optical connector receptacle, and the connection end face of the optical plug to be inserted into the optical connector receptacle can be cleaned by inserting the optical plug into a connector cleaning guide and abutting it on the cleaning member of the insertion portion within the guide.

(6) The cleaning member is not limited to a cleaning tape, and may for example, be a cotton swab.

(7) In the case of cleaning an optical plug using a connector cleaning guide, since it would be inconvenient for the connector cleaning guide to easily come off and separate from the insertion portion of the cleaning unit, a retaining mechanism (guide retaining mechanism) can be provided to hinder the connector cleaning guide from coming off. Such a guide retaining mechanism is not particularly limited so long as it allows the connector cleaning guide to separate from the cleaning unit and does not inhibit insertion of the insertion portion of the cleaning unit into a connector housing in the state of the connector cleaning guide being detached from the cleaning unit. For example, a mechanism that is able to detachably couple the cleaning unit and the connector cleaning guide by engagement or fitting may be included. In addition, a constitution in which the retaining mechanism is provided in the connector cleaning guide by friction or elastic resistance (spring etc.) or the like with respect to the insertion portion is also possible.

(8) The optical connector cleaning tool of the aforementioned first through third embodiments, as an optical component cleaning tool used for optical components such as optical fiber arrays and planar lightwave circuits, can be used for cleaning the end face of an optical component at which the end face of a lightwave circuit (an optical fiber being possible) is disposed. In this case, the aforementioned connector cleaning guide can be used as an optical component cleaning guide.

The optical fiber arrays may include one serving as an end face by its optical fibers being retained in one or a plurality of positioning grooves such as V-grooves positioned side by side that are formed on a substrate, the positioning grooves extending to at least one end of the substrate, and the end face of the optical fibers being arranged at one end of the substrate. Various constitutions are also known of optical components having planar lightwave circuits. According to the optical component cleaning tool of the present invention, even in the case of the end face of the optical component being disposed in a recess of a housing or the like, instead of the connection end face of the optical connector, the end face of another optical component, that is the end face of an optical fiber or the end face of a substrate or the like, can be cleaned by a cleaning tape wrapped around a head.

The present invention is explained in detail below based on the four and fifth embodiments.

FIGS. 15A through 25 are views showing the fourth embodiment of the optical connector cleaning tool of the present invention (hereafter simply referred to as the "cleaning tool").

Figure 18:
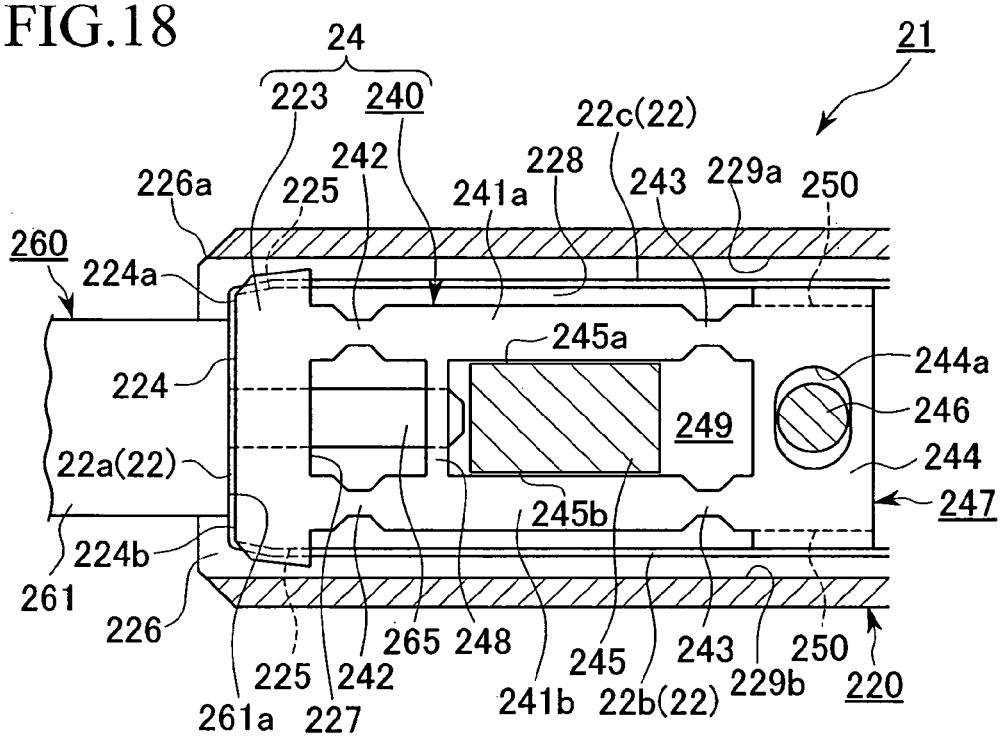
FIG. 18 is a sectional view showing an example of the state of the insertion portion of the optical connector cleaning tool shown in FIGS. 15A and 15B inserted in a connector housing.
Figure 19:
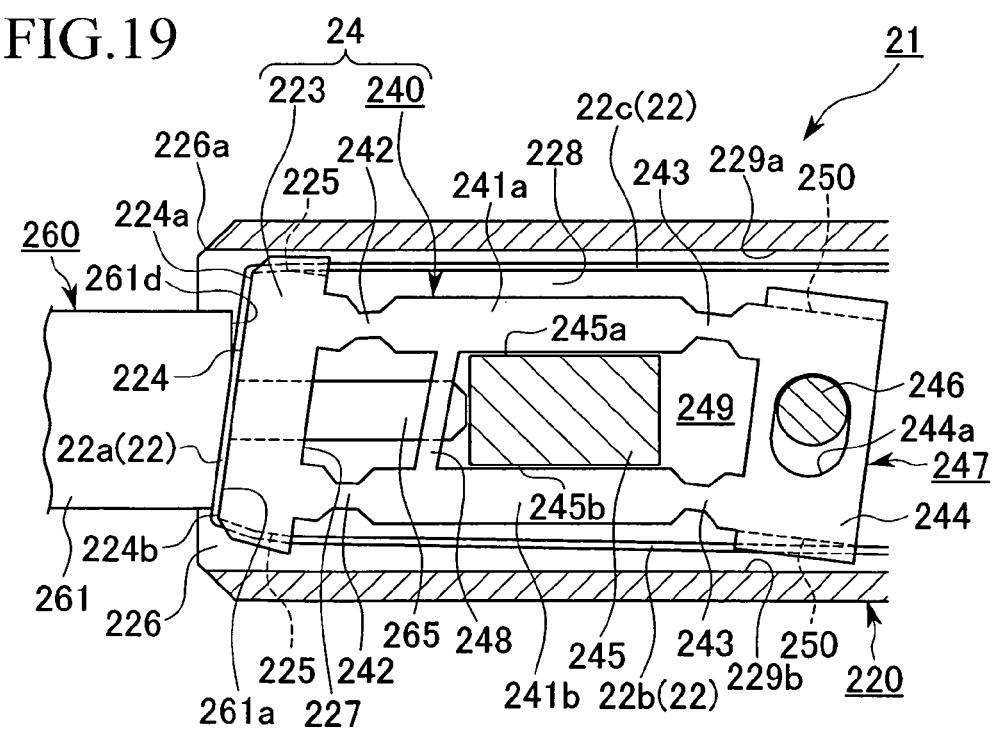
FIG. 19 is a sectional view showing another example of the state of the insertion portion of the optical connector cleaning tool shown in FIGS. 15A and 15B inserted in a connector housing.
Figure 20:
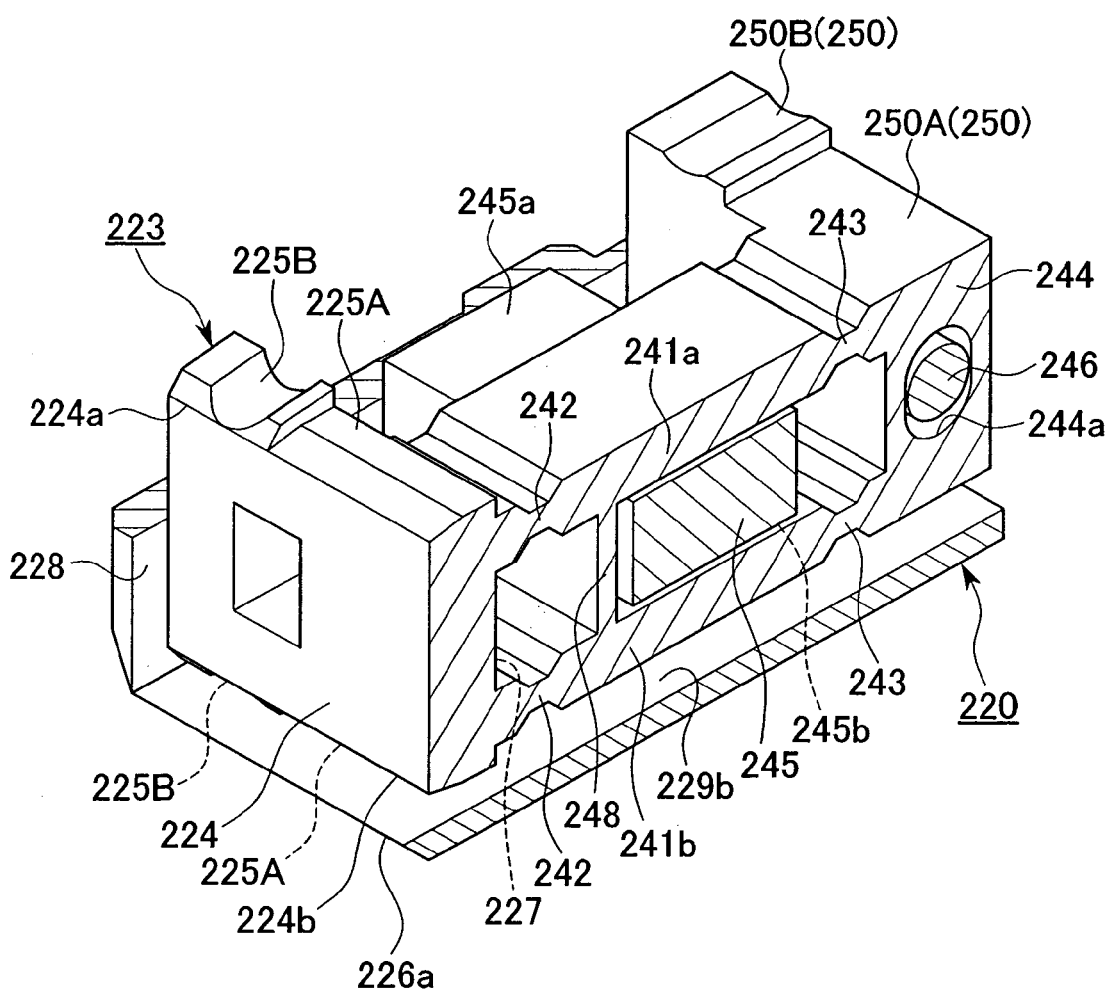
FIG. 20 is a half sectional perspective view showing another example of a possible state of the tape abutting mechanism of the optical connector cleaning tool shown in FIGS. 15A and 15B.
Figure 21:
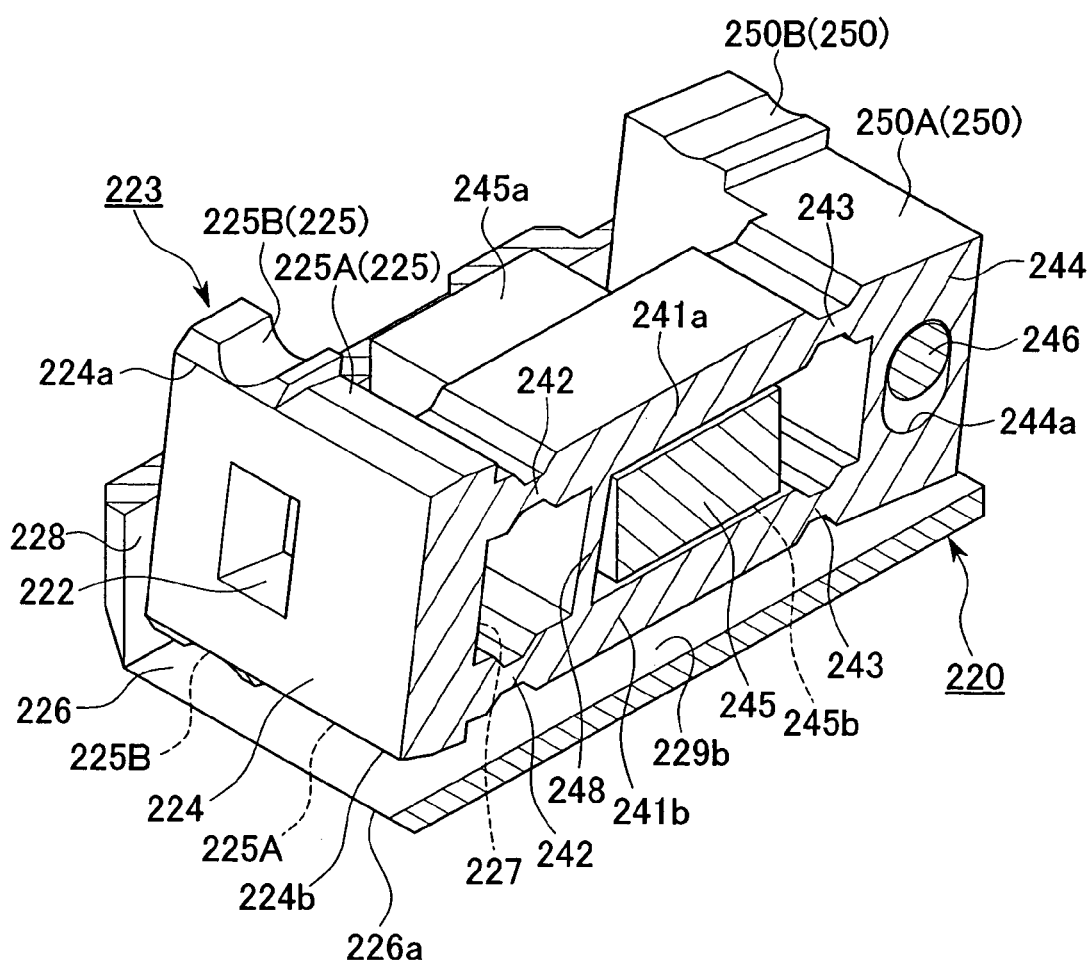
FIG. 21 is a half sectional perspective view showing another example of a possible state of the tape abutting mechanism of the optical connector cleaning tool shown in FIGS. 15A and 15B.

FIG. 20 is a perspective view corresponding to the state shown in FIG. 18, and FIG. 21 is a perspective view corresponding to the state shown in FIG. 19.

An optical connector plug 260 (sometimes referred to hereafter simply as an optical plug) and an optical connector adaptor 270 (connector housing. Sometimes referred to hereafter simply as an optical adaptor) to which a cleaning tool 21 of the fourth embodiment is applied are as shown in FIGS. 24 and 25 Multifiber Push-On (MPO) type optical connectors defined according to JIS C 5982.

The optical plug 260 is an optical connector plug of a constitution housing a Mechanically Transferable (MT) type optical connector ferrule 261 (hereafter simply referred to as a ferrule) defined according to JIS C 5981 at a distal end portion of a plastic sleeve-shaped housing 262, with the whole plug being formed in a low profile sectional shape in appearance.

In the explanation below, the direction corresponding to the low-profile, short side (vertical direction in FIG. 24) of the optical plug 260 and the ferrule 261 is referred to as the thickness direction, and the direction corresponding to the long side is referred to as the width direction (horizontal direction in FIG. 24). In addition, thickness direction and width direction are also similarly used for the optical adaptor 270 connected to the optical plug 260 and an insertion portion 220 of the cleaning tool 21 inserted in the optical adaptor 270 to correspond to the thickness direction and the width direction of the optical plug 260 and the ferrule 261.

Figure 24:
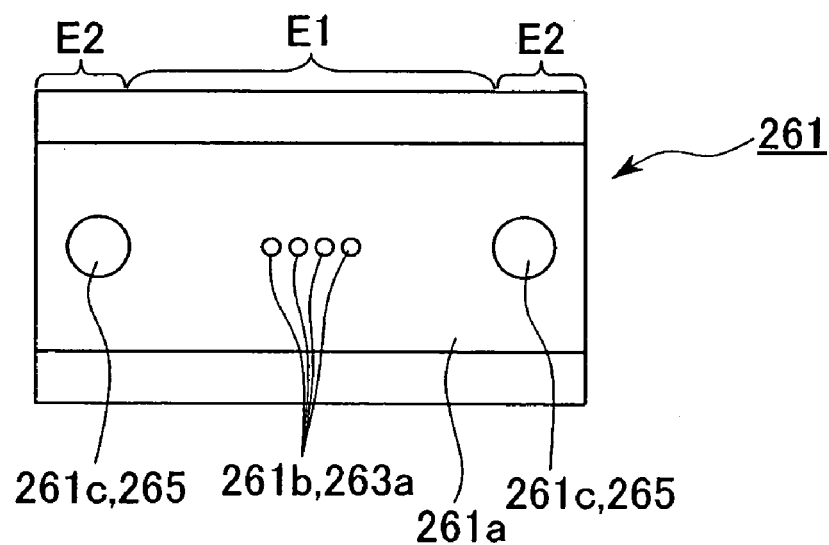
FIG. 24 is a front view showing an example of a ferrule of an optical connector plug.
Figure 25:
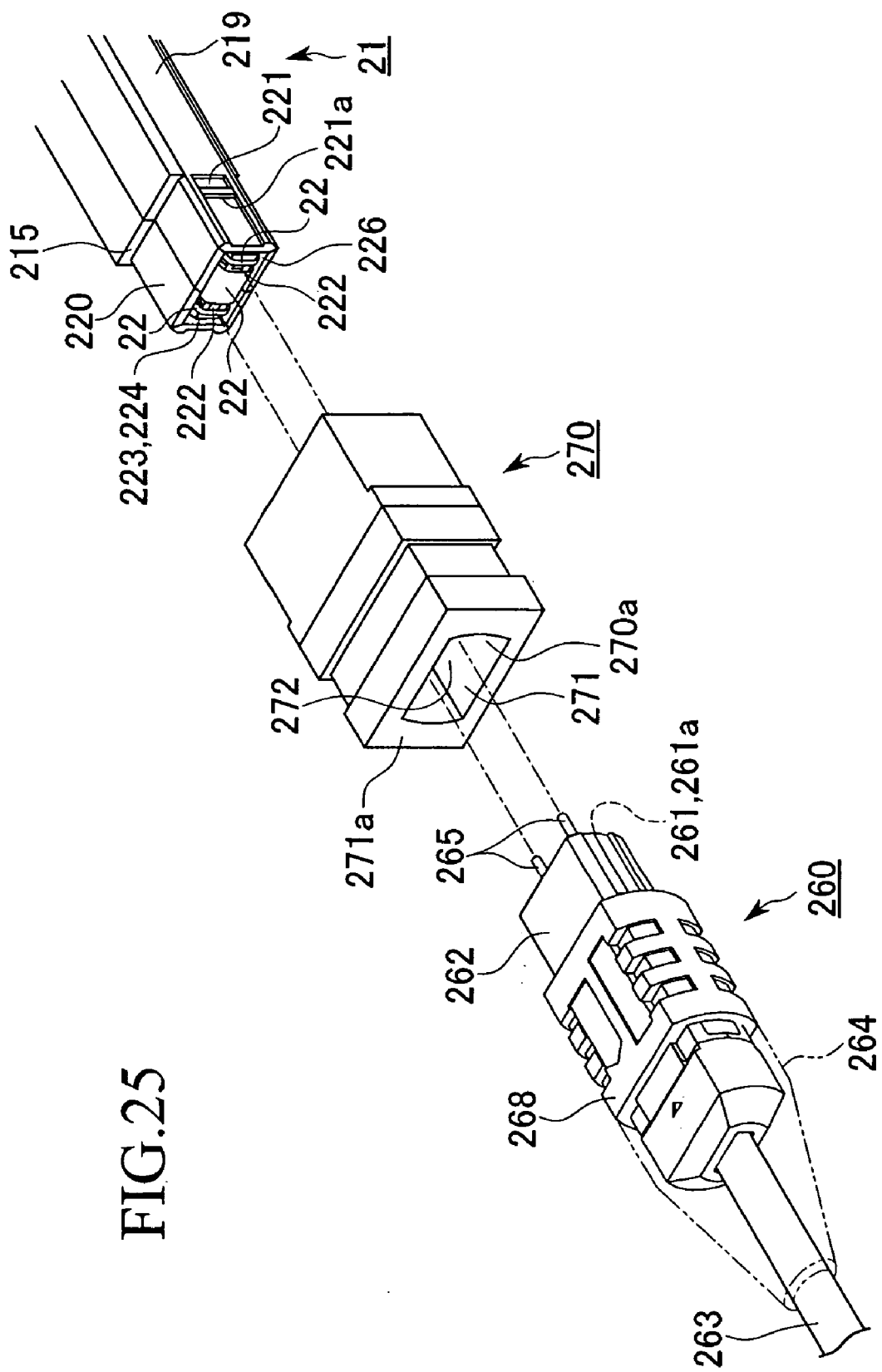
FIG. 25 is an exploded perspective view showing the state of the insertion portion of the optical connector cleaning tool shown in FIGS. 15A and 15B to be inserted in the connector insertion hole of a connector housing in which an optical connector is housed.

As shown in FIG. 24, optical fiber holes 261b of a prescribed number (here four) are opened so as to be arrayed on a connection end face 261a of the ferrule 261. Here, an optical fiber 263 is a four-fiber optical fiber tape ribbon, with optical fibers 263a having their resin coating removed at the distal end portion thereof (bare optical fibers) inserted into the optical fiber holes 261b (micro holes) in the ferrule 261. By doing so they are terminated to be butt-connectable with another optical connector and penetrate the inside of the optical plug 260 to be drawn out from the back end of the optical plug 260. By storing the optical fiber 263 drawn out from the back end of the optical plug 260 in a boot 264 provided at the back end of the housing 262 in the connection direction (left side in FIG. 25), sudden bending and the like near the back end of the optical plug 260 is prevented.

There are no particular limitations to the optical fiber 263 as long as it is suited to termination by the optical plug. For example, an optical fiber cord may be adopted having a single core or multi-core optical fiber core, with this optical fiber core housed in a tube.

Guide-pin holes 261c are provided in the connection end face 261a of the ferrule 261 on both sides of the outside of the optical fiber holes 261b in the width direction. Ferrules 261 are aligned with each other to a high degree of accuracy by a positioning mechanism of a widely-known guide-pin fitting system whereby protruding members 265 (guide pins) are provided so as to be inserted into the guide-pin holes 261c and protrude from the connection end face 261a, with the end faces of the optical fibers 263a being connected by butt-coupling. The optical fibers 263 terminated in the ferrules 261 are thus optically connected.

The optical adaptor 270 is formed in a sleeve-shape having a connector insertion port 271 on both sides. By inserting the optical plug 260 from the connector insertion port 271, it can be housed in a connector housing hole 272 formed in the interior of the optical adaptor 270 and continuous with the connector insertion port 271.

When the optical plug 260 is inserted from the connector insertion port 271 in the optical adaptor 270, it is housed in the connector housing hole 272 while displacement in a direction deviating from the insertion direction is restricted. When two optical plugs 260 are inserted in the optical adaptor 270, the ferrules 261 are butted against each other within the optical adaptor 270, with the optical fibers 263 terminated by the ferrules 261 being thereby optically connected.

Although not particularly illustrated, similarly to the widely known MPO type connector there are provided elastic engaging pieces formed extending toward the connector insertion port 271 along inner walls 270a of the optical adaptor 270 and having engaging claws on the distal end thereof. In addition, engaging recesses capable of engagement with the engaging claws of the elastic engaging pieces of the optical adaptor 270 are provided on the surfaces of both sides in the width direction of the housing 262 of the optical plug 260.

Moreover, on the periphery of the housing 262, a coupling 268 is mounted for pressing the elastic engaging pieces from the outside to prevent release of engagement with the engaging recesses when the engaging claws and the engaging recesses are engaged.

When the optical plug 260 is inserted into the optical adaptor 270 from the connector insertion port 271, it is housed in the connector housing hole 272 while displacement in a direction deviating from the insertion direction is restricted by the engagement of the engaging recesses and the engaging claws.

In the state of both optical plugs 260 being inserted in the optical adaptor 270, the distal ends of the optical fibers 263a fixedly held in the ferrules 261 within the optical adaptor 270 are butted against each other, with the optical fibers 263 terminated by the ferrules 261 being thereby optically connected.

The cleaning tool 21 capable of being applied to cleaning of the connection end face 261a of the optical plug 260 is as shown in FIGS. 15A through 17 provided with a roughly case-shaped tool body 210 having a cleaning member 22 housed therein and the insertion portion 220 set to protrude from the tool body 210 and formed to be insertable in the connector housing hole 272 of the optical adaptor 270.

Figure 15A:
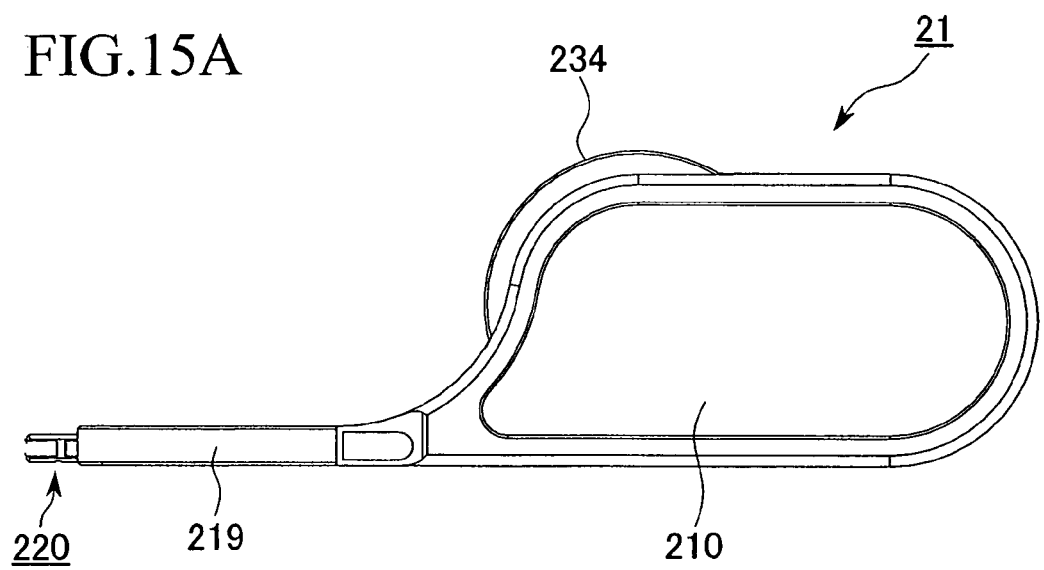
FIG. 15A is a front view showing an overview of the optical connector cleaning tool according to the fourth embodiment of the present invention.
Figure 15B:
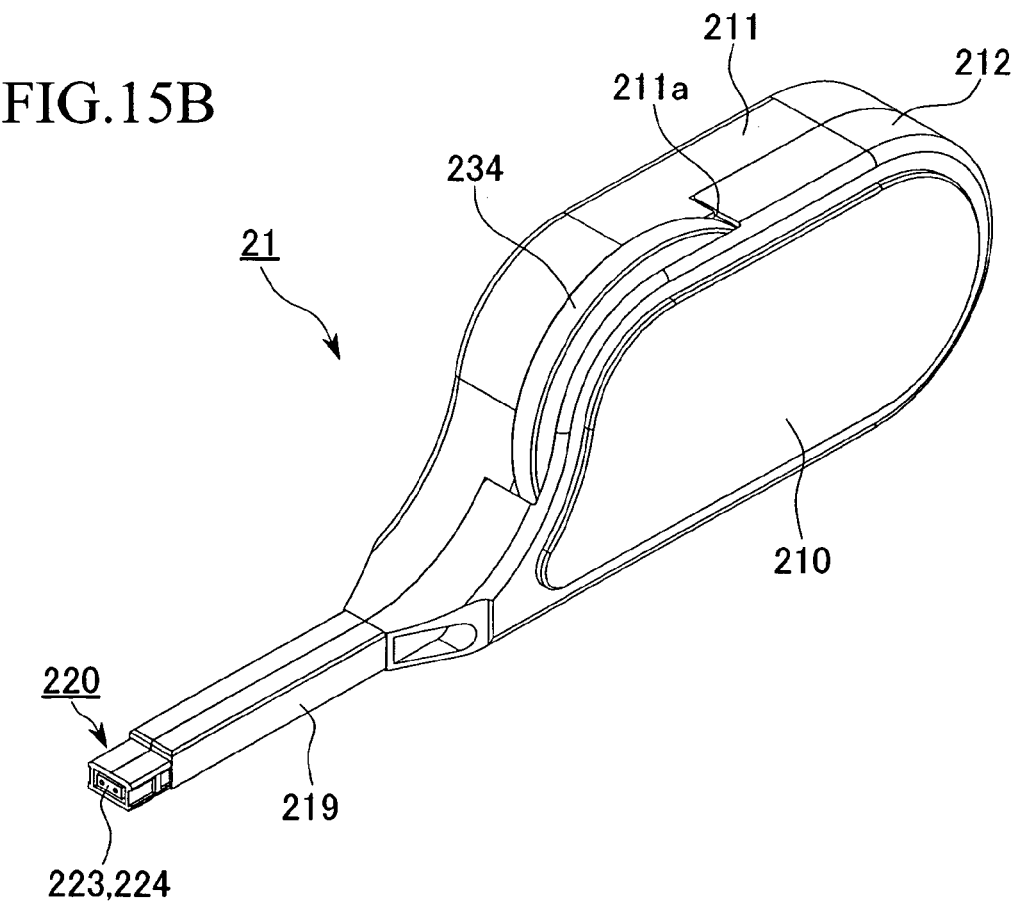
FIG. 15B is a perspective view thereof.

As shown in FIG. 15B, the tool body 210 here is a two-split structure of first and second case half-bodies 211, 212 made of plastic. Although not particularly illustrated, the case half-bodies 211, 212 are constituted to be able to be integrated together by mating fitting pins protrudingly formed on the inner side of the first case half-body 211 with fitting holes set in bosses provided in a protruding manner on the inner side of the second case half-body 212. Note that this is merely one example of the constitution of the tool body 210 and is not meant to particularly limit the present invention.

The cleaning member 22 is here a tape, the tape 22 is not particularly limited, and one can be adopted in which a publicly known suitable cleaning fabric (unwoven or woven fabric) is processed into a tape shape. For example, those made from an extra-fine fiber such as polyester or nylon are exemplified.

Figure 16:
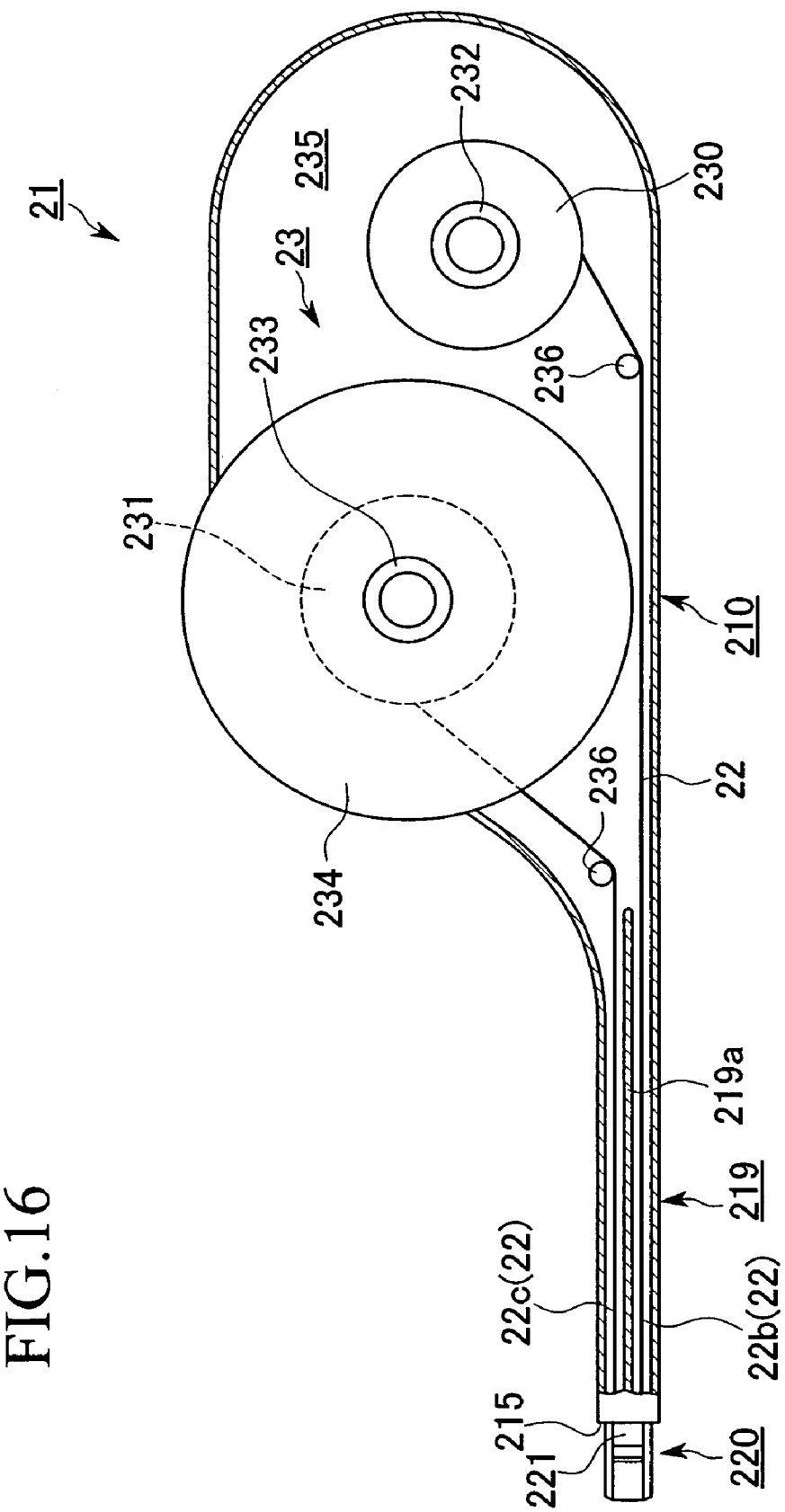
FIG. 16 is a sectional view showing the inside of the optical connector cleaning tool shown in FIGS. 15A and 15B.
Figure 17:
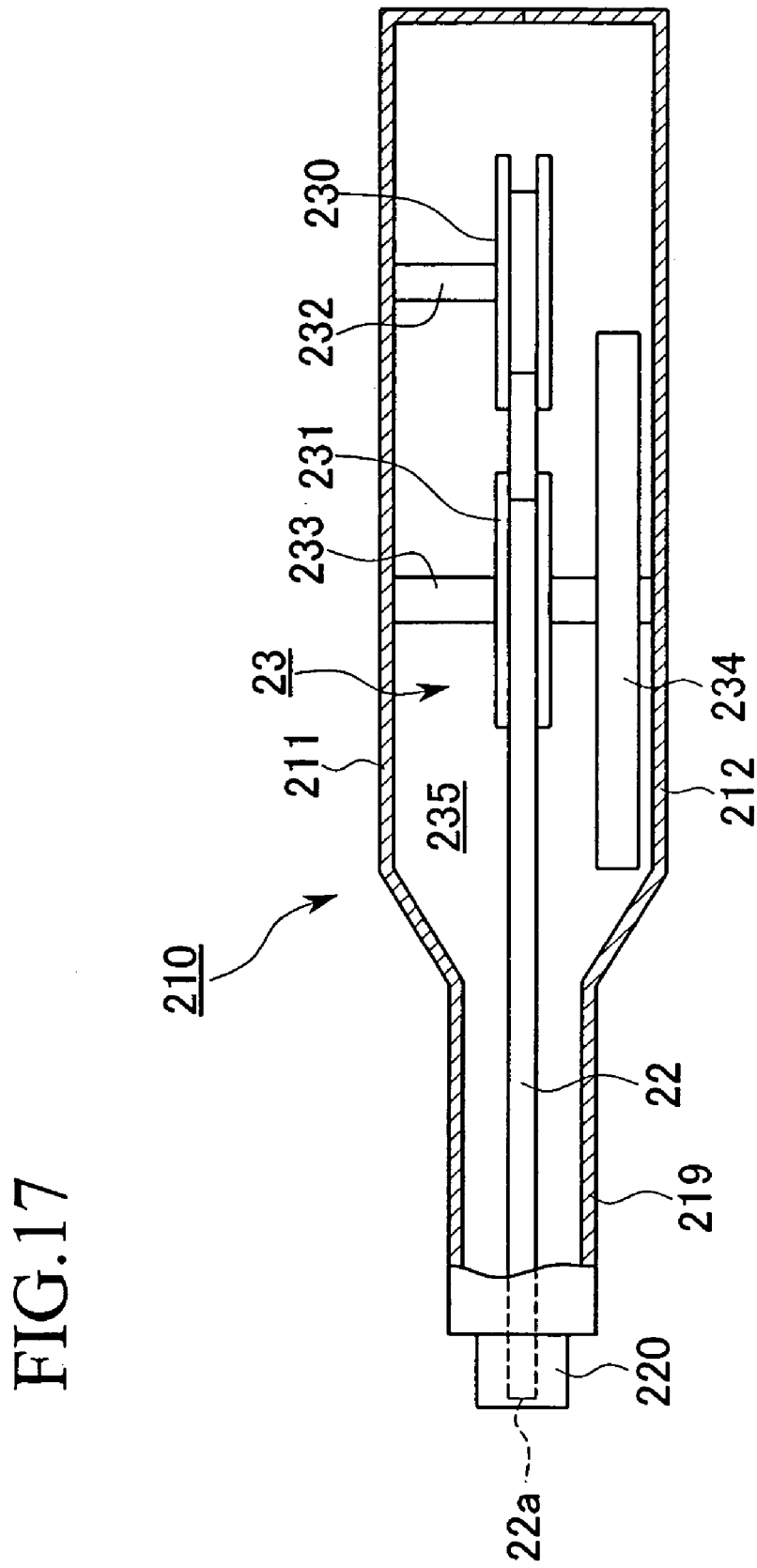
FIG. 17 is a sectional view showing the inside of the optical connector cleaning tool shown in FIGS. 15A and 15B.

As shown in FIGS. 16 and 17, a tape feeding mechanism that feeds the tape 22 is provided in a storage space 235 of the tool body 210.

This tape feeding mechanism 23 is provided with a supply reel 230 wound with the tape 22, a take-up reel 231 that takes up and collects the tape 22 after use, and an operation dial 234 that operates the tape 22.

On a surface inside (the side facing the storage space 235) of the first case half-body 211, a supply reel support shaft 232 on which the supply reel 230 is rotatably mounted and a take-up reel support shaft 233 on which the take-up reel 231 is rotatably mounted are provided to protrude toward the side of the second case half-body 212.

Between the supply reel 230 and the take-up reel 231, the tape 22 is stretched in the storage space 235 along pin-shaped tape guides 236. Midway, it is wound around a head portion 223, to be described hereinafter, housed in the insertion portion 220.

The operation dial 234 is mounted on the outer circumference of the take-up reel support shaft 233 so as to be concentric with the take-up reel 231.

A portion of the operation dial 234 is exposed to outside the tool body 210 from a window 211a provided on a side surface of the first case half-body 211.

The radius of the operation dial 234 is greater than the radius of the take-up reel 231. As a result, the length of the tape 22 taken up on the take-up reel 231 is smaller than the amount of operation of the operation dial 234 (displacement amount along the outer circumference of the operation dial 234) by just as much as the radial ratio. For this reason, very small feeding amounts of the tape 22 can be easily achieved.

The tape feeding mechanism 23 can be driven by operating the operation dial 234 by finger or the like to rotate it in the prescribed direction. More specifically, by rotation of the operation dial 234, the take-up reel 231 rotates to take up the tape 22, while the unused tape 22 is unreeled from the supply reel 230. Since the window 211a opens to the side surface of the tool body 210, even if the cleaning tool 21 is held with one hand, the operation dial 234 can be easily operated by a finger of the hand holding the cleaning tool 21.

Moreover, the cleaning tool 21 is, as shown in FIGS. 15A, 15B and FIG. 16, provided with the insertion portion 220, which is set to protrude from the tool body 210 and formed to be insertable in the optical adaptor 270. By inserting the insertion portion 220 into the optical adaptor 270, an abutting portion 22a of the cleaning member 22 (tape) disposed facing an opening portion 226 in the distal end of the insertion portion 220 is positioned to be abuttable against the connection end face 261a of the optical plug 260.

That is, the tool body 210 tapers toward the insertion portion 220, with the insertion portion 220 formed at the distal end of a small diameter portion 219 (the left side in FIG. 15A).

As will hereinafter be described, the abutting portion 22a of the tape 22 is the portion positioned on an abutting face 224 of the head portion 223, with the abutting portion 22a being replaced along the longitudinal direction of the tape 22 by feeding movement of the tape 22.

As shown in FIG. 16, a projecting wall 219a for reinforcing the small diameter portion 219 is provided in the interior of the small diameter portion 219. Since the path of a cleaning tape 22b (22) that should be clean heading from the supply reel 230 to the head portion 223 and the path of a cleaning tape 22c (22) that is soiled from wiping and cleaning heading from the head portion 223 to the take-up reel 231 are partitioned by this projecting wall 219a, it exhibits the effect of suppressing migration of contaminants on the cleaning tape 22.

A step 215 with the tool body 210 side is provided on the insertion portion 220. This step 215 is for preventing the depth of entry of the insertion portion 220 into the connector housing hole 272 from becoming too deep by the step 215 abutting the periphery 271a of the connector insertion port 271 in the optical adaptor 270 when the insertion portion 220 is inserted in the connector housing hole 272 of the optical adaptor 270.

Figure 23:
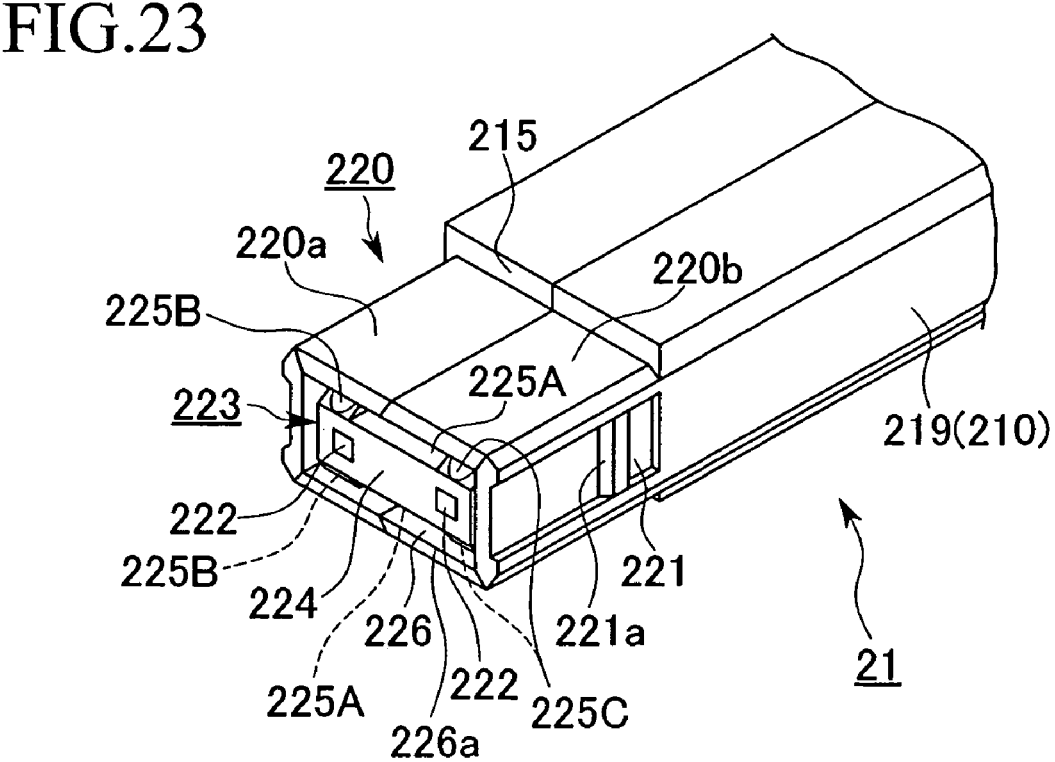
FIG. 23 is a partial enlarged perspective view of the insertion portion of the optical connector cleaning tool shown in FIGS. 15A and 15B.

Here, as shown in FIG. 23, the insertion portion 220 is a two-split structure similar to the tool body 210, being formed by integration of insertion portion half-bodies 220a, 220b integrally formed with the case half-bodies 211, 212, respectively, accompanying the integration of the case half-bodies 211, 212.

Engaging recesses 221 formed to be engageable with the engaging claws of the elastic engaging pieces (described above) on the optical adaptor 270 when the insertion portion 220 is inserted in the optical adaptor 270 are formed on both sides in the width direction of the outer surface of the insertion portion 220. Since front edge portions 221a of the engaging recesses 221 (edge portions on the side near the distal end of the insertion portion 220, on the left side in FIG. 23) are oblique faces, in the state of the engaging claws of the optical adaptor 270 engaged with the engaging recesses 221, when the insertion portion 220 is pulled out in the disengagement direction (toward the upper right in FIG. 23), the engaging claws overcome the front edge portions 221a so as to disengage from the engaging recesses 221 with comparatively little force.

A tape abutting mechanism 24 for causing the tape 22 to abut the connection end face 261a of the ferrule 261 is disposed in the insertion portion 220. The tape abutting mechanism 24 includes the head portion 223 having the abutting face 224 disposed facing the connection end face 261a and a head tilting mechanism 240 that tilts the abutting face 224 of the head portion 223 so that the abutting face 224 can change the direction of the tape 22 with respect to the insertion direction in the state of the insertion portion 220 of the cleaning tool 21 being inserted in the optical adaptor 270.

Figure 22:
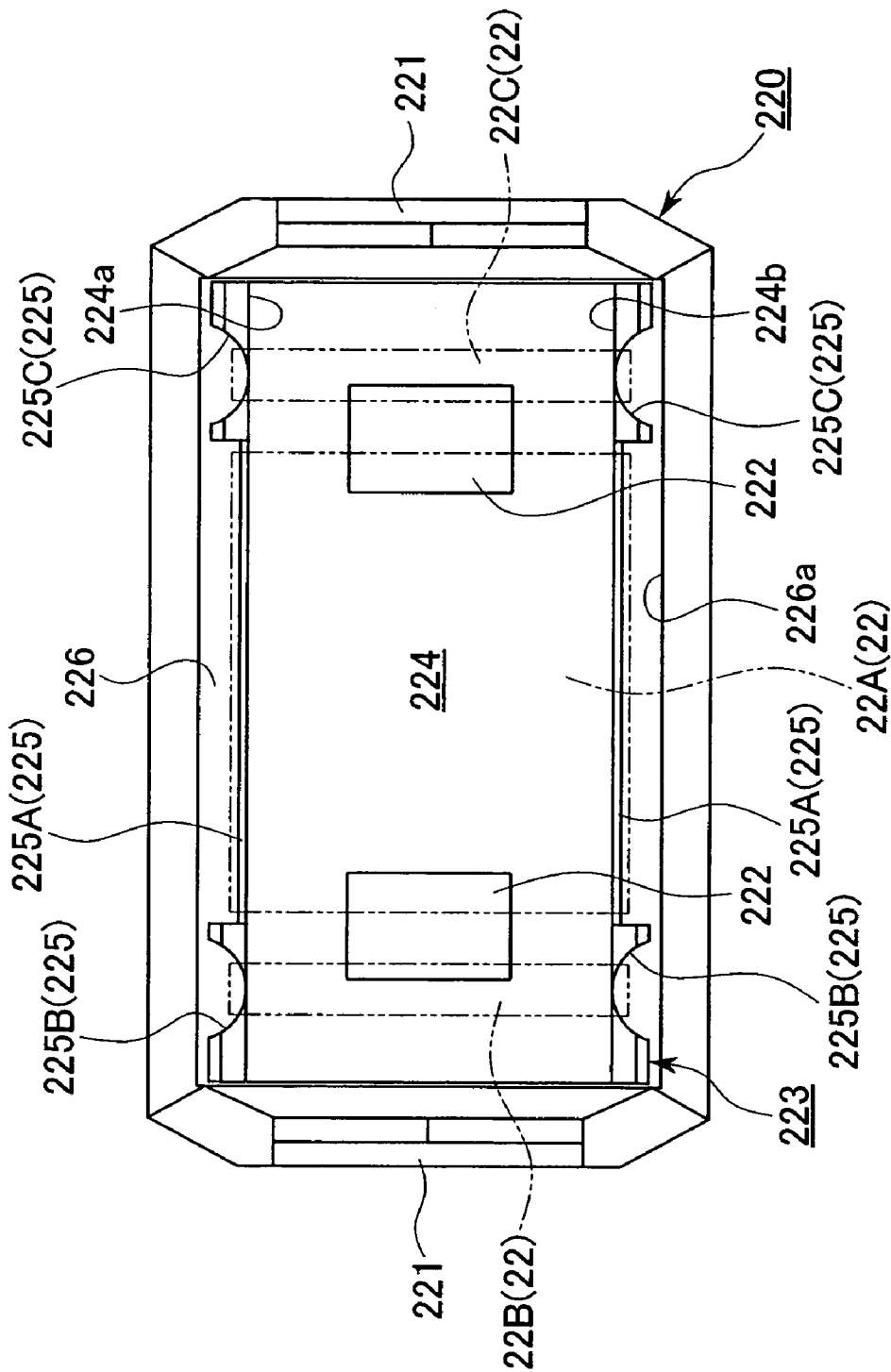
FIG. 22 is a front view showing the insertion portion of the optical connector cleaning tool shown in FIGS. 15A and 15B.

As shown in FIGS. 18 through 22, the abutting face 224 is provided on the side of the insertion direction of the head portion 223 (the left side in FIGS. 18 and 19). As shown in FIG. 22, the abutting face 224 is of an approximately rectangular shape, and during insertion of the head portion 223 into the optical adaptor 270, the protruding members (guide pins) 265 protruding from the connection end face 261a are inserted, and guide pin insertion holes 222, 222 are formed on both sides in the width direction of the insertion portion 220 as recesses for avoiding interference with the guide pins 265.

Here, the abutting face 224 is positioned inward of an end edge 226a of the opening portion 226 in the insertion portion 220 (right side in FIGS. 18 and 19). However, depending on conditions such as the shape of the optical connector to be cleaned, the abutting face 224 may be made to protrude to the side of the insertion direction (left side in FIGS. 18 and 19) more than the end edge 226a of the opening portion 226.

As shown in FIG. 22, on the upstream side (lower portion of FIG. 22) and the downstream side (upper portion) in the feeding direction of the tape, guide grooves 225A, 225B, 225C to guide the tape 22 are provided on the head portion 223 to oppose each other via the abutting face 224. These guide groves 225A, 225B, 225C function as a tape positioning mechanism in the present invention. However, as a tape positioning mechanism, it is not limited thereto, and various constitutions could be adopted such as guide walls for guiding and the like. In addition, they may be provided in the insertion portion as a tape positioning mechanism, but there are no limitations on the setting position in the insertion portion, and they do not necessarily always need to be provided in the head portion.

Here, as shown in FIGS. 27A and 27B, the tape 22 (cleaning tape) is one in which two parallel slits S1, S2 are formed over the entire longitudinal length of one tape-shaped cleaning fabric except at both longitudinal ends, with a total of three contact cleaning portions 22A, 22B, 22C being formed, separated by the two slits S1, S2. The slits function as protruding member escape portions. The three contact cleaning portions 22A, 22B, 22C consist of the one 22A disposed in the central portion in the width direction (longitudinal direction in FIG. 22) of the tape insertion portion 220, and those 22B, 22C disposed on both side portions in the width direction of the insertion portion 220.

Three pair of the guide grooves 225A, 225B, 225C are provided, corresponding respectively to the contact cleaning portions 22A, 22B, 22C. The widths of the guide grooves 225A, 225B, 225C fit the widths of the contact cleaning portions 22A, 22B, 22C. The contact cleaning portions 22A, 22B, 22C are wrapped around the head portion 223 by the upper side guide grooves 225A, 225B, 225C, the abutting face 224, and the lower side guide grooves 225A, 225B, 225C, respectively.

As shown in FIG. 22, on the abutting face 224, the guide pin insertion holes 222, 222 are disposed so as to open between the contact cleaning portions 22A, 22B, 22C guided by the guide grooves 225A, 225B, 225C. The guide pins 265 can thereby be inserted in the guide pin insertion holes 222, 222, passing between the contact cleaning portions 22A, 22B, 22C to avoid interference with the contact cleaning portions 22A, 22B, 22C.

As shown in FIGS. 18 to 21, the head tilting mechanism 240 has a pair of slide portions 241a, 241b disposed parallel to each other to extend approximately in the direction of insertion and separation (left and right in FIGS. 18 and 19) of the insertion portion 220, one end thereof being coupled by thin elastic deformation portions 242, 242 to a back face 227 of the head portion 223 opposite the abutting face 224, a coupling portion 244 coupling the other end of the slide portions 241a, 241b opposite the head portion 223 via elastic deformation portions 243, 243, and a guide portion 245 that guides so that the slide portions 241a, 241b slide and displace in the extending directions thereof. Moreover, the coupling portion 244 has a movement restriction portion (stopper) 246 that restricts movement of the insertion portion 220 in both the insertion direction and the separation direction in the opposite direction thereto, and a bridging portion 248 that bridges the slide portions 241a, 241b in the thickness direction of the insertion portion 220 (vertical direction in FIGS. 18 and 19). The bridging portion 248 is also elastically deformable (elastic deformation portion) with respect to displacement of the slide portions 241a, 241b.

The slide portions 241a, 241b are respectively coupled to the upper side and lower side (upper and lower in FIGS. 18 and 19) of the back face 227 of the head portion 223, corresponding to top end edge 224a and bottom end edge 224b of the abutting face 224 of the head portion 223.

The head portion 223, the pair of slide portions 241a, 241b and the coupling portion 244 constitute a square frame-shaped component 247 (head composite body).

More specifically, the head portion 223, the slide portions 241a, 241b, the coupling portion 244, the elastic deformation portions 242, 242, 243, 243, and the bridging portion 248 become the head composite body 247 integrally formed from plastic or the like.

The head composite body 247 is held in the insertion portion 220 by inserting the guide 245 and the stopper 246 in a space 249 between the slide portions 241a, 241b and a stopper insertion hole 244a.

The guide 245 has an approximately rectangular sectional shape, and is provided in the width direction of the insertion portion 220 between the pair of slide portions 241a, 241b in a manner protruding from an inner wall 228 disposed in the width direction of the insertion portion 220 (the direction perpendicular to the sheet of FIGS. 18 and 19).

The stopper 246 has an approximately round sectional shape, and is provided in a manner protruding from the inner wall 228 disposed in the width direction of the insertion portion 220. A stopper insertion hole 244a is formed in the coupling portion 244 between the portions coupled with the elastic deformation portions 243, 243. The stopper 246 is inserted into the stopper insertion hole 244a.

Displacement of the coupling portion 244 in the insertion direction and separation direction of the insertion portion 220 is restricted by the stopper 246, so that it essentially hardly displaces in either direction.

The head tilting mechanism 240 is disposed between the tape 22 (22b) on the supply reel 230 side of the head portion 223 and the tape 22 (22c) on the take-up reel 231 side of the head portion 223. The head portion 223 can thereby be stably tilted without inhibiting the feeding movement of the tape 22.

Recesses 250 are formed at locations on the coupling portion 244 near the tape 22 (the top and bottom surfaces of the coupling portion 244, top and bottom in FIGS. 18 and 19) in order to avoid interference with the tape 22. The recesses 250 are provided at three places (250A, 250B, 250C) corresponding to the guide grooves 225A, 225B, 225C to the rear (in the disengagement direction of the insertion portion 220. Toward the upper right in FIGS. 20 and 21) of the guide grooves.

The head composite body 247 is deformable by the elasticity of the elastic deformation portions 242, 242, 243, 243 and the bridging portion 248 and is constituted so as to allow tilting of the abutting face 224 of the head portion 223 with respect to a pushing force on the abutting face 224 of the head portion 223. More specifically, by an uneven pressing force acting on the top end edge 224a and the bottom end edge 224b with respect to the abutting face 224 of the head portion 223, the slide portions 241a, 241b displace in the insertion direction and separation direction of the insertion portion 220, so that the abutting face 224 is allowed to tilt.

The direction of the abutting face 224 of the head composite body 247 does not change by such an extent that would exert an adverse effect on cleaning by friction acting between the tape 22 and the head portion 223 when the tape 22 is fed in the feeding direction. The threshold value of the pressing force allowing tilting of the abutting face 224 is adjustable by the ease of elastic deformation of the elastic deformation portions 242, 242, 243, 243 and the presence or absence of the bridging portion 248. that is, the bridging portion 248 is not essential.

Although not particularly illustrated, a cap or cover and the like for protecting the head portion 223 and the tape 22 facing the opening portion 226 may of course be attached to the distal end of the insertion portion 220 to be able to protect the tape 22 and the like when the cleaning tool 21 is not in use.

An example of the method of using the cleaning tool 21 is explained.

By inserting the insertion portion 220 of the cleaning tool 21 from the connector insertion port 271 of the optical adaptor 270, the insertion portion 220 enters the connector housing hole 272 as its outer surface is aligned by the inner walls 270a of the optical adaptor 270. By pushing the insertion portion 220 until the step 215 runs into the periphery 271a of the connector insertion port 271, the cleaning member 22 is positioned to be abutted on an appropriate position (here, the optical fiber holes 261b and periphery thereof) of the connection end face 261a of the optical plug 260.

Even when the guide pins 265 protrude on the connection end face 261a of the optical plug 260, the guide pins 265 are housed in the guide pin insertion holes 222 provided on the head portion 223, enabling the insertion portion 220 to be housed in the connector housing hole 272 without interference with the guide pins 265.

By rotating the operation dial 234 by a prescribed amount, the tape 22 moves in conjunction with the rotation of the take-up reel 231, and since the connection end face 261a is wiped and cleaned by the tape 22, contaminants such as debris, dust and oil adhering to the connection end face 261a are reliably extracted by the tape 22.

Since extracted contaminants adhere to the tape 22 and move in the direction to be taken up on take-up reel 231, the used tape 22 is not exposed any more from the opening portion 226 of the insertion portion 220, and there is no risk of the contaminants once again adhering to the connection end face 261a.

Accordingly, the connection end face 261a can be thoroughly cleaned.

After cleaning, the insertion portion 220 can be easily removed by pulling in the direction opposite to when inserting the cleaning tool 21 (disengagement direction).

According to the cleaning tool 21 of the fourth embodiment, since the tape 22 wrapped around the head portion 223 is guided by the guide grooves 225A to 225C, shifting in the width direction is inhibited. For this reason, the connection end face 261a can abut the tape 22 with a uniform abutting force, and can smoothly advance the tape 22. Accordingly, cleaning can be reliably performed so that contaminants do not remain on the connection end face 261a.

Also, as shown in FIGS. 18 and 19, by disposing the contact cleaning portions 22A, 22B, 22C of the tape 22 in the guide grooves 225A, 225B, 225C, even when the head portion 223 has changed direction by tilting, the tape 22 makes no contact with inner walls 229a, 229b (upper and lower inner walls in FIGS. 18 and 19) of the insertion portion 220 in the tilting direction of the head portion 223.

Since the head portion 223 is able to tilt with respect to the pushing force when the abutting face 224 abuts the connection end face 261a of the optical plug 260, even in the event of the ferrule 261 with a perpendicularly polished connection end face 261a as shown in FIG. 18 being abutted, and even in the event of the ferrule 261 with an obliquely polished connection end face 261a as shown in FIG. 19 being abutted, the direction of the abutting face 224 is aligned with the direction of the connection end face 261a, and the tape 22 on the abutting face 224 can be more uniformly and securely made to abut the connection end face 261a.

In FIG. 19, in the event of a portion of the front surface of the ferrule 261 not being aligned in a plane with the connection end face 261a (here, perpendicularly polished portion 261d), although the tape 22 does not abut the perpendicularly polished portion 261d, since this is not the connection end face 261a of the ferrule 261, this does not present any particular problem.

Moreover, since the abutting face 224 of the head tilting mechanism 240 does not substantially displace vertically in the tilting direction thereof (up and down direction in FIGS. 18 and 19), the tape 22 not making good contact with the connection end face 261a due to shifting of the center positions of the connection end face 261a of the optical plug 260 and the abutting face 224 of the head portion 223, and the abutting force of the connection end face 261a abutting the tape 22 becoming uneven is inhibited, thereby enabling more secure removal of contaminants on the connection end face 261a.

Since the insertion portion 220 is positioned by the connector housing hole 272 of the optical adaptor 270 during cleaning as well, wiping and cleaning of the connection end face 261a can be performed by the tape 22 with a uniform pushing pressure without displacement. In addition, the insertion portion 220 can be supported in the optical adaptor 270 with an extremely light force, and so has excellent operability.

Another example of a cleaning tape applicable to the present invention is explained next.

Figure 28B:
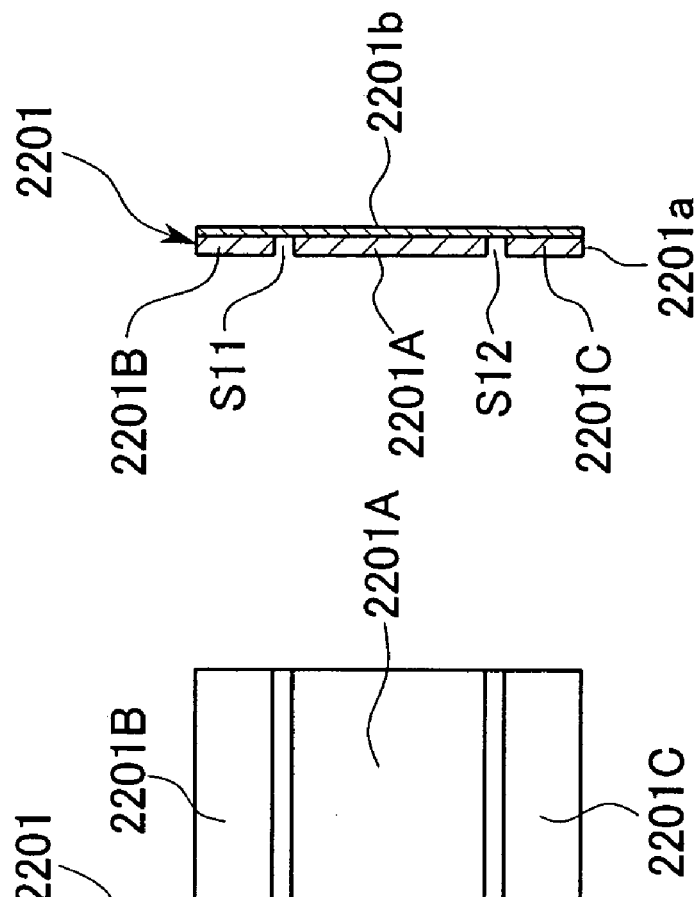
FIG. 28B is a sectional view thereof.
Figure 28A:
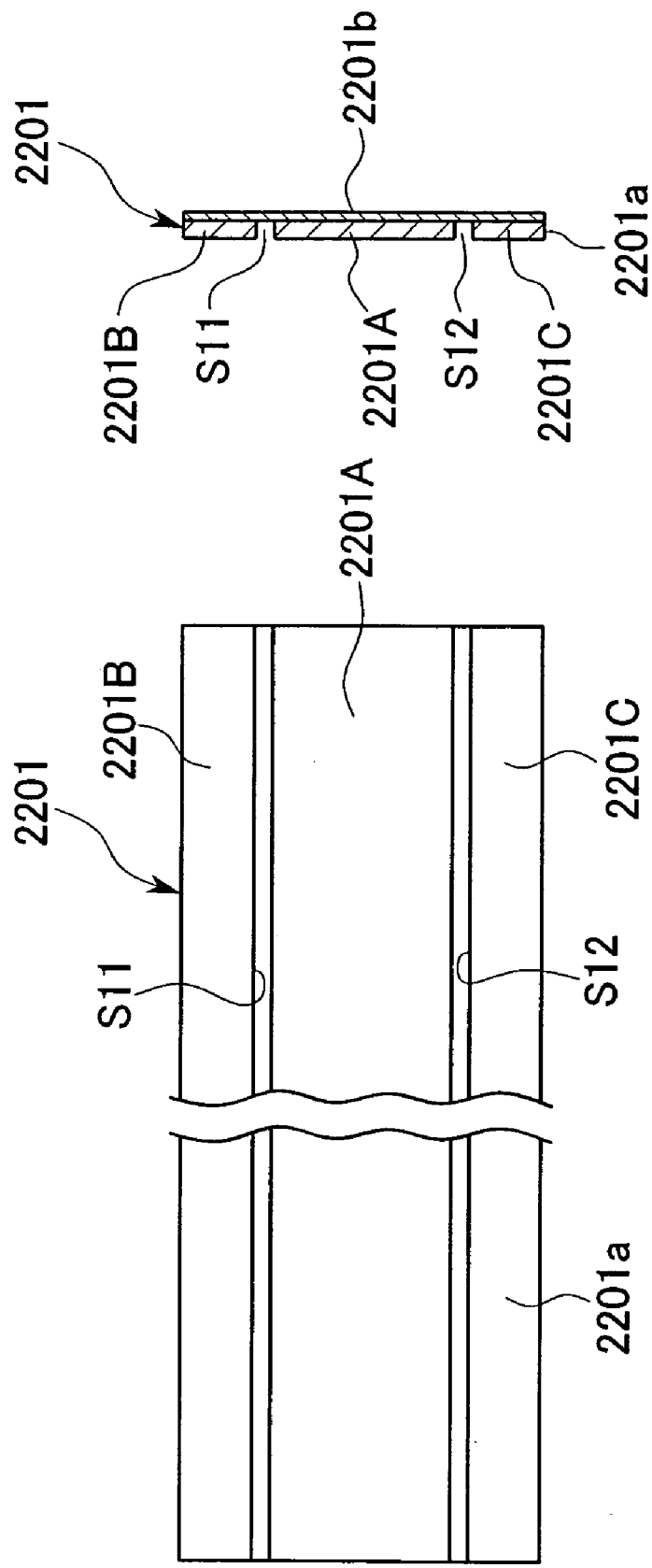
FIG. 28A is a plan view showing another example of the cleaning tape.

A cleaning tape 2201 shown in FIGS. 28A and 28B is one in which two parallel slits S11, S12 are formed over the entire longitudinal length of one tape-shaped cleaning fabric 2201a, with a total of three contact cleaning portions 2201A, 2201B, 2201C being formed separated by the two slits S11, S12, and moreover the three contact cleaning portions 2201A, 2201B, 2201C are integrated by a coupling film 2201b that is joined and integrated so as to laminate the cleaning fabric 2201a. The interval between adjacent contact cleaning portions is linked only by the coupling film 2201b. For example, synthetic resin films and the like could serve as the coupling film 2201b, however, it should be easily broken by the guide pins 265 protruding from the ferrule 261 being pressed thereagainst, be able to pass the guide pins 265, and have a weaker breaking strength compared to the contact cleaning portions 2201A, 2201B, 2201C. Portions of the coupling film 2201b positioned between adjacent contact cleaning portions, that is, the portions positioned in areas exposed in the slits S11, S12, function as protruding member escape portions and easily breakable portions.

The three contact cleaning portions 2201A, 2201B, 2201C can respectively function as the one 2201A disposed in the central portion in the width direction (longitudinal direction in FIG. 22) of the tape insertion portion 220, and those 2201B, 2201C disposed on both side portions in the width direction of the insertion portion 220.

The coupling film is not limited to the constitution bonded across all three contact cleaning portions 2201A, 2201B, 2201C as illustrated in FIGS. 28A and 28B, and may exist only at the places of slits S11, S12 to carry out the function of coupling adjacent contact cleaning portions.

In addition, the slits S11, S12 may be narrower than the diameter of the guide pins, in which case the contact cleaning portions contact from both sides the guide pins that have passed though the coupling film as an easily breakable portion, and can thereby also clean the guide pins themselves. Around the protruding base end portion of the guide pins from the connection end face can also be uniformly and effectively cleaned over the entire circumference in the circumferential direction of the guide pins.

Figure 29B:
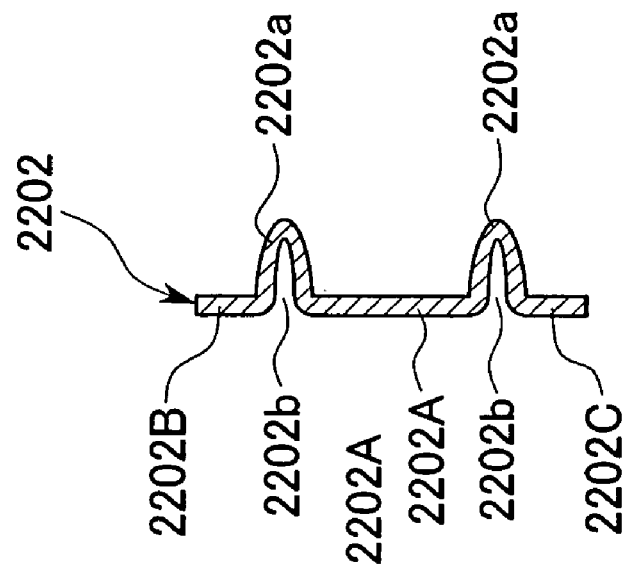
FIG. 29B is a sectional view thereof.
Figure 29A:
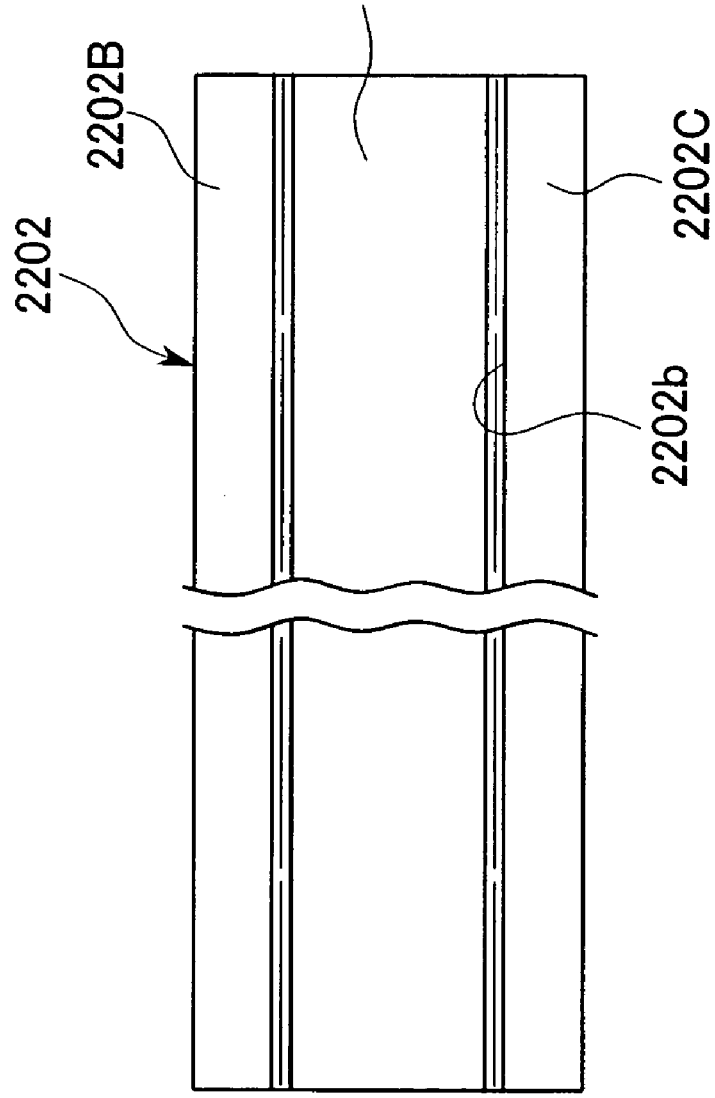
FIG. 29A is a plan view showing another example of the cleaning tape.

A cleaning tape 2202 shown in FIGS. 29A and 29B is one in which concavity forming portions 2202a formed concavely at two places of the cleaning material are formed parallel in the width direction over the entire longitudinal length of one tape-shaped cleaning fabric, having a total of three contact cleaning portions 2202A, 2202B, 2202C separated by the concavity forming portions 2202a. The concavity forming portions 2202a include therein protruding member housing grooves 2202b capable of housing the protruding member on the inside thereof, and function as protruding member escape portions. The concavity forming portions 2202a and the protruding member housing grooves 2202b are continuously formed along the longitudinal direction of the cleaning tape 2202.

Figure 30A:
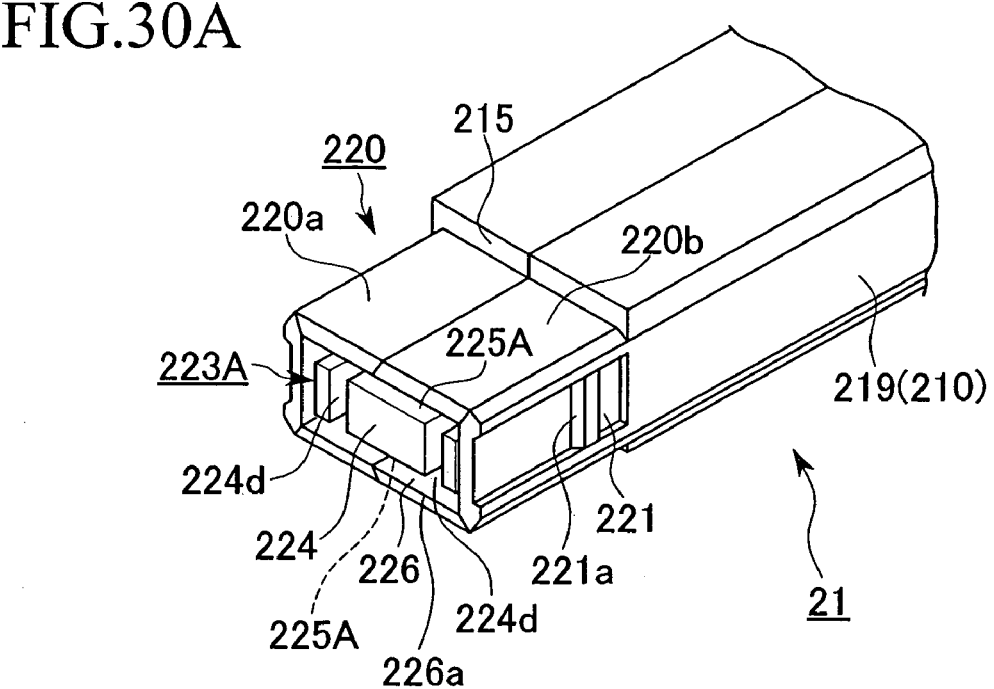
FIG. 30A is a perspective view showing an example of a head portion applying the cleaning tape of FIGS. 29A and 29B.
Figure 30B:
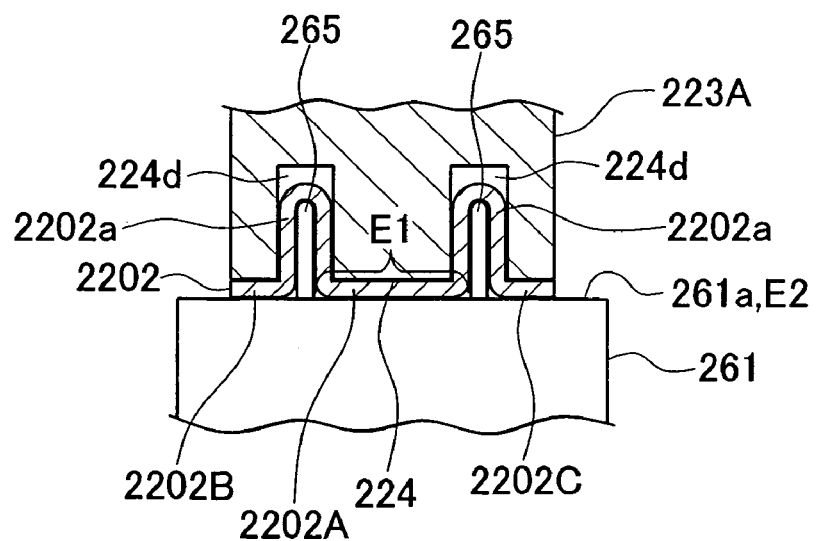
FIG. 30B is a plan sectional view thereof.

FIGS. 30A and 30B show an example of a head portion 223A to which the cleaning tape 2202 is applied. This head portion 223A differs from the aforementioned head portion 223 explained with reference to FIG. 23 on the point of formed portion guide grooves 224d for housing and guiding the concavity forming portions 2202a continuously formed along the longitudinal direction of the cleaning tape 2202 being formed across the abutting face 224 along the extending direction of the cleaning tape 2202 disposed across the abutting face 224, with feeding of the cleaning tape 2202 stabilizing. While the other constitutions are similar to the head portion 223, since the feeding stability is ensured by the formed portion guide grooves 224d, the formation of the guide groves 225A, 225B, and 225C can be omitted. In this constitution, because the tape is fed with the guide pins housed in the protruding member housing grooves 2202b, the entire outer surface of the guide pins can be efficiently and reliably cleaned. More specifically, by advancing the cleaning tape 2202 pressed against a central region E1 that is a portion positioned between the two guide pins 265 and outside regions E2 positioned outside of the central region E1 via the guide pins 265 in the connection end face 261a of the ferrule 261, the central region and the outside regions can be efficiently cleaned simultaneously.

Next, the cleaning tool according to the fifth embodiment of the present invention is explained.

Figure 31A:
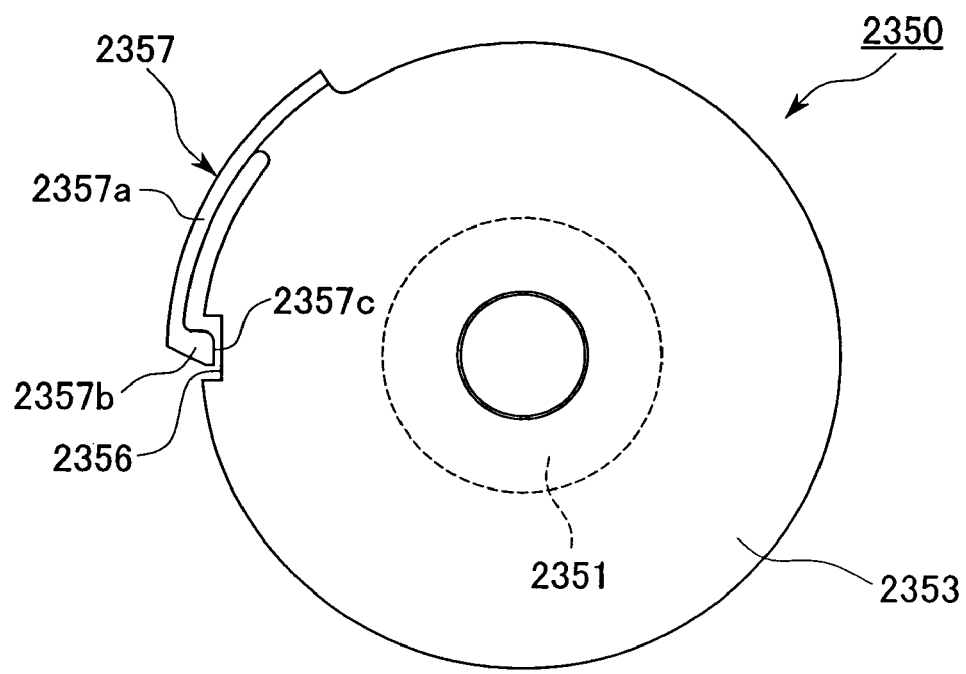
FIG. 31A is a front view showing an example of the take-up reel of the cleaning tool according to the fifth embodiment of the present invention.
Figure 31B:
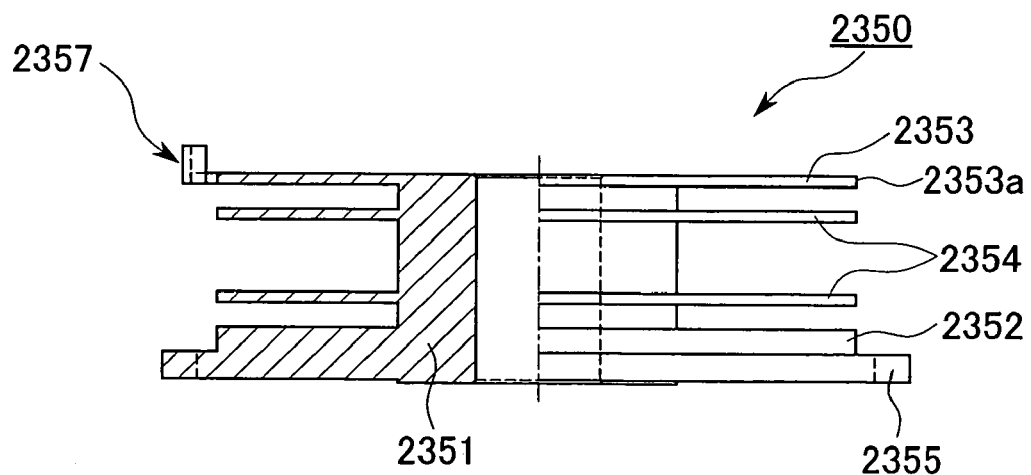
FIG. 31B is a half sectional view thereof.
Figure 32:
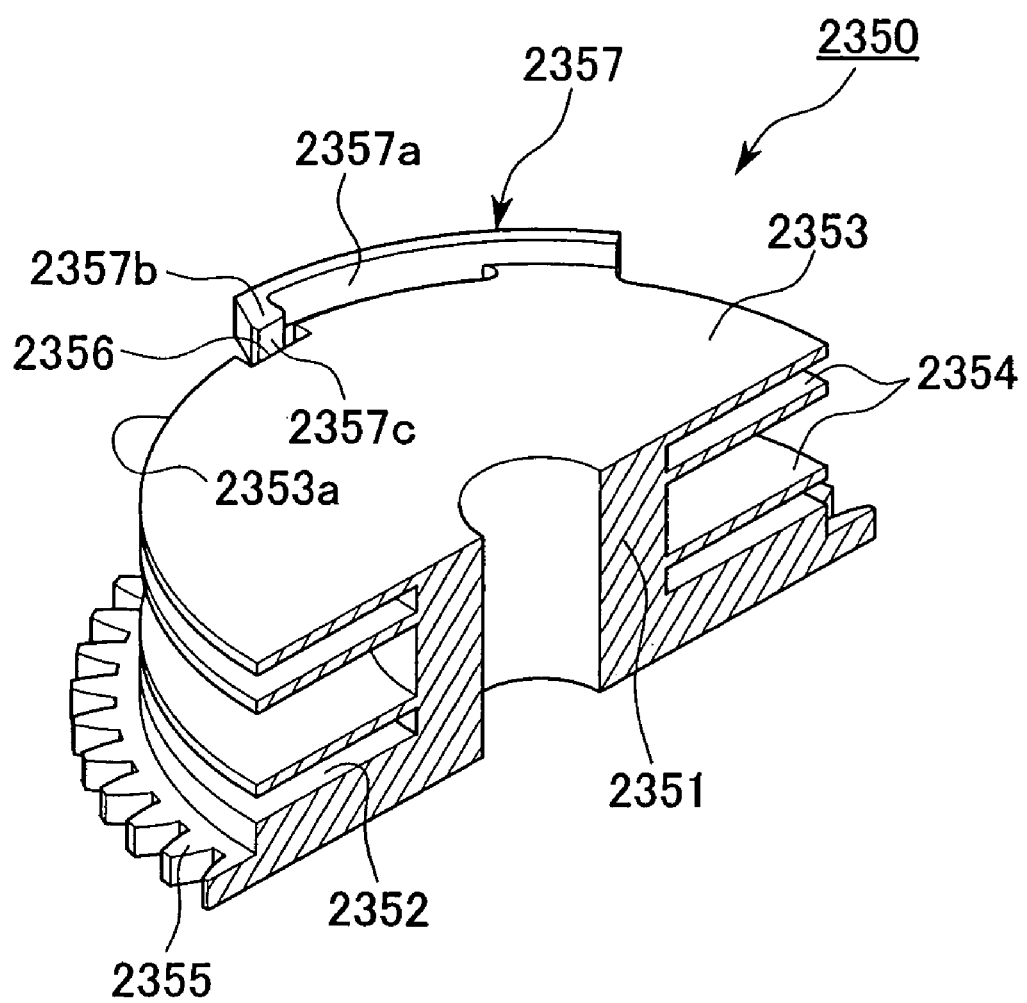
FIG. 32 is a cutaway perspective view of the take-up reel shown in FIGS. 31A and 32A.

FIG. 31A is a front view showing an example of a take-up reel used in the cleaning tool according to the fifth embodiment, and FIG. 31B is a half sectional view thereof, and FIG. 32 is a cutaway perspective view of the take-up reel shown in FIGS. 31A and 32A.

Figure 33A:
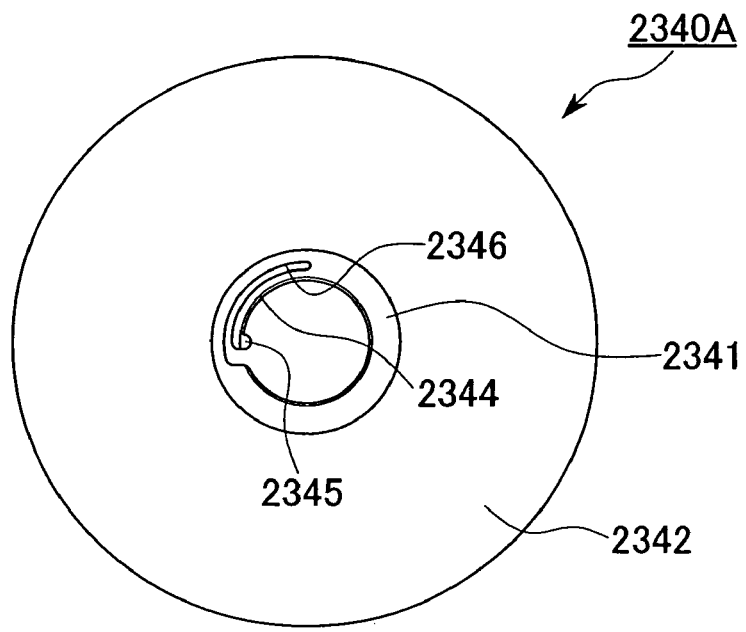
FIG. 33A is a front view showing an example of the supply reel of the cleaning tool according to the fifth embodiment of the present invention.
Figure 33B:
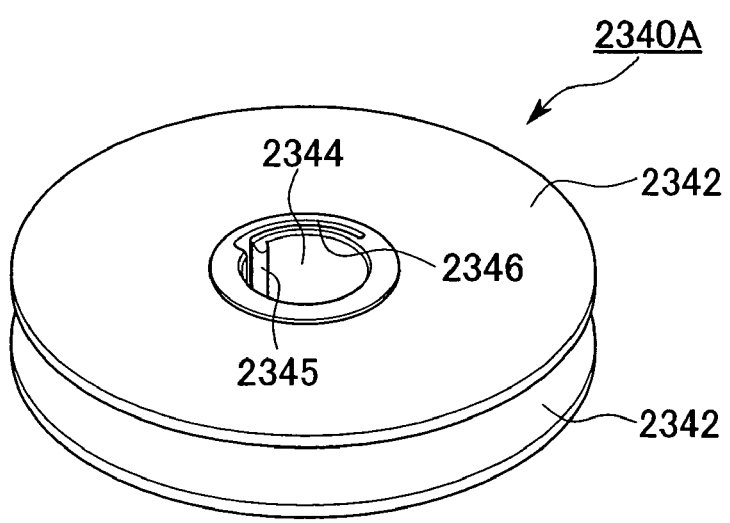
FIG. 33B is a perspective view thereof.
Figure 34:
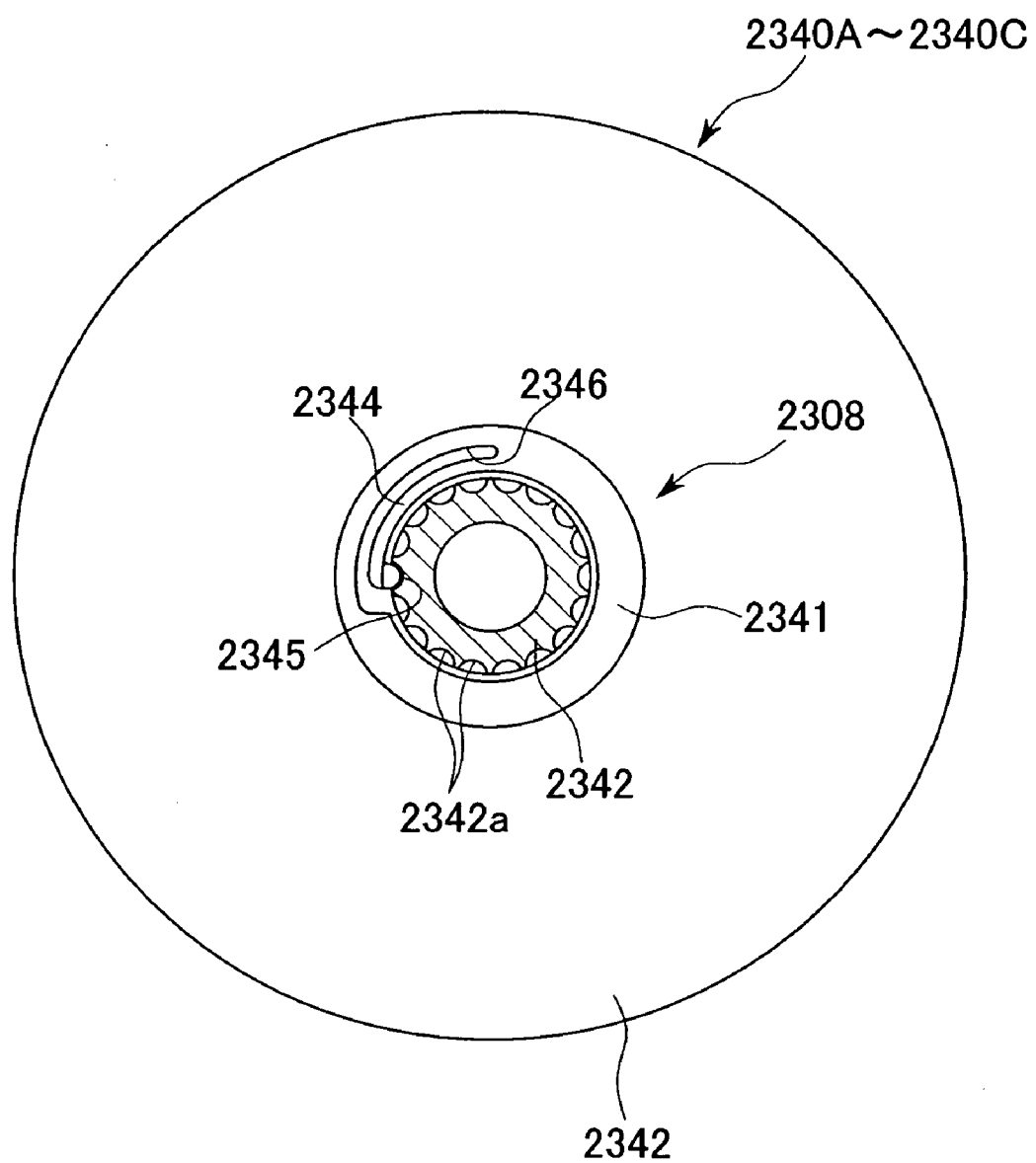
FIG. 34 is a partial sectional view showing the state of the supply reel shown in FIGS. 33A and 33B mounted on the supply reel support shaft.
Figure 35B:
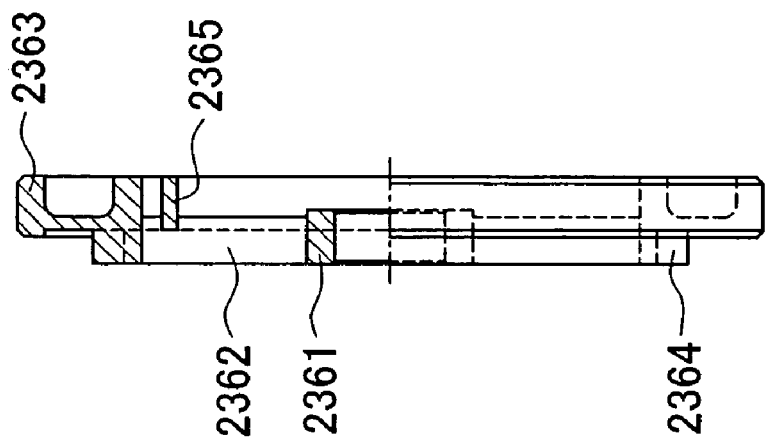
FIG. 35B is a half sectional view thereof.
Figure 35A:
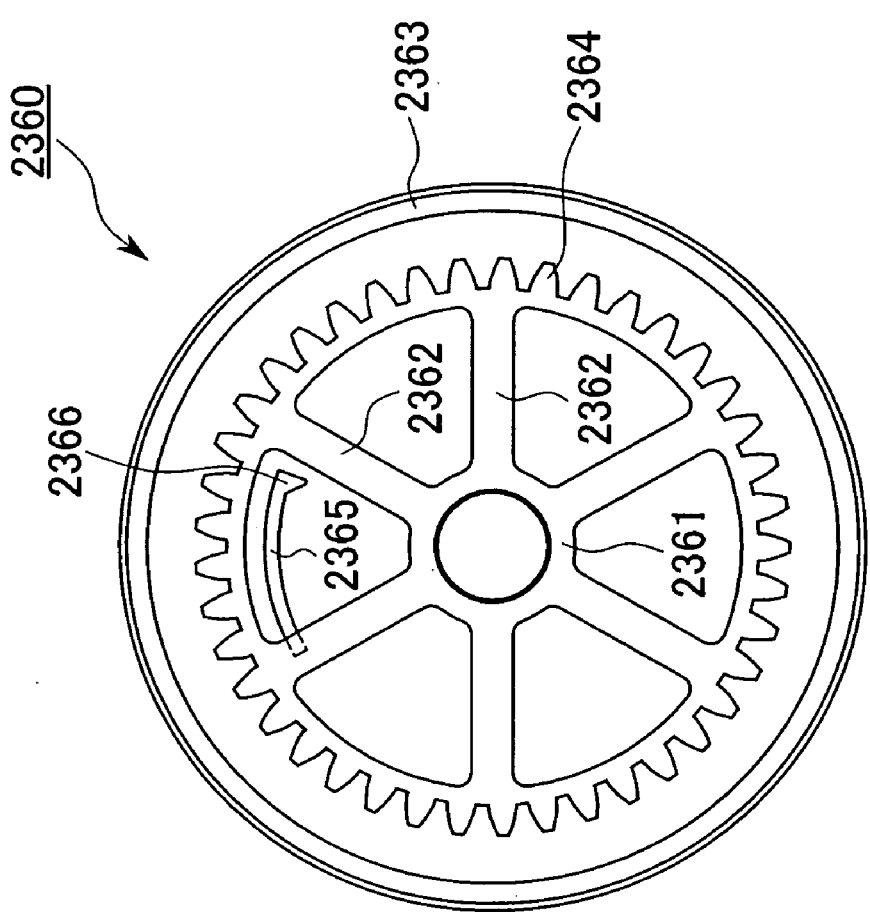
FIG. 35A is a front view showing an example of the dial according to the cleaning tool of the fifth embodiment of the present invention.

FIG. 33A is a front view showing an example of the supply reel, and FIG. 33B is a perspective view thereof. FIG. 34 is a partial sectional view showing the state of the supply reel shown in FIGS. 33A and 33B mounted on the supply reel support shaft. FIG. 35A is a front view showing an example of the dial, and FIG. 35B is a half sectional view thereof.

Figure 36:
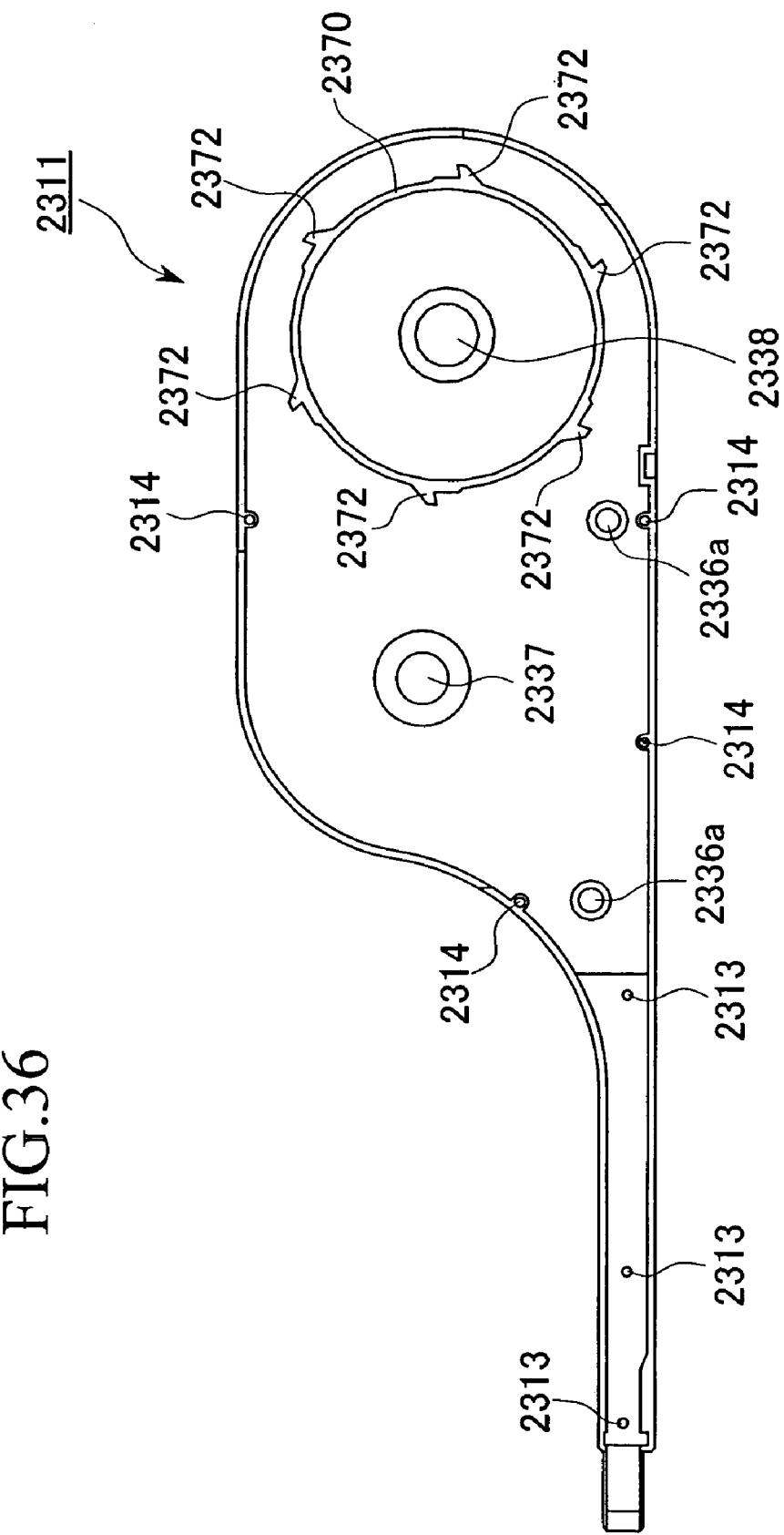
FIG. 36 is a front view showing an example of the first case half-body according to the cleaning tool of the fifth embodiment of the present invention.
Figure 37:
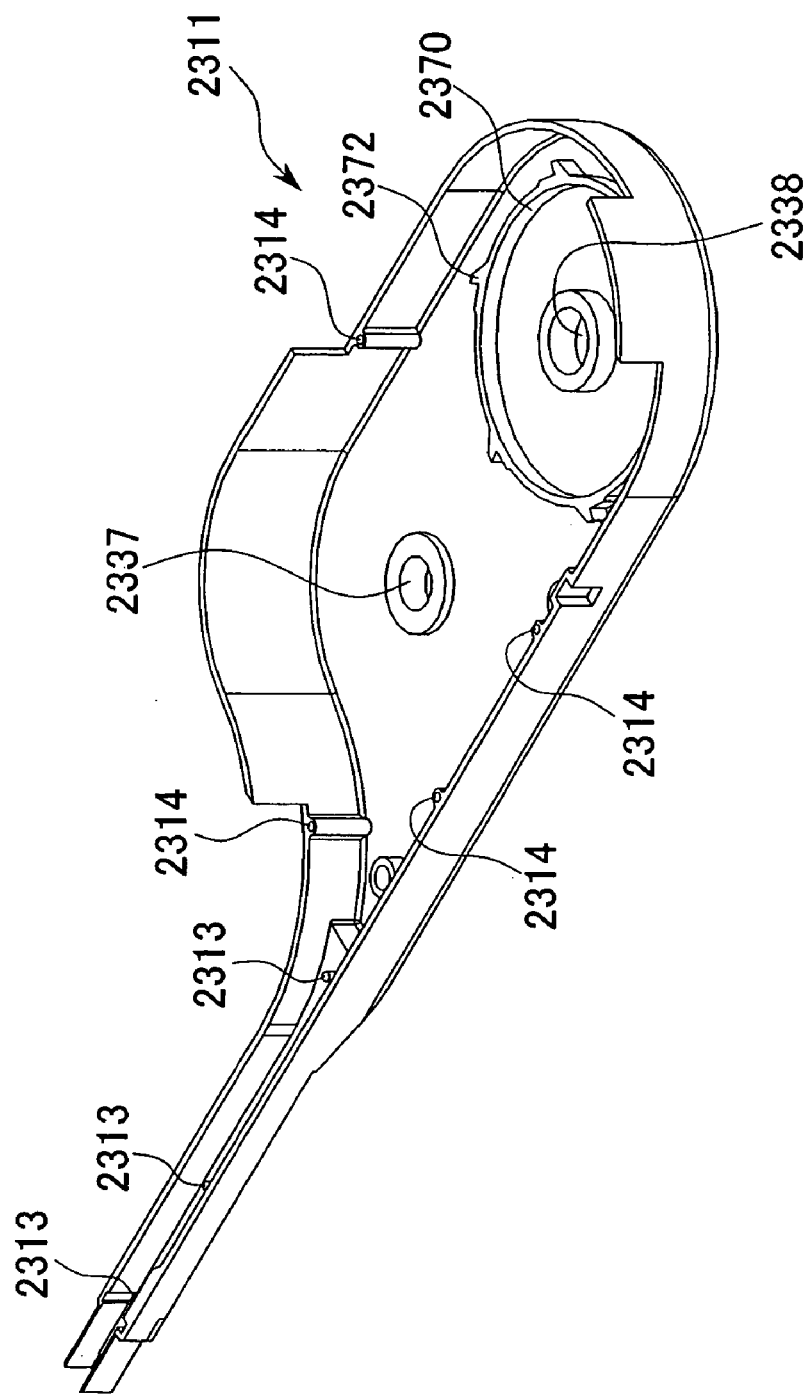
FIG. 37 is a perspective view of the first case half-body shown in FIG. 36.

FIG. 36 is a front view showing an example of the first case half-body, and FIG. 37 is a perspective view of the first case half-body shown in FIG. 36.

Figure 38:
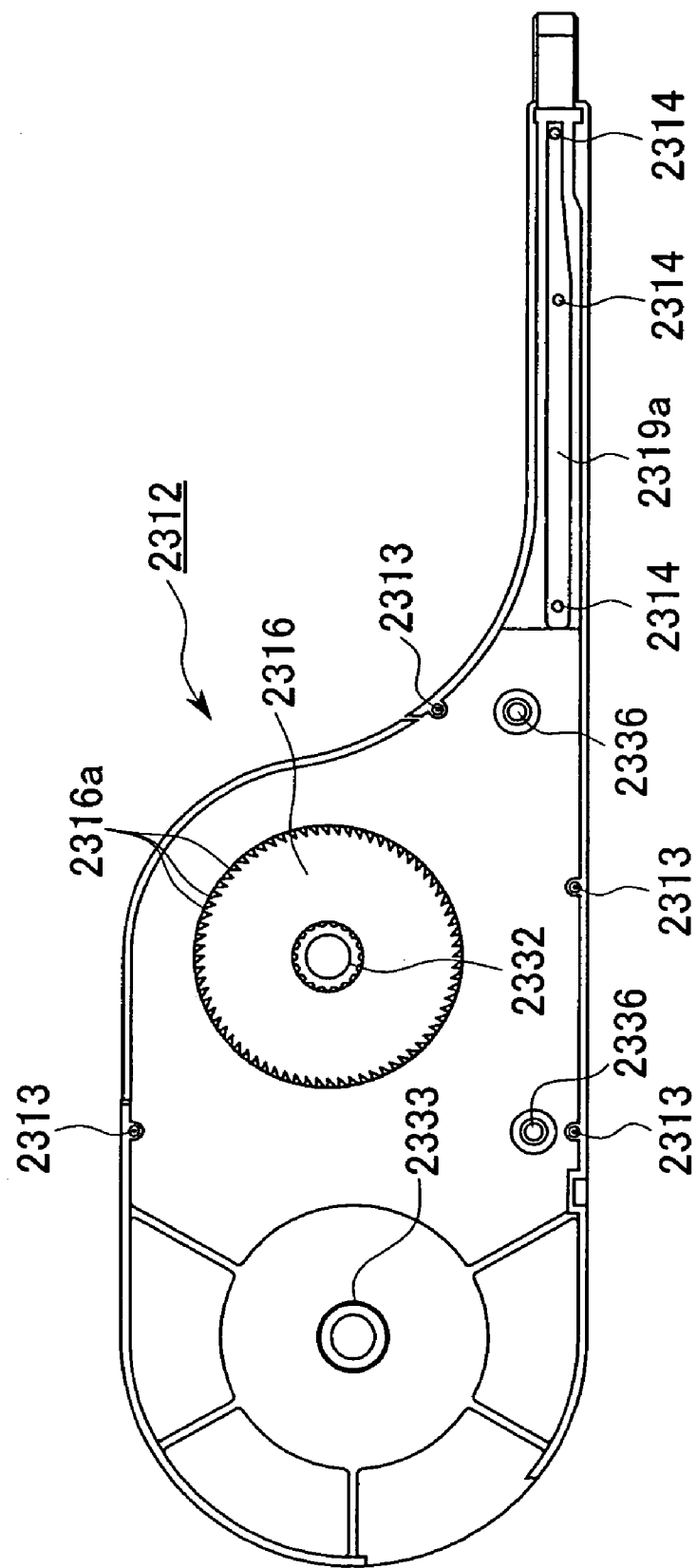
FIG. 38 is a front view showing an example of the second case half-body according to the cleaning tool of the fifth embodiment of the present invention.
Figure 39:
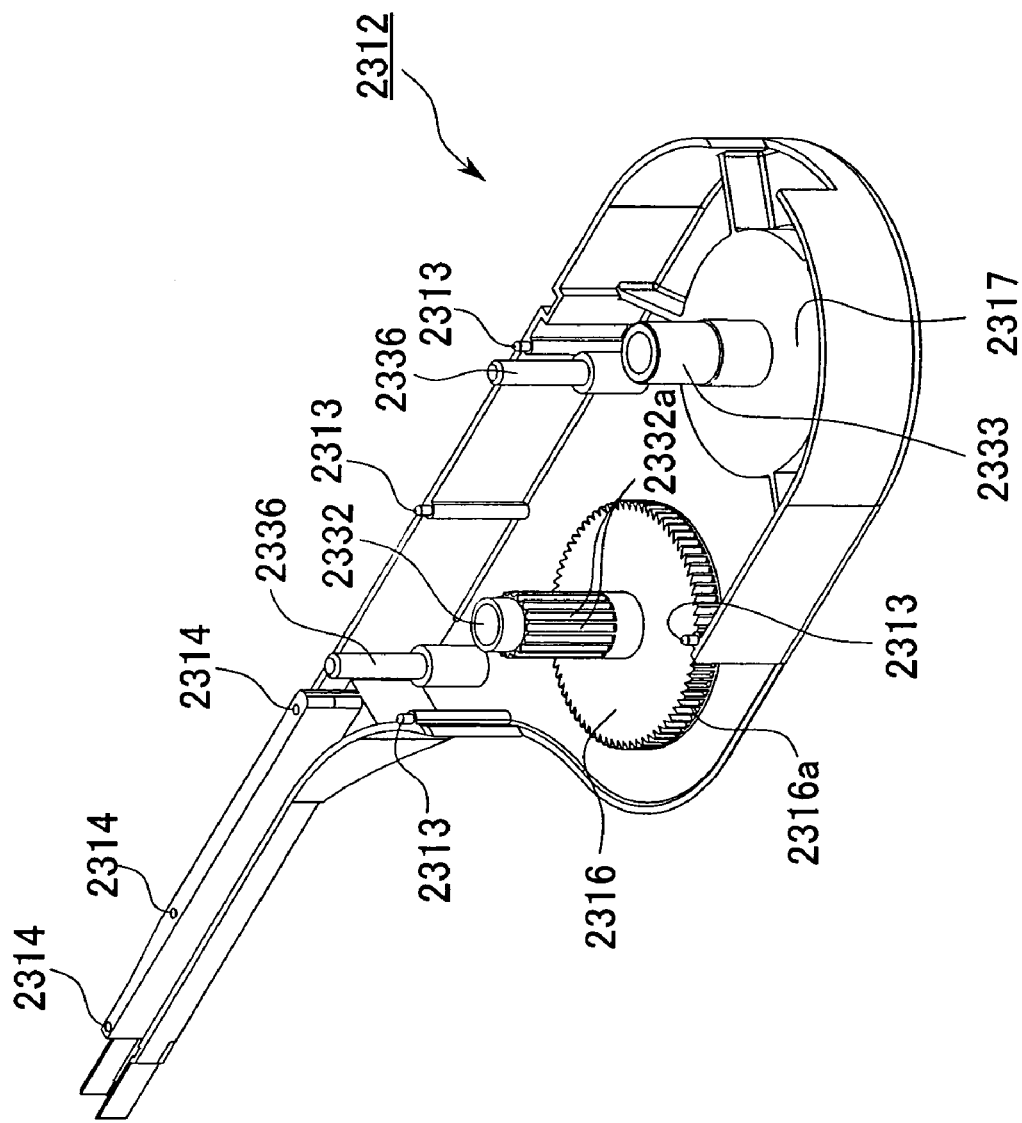
FIG. 39 is a perspective view of the second case half-body shown in FIG. 38.

FIG. 38 is a front view showing an example of the second case half-body, and FIG. 39 is a perspective view of the first case half-body shown in FIG. 38.

Figure 40A:
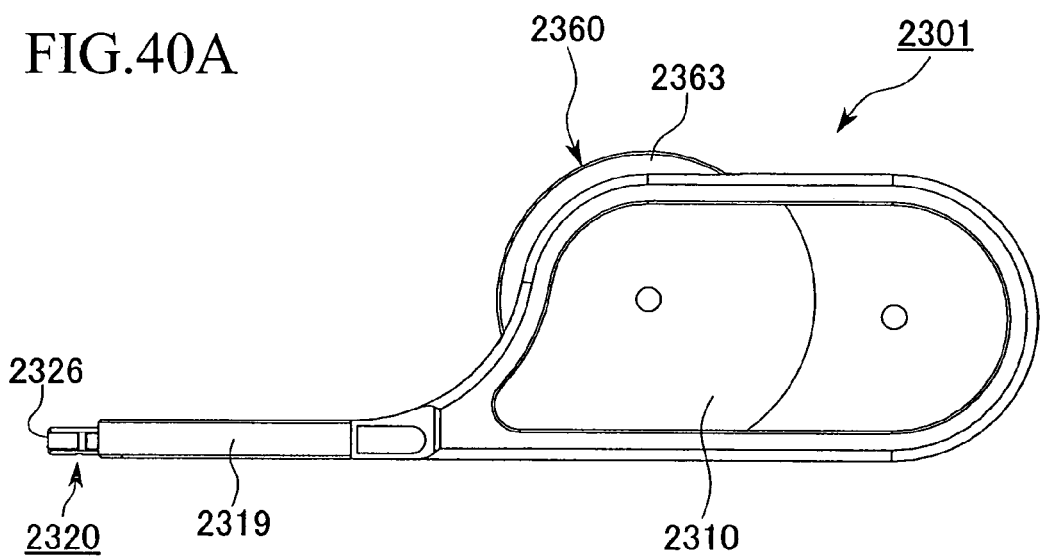
FIG. 40A is a front view showing an overview of the optical connector cleaning tool according to the fifth embodiment of the present invention.
Figure 40B:
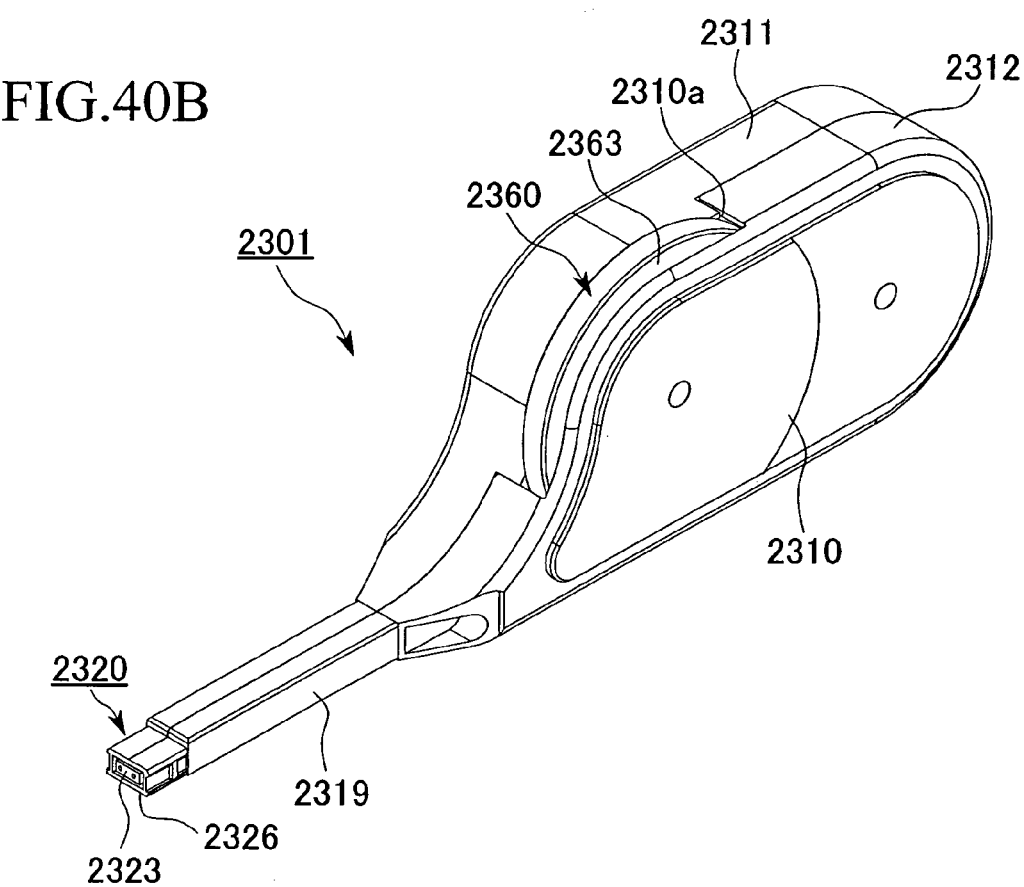
FIG. 40B is a perspective view thereof.

FIG. 40A is a front view showing an overview of the optical connector cleaning tool according to the fifth embodiment and FIG. 40B is a perspective view thereof.

Figure 41:
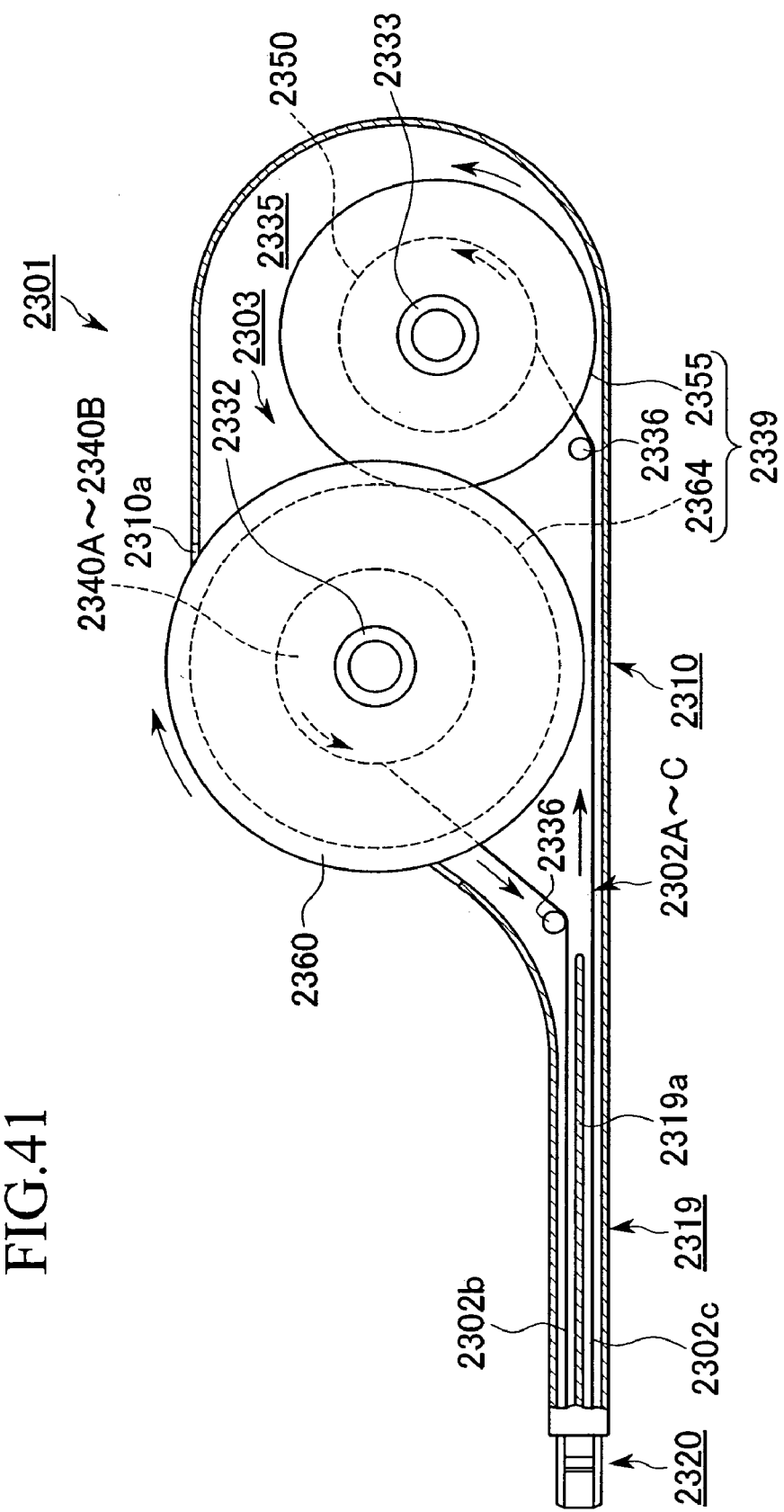
FIG. 41 is a sectional view showing the inside of the optical connector cleaning tool according to the fifth embodiment of the present invention.
Figure 42:
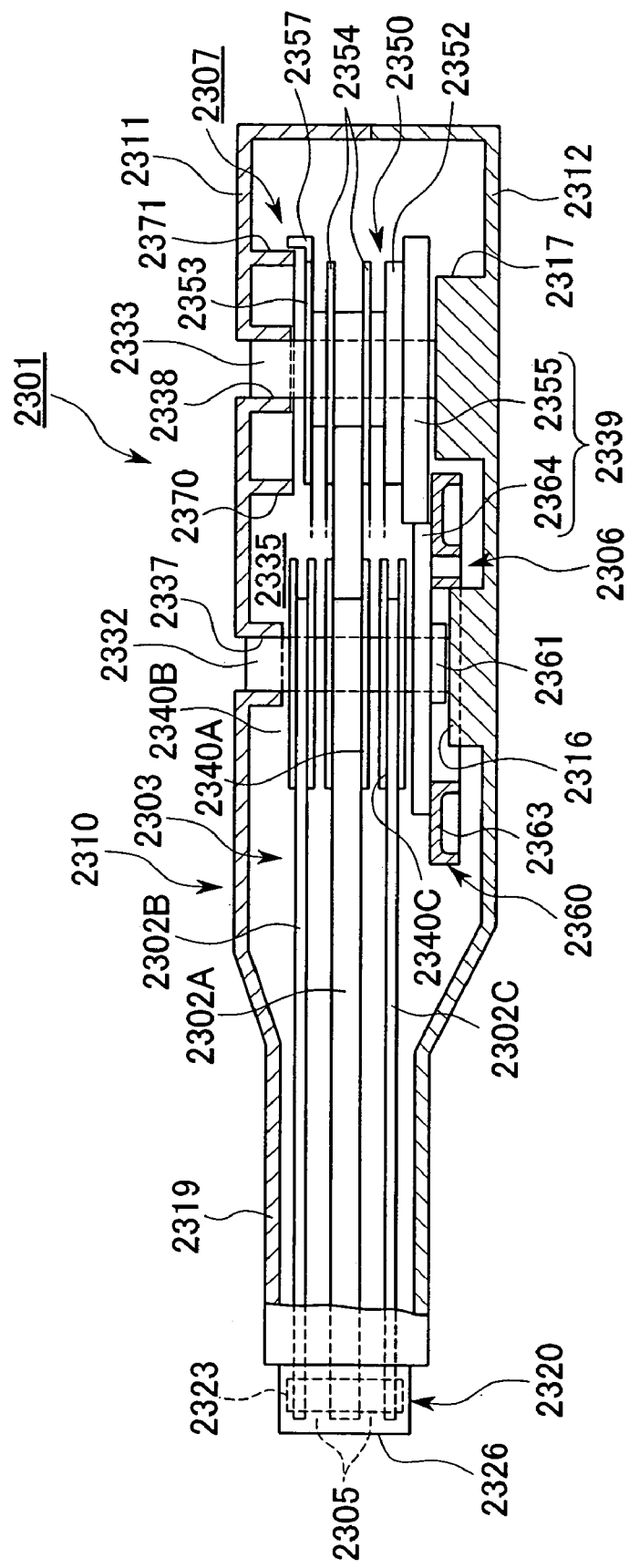
FIG. 42 is a sectional view showing the inside of the optical connector cleaning tool according to the fifth embodiment of the present invention.

FIGS. 41 and 42 are sectional views showing the inside of the optical connector cleaning tool according to the fifth embodiment.

FIGS. 43A through 43D are views explaining the operation of a rotation amount notification mechanism.

As shown in FIGS. 40A through 42, a cleaning tool 2301 according to the fifth embodiment is provided with a tool body 2310 that tapers toward an insertion portion 2320, and the insertion portion 2320 formed at the distal end (left side in FIG. 41) of a small diameter portion 2319 of the tool body 2310, being constituted generally similar to the cleaning tool 21 according to the aforementioned fourth embodiment.

As shown in FIG. 41, a projecting wall 2319a for reinforcing the small diameter portion 2319 is provided in the interior of the small diameter portion 2319. This projecting wall 2319a partitions the path of the upstream side portion 2302b of cleaning tapes 2302A to 2302C that should be clean (hereafter referred to as the "upstream portion") heading from supply reels 2340A to 2340C to a head portion 2323, and the path of the downstream side portion 2302c of the cleaning tapes 2302A to 2302C soiled from wiping and cleaning (hereafter referred to as the "downstream portion") heading from the head portion 2323 toward the take-up reel 2350.

As shown in FIG. 42, as the cleaning tapes 2302A, 2302B, 2302C, three mutually separated tapes are employed, with one cleaning a central region E1 that is a portion positioned between guide pin holes 261c and those cleaning outside regions E2, E2 positioned outside the central region E1 via the guide pin holes 261c within the connection end face 261a of the optical connector shown in FIG. 24. The tapes 2302A, 2302B, 2302C are not particularly limited, and ones can be adopted in which a publicly known suitable cleaning fabric (unwoven or woven fabric) is processed into a tape shape. For example, those made from an extra-fine fiber such as polyester or nylon are exemplified. In addition, the structure is also generally one with a roughly fixed width.

The widths of the tapes 2302A, 2302B, 2302C are made to match the width of the region to be cleaned. Here, the width of the tape 2302A that cleans the central region E1 is wider than the widths of the tapes 2302B, 2302C that clean the outside regions E2.

The three tapes 2302A, 2302B, 2302C respectively function as contact cleaning portions. Protruding member escape portions are gaps 2305 between the tape 2302A and the tape 2302B and between the tape 2302A and tape 2302C.

The aforementioned constitution can be employed as a tape abutting mechanism (not illustrated) including the head portion 2323.

The tool body 2310 is a two-split structure of first and second case half-bodies 2311, 2312 made of plastic. The case half-bodies 2311, 2312 are constituted to be able to be integrated together by the mating of fitting pins 2313 with fitting holes 2314.

A tape feeding mechanism 2303 that feeds the tapes 2302A to 2302C is provided in a storage space 2335 in the tool body 2310. This tape feeding mechanism 2303 includes the supply reels 2340A to 2340C wound with the tapes 2302A to 2302C, take-up reel 2350 that takes up and collects the tapes 2302A to 2302C after use, and an operation dial 2360 that operates the tapes 2302A to 2302C.

On a surface inside (the side facing the storage space 2335) of the second case half-body 2312, a supply reel support shaft 2332 on which the supply reels 2340A to 2340C are rotatably mounted and a take-up reel support shaft 2333 on which the take-up reel 2350 is rotatably mounted are provided to protrude toward the first case half-body 2311.

Through holes 2337, 2338 are formed in the first case half-body 2311 at positions meeting the supply reel support shaft 2332 and the take-up reel support shaft 2333 on the second case half-body 2312. More specifically, by fitting the distal end portions of the supply reel support shaft 2332 and the take-up reel support shaft 2333 into the through holes 2337, 2338, the supply reel support shaft 2332 and the take-up reel support shaft 2333 can bridge the space between the first case half-body 2311 and the second case half-body 2312 to retain the supply reels 2340A to 2340C and the take-up reel 2350 without dropping them.

Ratchet grooves 2332a extending in the axial direction of the supply reel support shaft 2332 are provided around the outer circumference of the supply reel support shaft 2332. These ratchet grooves 2332a have an approximately semicircular cross section and are able to engage with a projection 2345 (described hereinafter) on a ratchet arm 2344 of the supply reels 2340A to 2340C.

As shown in FIG. 41, between the supply reels 2340A to 2340C and the take-up reel 2350, tapes 2302A to 2302C are stretched in the storage space 2335 along pin-shaped tape guides 2336, midway being wound around a head portion 2323 (see FIG. 40B) housed in the insertion portion 2320. The head portion 2323 is disposed facing an opening portion 2326 in the protrusion distal end from the tool body 2310 of the insertion portion 2320.

As shown in FIGS. 36 to 39, the tape guides 2336 are pins provided in a protruding manner from the second case half-body 2312, with the distal end portions of the pins being fit into fitting holes 2336a formed on the side surface of the first case half-body 2311.

The operation dial 2360 is mounted on the outer circumference of the take-up reel support shaft 2333 so as to be concentric with the take-up reel 2350. The operation dial 2360 is one in which a hub portion 2361 that is penetratingly installed in the take-up reel support shaft 2333, a rim portion 2363 that has a knurled surface on its periphery, and a plurality of spoke portions 2362 connecting the hub portion 2361 and the rim portion 2362 are integrally formed from plastic and the like. A gear 2364 is integrally formed on the rim portion 2363. In addition, a ratchet arm 2365 having an engaging claw 2366 at the distal end thereof is disposed on one of the spoke portions 2362. The ratchet arm 2365 is elastically deformable.

A portion of the operation dial 2360 is exposed to outside the tool body 2310 from a window 2310a provided on a side surface of the tool body 2310 and can be rotated by operating in the prescribed feeding direction (clockwise in FIG. 41) by finger or the like. The tape feeding mechanism 2303 is driven by rotation of the operation dial 2360.

Shoulders 2316, 2317 are formed at the base of the supply reel support shaft 2332 and the take-up reel support shaft 2333. A plurality of ratchet teeth 2316a are provided on the peripheral face of the shoulder 2316 on the supply reel support shaft 2332 side. The engaging claw 2366 on the ratchet arm 2365 of the operation dial 2360 is attached so as to be able to engage the ratchet teeth 2316a and block reverse rotation of the operation dial 2360. More specifically, the ratchet teeth 2316a and the ratchet arm 2365 function as a reverse-feed blocking mechanism 2306 to block reverse feeding of the tapes 2302A to 2302C (a reverse-rotation prevention mechanism to prevent reverse rotation of the take-up reel). In this case, the tapes 2302A to 2302C are stably fed in the prescribed direction, which can suppress slack in the tapes 2302A to 2302C.

As shown in FIG. 42, the same number (here, three) of supply reels 2340A, 2340B, 2340C are provided as the number of cleaning tapes 2302A, 2302B, 2302C, and they are supported side by side by the supply reel support shaft 2332.

FIGS. 33A and 33B show an example of the supply reel 2340A wound with the tape 2302A. The supply reel 2340A is one in which a hollow cylindrical winding core portion 2341 and side plate portions 2342, 2342 formed on both ends of the winding core portion 2341 are integrally formed from plastic or the like. One tape 2302A is wound around the supply reel 2340A. The spacing between the two side plate portions 2342, 2342 is set to match the width of the tape 2302A wound therearound.

The supply reels 2340B, 2340C wound with the tapes 2302B, 2302C are similar to the supply reel 2340A of FIGS. 33A and 33B except for the spacing between the two side plate portions 2342, 2342 being narrower to match the width of the tapes 2302B, 2302C, and so illustration of their specific constitutions is omitted.

As shown in FIG. 34, the ratchet arm 2344 is formed on the inner surface of the winding core portion 2341 of the supply reels 2340A to 2340C. The approximately semi-cylindrical projection 2345 is formed at the distal end of the ratchet arm 2344 facing the center in the radial direction of the supply reels 2340A to 2340C. A concave portion 2346 is formed on the inner surface of the winding core portion 2341 so as to accommodate the ratchet arm 2344. The ratchet arm 2344 is able by elastic deformation to allow the projection 2345 to oscillate in the radial direction of the supply reels 2340A to 2340C.

The projection 2345 of the ratchet arm 2344 engages with the ratchet grooves 2332a when the supply reels 2340A to 2340C are supported on the supply reel support shaft 2332. When the supply reels 2340A to 2340C rotate, the projection 2345 repeatedly engages and disengages with the ratchet grooves 2332a due to elastic deformation of the ratchet arm 2344, thereby imparting rotation resistance to rotation of the supply reel 2340A. A constant tension force is required for the feeding movement of the tapes 2302A to 2302C, whereby slippage of the supply reels 2340A to 2340C is minimized. More specifically, the ratchet arm 2344 of the supply reels 2340A to 2340C and the projection 2345 of the supply reel support shaft 2332 function as a rotation resistance imparting mechanism 2308 that imparts rotation resistance to rotation of the supply reels 2340A to 2340C.

The constant tension force permitting the feeding movement of the tapes 2302A to 2302C is to an extent such that stretching of the tape due to tensioning by the tape feeding mechanism 2303 does not exert an adverse effect on cleaning, and such that the tape cannot be fed just by swinging or carrying the cleaning tool 2301.

As shown in FIGS. 31A, 31B and 32, the take-up reel 2350 is one in which a hollow cylindrical winding core portion 2351, side plate portions 2352, 2353 formed on both ends of the winding core portion 2351, partition plate portions 2354, 2354 formed between the both side plate portions 2352, 2353 are integrally formed from plastic or the like. The side plate portions 2352, 2353 and the partition plate portions 2354, 2354 are approximately disk-shaped concentric with the winding core portion 2351. The partition plate portions 2354, 2354 divide the area between both side plate portions 2352, 2353 into three, with the tapes 2302A to 2362C being wound in the spaces thus partitioned.

A gear 2355 is integrally formed on the side portion of one side plate portion 2352. This gear 2355 is meshed with the gear 2364 of the operation dial 2360. These gears 2355, 2364 transmit driving force due to rotating operation of the operation dial 2360 to the take-up reel 2350, and function as a driving force transmission mechanism 2339 for taking up the tape 22.

Moreover, the cleaning tool 2301 of the fifth embodiment is provided with a feeding amount notification mechanism 2307 that notifies the feeding amount of the tapes 2302A to 2302C. Here, the feeding amount notification mechanism 2307, to be described in detail hereinafter, is constituted by stranding projections 2372 of an annular wall portion 2370 and a hammer portion 2357 of the take-up reel 2350.

As shown in FIG. 36, the annular wall portion 2370 is formed on the inner surface of the first case half-body 2311, incorporating the through hole 2338 in which the take-up reel support shaft 2333 is fitted. A plurality of stranding projections 2372 (six in FIG. 36) are formed at regular intervals along the periphery of the annular wall portion 2370 on the outer circumference of the annular wall portion 2370.

In the front view shown in FIG. 36 and FIGS. 43A to 43D, the stranding projections 2372 have inclined faces 2372a forming an acute angle with an outer circumferential surface 2371 of the annular wall portion 2370. The inclined faces 2372a are provided on the side of the stranding projections 2372 facing the rotation direction of the take-up reel 2350 (the counterclockwise rotation direction in FIGS. 43A to 43D).

As shown in FIGS. 31A and 31B, the hammer portion 2357 is provided on the outer surface 2353a of the other side plate portion 2353 of the take-up reel 2350, and has an arm portion 2357a extending along the periphery of the side plate portion 2353 and a hammerhead portion 2357b formed at the distal end of the arm portion 2357a. A concave groove portion 2356 recessed to the hammerhead portion 2357b is formed on the outer surface 2353a of the other side plate portion 2353. In the state of no load being applied to the hammer portion 2357, a hitting face 2357c of the hammerhead portion 2357b is positioned in the concave groove portion 2356 that is interior to the outer surface 2353a of the side plate portion 2353.

Figure 43A:
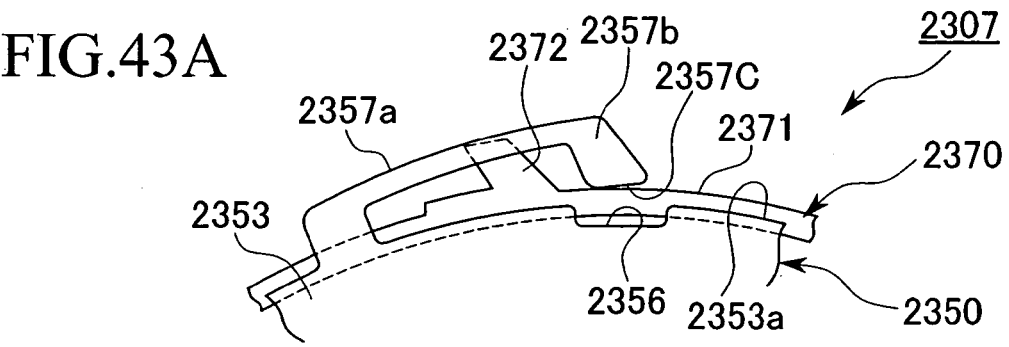
FIGS. 43A to 43D are drawings explaining the operation of the feeding amount notification mechanism according to the cleaning tool of the fifth embodiment of the present invention.

In the state of the take-up reel 2350 mounted on the take-up reel support shaft 2333 and the distal end portion of the take-up reel support shaft 2333 fitted into the through hole 2338, as shown in FIG. 43A, the arm portion 2357a is swung slightly outward from the outer surface 2353a of the side plate portion 2353, and the hitting face 2357c of the hammerhead portion 2357b abuts the outer surface 2371 of the annular wall portion 2370.

Figure 43B:
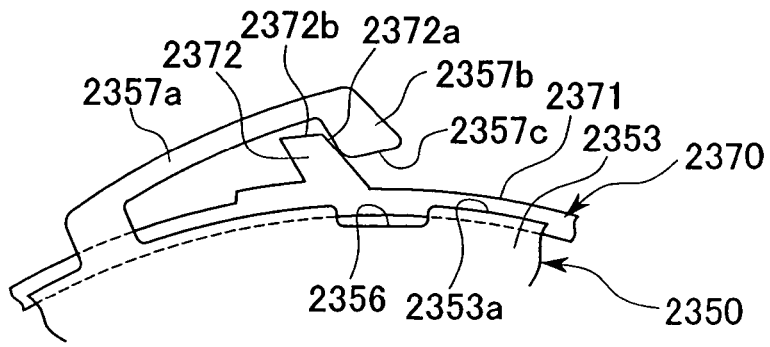
Figure 43C:
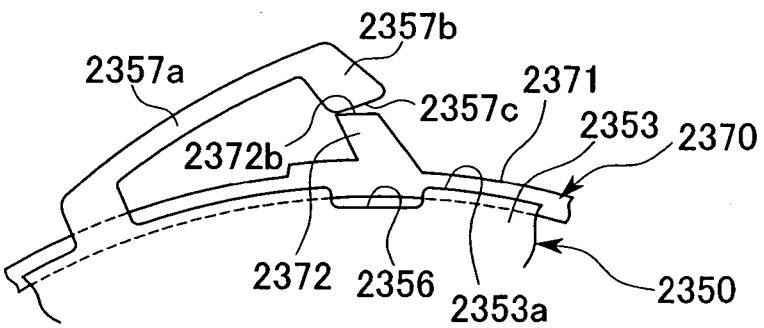
Figure 43D:
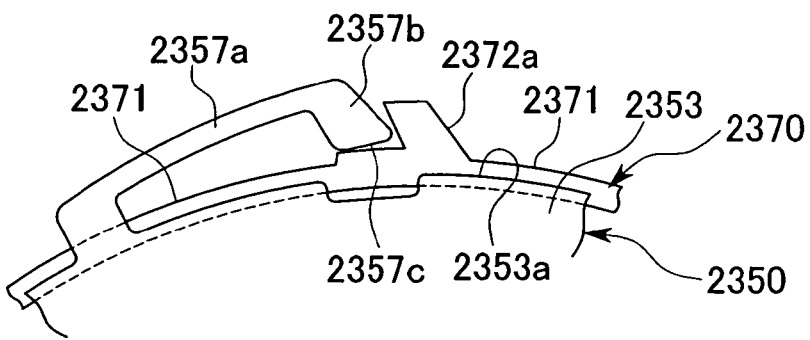

When the take-up reel 2350 rotates, as shown in FIGS. 43B and 43C, the hammerhead portion 2357b rises to the top portion 2372b along the inclined face 2372a, and as shown in FIG. 43D, losing the support of the stranding projection 2372, the hammer portion 2357 swings down the hammerhead portion 2357b by its own springing force toward the outer surface 2371 of the annular wall portion 2370, and the hitting face 2357c of the hammerhead portion 2357b collides with the outer surface 2371, producing a slapping sound. In this way, the operator can be notified of the feeding amount of the tape 22 by the slapping sound produced each time the feeding amount of the tapes 2302A to 2302C reaches a fixed amount.

The feeding amount of the tapes 2302A to 2302C corresponding to one slapping sound can be made to serve as the feeding amount required for one cleaning of an optical connector. In addition, multiple slapping sounds can be made to serve as the feeding amount corresponding to one cleaning of an optical connector. Operation is also possible by suitably changing the number of slapping sounds corresponding to one cleaning of an optical connector in accordance with the degree of dirtiness of the optical connector.

The method of cleaning an optical connector using the cleaning tool 2301 of the fifth embodiment is as described hereinabove.

As explained above, according to the cleaning tool 2301 of the fifth embodiment, since the plurality of cleaning tapes 2302A, 2302B, 2302C are supplied from the plurality of supply reels 2340A, 2340B, 2340C, the feeding amounts of each cleaning tape 22 can be made to mutually differ. Accordingly, even if the elongation differs depending on width and strength of the tapes, the tensions of the tapes 2302A, 2302B, 2302C can be uniformly maintained to enable stable feeding of the tapes 2302A, 2302B, 2302C.

Since the plurality of tapes 2302A, 2302B, 2302C are taken up on the one take-up reel 2350, there is no need to provide the tape feeding mechanism 2303 for each tape 2302A, 2302B, 2302C, which can simplify the constitution and enables the tapes 2302A, 2302B, 2302C to be easily operated collectively.

Since the feeding amount notification mechanism 2307 that notifies the feeding amount of the tapes 2302A, 2302B, 2302C is provided, feeding the tapes 2302A, 2302B, 2302C only required for cleaning is easy, reliable cleaning can be carried out, and wasteful usage of the tape 22 can be suppressed.

With a slack prevention mechanism constituted from a reverse-feed blocking mechanism 2306 to prevent reverse feeding of the tapes 2302A, 2302B, 2302C and a rotation resistance imparting mechanism 2308 that imparts rotation resistance to the supply reels 2340A to 2340C, even in the case of the tapes 2302A to 2302C being a plurality, the tapes 2302A to 2302C can be stably fed in the prescribed direction, and fluctuations in the tape feeding amount and the like can be suppressed. Accordingly, tape slack is prevented and constant cleaning conditions are maintained so that reliable wiping and cleaning can be carried out.

Preventing slack in the tapes 2302A to 2302C suppresses fluctuations in the feeding amount of the tapes 2302A to 2302C and the pushing pressure on the connection end face 261a. Accordingly, the connection end face 261a of the optical connector can be more reliably cleaned.

The present invention based on the preferred fourth and fifth embodiments was explained hereinabove, but the present invention is not limited to only the fourth and fifth embodiments and can be modified within a range that does not depart from the spirit of the present invention.

Figure 26:
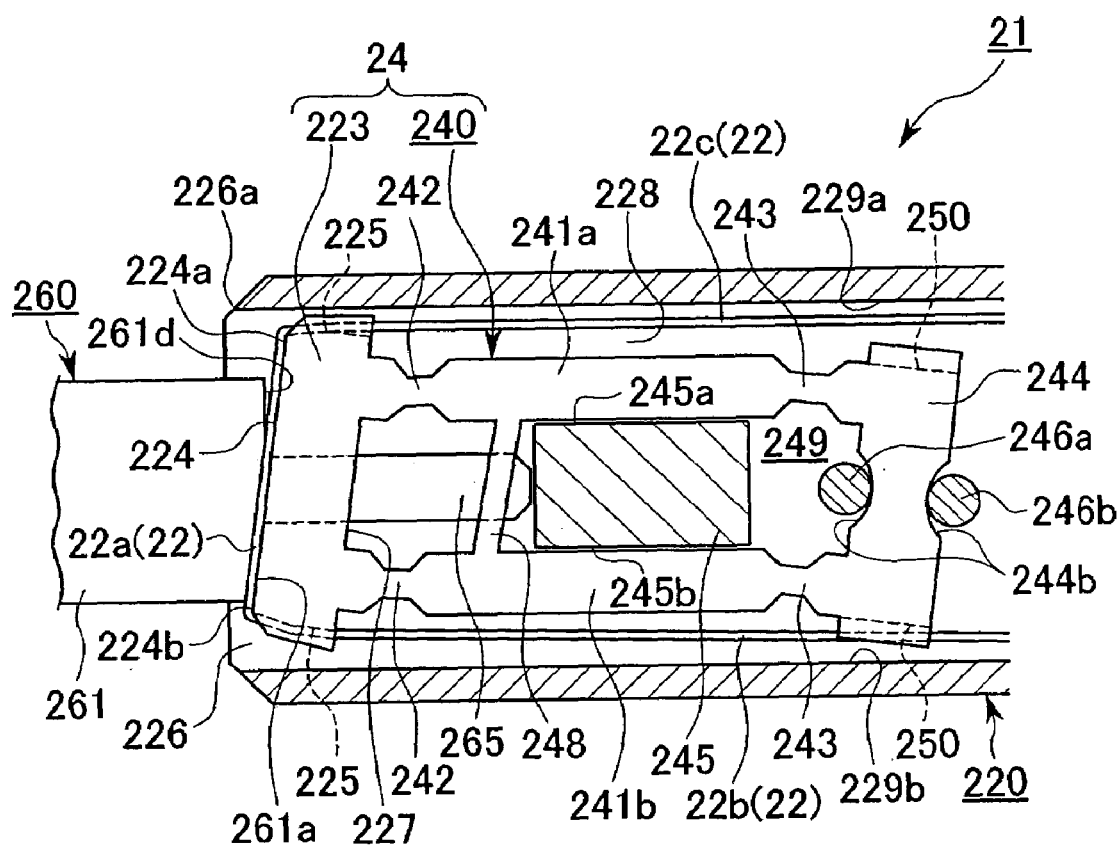
FIG. 26 is a sectional view showing the interior of the insertion portion of an optical connector cleaning tool according to a modification of the present invention.

For example, it is not necessary for a stopper to be inserted in a stopper insertion hole formed in the coupling portion. As shown by the modification example of the head tilting mechanism 240 in FIG. 26, displacement in the insertion direction and separation direction of the insertion portion 220 can be limited even by disposing stoppers 246a, 246b provided in a protruding manner from the inner wall 228 disposed in the width direction of the insertion portion 220 so as to sandwich the front and rear of the coupling portion 244 (places in the coupling portion 244 positioned in the insertion direction and separation direction of the insertion portion 220. Left and right in FIG. 26). Here, receiving portions 244b, 244b are provided in the coupling portion 244 for smooth contact with the stoppers 246a, 246b, however, they are not necessary in the fourth and fifth embodiments.

A constitution of the head tilting mechanism is also possible that retains the head portion by means of an elastic body such as a spring connected to the rear face of the head portion and biasing it so that the opposed both end edges of the abutting face of the head portion can displace by differing amounts of displacement in the insertion direction and separation direction of the insertion portion. Even by such a constitution, tilting of the head portion can be allowed by elastic deformation of the elastic body.

In the insertion portion, unit insertion portions which, by insertion into different connector housings, are to be positioned within the connector housing are formed at a plurality of locations in the protruding direction of the insertion portion, and the unit insertion portions of the insertion portion may be formed so as to be insertable in all of connector housings capable of housing the unit insertion portions positioned relatively to the rear in the protruding direction of the insertion portion. With this kind of cleaning tool, the insertion portion can be inserted so as to be positioned with respect to different connector housings by the respective unit insertion portions, so that, using a single cleaning tool, cleaning of a connection end face of an optical connector in the connector housing can be carried out in compliance with a plurality of types and sizes of connector housing.

In addition, the insertion portion can be constituted as one in which a plurality of kinds of insertion portions are exchangeable with respect to the tool body. This enables cleaning of the connection end face of an optical connector in a connector housing in compliance with the type and size of the connector housing just by changing the insertion portion without changing the tool body.

The driving mechanism for feeding the tape is not limited to one that is manually driven, and may be made to be driven by power from a motor or spring and the like. Also, manual driving and driving by motive power can be made to be used in combination or be switchable as required.

In the cleaning tool of the aforementioned fourth and fifth embodiments, the insertion portion is made to completely cover the cleaning member, except for the opening formed at the distal end of the insertion portion, but is not necessarily limited thereto. If the cleaning member is prevented from being contaminated by contact with the inner walls of the connector housing and the like when inserting the insertion portion in the connector housing, the shape or structure is not particularly limited, and does not necessarily need to be sleeve shaped.

As a rotation resistance imparting mechanism that imparts rotation resistance to the supply reel, it is not limited to a mechanism that imparts rotation resistance to between the winding core portion of the supply reel and the supply reel support shaft. For example, rotation resistance can also be imparted to the periphery of the supply reel. In addition, if the supply reel support shaft rotates in conjunction with the supply reel, a constitution is also possible that imparts rotation resistance to the supply reel support shaft. As method of imparting rotation resistance, it is not limited to the elastic force of the ratchet arm, with that due to contact friction obtained by roughening the contact face or viscosity resistance from a viscous body such as grease also being possible.

In addition, at all times or at least when take-up of tape is stopped, there may be a function that applies torque of a strength of the extent that does not impede take-up of the tape to the supply reel in the direction opposite to the rotation feeding direction of the supply reel.

As another constitutive example of the cleaning tape of the present invention, as a modification of the tape 22 shown in FIGS. 27A and 27B, it is also possible to adopt the constitution of a cleaning tape in which one end of the slits S1, S2 is cut through until one end of the cleaning fabric, and only at the other end of the slits S1, S2 is the cleaning tape connected. This type of tape, as shown in FIG. 42 and the like, can be used for a cleaning tool in which there is one take-up reel and a plurality of supply reels. By winding the ends of the side at which the contact cleaning portion is divided around a plurality of different supply reels and supplying to the head portion, as the feeding amounts of the cleaning tapes mutually differ, tape slack and the like can be suppressed.

The cleaning tool of the aforementioned fourth and fifth embodiments, as an optical component cleaning tool used for optical components such as optical fiber arrays and planar lightwave circuits, can be used for cleaning the end face of an optical component at which the end face of a lightwave circuit (an optical fiber being possible) is disposed. The optical fiber arrays may include one serving as an end face by its optical fibers being retained in one or a plurality of positioning grooves such as V-grooves positioned side by side that are formed on a substrate, the positioning grooves extending to at least one end of the substrate, and the end face of the fibers being arranged at one end of the substrate. Various constitutions are also known of optical components having planar lightwave circuits. According to the optical component cleaning tool of the present invention, even in the case of the end face of the optical component being disposed in a recess of a housing or the like, the end face of the optical fiber and the end face of a substrate or the like can be cleaned by a cleaning tape wrapped around a head.

The present invention is explained in detail below based on the sixth embodiment.

FIGS. 45A to 55 are views showing the sixth embodiment of the optical connector cleaning tool of the present invention (hereafter simply referred to as the "cleaning tool").

Figure 48:
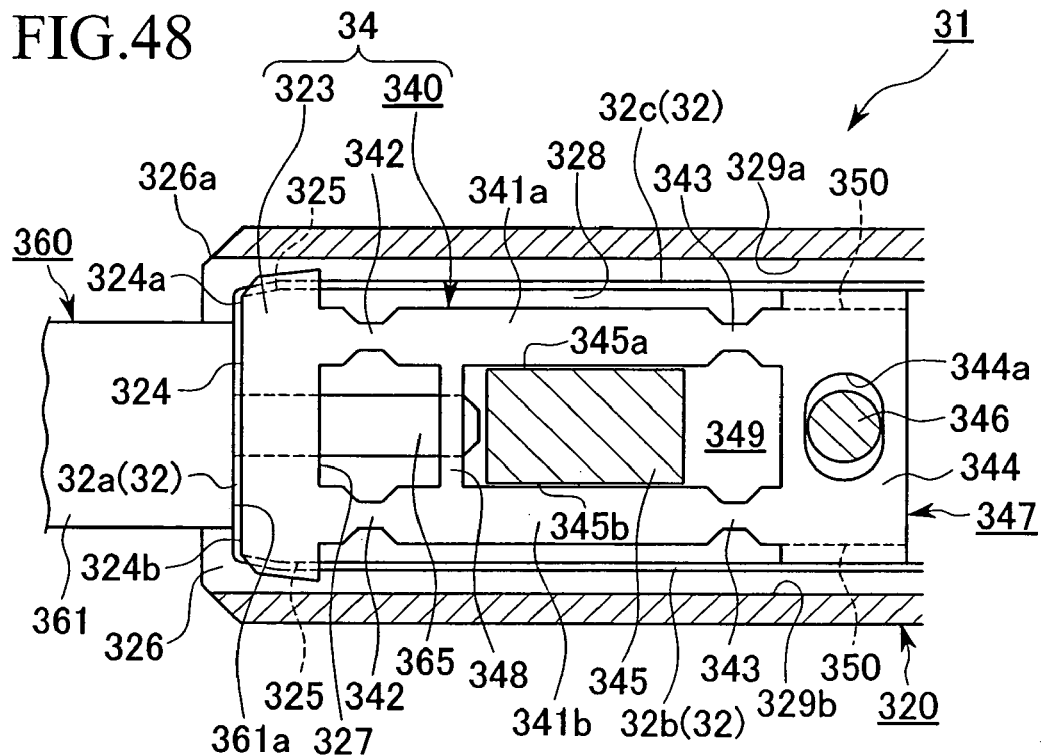
FIG. 48 is a sectional view showing an example of the state of the insertion portion of the optical connector cleaning tool shown in FIGS. 45A and 45B inserted in a connector housing.
Figure 49:
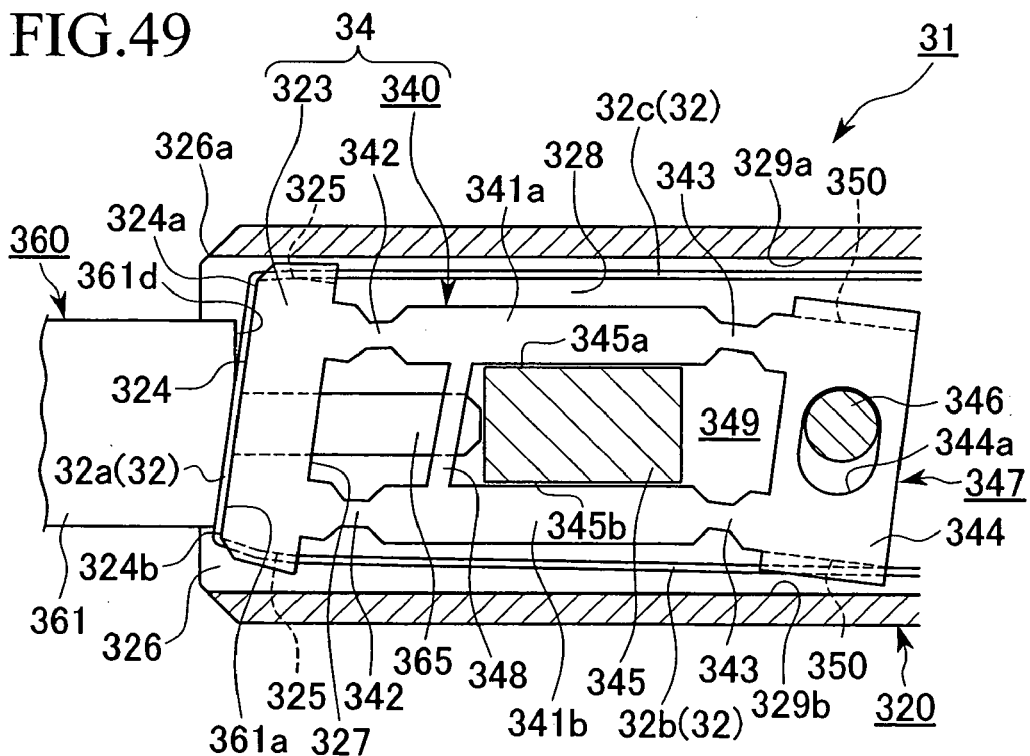
FIG. 49 is a sectional view showing another example of the state of the insertion portion of the optical connector cleaning tool shown in FIGS. 45A and 45B inserted in a connector housing.
Figure 50:
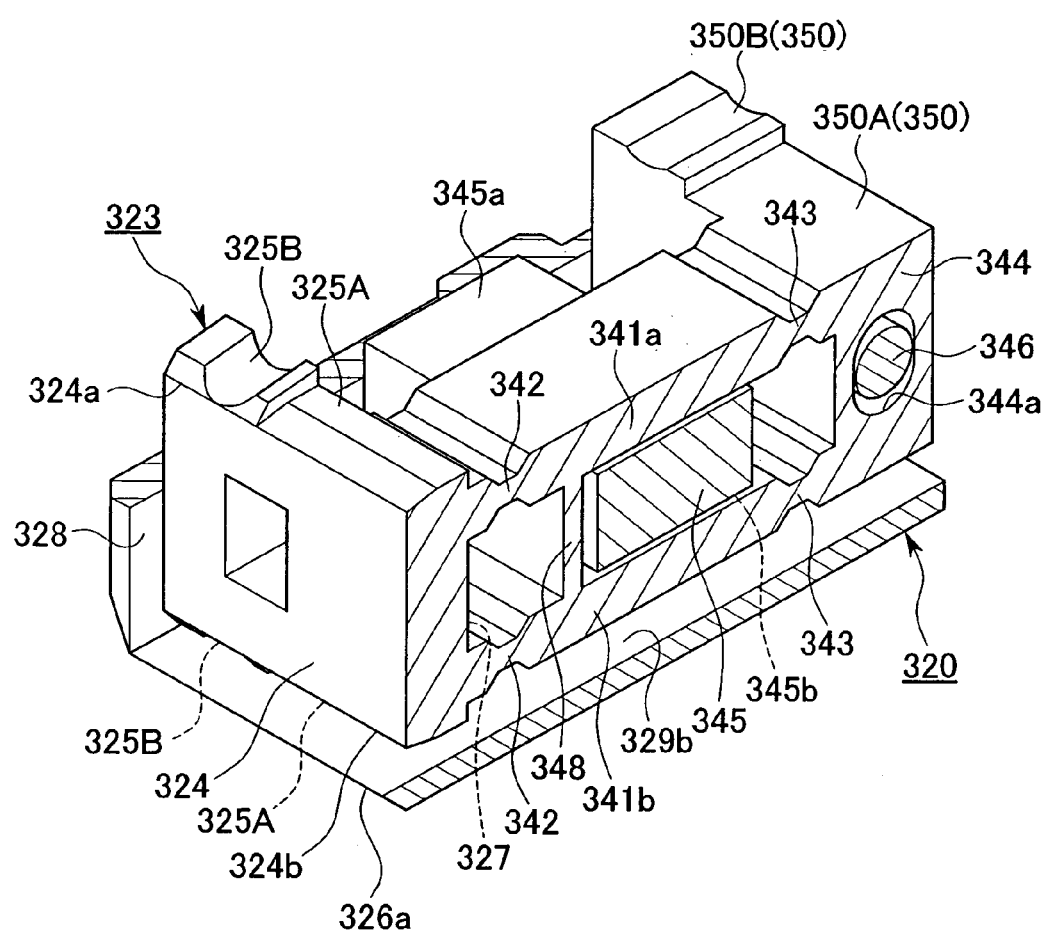
FIG. 50 is a half sectional perspective view showing another example of a possible state of the tape abutting mechanism of the optical connector cleaning tool shown in FIGS. 45A and 45B.
Figure 51:
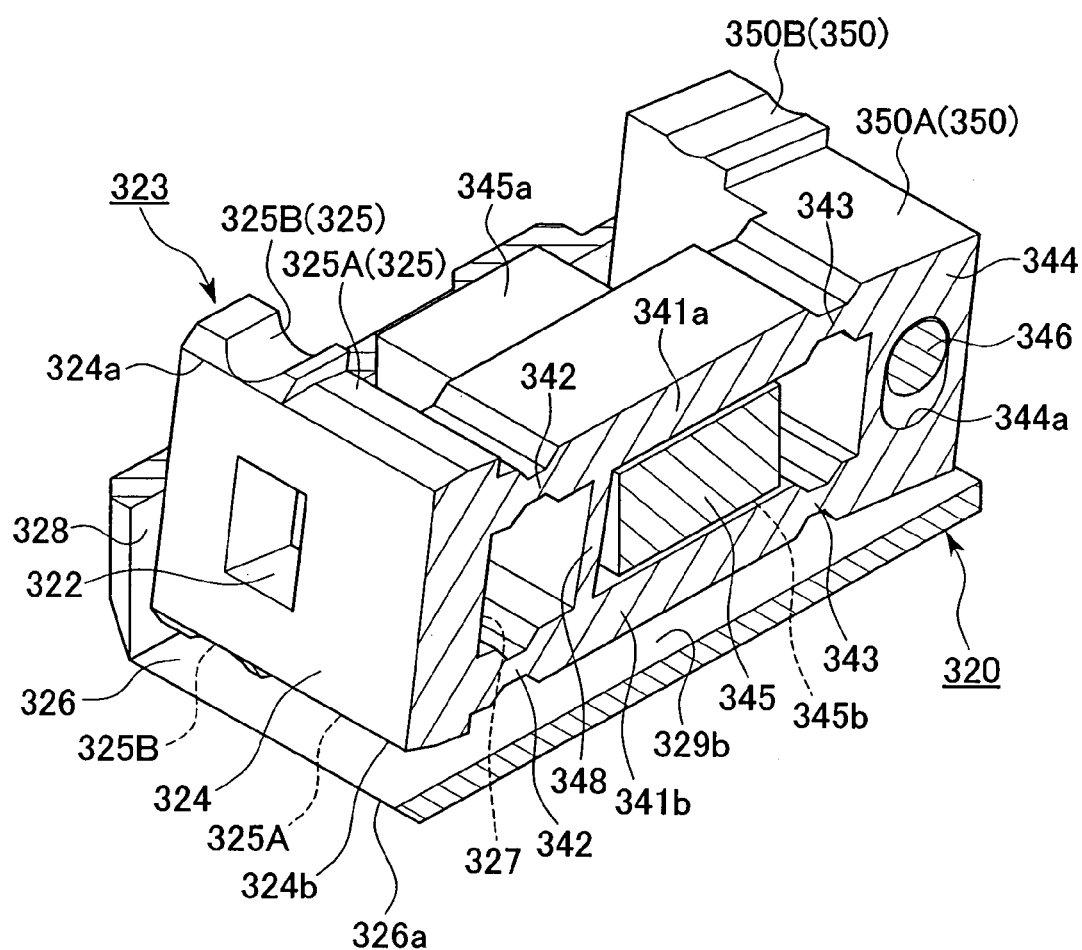
FIG. 51 is a half sectional perspective view showing another example of a possible state of the tape abutting mechanism of the optical connector cleaning tool shown in FIGS. 45A and 45B.

FIG. 50 is a perspective view corresponding to the state shown in FIG. 48, and FIG. 51 is a perspective view corresponding to the state shown in FIG. 49. Here, since an insertion portion 320 is symmetrical in the central face in the width direction, FIGS. 50 and 51 illustrate only one side of the insertion portion 320 in the width direction.

An optical connector plug 360 (sometimes referred to hereafter simply as an optical plug) and an optical connector adaptor 370 (connector housing. Sometimes referred to hereafter simply as an optical adaptor) to which a cleaning tool 31 of the sixth embodiment is applied are as shown in FIGS. 54 and 55 Multifiber Push-On (MPO) type optical connectors defined according to JIS C 5982.

The optical plug 360 is an optical connector plug of a constitution housing a Mechanically Transferable (MT) type optical connector ferrule 361 (hereafter simply referred to as a ferrule) defined according to JIS C 5981 at a distal end portion of a plastic sleeve-shaped housing 362, with the whole plug being formed in a low profile sectional shape in appearance.

In the explanation below, the direction corresponding to the low-profile, short side (vertical direction in FIG. 54) of the optical plug 360 and the ferrule 361 is referred to as the thickness direction, and the direction corresponding to the long side is referred to as the width direction (horizontal direction in FIG. 54). In addition, thickness direction and width direction are also similarly used for the optical adaptor 370 connected to the optical plug 360 and an insertion portion 320 of the cleaning tool 31 inserted in the optical adaptor 370 to correspond to the thickness direction and the width direction of the optical plug 360 and the ferrule 361.

Figure 54:
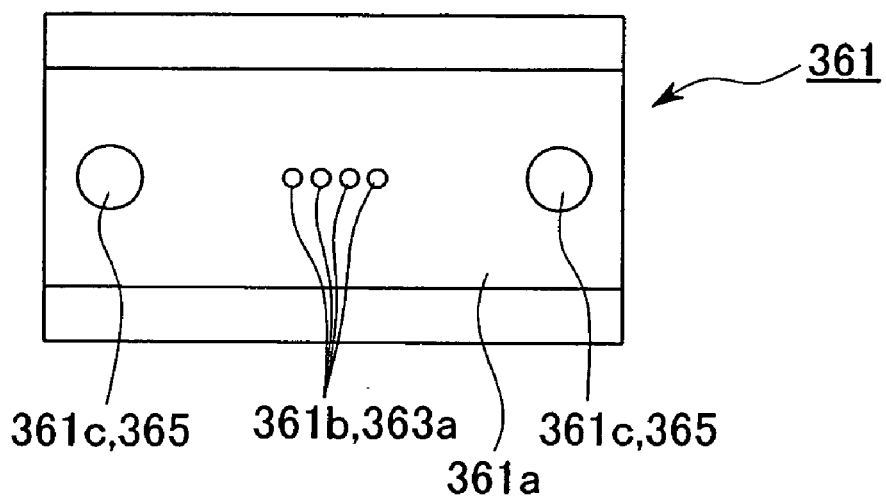
FIG. 54 is a front view showing an example of a ferrule of an optical connector plug.
Figure 55:
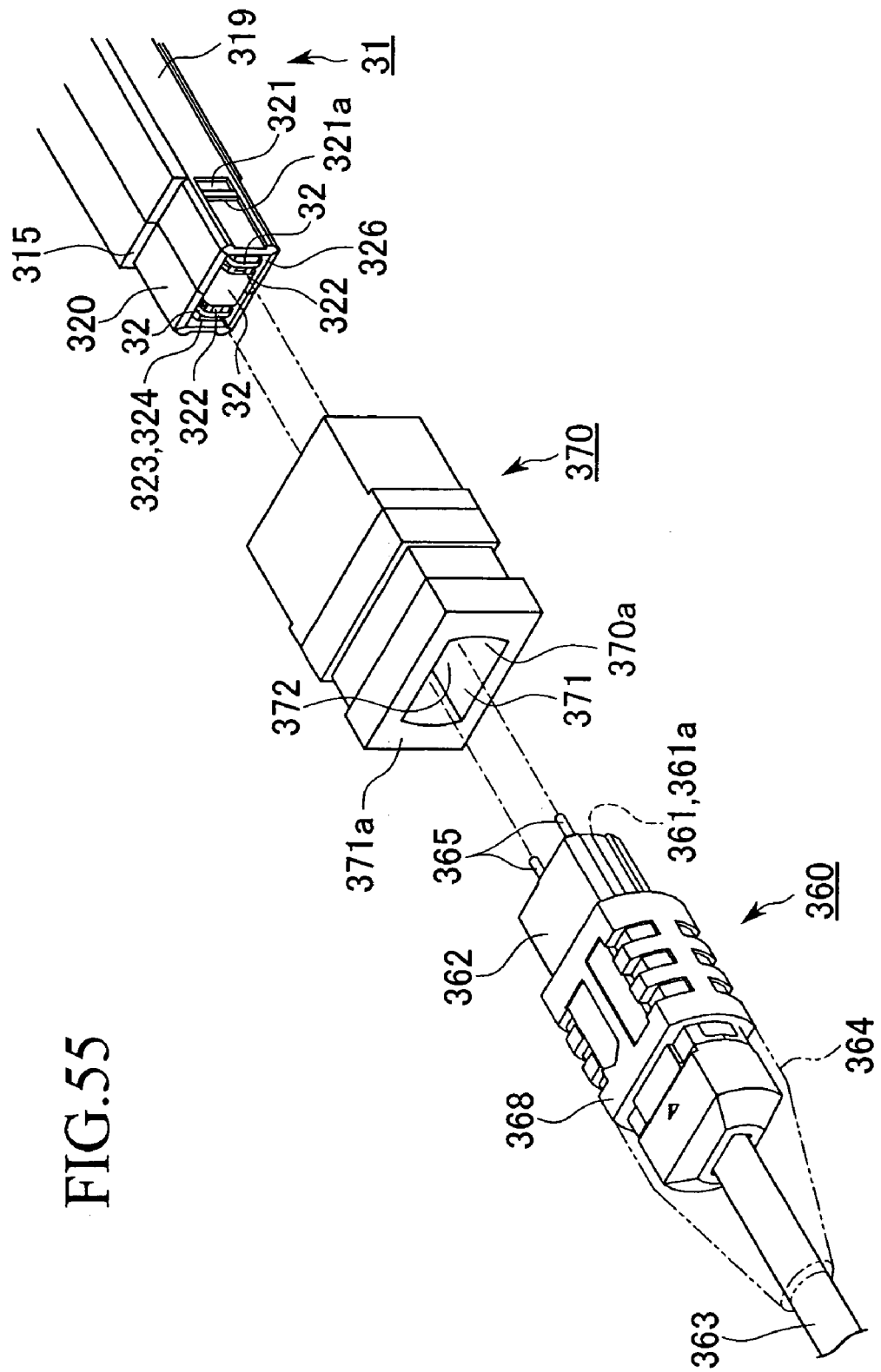
FIG. 55 is an exploded perspective view showing the state of the insertion portion of the optical connector cleaning tool shown in FIGS. 45A and 45B to be inserted in the connector insertion hole of a connector housing in which an optical connector is housed.

As shown in FIG. 54, optical fiber holes 361b of a prescribed number (here four) are opened so as to be arrayed on a connection end face 361a of the ferrule 361. Here, an optical fiber 363 is a four-fiber optical fiber tape ribbon, with optical fibers 363a having their resin coating removed at the distal end portion thereof (bare optical fibers) inserted into the optical fiber holes 361b (micro holes) in the ferrule 361. By doing so they are terminated to be butt-connectable with another optical connector and penetrate the inside of the optical plug 360 to be drawn out from the back end of the optical plug 360. By storing the optical fiber 363 drawn out from the back end of the optical plug 360 in a boot 364 provided at the back end of the housing 362 in the connection direction (left side in FIG. 55), sudden bending and the like near the back end of the optical plug 360 is prevented.

There are no particular limitations to the optical fiber 363 as long as it is suited to termination by the optical plug. The optical fiber may be one having a single core, one having multi-core, an optical fiber cord having such a single core housed in a tube, an optical fiber cord having such multi-core housed in a tube, or the like.

Guide-pin holes 361c are provided in the connection end face 361a of the ferrule 361 on both sides of the outside of the optical fiber holes 361b in the width direction. Ferrules 361 are aligned with each other to a high degree of accuracy by a positioning mechanism of a widely-known guide-pin fitting system whereby protruding members 365 (guide pins) are provided so as to protrude from the connection end face 361a and to be inserted into the guide-pin holes 361c with the end faces of the optical fibers 363a being connected by butt-coupling. The optical fibers 363 terminated in the ferrules 361 are thus optically connected.

The optical adaptor 370 is formed in a sleeve-shape having a connector insertion port 371 on both sides. By inserting the optical plug 360 from the connector insertion port 371, it can be housed in a connector housing hole 372 formed in the interior of the optical adaptor 370 and continuous with the connector insertion port 371.

When the optical plug 360 is inserted from the connector insertion port 371 in the optical adaptor 370, it is housed in the connector housing hole 372 while displacement in a direction deviating from the insertion direction is restricted. When two optical plugs 360 are inserted in the optical adaptor 370, the ferrules 361 are butted against each other within the optical adaptor 370, with the optical fibers 363 terminated by the ferrules 361 being thereby optically connected.

Although not particularly illustrated, similarly to the widely known MPO type connector there are provided elastic engaging pieces formed extending toward the connector insertion port 371 along inner walls 370a of the optical adaptor 370 and having engaging claws on the distal end thereof. In addition, engaging recesses capable of engagement with the engaging claws of the elastic engaging pieces of the optical adaptor 370 are provided on the surfaces of both sides in the width direction of the housing 362 of the optical plug 360.

Moreover, on the periphery of the housing 362, a coupling 368 is mounted for pressing the elastic engaging pieces from the outside to prevent release of engagement with the engaging recesses when the engaging claws and the engaging recesses are engaged.

When the optical plug 360 is inserted into the optical adaptor 370 from the connector insertion port 371, it is housed in the connector housing hole 372 while displacement in a direction deviating from the insertion direction is restricted by the engagement of the engaging recesses and the engaging claws.

In the state of both optical plugs 360 being inserted in the optical adaptor 370, the distal ends of the optical fibers 363a fixedly held in the ferrules 361 within the optical adaptor 370 are butted against each other, with the optical fibers 363 terminated by the ferrules 361 being thereby optically connected.

The cleaning tool 31 capable of being applied to cleaning of the connection end face 361a of the optical plug 360 is as shown in FIGS. 45A through 47 provided with a roughly case-shaped tool body 310 having a cleaning member 32 housed therein and the insertion portion 320 set to protrude from the tool body 310 and formed to be insertable in the connector housing hole 372 of the optical adaptor 370.

Figure 45A:
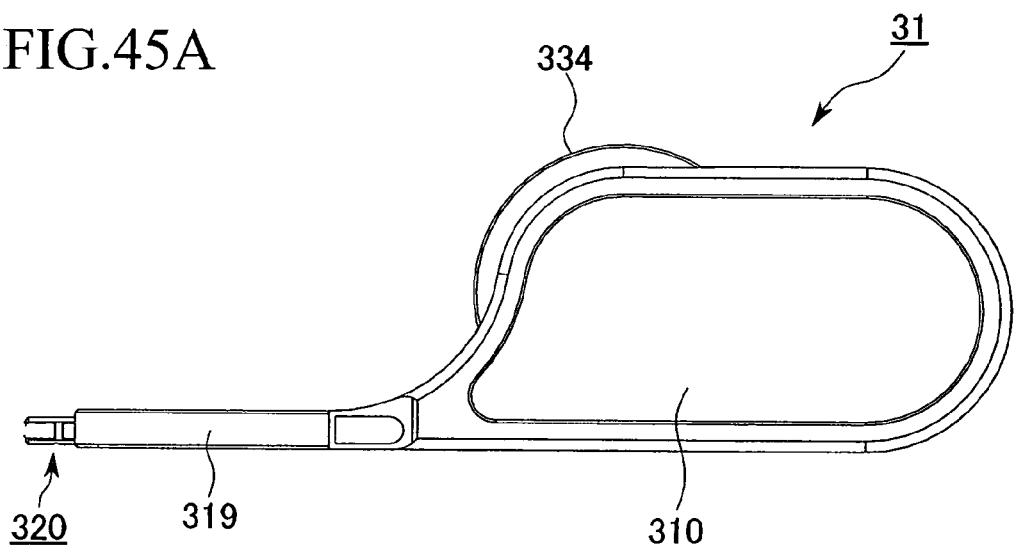
FIG. 45A is a front view showing an overview of the optical connector cleaning tool according to the sixth embodiment of the present invention and FIG. 45B is a perspective view thereof.
Figure 45B:
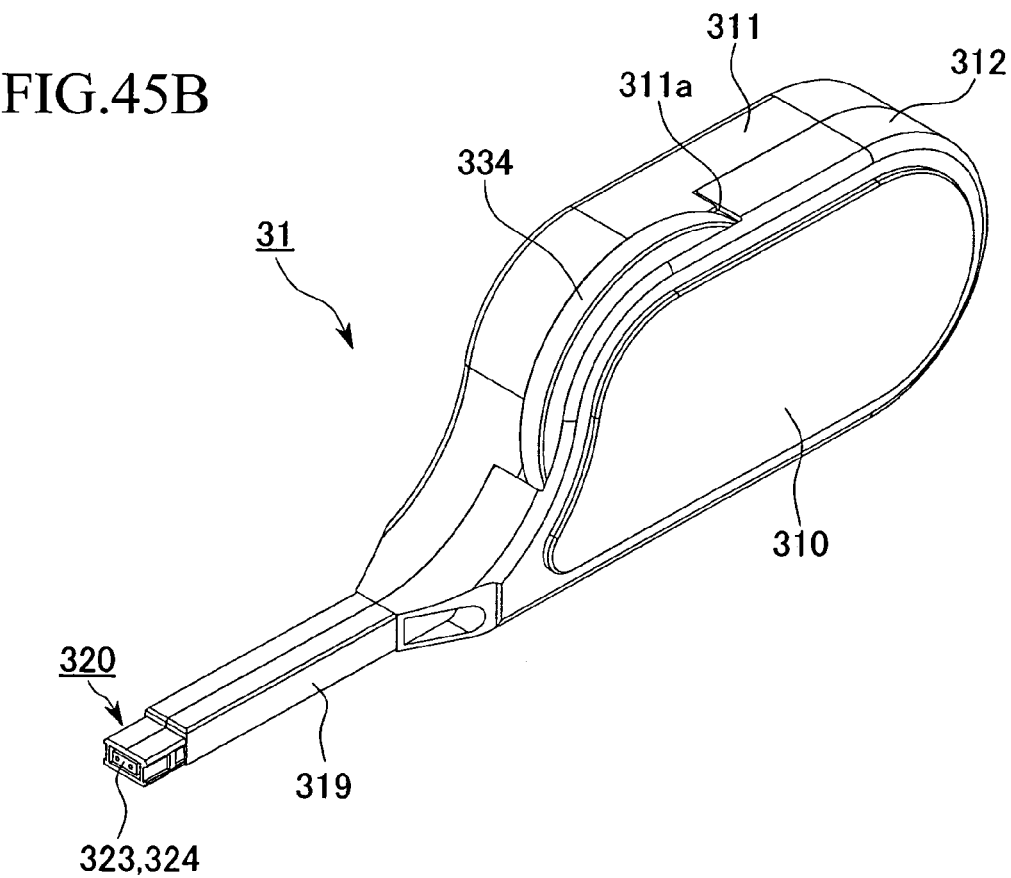

As shown in FIG. 45B, the tool body 310 here is a two-split structure of first and second case half-bodies 311, 312 made of plastic. Although not particularly illustrated, the case half-bodies 311, 312 are constituted to be able to be integrated together by mating fitting pins protrudingly formed on the inner side of the first case half-body 311 with fitting holes set in bosses provided in a protruding manner on the inner side of the second case half-body 312. Note that this is merely one example of the constitution of the tool body 310 and is not meant to particularly limit the present invention.

The cleaning member 32 is here a tape, the tape 32 is not particularly limited, and one can be adopted in which a publicly known suitable cleaning fabric (unwoven or woven fabric) is processed into a tape shape. For example, those made from an extra-fine fiber such as polyester or nylon are exemplified.

Figure 46:
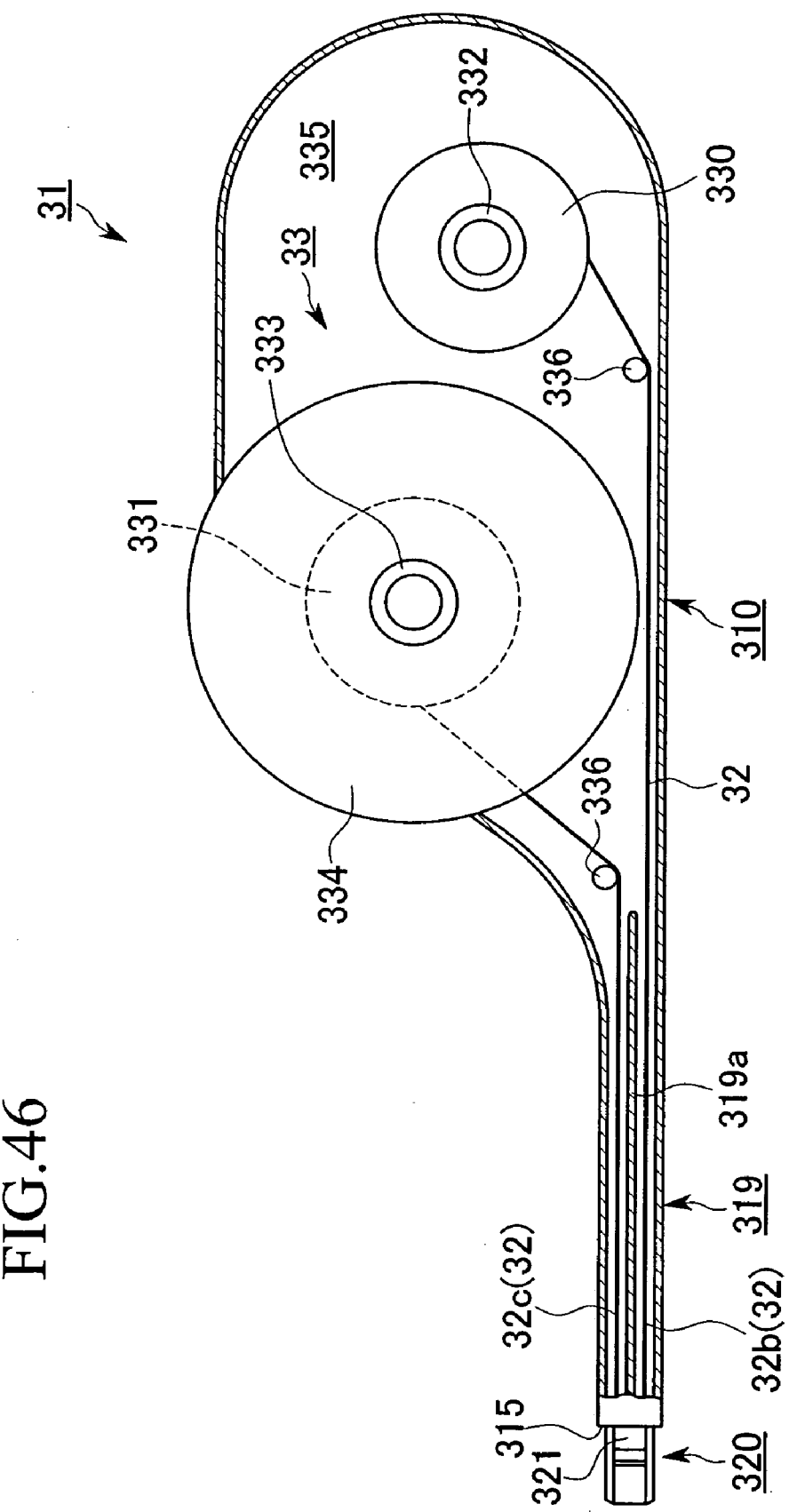
FIG. 46 is a sectional view showing the inside of the optical connector cleaning tool shown in FIGS. 45A and 45B.
Figure 47:
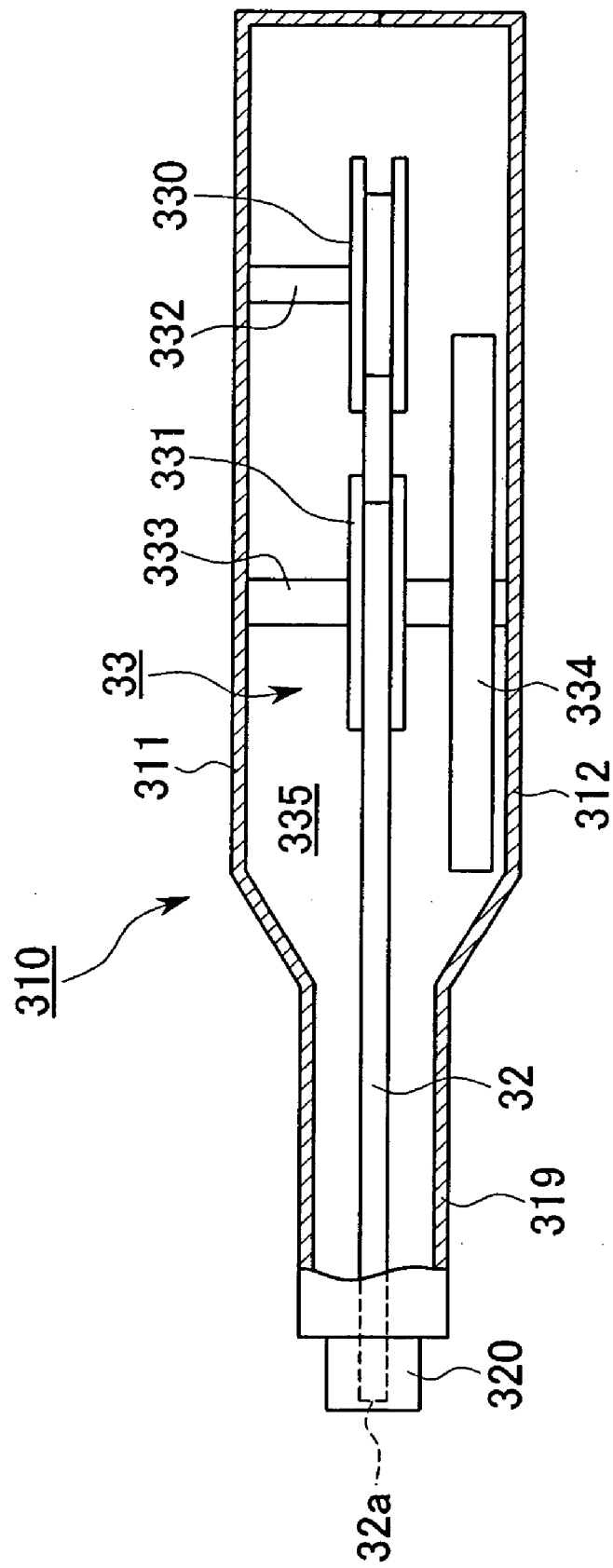
FIG. 47 is a sectional view showing the inside of the optical connector cleaning tool shown in FIGS. 45A and 45B.

As shown in FIGS. 46 and 47, a tape feeding mechanism that feeds the tape 32 is provided in a storage space 335 of the tool body 310 as a driving mechanism 33.

This tape feeding mechanism 33 is provided with a supply reel 330 wound with the tape 32, a take-up reel 331 that takes up and collects the tape 32 after use, and an operation dial 334 that operates the tape 32.

On a surface inside (the side facing the storage space 335) of the first case half-body 311, a supply reel support shaft 332 on which the supply reel 330 is rotatably mounted and a take-up reel support shaft 333 on which the take-up reel 331 is rotatably mounted are provided to protrude toward the side of the second case half-body 312.

Between the supply reel 330 and the take-up reel 331, the tape 32 is stretched in the storage space 335 along pin-shaped tape guides 336. Midway, it is wound around a head portion 323, to be described hereinafter, housed in the insertion portion 320.

The operation dial 334 is mounted on the outer circumference of the take-up reel support shaft 333 so as to be concentric with the take-up reel 331.

A portion of the operation dial 334 is exposed to outside the tool body 310 from a window 311a provided on a side surface of the first case half-body 311.

The radius of the operation dial 334 is greater than the radius of the take-up reel 331. As a result, the length of the tape 32 taken up on the take-up reel 331 is smaller than the amount of operation of the operation dial 334 (displacement amount along the outer circumference of the operation dial 334) by just as much as the radial ratio. For this reason, very small feeding amounts of the tape 32 can be easily achieved.

The tape feeding mechanism 33 can be driven by operating the operation dial 334 by finger or the like to rotate it in the prescribed direction. More specifically, by rotation of the operation dial 334, the take-up reel 331 rotates to take up the tape 32, while the unused tape 32 is unreeled from the supply reel 330 and fed. Since the window 311a opens to the side surface of the tool body 310, even if the cleaning tool 31 is held with one hand, the operation dial 334 can be easily operated by a finger of the hand holding the cleaning tool 31.

Moreover, the cleaning tool 31 is, as shown in FIGS. 45A, 45B and FIG. 46, provided with the insertion portion 320, which is set to protrude from the tool body 310 and formed to be insertable in the optical adaptor 370. By inserting the insertion portion 320 into the optical adaptor 370, an abutting portion 32a of the cleaning member 32 (tape) disposed facing an opening portion 326 in the distal end of the insertion portion 320 is positioned to be abuttable against the connection end face 361a of the optical plug 360.

That is, the tool body 310 tapers toward the insertion portion 320, with the insertion portion 320 formed at the distal end of a small diameter portion 319 (the left side in FIG. 45A).

As will hereinafter be described, the abutting portion 32a of the tape 32 is the portion positioned on an abutting face 324 of the head portion 323, with the abutting portion 32a being replaced along the longitudinal direction of the tape 32 by feeding movement of the tape 32.

As shown in FIG. 46, a projecting wall 319a for reinforcing the small diameter portion 319 is provided in the interior of the small diameter portion 319. Since the path of a cleaning tape 32b (32) that should be clean heading from the supply reel 330 to the head portion 323 and the path of a cleaning tape 32c (32) that is soiled from wiping and cleaning heading from the head portion 323 to the take-up reel 331 are partitioned by this projecting wall 319a, it exhibits the effect of suppressing migration of contaminants on the cleaning tape 32.

A step 315 with the tool body 310 side is provided on the insertion portion 320. This step 315 is for preventing the depth of entry of the insertion portion 320 into the connector housing hole 372 from becoming too deep by the step 315 abutting the periphery 371a of the connector insertion port 371 in the optical adaptor 370 when the insertion portion 320 is inserted in the connector housing hole 372 of the optical adaptor 370.

Figure 53:
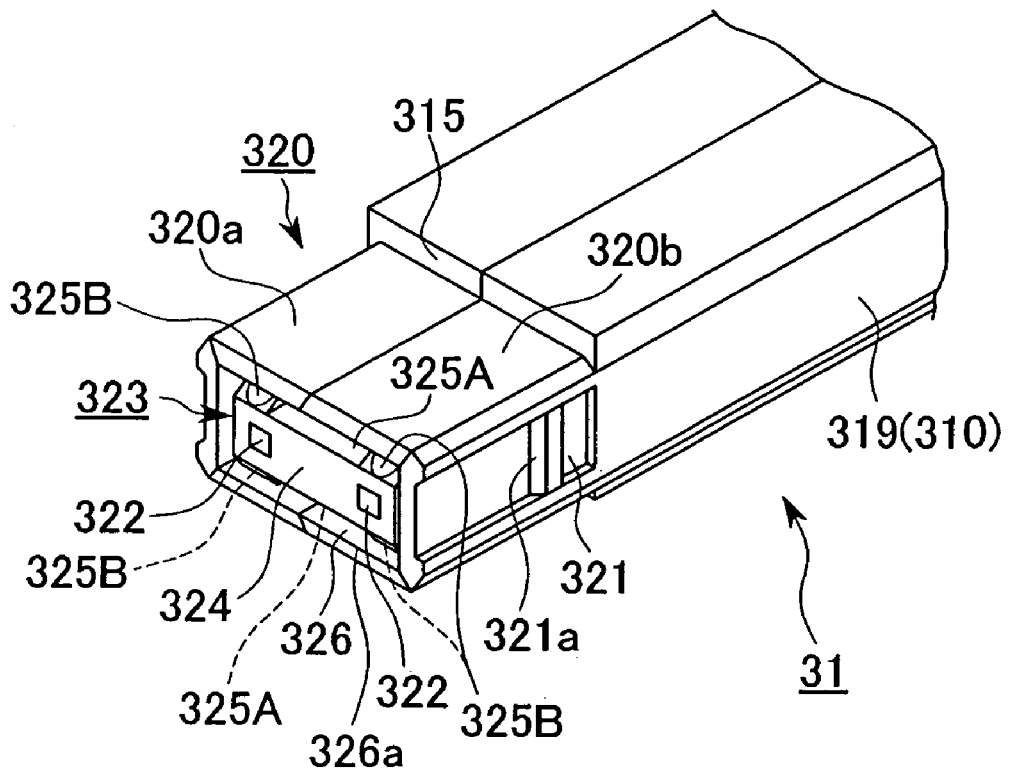
FIG. 53 is a partial enlarged perspective view of the insertion portion of the optical connector cleaning tool shown in FIGS. 45A and 45B.

Here, as shown in FIG. 53, the insertion portion 320 is a two-split structure similar to the tool body 310, being formed by integration of insertion portion half-bodies 320a, 320b integrally formed with the case half-bodies 311, 312, respectively, accompanying the integration of the case half-bodies 311, 312.

Engaging recesses 321 formed to be engageable with the engaging claws of the elastic engaging pieces (described above) on the optical adaptor 370 when the insertion portion 320 is inserted in the optical adaptor 370 are formed on both sides in the width direction of the outer surface of the insertion portion 320. Since front edge portions 321a of the engaging recesses 321 (edge portions on the side near the distal end of the insertion portion 320, on the left side in FIG. 53) are oblique faces, in the state of the engaging claws of the optical adaptor 370 engaged with the engaging recesses 321, when the insertion portion 320 is pulled out in the disengagement direction (toward the upper right in FIG. 53), the engaging claws overcome the front edge portions 321a so as to disengage from the engaging recesses 321 with comparatively little force.

A tape abutting mechanism 34 for causing the tape 32 to abut the connection end face 361a of the ferrule 361 is disposed in the insertion portion 320. The tape abutting mechanism 34 includes the head portion 323 having the abutting face 324 disposed facing the connection end face 361a in the state of the insertion portion 320 of the cleaning tool 31 being inserted in the optical adaptor 370 and a head tilting mechanism 340 that tilts the abutting face 324 of the head portion 323 so that the abutting face 324 can change the direction of the tape 32 with respect to the insertion direction.

Figure 52:
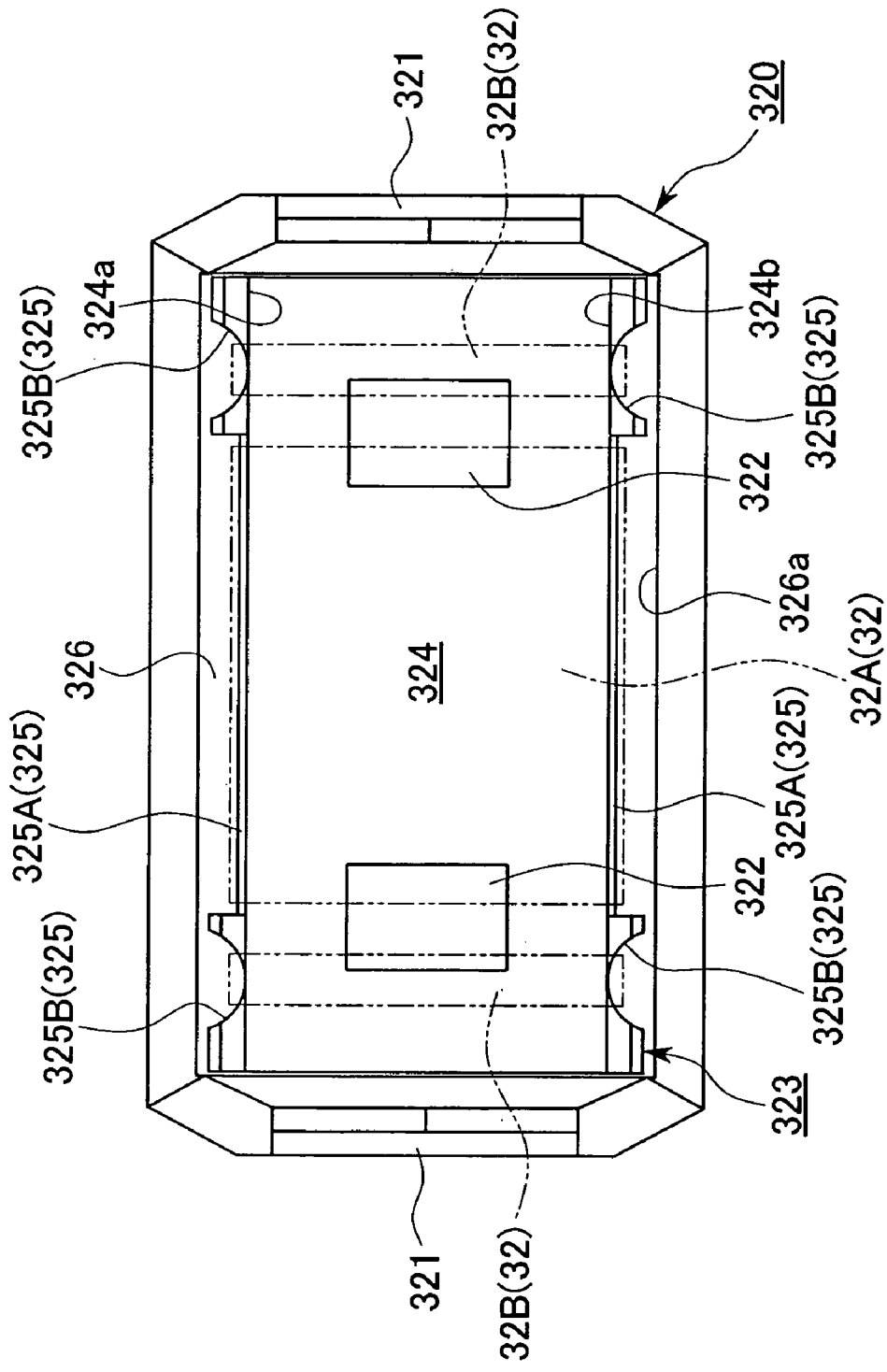
FIG. 52 is a front view showing the insertion portion of the optical connector cleaning tool shown in FIGS. 45A and 45B.

As shown in FIGS. 48 through 52, the abutting face 324 is provided on the side of the insertion direction of the head portion 323 (the left side in FIGS. 48 and 49). As shown in FIG. 52, the abutting face 324 is of an approximately rectangular shape, and during insertion of the head portion 323 into the optical adaptor 370, the protruding members (guide pins) 365 protruding from the connection end face 361a are inserted, and guide pin insertion holes 322, 322 are formed on both sides in the width direction of the insertion portion 320 as recesses for avoiding interference with the guide pins 365.

Here, the abutting face 324 is positioned inward of an end edge 326a of the opening portion 326 in the insertion portion 320 (right side in FIGS. 48 and 49). However, depending on conditions such as the shape of the optical connector to be cleaned, the abutting face 324 may be made to protrude to the side of the insertion direction (left side in FIGS. 48 and 49) more than the end edge 326a of the opening portion 326.

As shown in FIG. 52, on the upstream side (lower portion of FIG. 52) and the downstream side (upper portion) in the feeding direction of the tape, guide grooves 325 to guide the tape 32 are provided on the head portion 323 to oppose each other via the abutting face 324.

Here, the tape 32 has 32A disposed in the central portion of the insertion portion 320 in the width direction (the horizontal direction in FIG. 52) and 32B, 32B disposed on both side portions of the insertion portion 320 in the width direction. In addition, corresponding to tapes 32A, 32B, 32B, the guide grooves 325 have 325A disposed in the central portion of the insertion portion 320 in the width direction and 325B, 325B disposed on both side portions of the insertion portion 320 in the width direction. Below, the tapes 32 and the guide grooves 325 are at times explained by differentiating with different reference numbers 32A, 32B, 32B and 325A, 325B, 325B.

In the present invention, the tapes 32B and the guide grooves 325B disposed at both side portions of the insertion portion 320 in the width direction are not necessary.

Three pair of the guide grooves 325A, 325B, 325B are provided, corresponding respectively to the tapes 32A, 32B, 32B. The widths of the guide grooves 325A, 325B, 325B fit the widths of the tapes 32A, 32B, 32B. The tapes 32A, 32B, 32B are wrapped around the head portion 323 by the upper side guide grooves 325A, 325B, 325B, the abutting face 324, and the lower side guide grooves 325A, 325B, 325B, respectively.

As shown in FIG. 52, on the abutting face 324, the guide pin insertion holes 322, 322 are disposed so as to open between the tapes 32A, 32B, 32B guided by the guide grooves 325A, 325B, 325B. The guide pins 365 can thereby be inserted in the guide pin insertion holes 322, 322, passing between the tapes 32A, 32B, 32B to avoid interference with the tapes 32A, 32B, 32B.

As shown in FIGS. 48 to 51, the head tilting mechanism 340 has a pair of slide portions 341a, 341b disposed parallel to each other to extend approximately in the direction of insertion and separation (left and right in FIGS. 48 and 49) of the insertion portion 320, one end thereof being coupled by thin elastic deformation portions 342, 342 to a back face 327 of the head portion 323 opposite the abutting face 324, a coupling portion 344 coupling the other end of the slide portions 341a, 341b opposite the head portion 323 via elastic deformation portions 343, 343, and a guide portion 345 that guides so that the slide portions 341a, 341b slide and displace in the extending directions thereof.

Moreover, the coupling portion 344 has a movement restriction portion (stopper) 346 that restricts movement of the insertion portion 320 in both the insertion direction and the separation direction in the opposite direction thereto, and a bridging portion 348 that bridges the slide portions 341a, 341b in the thickness direction of the insertion portion 320 (vertical direction in FIGS. 48 and 49). The bridging portion 348 is also elastically deformable (elastic deformation portion) with respect to displacement of the slide portions 341a, 341b.

The slide portions 341a, 341b are respectively coupled to the upper side and lower side (upper and lower in FIGS. 48 and 49) of the back face 327 of the head portion 323, corresponding to top end edge 324a and bottom end edge 324b of the abutting face 324 of the head portion 323.

The head portion 323, the pair of slide portions 341a, 341b and the coupling portion 344 constitute a square frame-shaped component 347 (head composite body).

More specifically, the head portion 323, the slide portions 341a, 341b, the coupling portion 344, the elastic deformation portions 342, 342, 343, 343, and the bridging portion 348 become the head composite body 347 integrally formed from plastic or the like.

The head composite body 347 is held in the insertion portion 320 by inserting the guide 345 and the stopper 346 in a space 349 between the slide portions 341a, 341b and a stopper insertion hole 344a.

The guide 345 has an approximately rectangular sectional shape, and is provided in the width direction of the insertion portion 320 between the pair of slide portions 341a, 341b in a manner protruding from an inner wall 328 disposed in the width direction of the insertion portion 320 (the direction perpendicular to the sheet of FIGS. 48 and 49). The guide 345 guides the sliding of the slide portions 341a, 341b by means of the upper surface 345a and lower surface 345b thereof (upper side and lower side, respectively, in FIGS. 50 and 51).

The stopper 346 has an approximately round sectional shape, and is provided in a manner protruding from the inner wall 328 disposed in the width direction of the insertion portion 320. A stopper insertion hole 344a is formed in the coupling portion 344 between the portions coupled with the elastic deformation portions 343, 343. The stopper 346 is inserted into the stopper insertion hole 344a.

Displacement of the coupling portion 344 in the insertion direction and separation direction of the insertion portion 320 is restricted by the stopper 346, so that it essentially hardly displaces in either direction.

The head tilting mechanism 340 is disposed between the tape 32 (32b) on the supply reel 330 side of the head portion 323 and the tape 32 (32c) on the take-up reel 331 side of the head portion 323. The head portion 323 can thereby be stably tilted without inhibiting the feeding movement of the tape 32.

Recesses 350 are formed at locations on the coupling portion 344 near the tape 32 (the top and bottom surfaces of the coupling portion 344, top and bottom in FIGS. 48 and 49) in order to avoid interference with the tape 32. The recesses 350 are provided at three places (350A, 350B, 350B) corresponding to the guide grooves 325A, 325B, 325B to the rear (in the separation direction of the insertion portion 320. Toward the upper right in FIGS. 50 and 51) of the guide grooves.

The head composite body 347 is deformable by the elasticity of the elastic deformation portions 342, 342, 343, 343 and the bridging portion 348 and is constituted so as to allow tilting of the head portion 323 with respect to a pushing force on the abutting face 324 of the head portion 323. More specifically, by an uneven pressing force acting on the top end edge 324a and the bottom end edge 324b of the abutting face 324 with respect to the head portion 323, the slide portions 341a, 341b displace in the insertion direction and separation direction of the insertion portion 320, so that the abutting face 324 is allowed to tilt.

The shapes of the portions supporting the head portion 323 in the head composite body 347 can be formed into appropriate shapes such as struts, walls and plates.

The direction of the abutting face 324 of the head composite body 347 does not change by such an extent that would exert an adverse effect on cleaning by friction acting between the tape 32 and the head portion 323 when the tape 32 is fed in the feeding direction. The threshold value of the pressing force allowing tilting of the abutting face 324 is adjustable by the ease of elastic deformation of the elastic deformation portions 342, 342, 343, 343 and the presence or absence of the bridging portion 348. That is, the bridging portion 348 is not essential.

Although not particularly illustrated, a cap or cover and the like for protecting the head portion 323 and the tape 32 facing the opening portion 326 may of course be attached to the distal end of the insertion portion 320 to be able to protect the tape 32 and the like when the cleaning tool 31 is not in use.

An example of the method of using the cleaning tool 31 is explained.

By inserting the insertion portion 320 of the cleaning tool 31 from the connector insertion port 371 of the optical adaptor 370, the insertion portion 320 enters the connector housing hole 372 as its outer surface is aligned by the inner walls 370a of the optical adaptor 370. By pushing the insertion portion 320 until the step 315 runs into the periphery 371a of the connector insertion port 371, the cleaning member 32 is positioned to be abutted on an appropriate position (here, the optical fiber holes 361b and periphery thereof) of the connection end face 361a of the optical plug 360.

Even when the guide pins 365 protrude on the connection end face 361a of the optical plug 360, the guide pins 365 are housed in the guide pin insertion holes 322 provided on the head portion 323, enabling the insertion portion 320 to be housed in the connector housing hole 372 without interference with the guide pins 365.

By rotating the operation dial 334 by a prescribed amount, the tape 32 moves in conjunction with the rotation of the take-up reel 331, and since the connection end face 361a is wiped and cleaned by the tape 32, contaminants such as debris, dust and oil adhering to the connection end face 361a are reliably extracted by the tape 32.

Since extracted contaminants adhere to the tape 32 and move in the direction to be taken up on take-up reel 331, the used tape 32 is not exposed any more from the opening portion 326 of the insertion portion 320, and there is no risk of the contaminants once again adhering to the connection end face 361a.

Accordingly, the connection end face 361a can be thoroughly cleaned.

After cleaning, the insertion portion 320 can be easily removed by pulling in the direction opposite to when inserting the cleaning tool 31 (disengagement direction).

According to the cleaning tool 31 of the sixth embodiment, since the tape 32 wrapped around the head portion 323 is guided by the guide grooves 325A, 325B, 325B, shifting in the width direction is suppressed. For this reason, the connection end face 361a can abut the tape 32 with a uniform abutting force, and can smoothly advance the tape 32. Accordingly, cleaning can be reliably performed so that contaminants do not remain on the connection end face 361a.

Also, as shown in FIGS. 48 and 49, by disposing the tape 32 (32A, 32B, 32B) in the guide grooves 325A, 325B, 325B, even when the head portion 323 has changed direction by tilting, the tape 32 makes no contact with inner walls 329a, 329b (upper and lower inner walls in FIGS. 48 and 49) of the insertion portion 320 in the tilting direction of the head portion 323.

Since the head portion 323 is able to tilt with respect to the pushing force when the abutting face 324 abuts the connection end face 361a of the optical plug 360, even in the event of the ferrule 361 with a perpendicularly polished connection end face 361a as shown in FIG. 48 being abutted, and even in the event of the ferrule 361 with an obliquely polished connection end face 361a as shown in FIG. 49 being abutted, the direction of the abutting face 324 is aligned with the direction of the connection end face 361a, and the tape 32 on the abutting face 324 can be more uniformly and securely made to abut the connection end face 361a.

In FIG. 49, in the event of a portion of the front surface of the ferrule 361 not being aligned in a plane with the connection end face 361a (here, perpendicularly polished portion 361d), although the tape 32 does not abut the perpendicularly polished portion 361d, since this is not the connection end face 361a of the ferrule 361, this does not present any particular problem.

Moreover, since the abutting face 324 of the head tilting mechanism 340 does not substantially displace vertically in the tilting direction thereof (vertical direction in FIGS. 48 and 49), poor contact of the tape 32 with the connection end face 361a due to shifting of the center positions of the connection end face 361a of the optical plug 360 and the abutting face 324 of the head portion 323, and unevenness in the abutting force of the connection end face 361a abutting the tape 32 is suppressed, thereby enabling more secure removal of contaminants on the connection end face 361a.

Since the insertion portion 320 is positioned by the connector housing hole 372 of the optical adaptor 370 during cleaning as well, wiping and cleaning of the connection end face 361a can be performed by the tape 32 with a uniform pushing pressure without displacement. In addition, the insertion portion 320 can be supported in the optical adaptor 370 with an extremely light force, and so has excellent operability.

The present invention based on the preferred sixth embodiment was explained hereinabove, but the present invention is not limited to only the sixth embodiment and can be modified within a range that does not depart from the spirit of the present invention.

Figure 56:
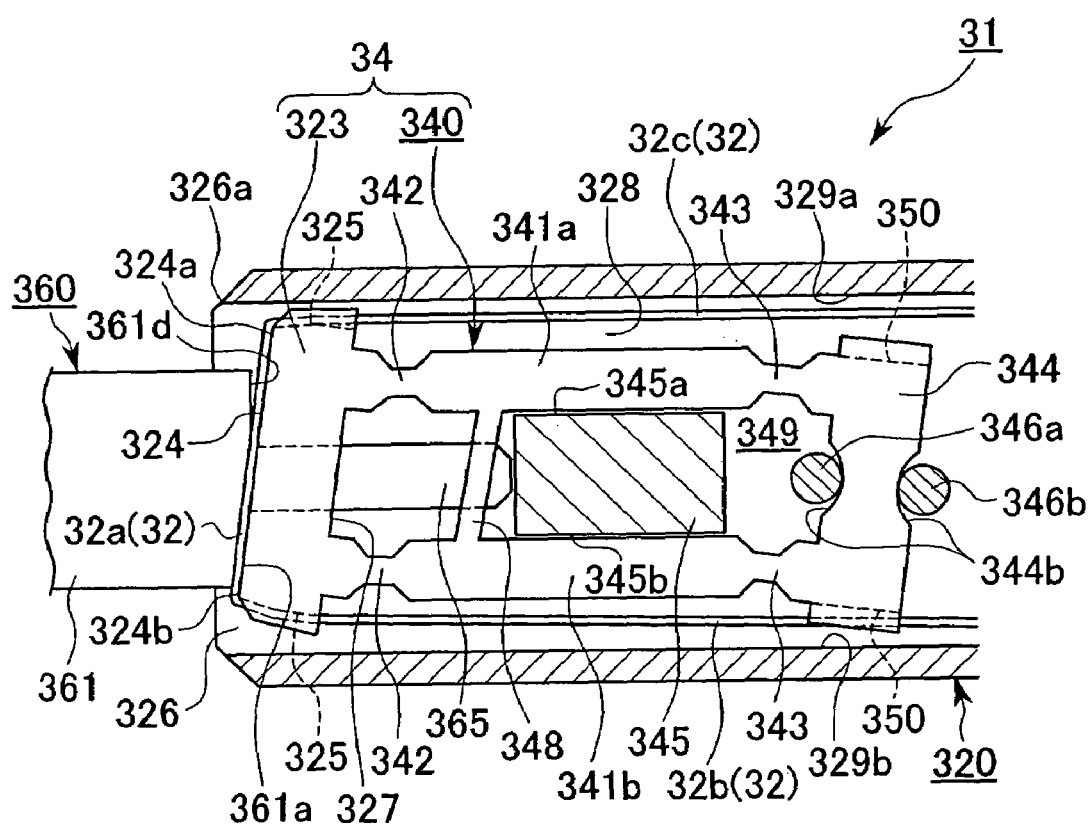
FIG. 56 is a sectional view showing the interior of the insertion portion of an optical connector cleaning tool according to a modification of the present invention.

For example, it is not necessary for a stopper to be inserted in a stopper insertion hole formed in the coupling portion. As shown by the modification example of the head tilting mechanism 340 in FIG. 56, displacement in the insertion direction and separation direction of the insertion portion 320 can be limited even by disposing stoppers 346a, 346b provided in a protruding manner from the inner wall 328 disposed in the width direction of the insertion portion 320 so as to sandwich the front and rear of the coupling portion 344 (places in the coupling portion 344 positioned in the insertion direction and separation direction of the insertion portion 320. Left and right in FIG. 56). Here, receiving portions 344b, 344b are provided in the coupling portion 344 for smooth contact with the stoppers 346a, 346b, however, they are not necessary in the sixth embodiment.

In the present invention, the construction of the head is not particularly limited, and, for example, a head with a conventional construction such as that illustrated in FIG. 57 can also be employed.

A constitution of the head tilting mechanism is also possible that retains the head portion by means of an elastic body such as a spring connected to the rear face of the head portion and biasing it so that the opposed both end edges of the abutting face of the head portion can displace by differing amounts of displacement with respect to the insertion direction and separation direction of the insertion portion. Even by such a constitution, tilting of the head portion can be allowed by elastic deformation of the elastic body.

The head tilting mechanism can also have a constitution other than frame-shaped depending on the selection of materials. In addition, a constitution is also possible to allow tilting of the head portion by elastic deformation of the head portion itself.

In the insertion portion, unit insertion portions which, by insertion into different connector housings, are to be positioned within the connector housing are formed at a plurality of locations in the protruding direction of the insertion portion, and the unit insertion portions of the insertion portion may be formed so as to be insertable in all connector housings capable of housing the unit insertion portions positioned relatively to the rear in the protruding direction of the insertion portion. With this kind of cleaning tool, the insertion portion can be inserted so as to be positioned with respect to different connector housings by the respective unit insertion portions, so that, using a single cleaning tool, cleaning of a connection end face of an optical connector in the connector housing can be carried out in compliance with a plurality of types and sizes of connector housing.

In addition, the insertion portion can be constituted as one in which a plurality of kinds of insertion portions are exchangeable with respect to the tool body. This enables cleaning of the connection end face of an optical connector in a connector housing in compliance with the type and size of the connector housing just by changing the insertion portion without changing the tool body.

The driving mechanism for feeding the tape is not limited to one that is manually driven, and may be made to be driven by power from a motor or spring and the like. Also, manual driving and driving by motive power can be made to be used in combination or be switchable as required.

In the cleaning tool of the aforementioned sixth embodiment, the insertion portion is made to completely cover the cleaning member, except for the opening formed at the distal end of the insertion portion, but is not necessarily limited thereto. If the cleaning member is prevented from being contaminated by contact with the inner walls of the connector housing and the like when inserting the insertion portion in the connector housing, the shape or structure is not particularly limited, and does not necessarily need to be sleeve shaped.

The seventh embodiment of the present invention is explained below referring to the drawings.

FIGS. 58A to 79D are views showing the seventh embodiment of the optical connector cleaning tool of the present invention (hereafter simply referred to as the "cleaning tool").

Figure 76:
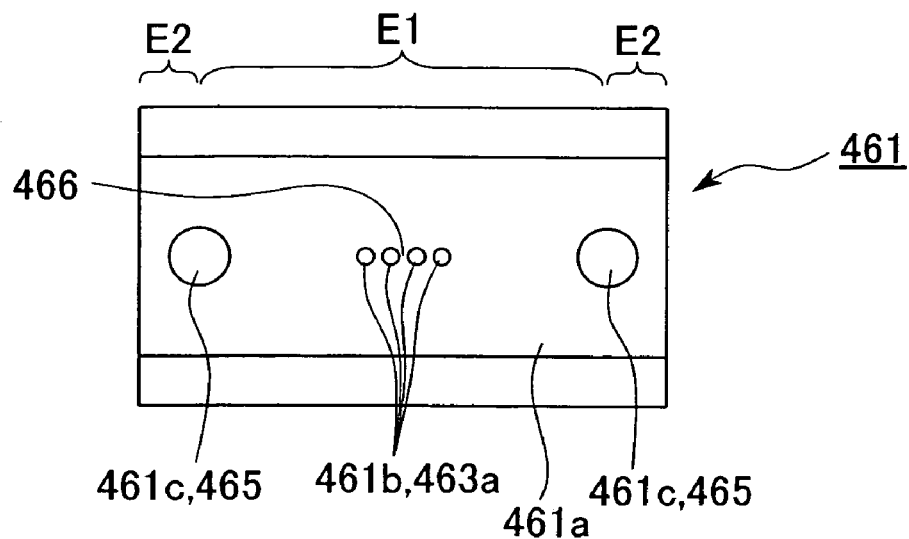
FIG. 76 is a front view showing an example of a ferrule of an optical connector plug.
Figure 78:
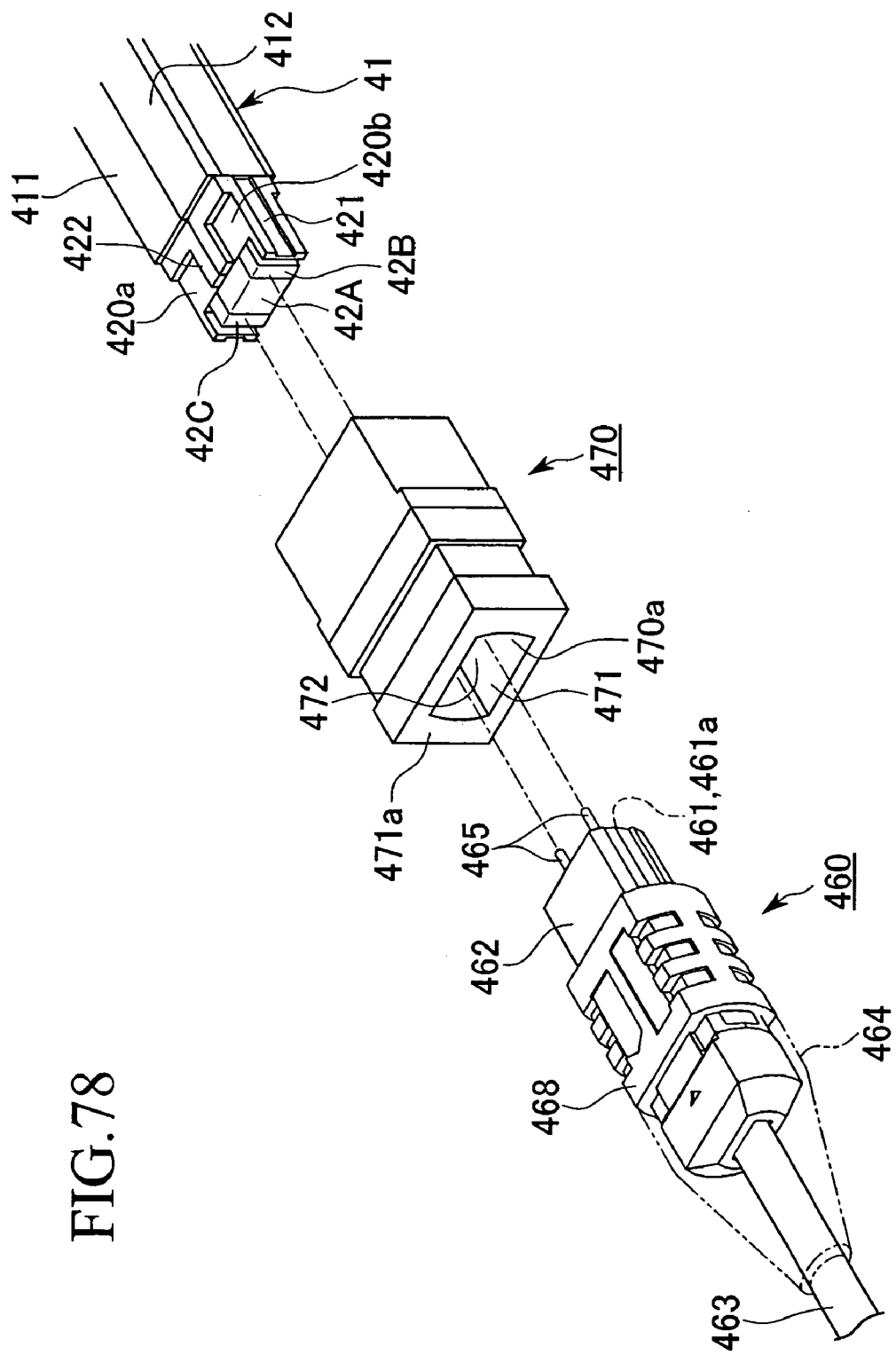
FIG. 78 is an exploded perspective view showing the state of the insertion portion of the present cleaning tool and the optical connector plug inserted in the optical connector adaptor.

As shown in FIGS. 76 and 78, an optical connector plug 460 (sometimes referred to hereafter simply as an optical plug) and an optical connector adaptor 470 (connector housing. Sometimes referred to hereafter simply as an optical adaptor) to which a cleaning tool 41 of the seventh embodiment is applied are Multifiber Push-On (MPO) type optical connectors defined according to JIS C 5982.

The optical plug 460 is an optical connector plug of a constitution housing a Mechanically Transferable (MT) type optical connector ferrule 461 (hereafter simply referred to as a ferrule) defined according to JIS C 5981 at a distal end portion of a plastic sleeve-shaped housing 462, with the whole plug being formed in a low profile sectional shape in appearance.

In the explanation below, the direction corresponding to the low-profile, short side (vertical direction in FIG. 76) of the ferrule 461 of the optical plug 460 is referred to as the thickness direction, and the direction corresponding to the long side is referred to as the width direction (horizontal direction in FIG. 76). In addition, thickness direction and width direction are also similarly used for the optical adaptor 470 connected with the optical plug 460 and an insertion portion 420 (described below) of the cleaning tool 41 inserted in the optical adaptor 470 to correspond to the thickness direction and the width direction of the ferrule 461.

As shown in FIG. 76, optical fiber holes 461b (micro holes) of a prescribed number (here four) are opened so as to be arrayed near a center location 466 of a connection end face 461a of the ferrule 461. Here, an optical fiber 463 is a four-fiber optical fiber tape ribbon, with optical fibers 463a having their resin coating removed at the distal end portion thereof (bare optical fibers) inserted into the optical fiber holes 461b in the ferrule 461. By doing so they are terminated to be butt-connectable with another optical connector and penetrate the inside of the optical plug 460 to be drawn out from the back end of the optical plug 460. By storing the optical fiber 463 drawn out from the back end of the optical plug 460 in a boot 464 provided at the back end of the housing 462 in the connection direction (lower left side in FIG. 78), sudden bending and the like near the back end of the optical plug 460 is prevented.

There are no particular limitations to the optical fiber 463 as long as it is suited to termination by the optical plug. The optical fiber may be one having a single core, one having multi-core, an optical fiber cord having such a single core housed in a tube, an optical fiber cord having such multi-core housed in a tube, or the like.

Guide-pin holes 461c are provided in the connection end face 461a of the ferrule 461 on both sides of the outside of the optical fiber holes 461b in the width direction. Ferrules 461 are aligned with each other to a high degree of accuracy by a positioning mechanism of a widely-known guide-pin fitting system whereby protruding members 465 (guide pins) are provided so as to be inserted into the guide-pin holes 461c and protrude from the connection end face 461a, with the end faces of the optical fibers 463a being connected by butt-coupling. The optical fibers 463 terminated in the ferrules 461 are thus optically connected.

Figure 74:
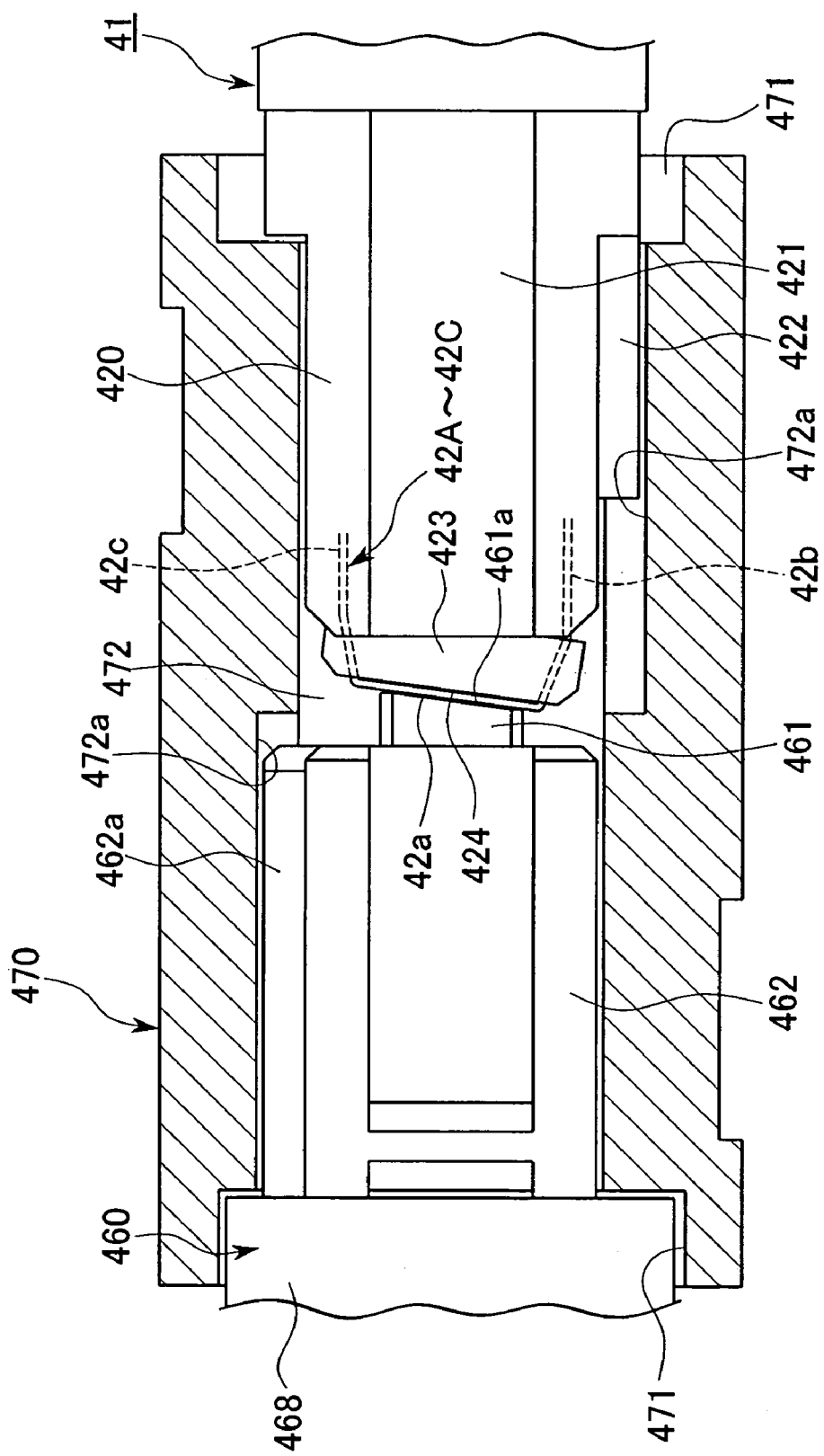
FIG. 74 is a schematic view showing the state of an obliquely polished connection end face of an optical connector plug abutting the distal end face of the head member.

As shown in FIGS. 78 and 74, the optical adaptor 470 is formed in a sleeve shape in which both sides of a connector housing hole 472 are opened as connector insertion ports 471. By inserting the optical plug 460 from the connector insertion port 471, it can be housed in the connector housing hole 472.

The optical adaptor 470 as in the present invention is an all-inclusive term for relay equipment that positions, connects and fixes optical plugs 460 on both sides thereof. Accordingly, the optical plugs 460 on both sides connected to the optical adaptor 470 are not limited to those shaped the same as each other. Even if optical plugs with different shapes are connectable, it is termed an optical adaptor.

When the optical plug 460 is inserted from the connector insertion port 471 in the optical adaptor 470, it is housed in the connector housing hole 472 while displacement in a direction deviating from the insertion direction is restricted. When two optical plugs 460 are inserted in the optical adaptor 470, the ferrules 461 are butted against each other within the adaptor 470, with the optical fibers 463 terminated by the ferrules 461 being thereby optically connected.

In this type of optical connector 460, when the ferrule 461 is engaged in the optical adaptor 470, it is biased by a spring (not shown) built into the housing 462, so that a pushing pressure acts on the ferrules 461.

In the optical adaptor 470, similarly to the widely known MPO type connector there is provided a key groove 472a on an inner wall 470a of the optical adaptor 470 to engage with a key 462a formed on the housing 462 of the optical plug 460. The key 462a and the key groove 472a are formed only on one of the surfaces on both sides in the thickness direction of the housing 462 of the optical plug 460 and the connector insertion port 471 of the optical adaptor 470, respectively. When the orientation of the key 462a and the key groove 472a do not match, the optical plug 460 cannot be inserted into the connector insertion port 471 of the optical adaptor 470. Thereby, in the case of the connection end face 461a of the optical plug 460 being obliquely polished (polished into an oblique plane), errors of inserting the optical plug 460 in the optical adaptor 470 with its orientation in the thickness direction reversed (reverse insertion) are thereby prevented.

Moreover, on the optical adaptor 470, although not particularly illustrated, there are provided elastic engaging pieces formed extending toward the connector insertion port 471 along inner walls 470a of the optical adaptor 470 and having engaging claws on the distal end thereof. In addition, engaging recesses capable of engagement with the engaging claws of the elastic engaging pieces of the optical adaptor 470 are provided on the surfaces of both sides in the width direction of the housing 462 of the optical plug 460.

On the periphery of the housing 462 of the optical plug 460, a coupling 468 is mounted for pressing the elastic engaging pieces from the outside to prevent release of engagement with the engaging recesses when the engaging claws and the engaging recesses are engaged.

When the optical plug 460 is inserted into the optical adaptor 470 from the connector insertion port 471, it is housed in the connector housing hole 472 while displacement in a direction deviating from the insertion direction is restricted by the engagement of the engaging recesses and the engaging claws.

In the state of both optical plugs 460 being inserted in the optical adaptor 470, the distal ends of the optical fibers 463a fixedly held in the ferrules 461 within the optical adaptor 470 are butted against each other, with the optical fibers 463 terminated by the ferrules 461 being thereby optically connected.

The cleaning tool 41 capable of being applied to cleaning of the connection end face 461a of the optical plug 460 is as shown in FIGS. 58A through 62 and FIG. 74 provided with a tool body 410 having cleaning tapes 42A to 42C housed therein and an insertion portion 420 set to protrude from the tool body 410 and formed to be insertable in the connector housing hole 472 of the optical adaptor 470.

The tool body 410 tapers toward the insertion portion 420, with the insertion portion 420 formed at the protruding distal end of a narrow portion 419 of the tool body 410 distal end portion (the end at the left side in FIG. 58A).

As shown in FIG. 58A, the tool body 410 here is a two-split structure of first and second case half-bodies 411, 412 made of plastic such as polystyrene (PS) or polyoxymethylene (POM, polyacetal).

As shown in FIGS. 59A, 59B, 60A and 60B, the first and second case half-bodies 411, 412 are constituted to be able to be integrated together by the engagement of fitting pins 413a to 413e and fitting holes 414a to 414e formed to be disposed oppositely on the inner sides of the first case half-body 411 and the second case half-body 412. Note that this is merely one example of the constitution of the tool body 410 and is not meant to particularly limit the present invention.

As shown in FIG. 74, by inserting the insertion portion 420 into the optical adaptor 470, an abutting portion 42a of the cleaning tapes 42A to 42C disposed facing an opening portion 426 in the distal end of the insertion portion 420 is positioned to be abuttable against the connection end face 461a of the optical plug 460.

The abutting portion 42a of the cleaning tapes 42A to 42C is the portion positioned on a distal end face 424 of a head member 423 (to be described in detail hereinafter), with the abutting portion 42a being replaced along the longitudinal direction of the cleaning tape by feeding movement of the cleaning tape.

Figure 62:
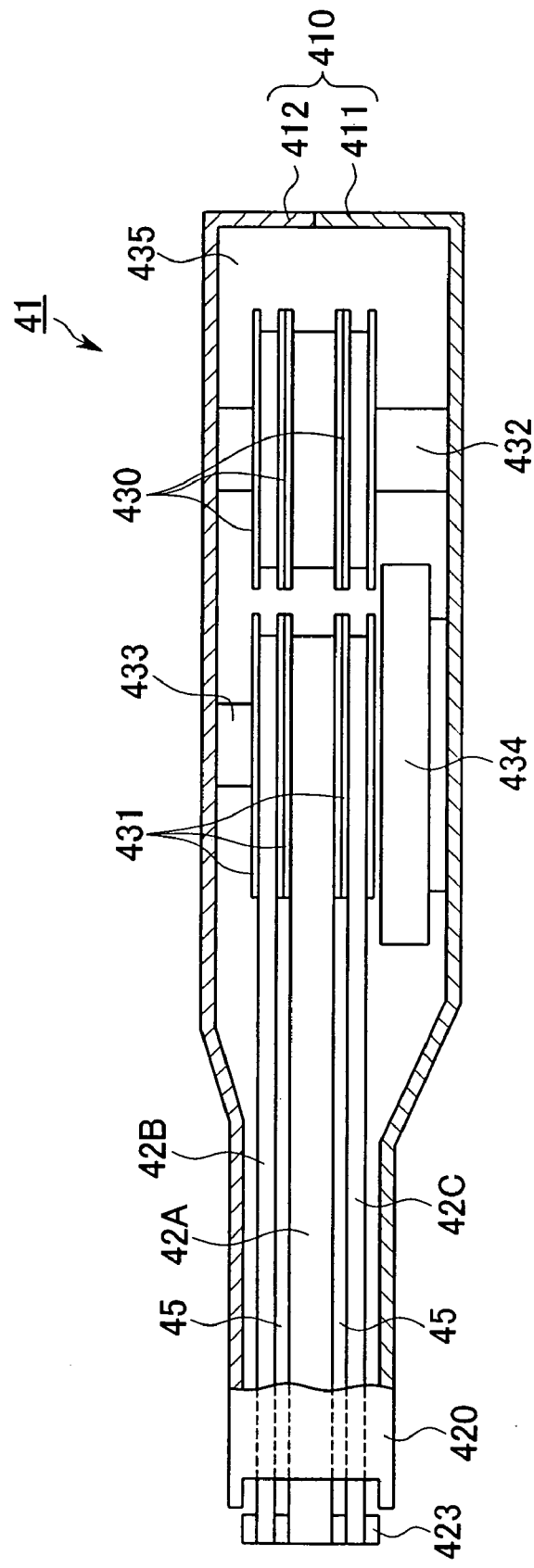
FIG. 62 is a sectional view showing the inside of the cleaning tool of FIGS. 58A and 58B.
Figure 77:
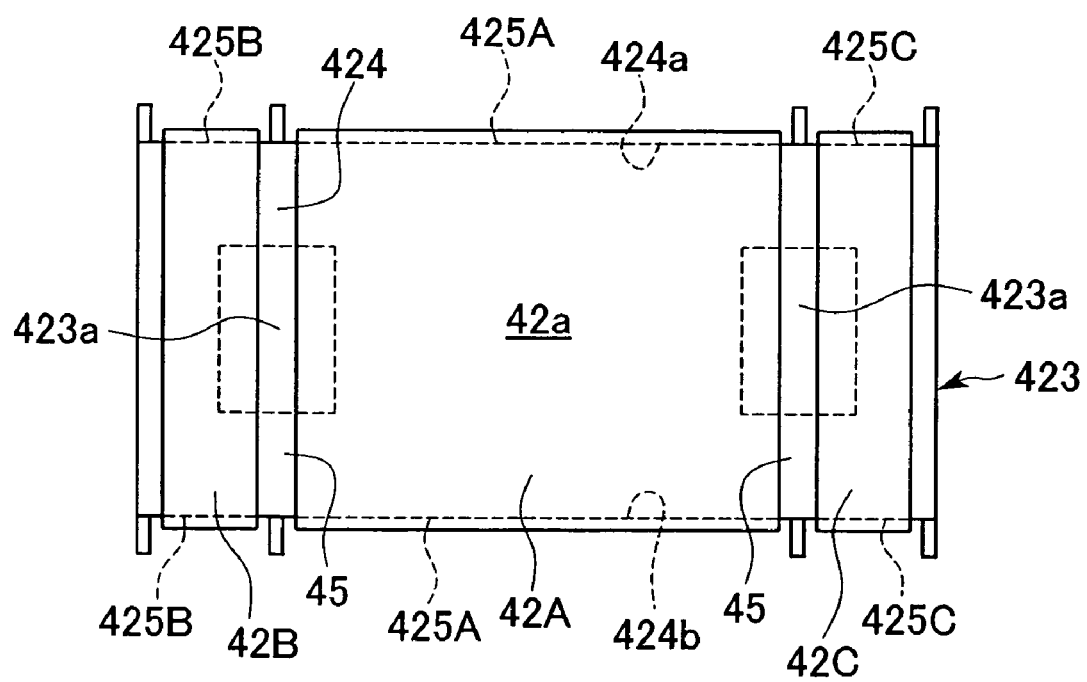
FIG. 77 is a front view showing the distal end face of the head member with the cleaning tape attached.

As shown in FIGS. 62 and 77, a total of three cleaning tapes (mutually separated tapes) are employed, with one 42A cleaning a central region E1 that is a portion positioned between the guide pin holes 461c and those 42B, 42C cleaning outside regions E2, E2 positioned outside the central region E1 via the guide pin holes 461c within the connection end face 461a of the optical connector shown in FIG. 74. Here, the widths of the cleaning tapes 42A, 42B, 42C are made to match the widths of the regions to be cleaned E1, E2. Here, the width of the cleaning tape 42A that cleans the central region E1 is wider than the widths of the tapes 42B, 42C that clean the outside regions E2.

The cleaning tapes 42A to 42C (hereafter simply referred to at times as the tapes) are not particularly limited, and ones can be adopted in which a publicly known suitable cleaning fabric (unwoven or woven fabric) is processed into a tape shape. For example, those made from an extra-fine fiber such as polyester or nylon are exemplified. In addition, the structure is also ordinary one with a roughly fixed width.

Here, an embodiment having three tapes 42A, 42B, 42C is illustrated, but in the present invention the number of cleaning tapes is not particularly limited and may be one or more.

The cleaning tapes 42A, 42B, 42C are mutually separated tapes, and as shown in FIG. 77, there are gaps 45 between the cleaning tape 42A of the central portion and the cleaning tapes 42B, 42C of both sides. Thereby, even in the case of the optical connector 460 in which guide pins 465 to be inserted into the guide pin holes 461c protrude from the connection end face 461a, the guide pins 465 escape into the gaps 45 of the cleaning tapes 42A to 42C, and the central region E1 and the outside regions E2, E2 of the connection end face 461a can be efficiently cleaned simultaneously. That is, the gaps 45 function as protruding member escape portions.

Figure 61:
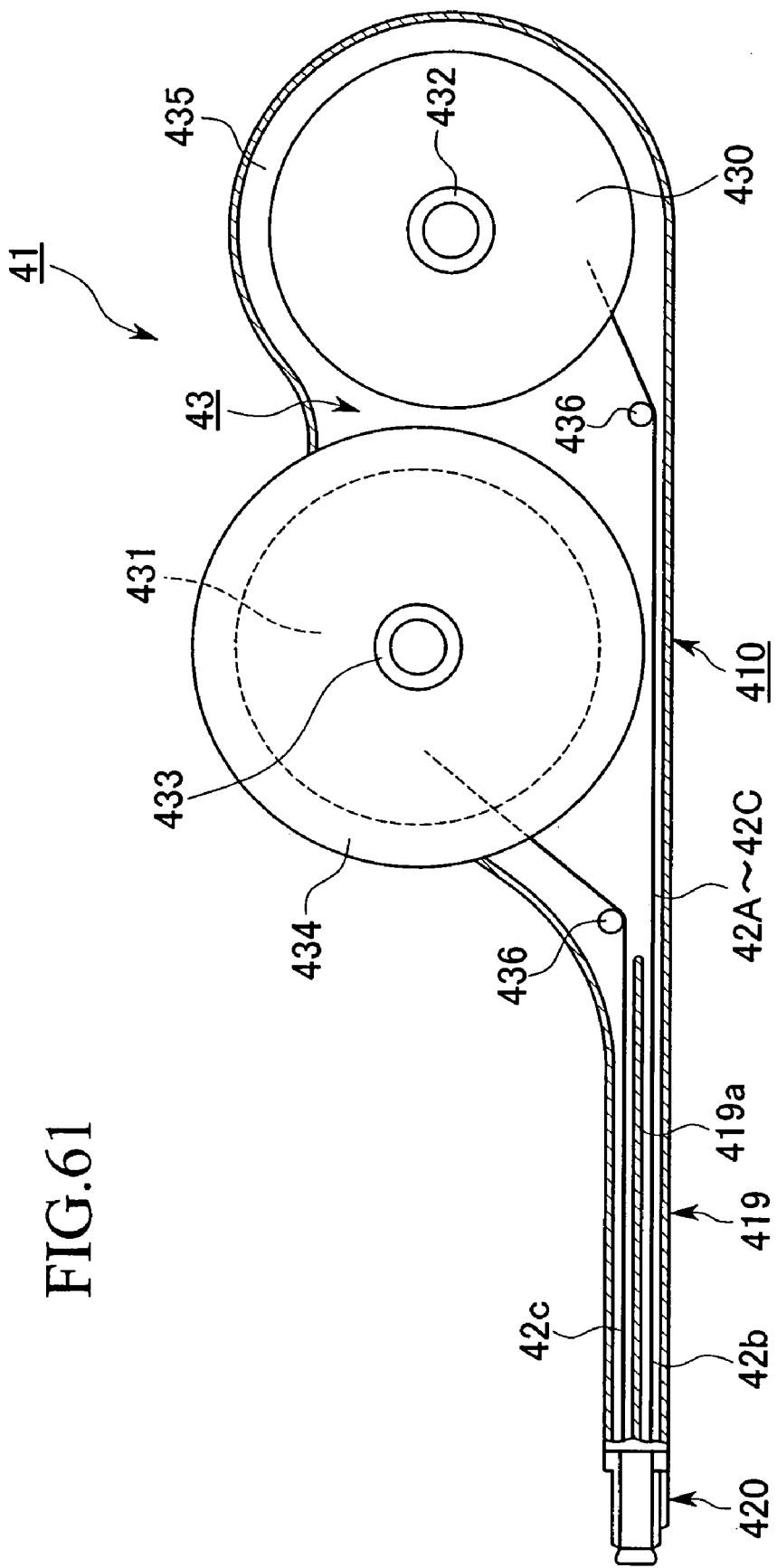
FIG. 61 is a sectional view showing the inside of the cleaning tool of FIGS. 58A and 58B.

As shown in FIGS. 59A, 59B and 61, a projecting wall 419a for reinforcing the narrow portion 419 is provided in the interior of the narrow portion 419 of the tool distal end portion. Since the path of the upstream side portion 42b of the cleaning tapes 42A to 42C that should be clean (hereafter referred to at times as the "upstream portion") heading from a supply reel 430 to the head member 423 and the path of the downstream side portion 42c of the cleaning tapes 42A to 42C that are soiled from wiping and cleaning (hereafter referred to at times as the "downstream portion") heading from the head member 423 toward a take-up reel 431 are partitioned by this projecting wall 419a, it exhibits the effect of suppressing migration of contaminants on the cleaning tapes 42A to 42C.

As shown in FIGS. 59A, 59B, 60A, 60B and 78, the insertion portion 420 is a two-split structure similar to the tool body 410, being formed by integration of insertion portion half-bodies 420a, 420b integrally formed with the case half-bodies 411, 412, respectively, accompanying the integration of the case half-bodies 411, 412.

Engaging recesses 421 for avoiding interference with the engaging claws of the elastic engaging pieces (described above) on the optical adaptor 470 when the insertion portion 420 is inserted in the optical adaptor 470 are formed on both sides in the width direction of the outer surface of the insertion portion 420. The engaging recesses 421 are not particularly necessary.

In addition, a key 422 to engage with a key groove 472a on the optical adaptor 470 is provided in a protruding manner on the insertion portion 420, whereby reverse insertion with respect to the optical adaptor 470 is blocked.

As shown in FIGS. 67A through 67D, 68, 70A, 70B, 71 and 77 and the like, a head composite body 44 having the head member 423 for causing the cleaning tape 42a to abut the connection end face 461a of the ferrule 461 is mounted at the distal end portion of the cleaning tool including the insertion portion 420.

The head composite body 44 is constituted to include the head member 423 having the distal end face 424 facing the connection end face 461a of the optical plug 460 to be cleaned during cleaning and a support mechanism 440 coupled to a back face 427 of the head member 423 that is the side reverse to the distal end face 424 from the head member 423 and supports the head member 423.

The head composite body 44 is one in which the head member 423 and the support mechanism 440 are integrally formed, and can be manufactured from plastic such as polyoxymethylene (POM) using a suitable molding method.

The head composite body 44 is disposed between the upstream portion 42b of the cleaning tapes 42A to 42C that is the supply reel 430 side of the head member 423 and the downstream portion 42c of the cleaning tapes 42A to 42C that is the take-up reel 431 side of the head member 423. For this reason, the head composite body 44 does not inhibit feeding movement of the cleaning tapes 42A to 42C.

Figure 70A:
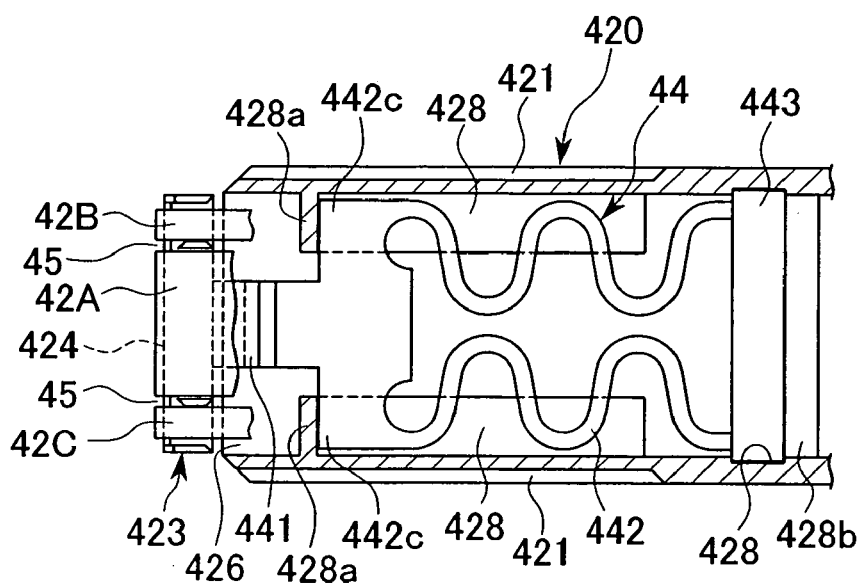
FIG. 70A is a plan sectional view of the tool distal end portion of the present cleaning tool.
Figure 70B:
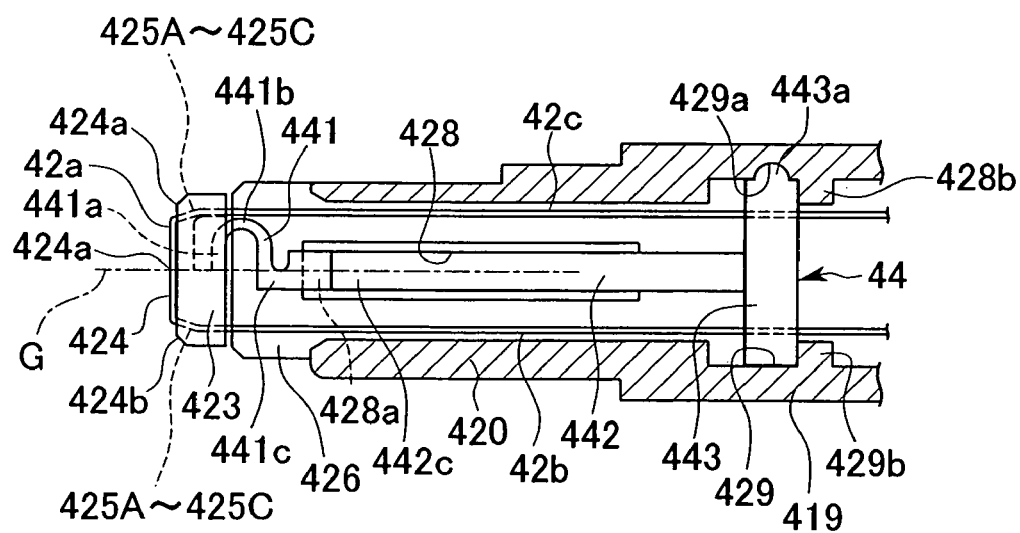
FIG. 70B is a front sectional view thereof.

As shown in FIGS. 70A, 70B and 77, the head member 423 has an approximately rectangular-shaped distal end face 424 and is able to effectively secure an abutting area with respect to the connection end face 461a of the optical plug 460. The distal end face 424 is provided at the insertion distal end (left side in FIGS. 70A, 70B) of the head member 423, and is exposed to the opening portion 426 of the insertion portion 420 distal end.

On the head member 423, a pair of guide pin insertion holes 423a are formed on both sides in the width direction of the insertion portion 420 as protruding member escape portions that can pass the protruding members (guide pins) 465 protruding from the connection end face 461a. The guide pin insertion holes 423a penetrate from the distal end face 424 of the head member 423 to the back face 427. Thereby, when the insertion portion 420 is inserted into the optical adaptor 470, interference between the head member 423 and the guide pins 465 can be avoided.

On the upstream side (here, the lower side in FIGS. 70B and 77) and the downstream side (here, the upper side in FIGS. 70B and 77) in the feeding direction of the cleaning tapes, guide grooves 425A, 425B, 425C to guide the feeding of the cleaning tapes 42A to 42C are provided on the head member 423 to oppose each other via the distal end face 424. These guide groves 425A, 425B, 425C function as a tape positioning mechanism.

Three pair of the guide grooves 425A, 425B, 425C are provided, corresponding respectively to the cleaning tapes 42A, 42B, 42C. The widths of the guide grooves 425A, 425B, 425C fit the widths of the cleaning tapes 42A, 42B, 42C. The cleaning tapes 42A, 42B, 42C are wrapped around the head member 423 by the guide grooves 425A, 425B, 425C on the upstream side and downstream side of the distal end face 424.

In this way, by disposing the cleaning tapes 42A to 42C in the guide grooves 425A, 425B, 425C, even when the head member 423 tilts, shifting of the positions of the cleaning tapes 42A to 42C and their coming off from the head member 423 is suppressed.

As shown in FIG. 77, on the distal end face 424 of the head member 423, the guide pin insertion holes 423a are disposed so as to open in the gaps 45 of the cleaning tapes 42A, 42B, 42C guided by the guide grooves 425A, 425B, 425C. The guide pins 465, 465 can thereby pass between the cleaning tapes 42A, 42B, 42C and be inserted in the guide pin insertion holes 423a, avoiding interference with the cleaning tapes 42A, 42B, 42C.

The support mechanism 440 has a tilting spring 441 protruding from the recess 427a formed in the back face 427 of the head member 423, a compression spring 442 coupled to the tilting spring 441, and a plate-shaped base portion 443 connected to the side of the compression spring 442 opposite the tilting spring 441.

The base portion 443 is fixed to mounting recesses 429 formed in the case of the cleaning tool (specifically, on the inner surface of the narrow portion 419 of the tool body 410).

The compression spring 442 functions as a coupling portion that expansively connects the tilting spring 441 and the base portion 443.

The shape and the like of the tilting spring 441 is not particularly limited, and as shown in FIGS. 70A, 70B, it is formed in a waveform having a plurality of rotational central axes 441a, 441b, 441c by means of bending curvature portions. These rotational central axes 441a, 441b, 441c all extend in the width direction of the insertion portion 420 (the direction perpendicular to the sheet of FIG. 70B).

At least one of the rotational central axes (here, 441b) is disposed in a position displaced in the thickness direction of the insertion portion 420 (vertical direction in FIG. 70B). It is in a twisted position (a positional relation of two straight lines in a space that neither intersect nor are parallel) with respect to a straight line G extending in the insertion direction (rightward in FIG. 70B) of the optical connector 460 from the center location 424c on the distal end face 424 of the head member 423.

The bending curvature portion 441b is rounded, so that even if the cleaning tape (downstream portion) 42c touches, there is no risk of it being damaged. In addition, even if the cleaning tape 42c touches the bending curvature portion 441b, it is the back face opposite the surface of the side that cleans the ferrule 461, and so there is no problem of migration of contaminants.

As shown in FIG. 70A, the compression spring 442 is a pair of waveform springs symmetrically disposed in the width direction (vertical direction in FIG. 70A) of the insertion portion 420. Corner portions 442c on the distal end thereof are housed in a pair of slide grooves 428 provided in the inner walls of both sides in the width direction of the insertion portion 420. The slide grooves 428 extend in the insertion and separation direction of the insertion portion 420 (horizontal direction in FIGS. 70A and 70B) and have end portion walls 428a that close the end portion of the distal end (left side in FIGS. 70A, 70B) of the insertion portion 420.

When a pushing pressure does not act on the distal end face 424 of the head member 423, the compression spring 442, by its own springing force, biases the corner portions 442c of the compression spring 442, causing them to abut the end portion walls 428a of the slide grooves 428. The corner portions 442c of the compression spring 442 are slidable in both directions along the slide grooves 428 by extension and compression of the compression spring 442.

The base portion 443 is formed as a plate-shaped member so as to approximately plug the inner cross-section of the insertion portion 420. The base portion 443 is housed in the pair of mounting recesses 429 provided in a concave manner in opposition on both sides in the thickness direction of the narrow portion 419 of the tool distal end. The base portion 443 has an approximately semi-cylindrical fitting portion 443a that fits a fitting groove 429a formed in one of the mounting recesses 429.

When fitting together the case half-bodies 411, 412, by respectively housing the compression spring 442 in the slide grooves 428 and the base portion 443 in the mounting recesses 429, the compression spring 442 is compressed, and by the biasing force of the compression spring 442, the head composite body 44 is mounted between end portion walls 428a of the slide grooves 428 and a projecting wall 429b that protrudes on the rear-end of the mounting recess 429. The head composite body 44 is attached so that the fitting portion 443a fits into the fitting groove 429a.

As shown in FIG. 67D and the like, long holes 444A, 444B, 444C through which the cleaning tapes are inserted are provided on the base portion 443. Here, three pairs of the long holes 444A, 444B, 444C are provided, corresponding to the three cleaning tapes 42A, 42B, 42C. The upstream side tape 42b and the downstream side tape 42c of the head member 423 are inserted into each pair of the long holes 444A, 444B, 444C.

By inserting the cleaning tapes 42A, 42B, 42C into the long holes 444A, 444B, 444C, when assembling the cleaning tool 41, the cleaning tapes 42A to 42C do not come off the head composite body 44, leading to good attachment workability even when the cleaning tapes 42A, 42B, 42C are a plurality (here, three).

The long holes 444A, 444B, 444C are stepped in accordance with the thickness direction (vertical direction in FIG. 67D) of the insertion portion 420 instead of being arranged in a row in the width direction of the insertion portion 420. This is in order to be able to ensure that the dimensions of the long holes 444A, 444B, 444C in the width direction are sufficiently larger than the widths of the cleaning tapes 42A, 42B, 42C to be inserted without merging into each other.

Figure 71:
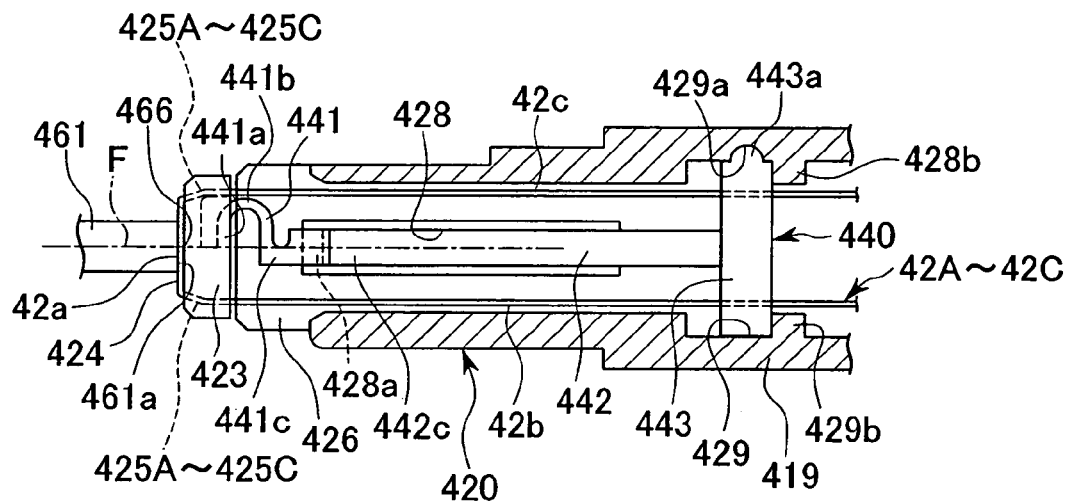
FIG. 71 is a sectional view showing an example of a possible state of the tape abutting mechanism of the preset cleaning tool.
Figure 72:
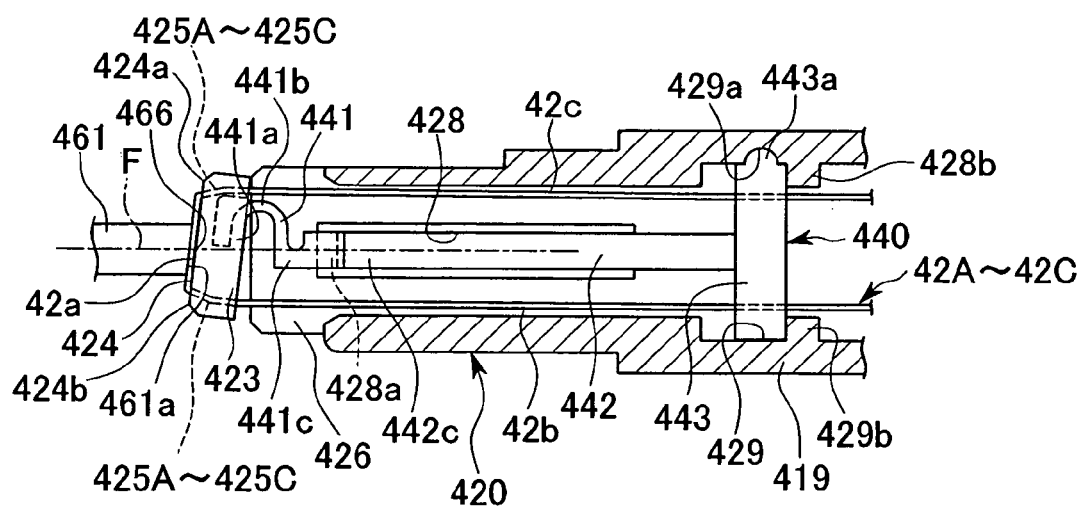
FIG. 72 is a sectional view showing another example of a possible state of the tape abutting mechanism of the preset cleaning tool.

As shown in FIGS. 71 and 72, the aforementioned head composite body 44 is constituted so that when a pushing pressure against the head member 423 is transmitted to the compression spring 442, the head member 423 is able to retreat in the separation direction (rightward in FIGS. 71 and 72) of the insertion portion 420.

FIG. 71 shows the case of the connection end face 461a of the optical plug 460 being perpendicularly polished with respect to the optical axis (longitudinal direction in FIG. 71). In addition, FIG. 72 shows the case of the connection end face 461a of the optical plug 460 being obliquely polished with respect to the optical axis.

In the case of the optical plug 460 having an obliquely polished connection end face 461a, as shown in FIG. 72, upon the application of a pushing pressure on the head member 423 that is uneven with the side of a top end edge 424a and the side of a bottom end edge 424b of the distal end face 424, the tilting spring 441 elastically deforms so that the distal end face 424 can tilt upward or downward (vertically in FIG. 72) in the thickness direction of the insertion portion. FIG. 72 shows the state of the head member 423 tilted upward.

Figure 73:
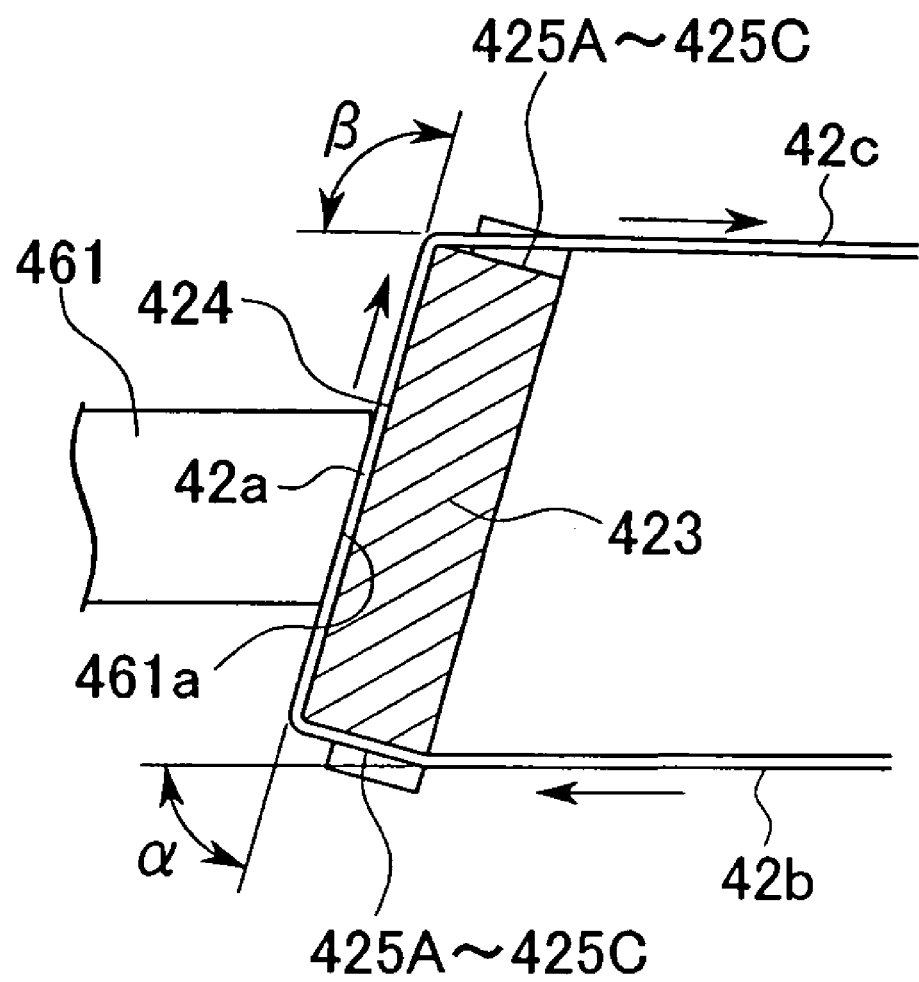
FIG. 73 is a sectional view showing another example of a possible state of the tape abutting mechanism of the preset cleaning tool.

As shown in FIGS. 72 and 73, in the case of the connection end face 461a of the optical plug 460 being one that is obliquely polished, when the distal end face 424 of the head member 423 faces and abuts the connection end face 461a of the optical plug 460, the angle (hereafter referred to on occasion as angle α) formed by the feeding direction of the upstream side cleaning tape 42b supplied to the head member 423 and the feeding direction of the cleaning tape 42a moving along the distal end face 424 of the head member 423 is an acute angle. Also, the angle (hereinafter referred to on occasion as angle β) formed by the feeding direction of the cleaning tape 42a moving along the distal end face 424 of the head member 423 and the feeding direction of the downstream side cleaning tape 42c sent away from the head member 423 is an obtuse angle. In other words, the aforementioned angle α is smaller than the aforementioned angle β(α<β).

In the cleaning tool 41 of the seventh embodiment, the relationship of the aforementioned angles α, β becoming α>β is prevented by engagement of a key and key groove to prevent reverse insertion, such as engagement of the key 462a of the optical plug 460 and the key groove 472a of the optical adaptor 470, and engagement of the key 422 of the insertion portion 420 of the cleaning tool 41 and the key groove 472a of the optical adaptor 470.

In this way, by the angle α becoming smaller than the angle β(α<β), the cleaning tape contacts the guide grooves 425A to 425C of the head member 423 at the upstream side 42b of the distal end face 424, and is in a state raised from the guide grooves 425A to 425C of the head member 423 at the downstream side 42c. Because of this, when the cleaning tapes 42a to 42c are fed in the feeding direction (the direction shown by the straight arrows in FIG. 73), the head member 423 is rotated in the feeding direction of the cleaning tapes 42a to 42c by the friction between the upstream portion 42b of the cleaning tapes and the head member 423, which acts to press the cleaning tape 42a onto the connection end face 461a. In addition, at the downstream side of the distal end face 424, the friction between the cleaning tape 42c and the head member 423 is relatively less, and so the rotating action in the direction of pulling the head member 423 and the cleaning tape 42a away from the connection end face 461a is small. Accordingly, the cleaning tape 42a abuts the connection end face 461a well, and the cleaning efficiency of the connection end face 461a improves.

Moreover, as shown in FIGS. 71 and 72, when the connection end face 461a of the optical plug 460 is abutted on the distal end face 424 of the head member 423, the rotational axis line of the bending curvature portion 441b is in a twisted position (a positional relation of two straight lines in a space that neither intersect nor are parallel) with respect to a straight line F extending in the insertion direction (rightward in FIGS. 71 and 72) of the optical connector 460 from the center location 466 of the connection end face 461a of the optical plug 460.

Accordingly, when the head member 423 tilts, the center location 466 of the connection end face 461a of the optical plug 460 can be in a positional relation aligned with the center location 424c on the distal end face 424 of the head member 423, with no uneven contact, so that the pushing pressure onto the connection end face 461a acts sufficiently uniformly. Accordingly, the connection end face 461a can be uniformly cleaned by the cleaning tape.

In addition, the distance between the straight line F and the rotational axis line of the bending curvature portion 441b (rotational radius) is secured, the torque produced centered on the rotational central axis by the pushing pressure applied to the distal end face 424 of the head member 423 from the connection end face 461a is secured, thereby facilitating smooth rotation of the head member 423, and the distal end face 424 of the head member 423 easily follows the direction of the connection end face 461a.

As shown in FIGS. 69A to 69D and 75, a guide cap 450 has a guide body 451 formed in an approximately sleeve shape (tube shape) from plastic and the like and a lid 455 connected to one end of the guide body 451 by a hinge 456. A fitting hole 455a that fits a projection 451a provided on the guide body 451 is formed in the lid 455, so that by flexing the hinge 456 to fit the fitting hole 455a of the lid 455 with the projection 451a on the guide body 451, the lid 455 can be maintained in a closed state.

The end of the guide body 451 on the lid 455 side has a plug insertion port 452 (first port) in which the optical plug 460 is inserted, and the other end opposite the plug insertion port 452 has an insertion portion insertion port 453 (second port) in which the insertion portion 420 of the cleaning tool 41 is inserted. The plug insertion port 452 and the insertion portion insertion port 453 are interconnected through an internal space 454 of the guide cap 450.

By insertion of the optical plug 460 from the plug insertion port 452 and insertion of the insertion portion 420 of the cleaning tool 41 from the insertion portion insertion port 453, the guide cap 450 can house the distal end portion of the optical plug 460 including the connection end face 461a and the insertion portion 420 of the cleaning tool 41 in the internal space 454 of the guide cap 450 in a state of facing each other.

A key groove 457a to fit a key 462a provided in a protruding manner on the outer surface of the housing 462 of the optical plug 460 is provided on an inner wall on the plug insertion port 452 side of the guide body 451. Also, a key groove 457b to fit a key 422 provided in a protruding manner on the outer surface of the insertion portion 420 of the cleaning tool 41 is provided on the inner wall of the insertion portion insertion port 453 side of the guide body 451.

For this reason, in the guide cap 450, when the orientation of the keys 462a, 422 and the key grooves 457a, 457b do not align, the optical plug 460 and the insertion portion 420 of the cleaning tool 41 cannot be inserted into the guide body 451. In the case of the connection end face 461a of the optical plug 460 being obliquely polished, errors of inserting the optical plug 460 in the guide cap 450 with its orientation in the thickness direction reversed (reverse insertion) are thereby prevented.

The guide cap 450 is detachably mounted on the insertion portion 420. More specifically, when cleaning of the optical plug 460 is not being carried out, the guide cap 450 can be in a state of the insertion portion 420 of the cleaning tool 41 inserted in the insertion portion insertion port 453. In addition, as shown by the chain double-dashed line in FIG. 69A, closing the lid 455 that covers up the plug insertion port 452 of the guide cap 450 can inhibit ingress of debris, dust and water and the like into the internal space 454 of the guide cap 450, thereby enabling the internal space 454 to be constantly maintained in a clean state.

As shown in FIGS. 61 and 62, a tape feeding mechanism (hereinafter referred to on occasion as "tape feeding mechanism 43") that feeds the cleaning tapes 42A to 42C is provided in a storage space 435 of the tool body 410 as a driving mechanism.

This tape feeding mechanism 43 is provided with the supply reel 430 wound with the cleaning tapes 42A to 42C, the take-up reel 431 that takes up and collects the cleaning tapes 42A to 42C after use, and an operation dial 434 that operates the feeding of the cleaning tapes 42A to 42C.

The supply reels 430, the take-up reels 431 and the operation dial 434 can be manufactured by forming from plastic such as polystyrene (PS) or polyoxymethylene (POM, polyacetal) with a mold.

On the inside (the side facing the storage space 435) of the first case half-body 411, a supply reel support shaft 432 on which the supply reel 430 is rotatably mounted and a take-up reel support shaft 433 on which the take-up reel 431 and the operation dial 434 are rotatably mounted are provided to protrude toward the second case half-body 412.

Here, the supply reel support shaft 432 and the take-up reel support shaft 433 are integrally formed with one case half-body 411. By fitting the distal ends of the support shafts 432, 433 into fitting holes 432a, 433a provided in the other case half-body 412, both case half-bodies 411, 412 are bridged in the storage space 435 to be able to hold the supply reel 430 and the take-up reel 431 without dropping them.

Between the supply reels 430 and the take-up reels 431, the cleaning tapes 42A to 42C are stretched in the storage space 435 along pin-shaped tape guides 436. Midway, they are wrapped around the head member 423 housed in the insertion portion 420. As shown in FIGS. 59A and 59B, here the tape guides 436 are provided as the outer circumferential surface of the fitting pins 413a provided in a protruding manner from the first case half-body 411.

Ratchet grooves 432c, 433c extending in the axial direction of the reel support shafts 432, 433 are provided around the outer circumference of the supply reel support shaft 432 and the take-up reel support shaft 433. These ratchet grooves 432c, 433c can engage with a projection of a ratchet arm of the supply reel 430 and the take-up reel 431 described hereafter.

As shown in FIG. 62, the same number (here, three) of the supply reels 430 and the take-up reels 431 are provided as the number of tapes 42A, 42B, 42C. The reels 430, 431 are supported side by side by the supply reel support shaft 432 and the take-up reel support shaft 433, respectively.

Figure 65A:
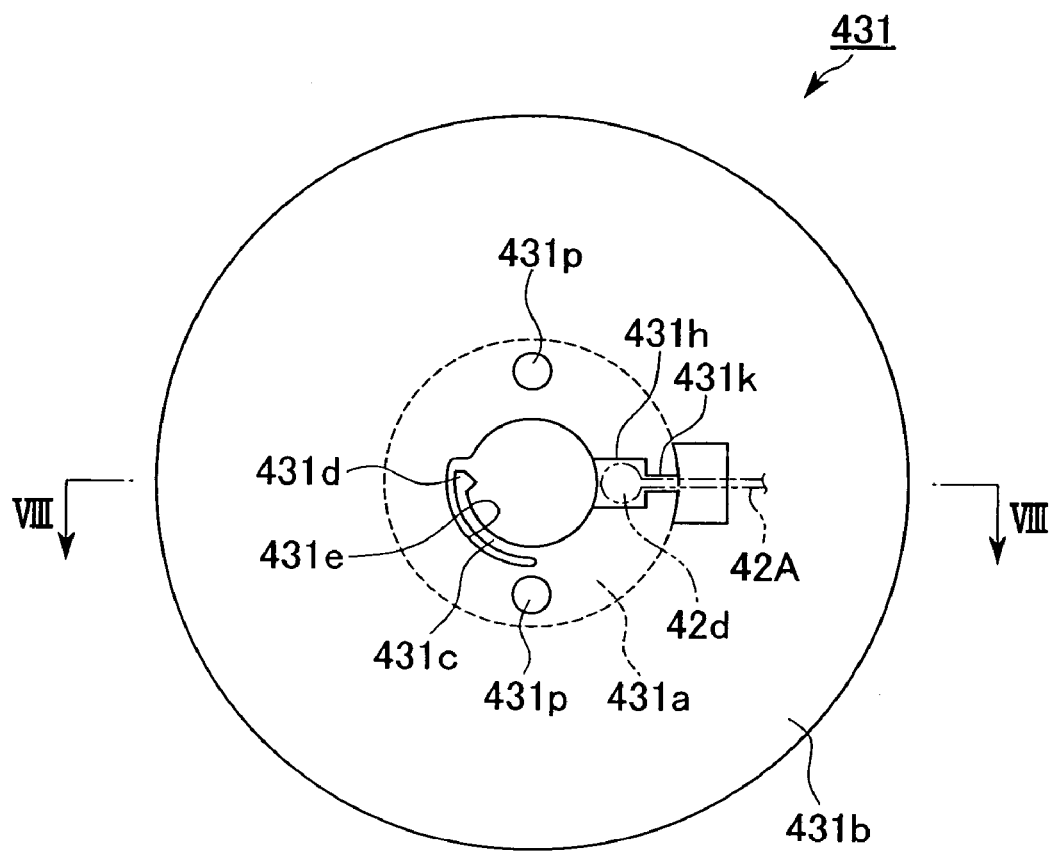
FIG. 65A is a front view showing an example of the supply reel and take-up reel of the present cleaning tool.
Figure 65B:
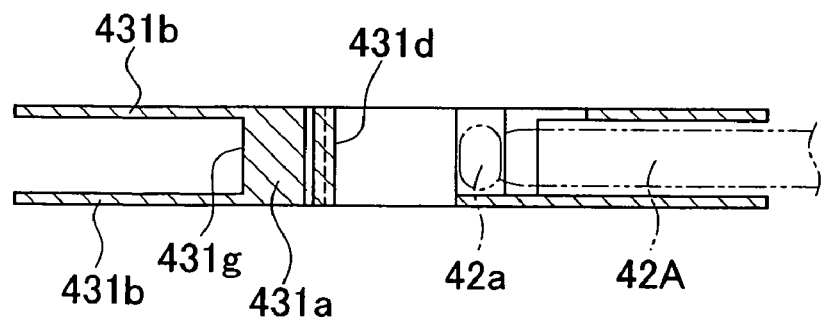
FIG. 65B is a sectional view along line VIII—VIII.
Figure 66:
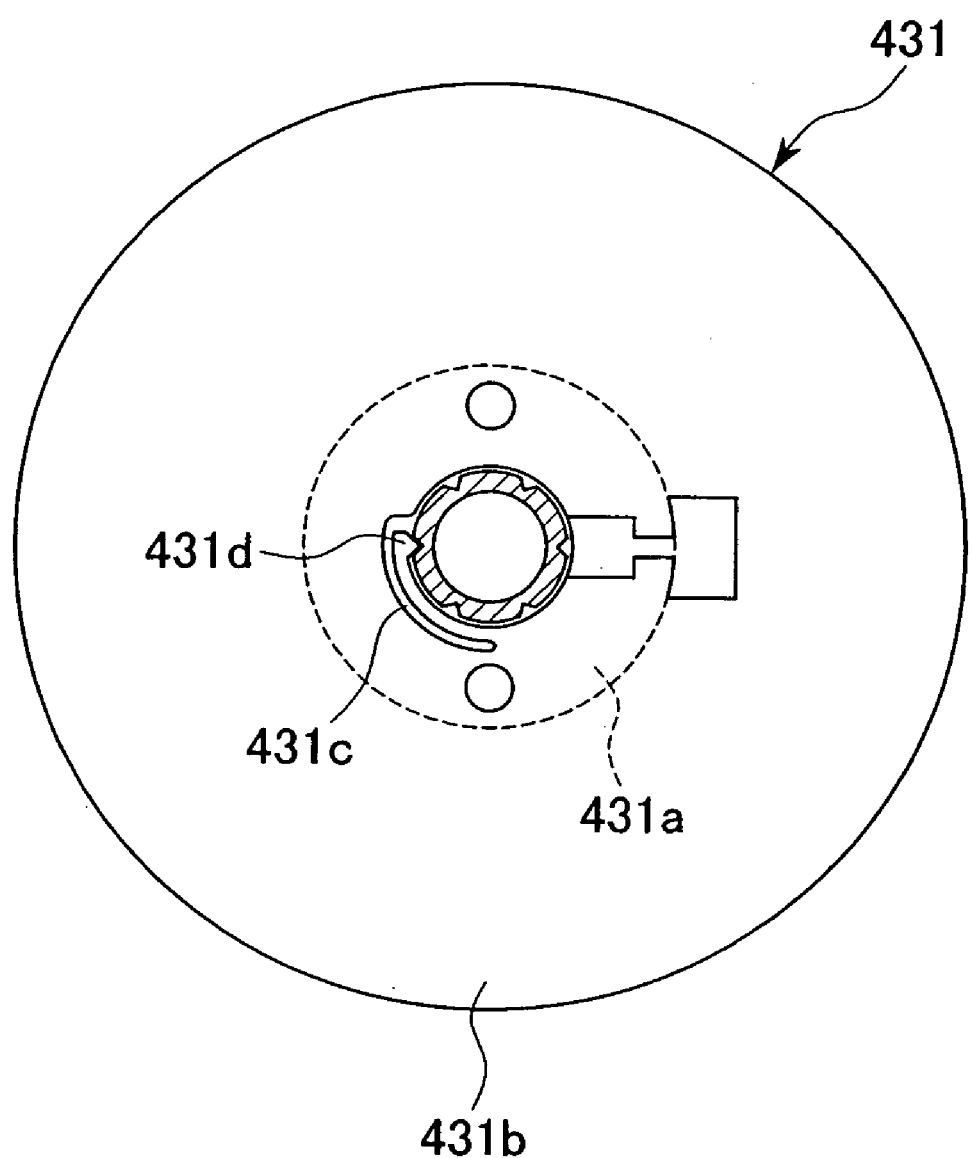
FIG. 66 is a partial sectional view showing the state of the supply reel and take-up reel shown in FIGS. 65A and 65B mounted on the support shaft.
Figure 68:
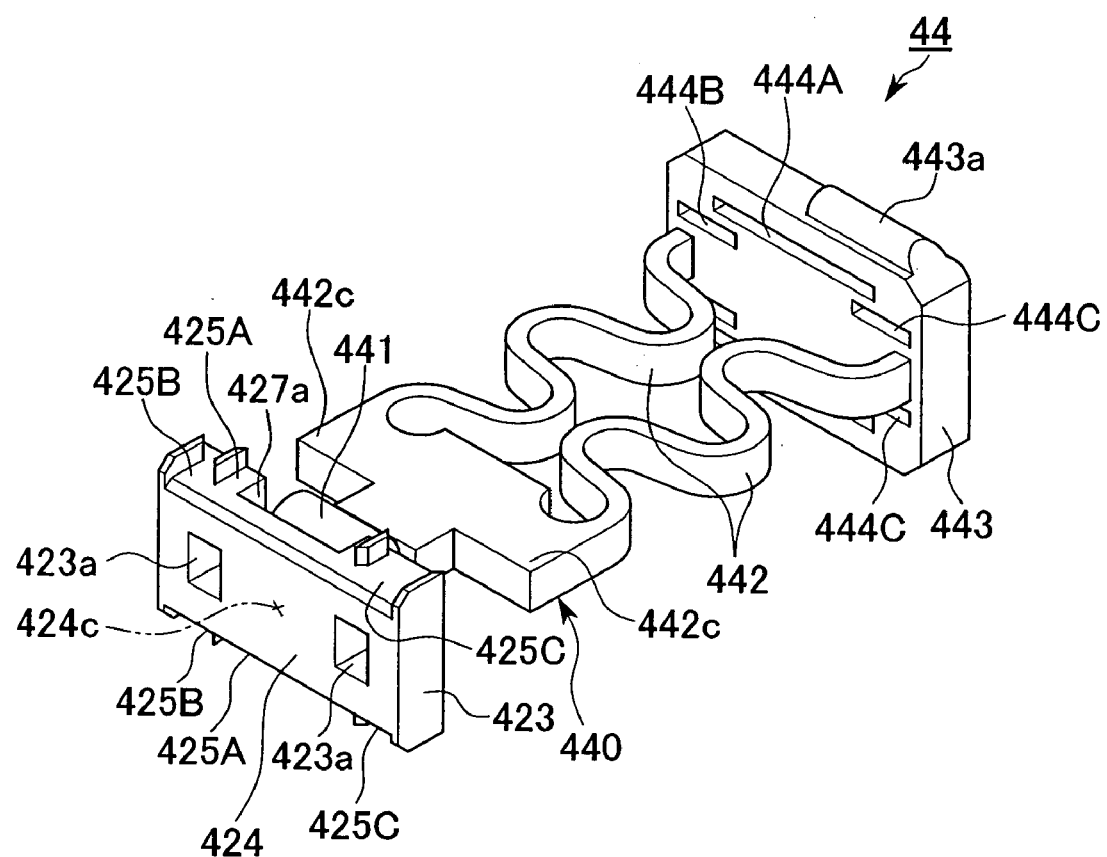
FIG. 68 is a perspective view of the tape abutting member shown in FIGS. 67A to 67D.

FIGS. 65A, 65B and 66 show an example of the take-up reel 431 wound with the cleaning tape 42A. The take-up reel 431 is one in which a hollow cylindrical winding core portion 431a and side plate portions 431b, 431b formed on both ends of the winding core portion 431a are integrally formed from plastic or the like. One cleaning tape is wound around one take-up reel 431. The spacing between the two side plate portions 431b, 431b is set to match the width of the cleaning tape wound therearound.

An insertion hole 431h (through hole) that opens facing the outer circumferential surface 431g of the winding core portion 431a is formed in the winding core portion 431a, and the insertion hole 431h includes a narrow portion 431k. As a way of attaching the end portion of the cleaning tape to the take-up reel 431, there are no particular limitations, however, as shown in FIGS. 65A and 65B, one way is to form a bunched-up knot 42d at one end of the cleaning tape 42A inserted in the insertion hole 431h of the take-up reel 431 and prevent the knot 42d from being pulled out of the narrow portion 431k.

A ratchet arm 431c is formed on the inner surface of the winding core portion 431a of the take-up reel 431. An approximately semi-cylindrical projection 431d is formed at the distal end of the ratchet arm 431c facing the center in the radial direction of the take-up reel 431. A concave portion 431e is formed on the inner surface of the winding core portion 431a so as to accommodate the ratchet arm 431c. The ratchet arm 431c is able by elastic deformation to allow the projection 431d to oscillate in the radial direction of the take-up reel 431.

The projection 431d of the ratchet arm 431c engages with the ratchet grooves 433c provided around the periphery of the take-up reel support shaft 433 when the take-up reel is supported on the take-up reel support shaft 433. When the take-up reel 431 rotates, the projection 431d repeatedly engages and disengages with the ratchet grooves 433c due to elastic deformation of the ratchet arm 431c, thereby imparting rotation resistance to rotation of the take-up reel 431. As a result, a constant tension force is required for the feeding movement of the cleaning tape, and slippage of the take-up reel 431 is suppressed. More specifically, the ratchet arm 431c of the take-up reel 431 and the ratchet grooves 433c of the take-up reel support shaft 433 function as a rotation resistance imparting mechanism that imparts rotation resistance to rotation of the take-up reel 431.

The constant tension force permitting the feeding movement of the cleaning tapes 42A to 42C is to an extent such that stretching of the cleaning tapes due to tensioning by the tape feeding mechanism 43 does not exert an adverse effect on cleaning, and such that the tapes cannot be fed just by swinging or carrying the cleaning tool 41.

The take-up reels 431 around which the cleaning tapes 42B, 42C are spooled have the same constitution as the take-up reel 431 for the cleaning tape 42A shown in FIGS. 65A and 65B, except for different spacing between their side plate portions 431b, 431b, and so their illustration is omitted.

Also, reels similar to the take-up reels 431 can be used as the supply reels 430. Similarly to the take-up reels 431, a ratchet arm having a projection that engages with the ratchet grooves 432c provided around the periphery of the supply reel support shaft 432 is provided on the supply reels 430, and the aforementioned rotation resistance imparting mechanism is constituted.

The operation dial 434 is mounted on the outer circumference of the take-up reel support shaft 433 so as to be concentric with the take-up reel 431.

Figure 63A:
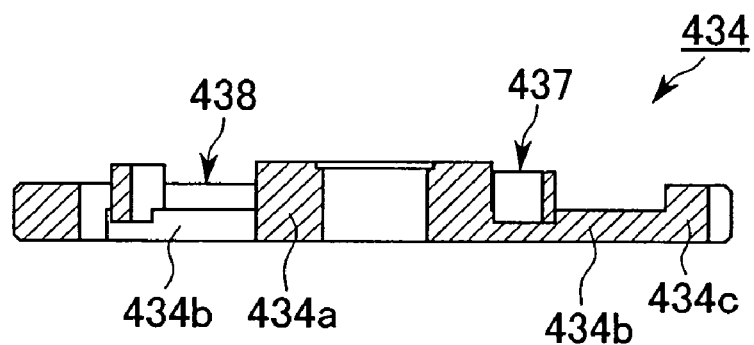
FIG. 63A is a sectional view along line VI—VI showing an example of the dial of the present cleaning tool.
Figure 63B:
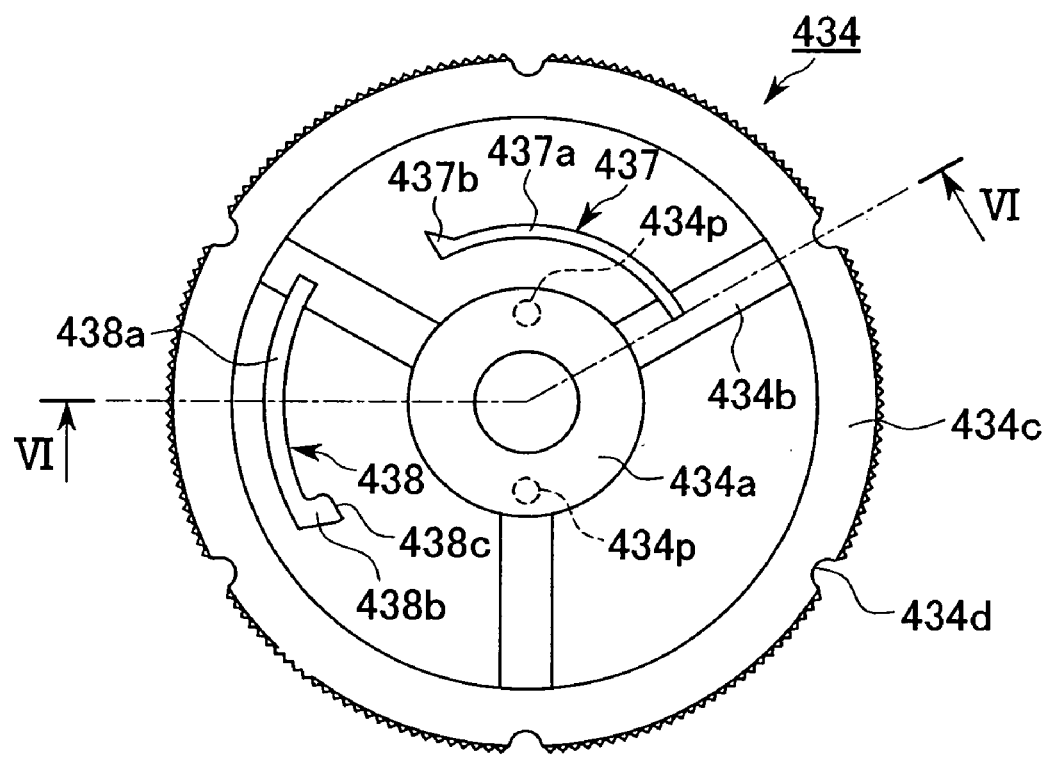
FIG. 63B is a front view thereof.
Figure 64:
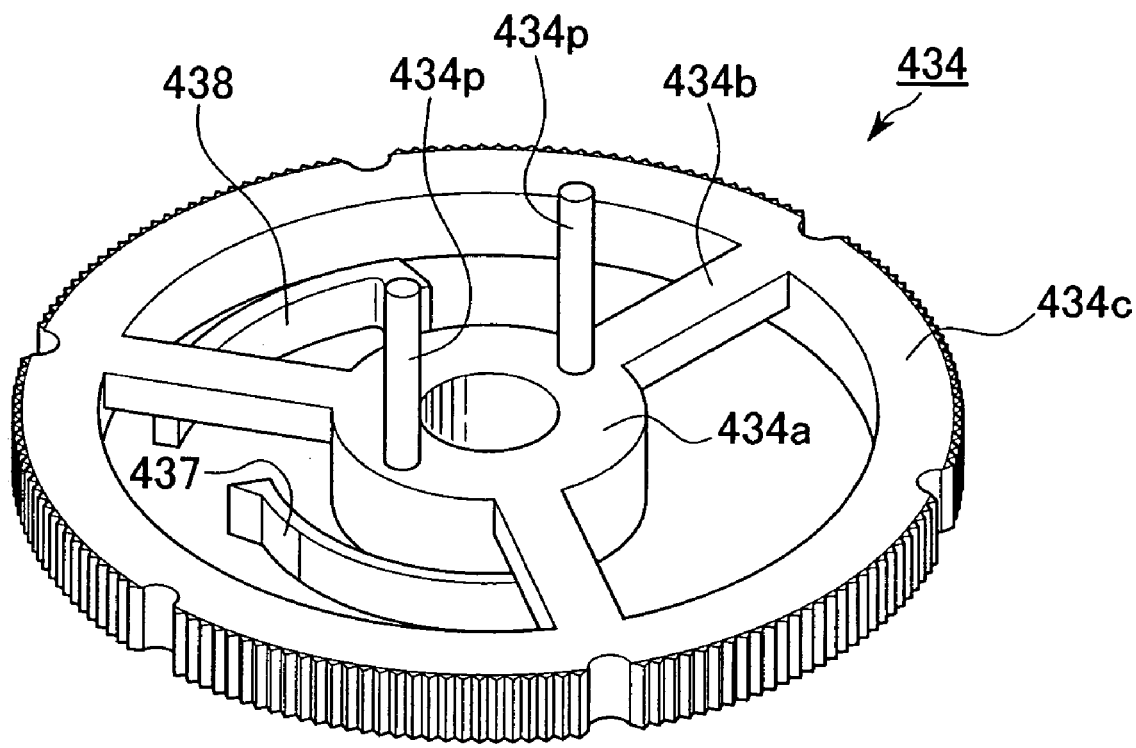
FIG. 64 is a perspective view of the dial of FIGS. 63A and 63B.

As shown in FIGS. 63A, 63B and 64, the operation dial 434 is one in which a hub portion 434a that is penetratingly installed in the take-up reel support shaft 433, a rim portion 434c that has a knurled surface on its periphery, and a plurality of spoke portions 434b connecting the hub portion 434a and the rim portion 434c are integrally formed from plastic and the like. A ratchet arm 437 having an engaging claw 437b formed in a protruding manner on the distal end of an arm portion 437a extending in the circumferential direction of the operation dial 434 is provided on one of the plurality of spoke portions 434b. In addition, a hammer arm 438 having a hammerhead portion 438b formed in a protruding manner at the distal end of an arm portion 438a extending in the circumferential direction of the operation dial 434 is provided on another spoke portion 434b. The arm portions 437a, 438a of the ratchet arm 437 and the hammer arm 438 are elastically deformable.

As shown in FIGS. 58A and 58B, a portion of the operation dial 434 is exposed to outside the tool body 410 from a window 411a provided on a side surface of the tool body 410.

The operation dial 434 and the take-up reel 431 are coupled so as to be integrated by fitting pins 434p formed on the operation dial into insertion holes 431p formed in the take-up reel 431.

The radius of the operation dial 434 is greater than the radius of the take-up reel 431. As a result, the length of the cleaning tapes 42A to 42C spooled onto the take-up reel 431 is smaller than the amount of operation of the operation dial 434 (displacement amount along the outer circumference of the operation dial 434) by just as much as the radial ratio. For this reason, very small feeding amounts of the cleaning tapes 42A to 42C can be easily achieved.

As shown in FIGS. 59A and 59B, the tape feeding mechanism 43 can be driven by operating the operation dial 434 by finger or the like to rotate it in the prescribed direction. More specifically, by rotation of the operation dial 434, the take-up reel 431 rotates to take up the cleaning tapes 42A to 42C, and the unused cleaning tapes 42A to 42C are unreeled from the supply reel 430 and fed. Since the operation dial 434 is open to the side surface of the tool body 410 from the window 411a, even if the cleaning tool 41 is held with one hand, the operation dial 434 can be easily operated by a finger of the hand holding the cleaning tool 41.

As shown in FIGS. 59A and 59B, an annular wall portion 416 is formed on the inner surface of the first case half-body 411, incorporating the take-up reel support shaft 432. A plurality of stranding projections 417 (six in FIGS. 59A and 59B) are formed at regular intervals along the periphery of the annular wall portion 416 on the outer circumference of the annular wall portion 416. Also, a plurality of ratchet teeth 416b are provided around the inner circumferential surface of the annular wall portion 416.

In the front view shown in FIGS. 59A and 59B and FIGS. 79A to 79D, the stranding projections 417 have inclined faces 417a forming an acute angle with an outer circumferential surface 416a of the annular wall portion 416. The inclined faces 417a are provided on the side of the stranding projections 417 facing the rotation direction of the take-up reel 431 (the counterclockwise rotation direction in FIGS. 79A to 79D).

Reverse rotation of the operation dial 434 is blocked by engagement of the engaging claw 437b of the ratchet arm 437 with the ratchet teeth 416b on the annular wall portion 416. More specifically, the ratchet teeth 416b and the ratchet arm 437 function as a reverse-feed blocking mechanism to block reverse feeding of the cleaning tapes 42A to 42C (a reverse-rotation prevention mechanism to prevent reverse rotation of the take-up reel). Accordingly, the cleaning tapes 42A to 42C are stably fed in the prescribed direction, which can suppress slack in the cleaning tapes 42A to 42C.

Figure 79A:
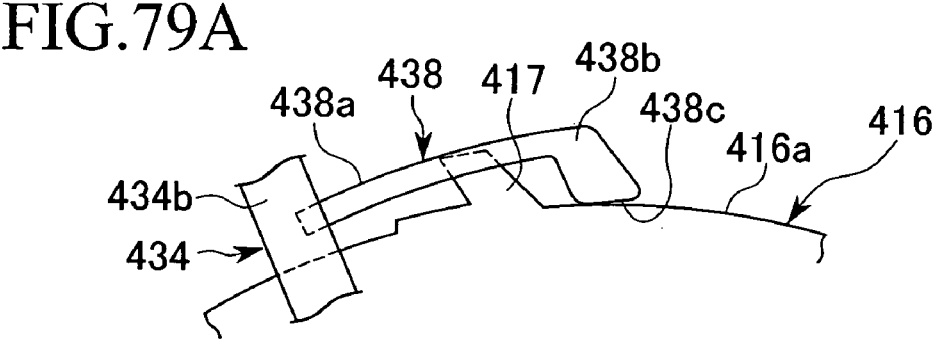
FIGS. 79A to 79D are drawings explaining the operation of the feeding amount notification mechanism according to the present cleaning tool.

In addition, in the state of the operation dial 434 mounted on the take-up reel support shaft 433, as shown in FIG. 79A, the hitting face 438c of the hammerhead portion 438b of the hammer arm 438 abuts the outer circumferential surface 416a of the annular wall portion 416.

Figure 79B:
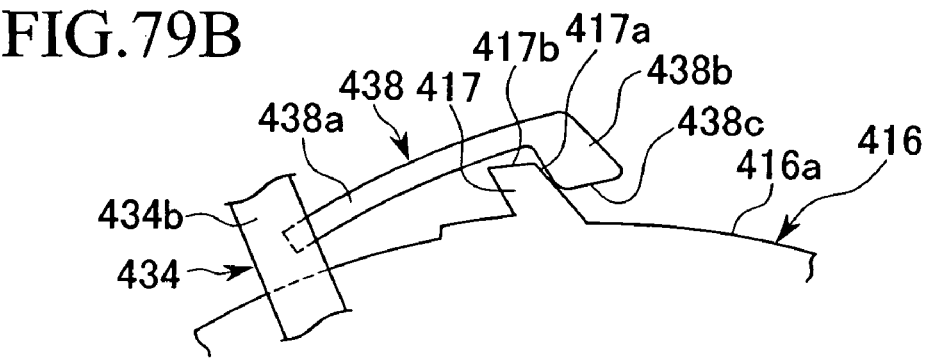
Figure 79C:
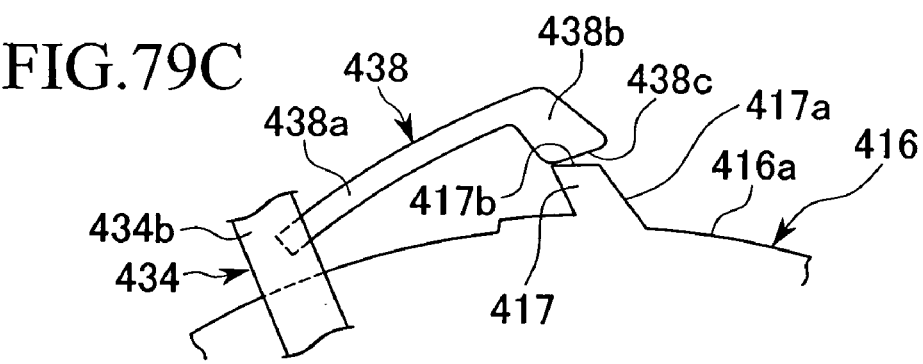
Figure 79D:
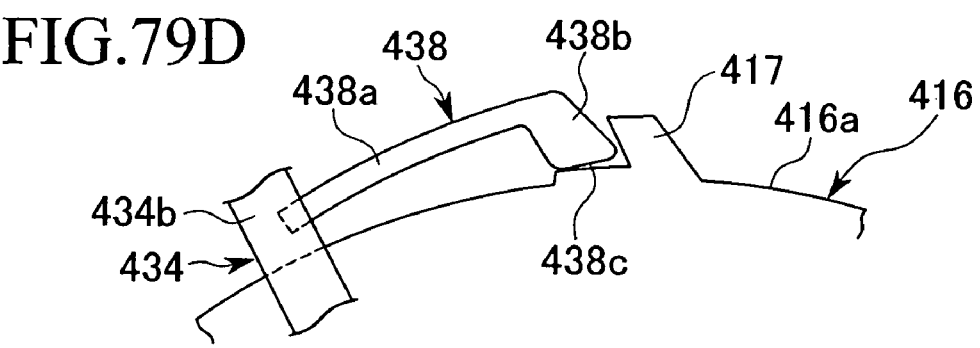
Figure 80:
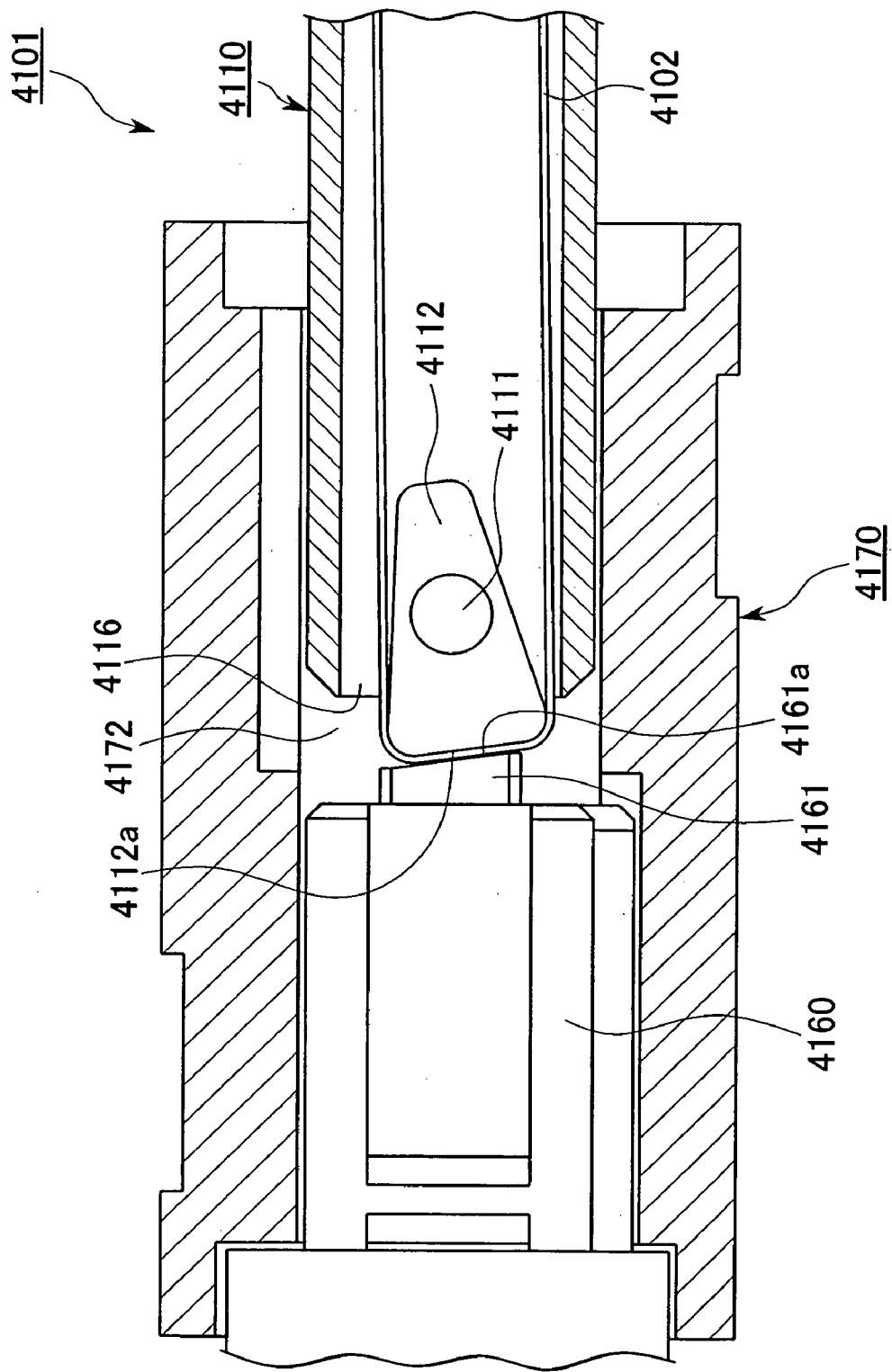
FIG. 80 is a sectional view showing an example of the state of a conventional cleaner inserted in a connector housing.

When the operation dial 434 rotates, as shown in FIGS. 79B and 79C, the hammerhead portion 438b rises to the top portion 417b along the inclined face 417a of the stranding projection 417. When the operation dial 434 further rotates, as shown in FIG. 79D, losing the support of the stranding projection 417, the hammer arm 438 swings down the hammerhead portion 438b by the springing force of the arm portion 438a toward the outer circumferential surface 416a of the annular wall portion 416, and the hitting face 438c of the hammerhead portion 438b collides with the outer circumferential surface 416a, producing a slapping sound. In this way, the operator can be notified of the feeding amount of the cleaning tapes 42A to 42C by the slapping sound produced each time the feeding amount of the cleaning tapes 42A to 42C reaches a fixed amount.

More specifically, in the cleaning tool 41 of the seventh embodiment, a feeding amount notification mechanism that notifies the feeding amount of the cleaning tapes 42A to 42C is constituted from the stranding projections 417 of the annular wall portion 416 and the hammer arm 438 of the operation dial 434.

The feeding amount of the cleaning tapes 42A to 42C corresponding to one slapping sound can be made to serve as the feeding amount required for one cleaning of an optical connector. In addition, multiple slapping sounds can be made to serve as the feeding amount corresponding to one cleaning of an optical connector. Operation is also possible by suitably changing the number of slapping sounds corresponding to one cleaning of an optical connector in accordance with the degree of dirtiness of the optical connector.

As an example of the method of using the cleaning tool 41, an example of the procedure of cleaning the connection end face 461a of the optical plug 460 housed in the optical adaptor 470 is explained.

As shown in FIG. 74, by inserting the insertion portion 420 of the cleaning tool 41 from the connector insertion port 471 of the optical adaptor 470, the insertion portion 420 enters the connector housing hole 472 as its outer surface is aligned by the inner walls 470a of the optical adaptor 470, whereby the cleaning tapes 42A to 42C are positioned to be abutted on an appropriate position (here, the optical fiber holes 461b and periphery thereof) of the connection end face 461a of the optical plug 460.

Even when the guide pins 465 protrude on the connection end face 461a of the optical plug 460, the guide pins 465 are housed in the guide pin insertion holes 423a provided on the head member 423, enabling the insertion portion 420 to be housed in the connector housing hole 472 without interference with the guide pins 465.

By rotating the operation dial 434 by a prescribed amount, the cleaning tapes 42A to 42C move in conjunction with the rotation of the take-up reel 431, and the connection end face 461a is wiped and cleaned by the cleaning tapes 42A to 42C, with contaminants such as debris, dust and oil adhering to the connection end face 461a being securely extracted by the cleaning tapes 42A to 42C.

Since extracted contaminants adhere to the cleaning tapes 42A to 42C and move in the direction to be taken up on take-up reel 431, the used cleaning tape (downstream portion) 42c is not exposed any more from the opening portion 426 of the insertion portion 420, and so there is no risk of the contaminants once again adhering to the connection end face 461a.

Accordingly, the connection end face 461a *can be thoroughly cleaned.*

After cleaning, the insertion portion 420 can be easily removed by pulling in the direction opposite to when inserting the cleaning tool 41 (disengagement direction).

Next, an example of the procedure of cleaning the connection end face 461a of the optical plug 460 outside the optical adaptor 470 is explained.

Figure 75:
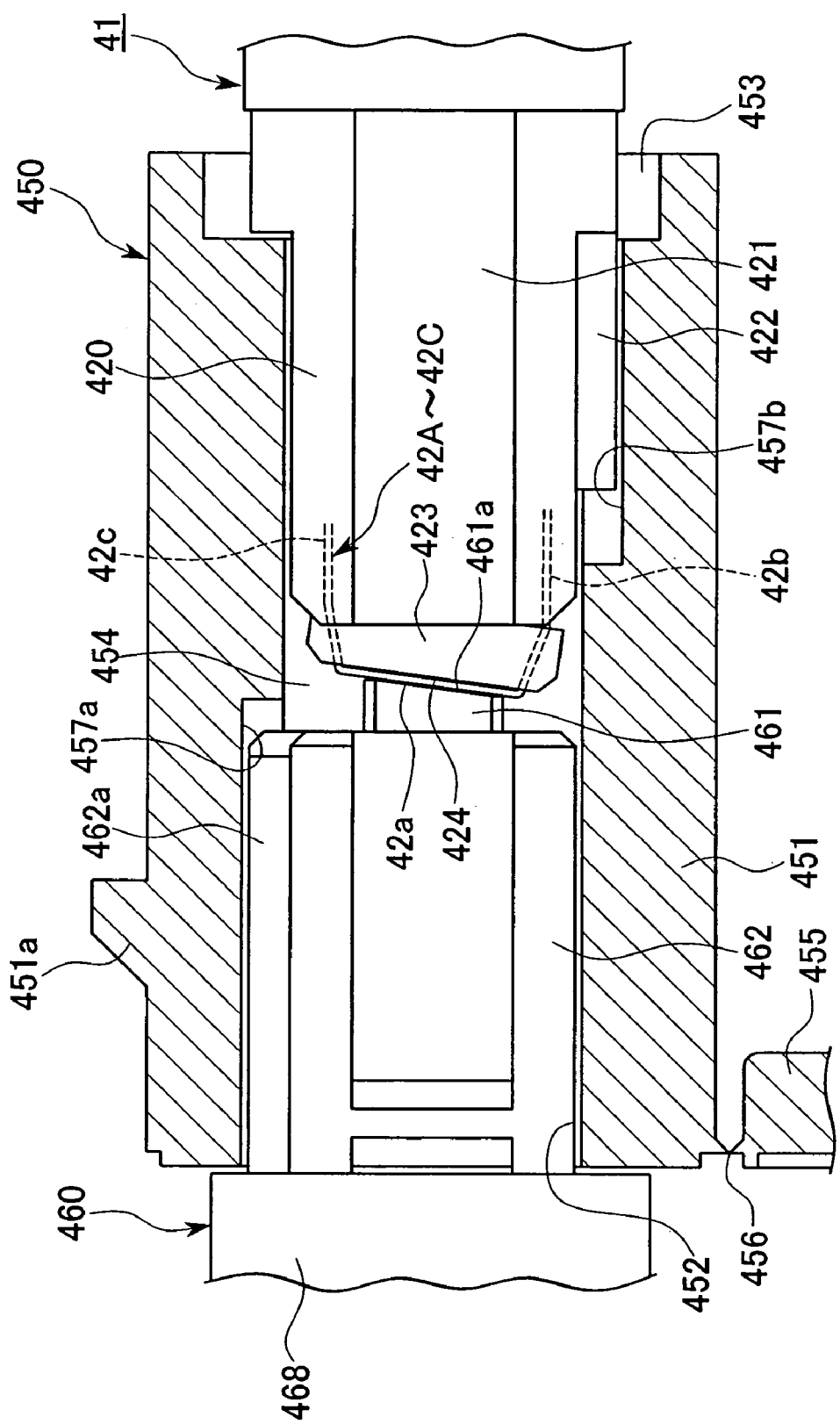
FIG. 75 is a sectional view showing an example of the state of the insertion portion of the present cleaning tool and the optical connector plug inserted in the guide cap.

As shown in FIG. 75, by inserting the insertion portion 420 of the cleaning tool 41 in the insertion portion insertion port 453 and inserting the optical plug 460 into the plug insertion port 452 that is opened by removing the lid 455 of the guide cap 450, the outer surface of the housing 462 of the optical plug 460 advances into the internal space 454 of the guide cap 450 while being positioned by the internal walls of the guide cap 450. By pushing the optical plug 460 in this way, the cleaning tapes 42A to 42C are positioned to be abutted on an appropriate position (here, the optical fiber holes 461b and periphery thereof) of the connection end face 461a of the optical plug 460.

In this way, since butting of the connection end face 461a of the optical plug 460 and the abutting portion 42a of the cleaning tape of the insertion portion 420 is appropriately guided by the guide cap 450, cleaning of the connection end face 461a of the optical plug 460 in the guide cap 450 can be easily carried out similarly to the case of the connection end face 461a of the optical plug 460 in the aforementioned optical adaptor 470.

More specifically, according to the cleaning tool 41 of the seventh embodiment, the connection end face 461a of the optical plug 460 in the optical adaptor 470 can be cleaned in the state of being housed in the optical adaptor 470 and, by mounting the guide cap 450 on the insertion portion 420, the connection end face 461a of the optical plug 460 outside the optical adaptor 470 can also be cleaned. Since any optical plug can be cleaned by one type of cleaning tool, the number of articles required for cleaning work can be reduced.

By closing the lid 455 of the guide cap 450 and attaching to the insertion portion 420, the guide cap 450 functions as a cap preventing exposure of the cleaning tapes 42A to 42C from the opening portion 426 of the insertion portion 420 when not in use (cleaning work), thereby preventing contamination of the interior of the guide cap 450 and the cleaning tapes 42A to 42C and the like during storage or transport of the cleaning tool 41.

Since the head member 423 is able to tilt with respect to the pushing pressure when the distal end face 424 abuts the connection end face 461a of the optical plug 460, even in the event of the ferrule 461 with a perpendicularly polished connection end face 461a as shown in FIG. 71 being abutted, and even in the event of the ferrule 461 with an obliquely polished connection end face 461a as shown in FIG. 72 being abutted, the direction of the distal end face 424 is aligned with the direction of the connection end face 461a, and the cleaning tape 42a on the distal end face 424 can be more uniformly and securely made to abut on the connection end face 461a. Also, if the operator holding the cleaning tool 41 happens to move slightly during cleaning, since the state of surface contact of the cleaning tapes 42A to 42C can be maintained by aligning the direction of the distal end face 424 of the head member 423 with the direction of the connection end face 461a of the ferrule 461 following the movement, the pushing pressure is not concentrated locally but acts more uniformly between the distal end face 424 of the head member 423 and the connection end face 461a of the ferrule 461, enabling the connection end face 461a to be reliably cleaned all over.

Due to the pushing pressure of the ferrule 461 of the optical plug 460, the compression spring 442 and the like elastically deforms, causing the head composite body 44 to recede in the direction opposite to the insertion direction, which can relax the pushing pressure of the ferrule 461 on the head member 423. Accordingly, when the head member 423 abuts the ferrule 461 by inserting the insertion portion 420 from the connector insertion port 471, the head member 423 can accommodate the pressure while relaxing the force from the ferrule 461 with the tilting spring 441 without the pressing force being directly applied strongly. Thereby, damage to the connection end face 461a and the optical fiber 463a end faces can be suppressed. In addition, even if the hands of the operator holding the cleaning tool 41 happen to move slightly during cleaning, the head member 423 alleviates the fluctuation in pushing pressure pressing the ferrule 461, inhibits the application of excessive pushing pressure to the connection end face 461a, and so can suppress damage to the connection end face 461a and the optical fiber 463a end faces. Also, dirt is inhibited from being pushed against the ferrule 461 and the like of the optical connector 460 side and becoming stuck thereon, enabling the dirt to be readily removed.

Since the amount of backward displacement of the distal end face 424 of the head member 423 can be secured by the compression spring 442, it can be adapted even to optical components such as optical plugs and optical transceivers with different optical reference planes, enabling cleaning with the position of the cleaning tape 42a aligned with the connection end face.

Since the distal end face 424 of the head member 423 in the head composite body 44 does not substantially displace vertically in the tilting direction thereof (vertical direction in FIGS. 71 and 72), the cleaning tape 42a not making good contact with the connection end face 461a due to shifting of the center locations of the connection end face 461a of the optical plug 460 and the distal end face 424 of the head member 423, and the abutting force of the connection end face 461a abutting the cleaning tape 42a becoming uneven is inhibited, thereby enabling more secure removal of contaminants on the connection end face 461a.

Since the insertion portion 420 is positioned by the connector housing hole 472 of the optical adaptor 470 during cleaning as well, wiping and cleaning of the connection end face 461a can be performed by the abutting portion 42a of the cleaning tape with a uniform pushing pressure without displacement. In addition, the insertion portion 420 can be supported in the optical adaptor 470 with an extremely light force, and so has excellent operability.

Since the cleaning tool of the seventh embodiment can be manufactured by assembling inflammable materials such as POM or PS without using metal components such as screws, it can be disposed of by incineration after use without disassembly.

The present invention based on the preferred seventh embodiment was explained hereinabove, but the present invention is not limited to only this embodiment and can be modified within a range that does not depart from the spirit of the present invention.

(1) As shown in FIGS. 71, 72 and 73, in the cleaning tool according to the seventh embodiment, the distal end face of the head portion is tiltable in the thickness direction (vertical direction in FIG. 67D, for example) of the insertion portion due to elastic deformation of a spring portion, but the present invention is not particularly limited to this. For example, the distal end face of the head portion may be tiltable in the width direction (for example, leftward and rightward in FIG. 67D) of the insertion portion.

Also, a constitution can be adopted that is tiltable in both the thickness direction and the width direction of the insertion portion. In this case, the direction of the head portion of the insertion portion and the direction of the connection end face of the ferrule can be brought into better alignment, thereby enabling better cleaning of the connection end face.

Moreover, similarly to the cleaning tool described above, when the head portion is one that is able to recede in a direction opposite the connection end face (separation direction), it preferably can make the pushing pressure applied to the ferrule appropriate.

(2) In the insertion portion, unit insertion portions which, by insertion into different connector housings, are to be positioned within the connector housing are formed at a plurality of locations in the protruding direction of the insertion portion, and the unit insertion portions of the insertion portion may be formed so as to be insertable in all connector housings capable of housing the unit insertion portions positioned relatively to the rear in the protruding direction of the insertion portion. With this kind of cleaning tool, the insertion portion can be inserted so as to be positioned with respect to different connector housings by the unit insertion portions, so that, using a single cleaning tool, cleaning of a connection end face of an optical connector in the connector housing can be carried out in compliance with a plurality of types and sizes of connector housing.

(3) The insertion portion can be constituted as one in which a plurality of kinds of insertion portions are exchangeable with respect to the tool body. This enables cleaning of the connection end face of an optical connector in a connector housing in compliance with the type and size of the connector housing just by changing the insertion portion without changing the tool body.

(4) The driving mechanism for feeding the tape (tape driving mechanism) is not limited to one that is manually driven, and may be made to be driven by power from a motor or spring and the like. Also, manual driving and driving by motive power can be made to be used in combination or be switchable as required.

(5) In the cleaning tool of the aforementioned seventh embodiment, the insertion portion is made to completely cover the cleaning tape, except for the opening formed at the distal end of the insertion portion, but is not necessarily limited thereto. If the cleaning tape is prevented from being contaminated by contact with the inner walls of the connector housing and the like when inserting the insertion portion in the connector housing, the shape or structure is not particularly limited, and does not necessarily need to be sleeve shaped.

(6) As the feeding amount notification mechanism, it is possible to adopt an optional mechanism to notify the amount of feeding of the cleaning tape by, for example, emitting a signal such as a sound or lighting/flashing of a lamp in accordance with the feeding amount of the cleaning tape, without limiting to the constitution of the seventh embodiment.

(7) The cleaning tool of the aforementioned seventh embodiment, as an optical component cleaning tool used for optical components such as optical fiber arrays, planar lightwave circuits and optical transceivers, can be used for cleaning the end face of an optical component at which the end face of a lightwave circuit (an optical fiber being possible) is disposed.

The optical fiber arrays may include one serving as an end face by its optical fibers being retained in one or a plurality of positioning grooves such as V-grooves positioned side by side that are formed on a substrate, the positioning grooves extending to at least one end of the substrate, and the end face of the optical fibers being arranged at one end of the substrate. Various constitutions are also known of optical components having planar lightwave circuits. According to the optical component cleaning tool of the present invention, even in the case of the end face of the optical component being disposed in a recess of a housing or the like, instead of the connection end face of the optical connector, the end face of another optical component, that is the end face the an optical fiber or the end face of a substrate or the like, can be cleaned by a cleaning tape wrapped around a head.

The eighth embodiment of the present invention is explained below referring to the drawings.

FIGS. 81A to 104D are views showing the eight embodiment of the optical connector cleaning tool of the present invention (hereafter simply referred to as the "cleaning tool").

Figure 101:
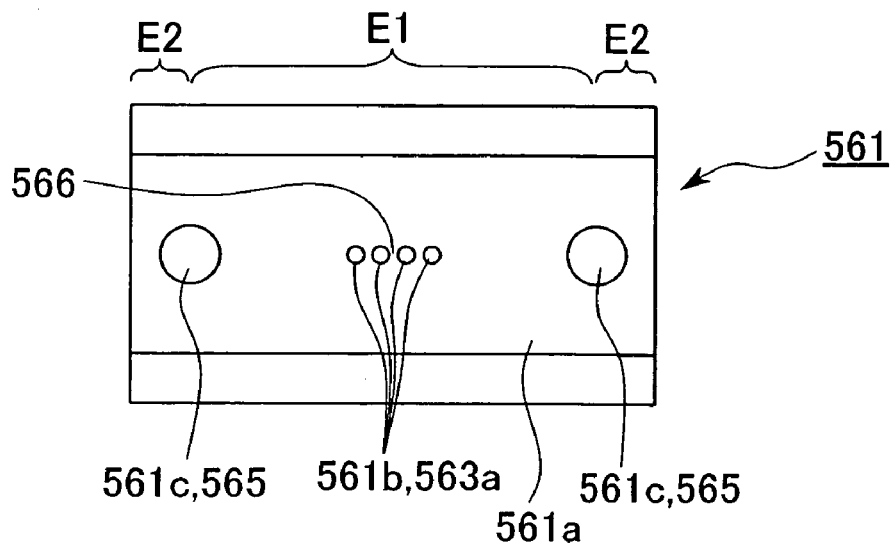
FIG. 101 is a front view showing an example of a ferrule of an optical connector plug.
Figure 103:
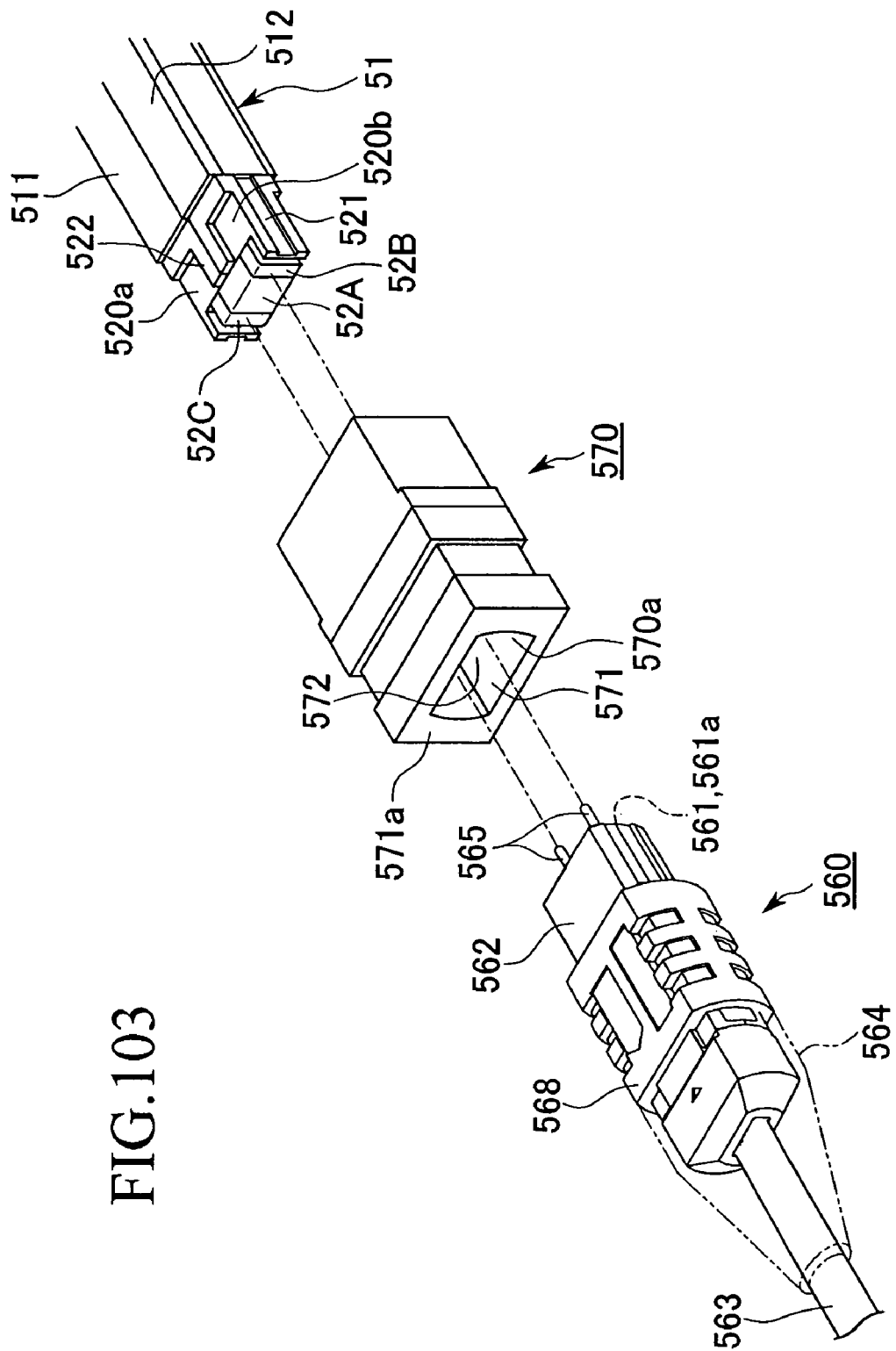
FIG. 103 is an exploded perspective view showing the state of the insertion portion of the present cleaning tool and the optical connector plug inserted in the optical connector adaptor.

As shown in FIGS. 101 and 103, an optical connector plug 560 (sometimes referred to hereafter simply as an optical plug) and an optical connector adaptor 570 (connector housing. Sometimes referred to hereafter simply as an optical adaptor) to which a cleaning tool 51 of the eight embodiment is applied are Multifiber Push-On (MPO) type optical connectors defined according to JIS C 5982.

The optical plug 560 is an optical connector plug of a constitution housing a Mechanically Transferable (MT) type optical connector ferrule 561 (hereafter simply referred to as a ferrule) defined according to JIS C 5981 at a distal end portion of a plastic sleeve-shaped housing 562, with the whole plug being formed in a low profile sectional shape in appearance.

In the explanation below, the direction corresponding to the low-profile, short side (vertical direction in FIG. 101) of the ferrule 561 of the optical plug 560 is referred to as the thickness direction, and the direction corresponding to the long side is referred to as the width direction (horizontal direction in FIG. 101). In addition, thickness direction and width direction are also similarly used for the optical adaptor 570 connected with the optical plug 560 and an insertion portion 520 (described below) of the cleaning tool 51 inserted in the optical adaptor 570 to correspond to the thickness direction and the width direction of the ferrule 561.

As shown in FIG. 101, optical fiber holes 561b (micro holes) of a prescribed number (here four) are opened so as to be arrayed near a center location 566 of a connection end face 561a of the ferrule 561. Here, an optical fiber 563 is a four-fiber optical fiber tape ribbon, with optical fibers 563a having their resin coating removed at the distal end portion thereof (bare optical fibers) inserted into the optical fiber holes 561b in the ferrule 561. By doing so they are terminated to be butt-connectable with another optical connector and penetrate the inside of the optical plug 560 to be drawn out from the back end of the optical plug 560. By storing the optical fiber 563 drawn out from the back end of the optical plug 560 in a boot 564 provided at the back end of the housing 562 in the connection direction (lower left side in FIG. 103), sudden bending and the like near the back end of the optical plug 560 is prevented.

There are no particular limitations to the optical fiber 563 as long as it is suited to termination by the optical plug. The optical fiber may be one having a single core, one having multi-core, an optical fiber cord having such a single core housed in a tube, an optical fiber cord having such multi-core housed in a tube, or the like.

Guide-pin holes 561c are provided in the connection end face 561a of the ferrule 561 on both sides of the outside of the optical fiber holes 561b in the width direction. Ferrules 561 are aligned with each other to a high degree of accuracy by a positioning mechanism of a widely-known guide-pin fitting system whereby protruding members 565 (guide pins) are provided so as to be inserted into the guide-pin holes 561c and protrude from the connection end face 561a, with the end faces of the optical fibers 563a being connected by butt-coupling. The optical fibers 563 terminated in the ferrules 561 are thus optically connected.

Figure 99:
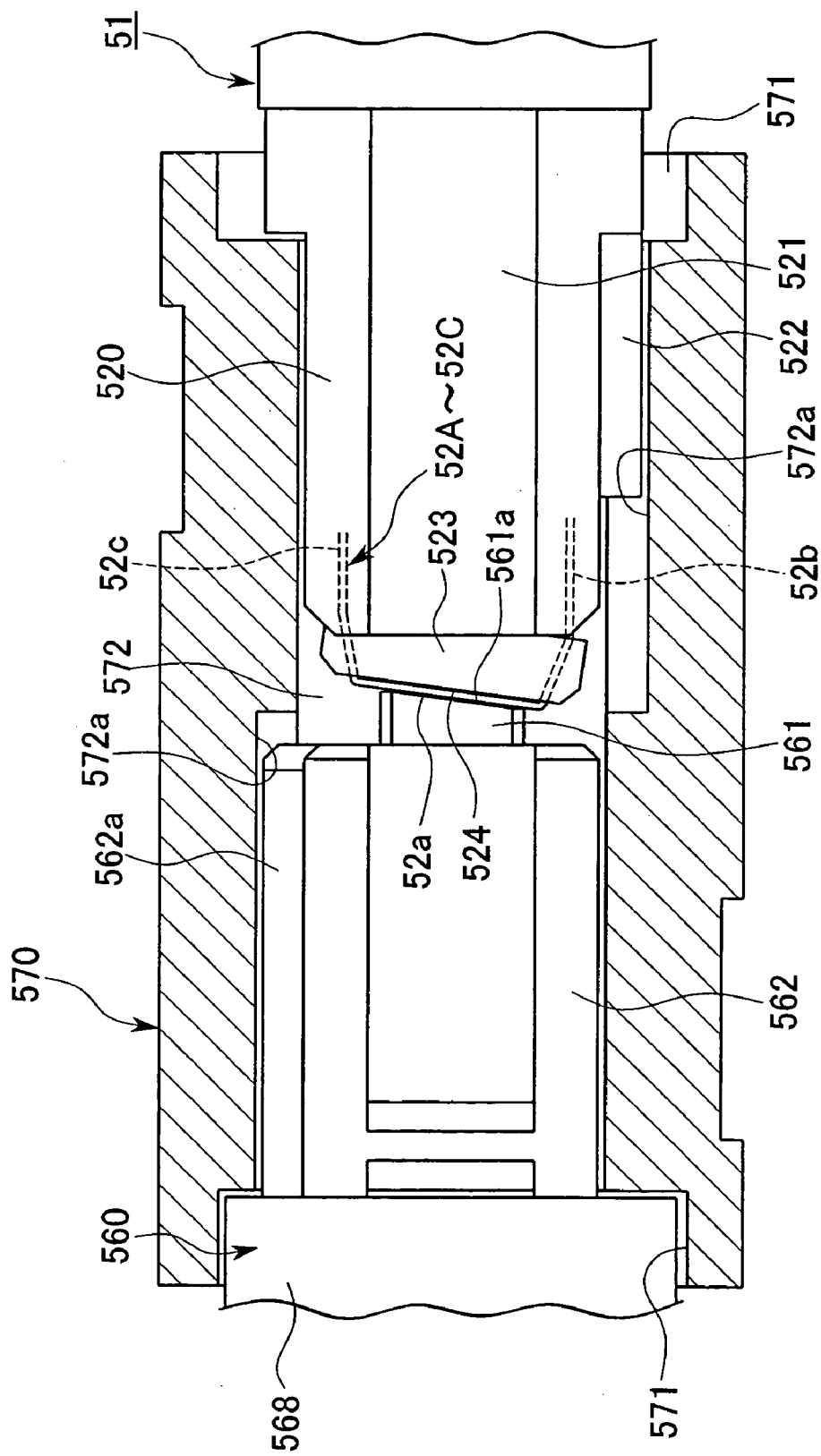
FIG. 99 is a schematic view showing the state of an obliquely polished connection end face of an optical connector plug abutting the distal end face of the head member.

As shown in FIGS. 103 and 99, the optical adaptor 570 is formed in a sleeve shape in which both sides of a connector housing hole 572 are opened as connector insertion ports 571. By inserting the optical plug 560 from the connector insertion port 571, it can be housed in the connector housing hole 572.

The optical adaptor 570 as in the present invention is an all-inclusive term for relay equipment that positions, connects and fixes optical plugs 560 on both sides thereof. Accordingly, the optical plugs 560 on both sides connected to the optical adaptor 570 are not limited to those shaped the same as each other. Even if optical plugs with different shapes are connectable, it is termed an optical adaptor.

When the optical plug 560 is inserted from the connector insertion port 571 in the optical adaptor 570, it is housed in the connector housing hole 572 while displacement in a direction deviating from the insertion direction is restricted. When two optical plugs 560 are inserted in the optical adaptor 570, the ferrules 561 are butted against each other within the adaptor 570, with the optical fibers 563 terminated by the ferrules 561 being thereby optically connected.

In this type of optical connector 560, when the ferrule 561 is engaged in the optical adaptor 570, it is biased by a spring (not shown) built into the housing 562, so that a pushing pressure acts on the ferrules 561.

In the optical adaptor 570, similarly to the widely known MPO type connector there is provided a key groove 572a on an inner wall 570a of the optical adaptor 570 to engage with a key 562a formed on the housing 562 of the optical plug 560. The key 562a and the key groove 572a are formed only on one of the surfaces on both sides in the thickness direction of the housing 562 of the optical plug 560 and the connector insertion port 571 of the optical adaptor 570, respectively. When the orientation of the key 562a and the key groove 572a do not match, the optical plug 560 cannot be inserted into the connector insertion port 571 of the optical adaptor 570. Thereby, in the case of the connection end face 561a of the optical plug 560 being obliquely polished (polished into an oblique plane), errors of inserting the optical plug 560 in the optical adaptor 570 with its orientation in the thickness direction reversed (reverse insertion) are thereby prevented.

Moreover, on the optical adaptor 570, although not particularly illustrated, there are provided elastic engaging pieces formed extending toward the connector insertion port 571 along inner walls 570a of the optical adaptor 570 and having engaging claws on the distal end thereof as widely known. In addition, engaging recesses capable of engagement with the engaging claws of the elastic engaging pieces of the optical adaptor 570 are provided on the surfaces of both sides in the width direction of the housing 562 of the optical plug 560.

On the periphery of the housing 562 of the optical plug 560, a coupling 568 is mounted for pressing the elastic engaging pieces from the outside to prevent release of engagement with the engaging recesses when the engaging claws and the engaging recesses are engaged.

When the optical plug 560 is inserted into the optical adaptor 570 from the connector insertion port 571, it is housed in the connector housing hole 572 while displacement in a direction deviating from the insertion direction is restricted by the engagement of the engaging recesses and the engaging claws.

In the state of both optical plugs 560 being inserted in the optical adaptor 570, the distal ends of the optical fibers 563a fixedly held in the ferrules 561 within the optical adaptor 570 are butted against each other, with the optical fibers 563 terminated by the ferrules 561 being thereby optically connected.

The cleaning tool 51 capable of being applied to cleaning of the connection end face 561a of the optical plug 560 is as shown in FIGS. 81A through 85 and FIG. 99 provided with a tool body 510 having cleaning tapes 52A to 52C housed therein and an insertion portion 520 set to protrude from the tool body 510 and formed to be insertable in the connector housing hole 572 of the optical adaptor 570.

Figure 81A:
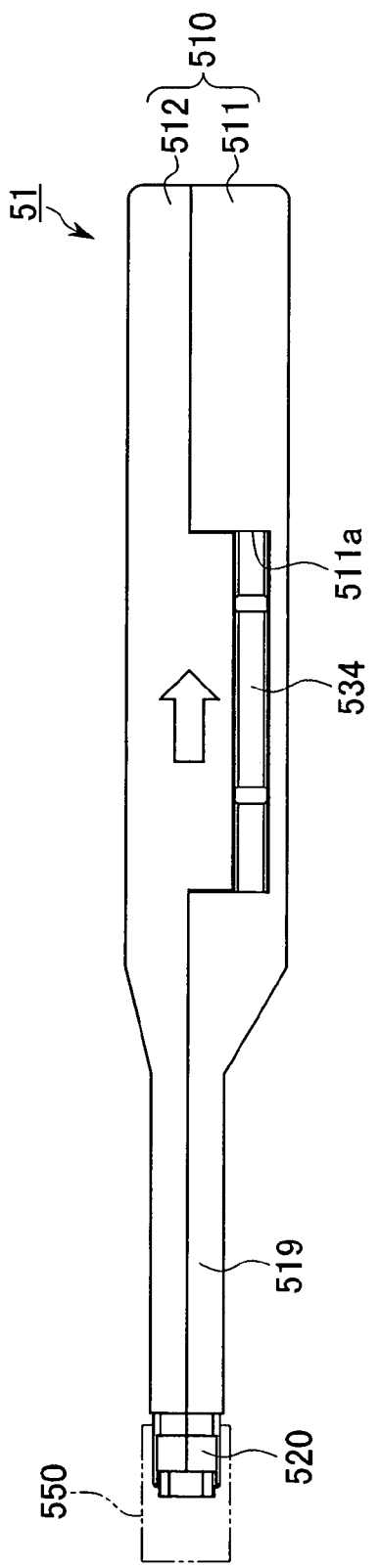
FIG. 81A is a plan view showing an overview of the optical connector cleaning tool according to the eighth embodiment of the present invention.

The tool body 510 tapers toward the insertion portion 520, with the insertion portion 520 formed at the protruding distal end of a narrow portion 519 of the tool body 510 distal end portion (the end at the left side in FIG. 81A).

As shown in FIG. 81A, the tool body 510 here is a two-split structure of first and second case half-bodies 511, 512 made of plastic such as polystyrene (PS) or polyoxymethylene (10M, polyacetal).

As shown in FIGS. 82A, 82B, 83A and 83B, the first and second case half-bodies 511, 512 are constituted to be able to be integrated together by the engagement of fitting pins 513a to 513e and fitting holes 514a to 514e formed to be disposed oppositely on the inner sides of the first case half-body 511 and the second case half-body 512. Note that this is merely one example of the constitution of the tool body 510 and is not meant to particularly limit the present invention.

As shown in FIG. 99, by inserting the insertion portion 520 into the optical adaptor 570, an abutting portion 52a of the cleaning tapes 52A to 52C disposed facing an opening portion 526 in the distal end of the insertion portion 520 is positioned to be abuttable against the connection end face 561a of the optical plug 560.

The abutting portion 52a of the cleaning tapes 52A to 52C is the portion positioned on a distal end face 524 of a head member 523 (to be described in detail hereinafter), with the abutting portion 52a being replaced along the longitudinal direction of the cleaning tape by feeding movement of the cleaning tape.

Figure 85:
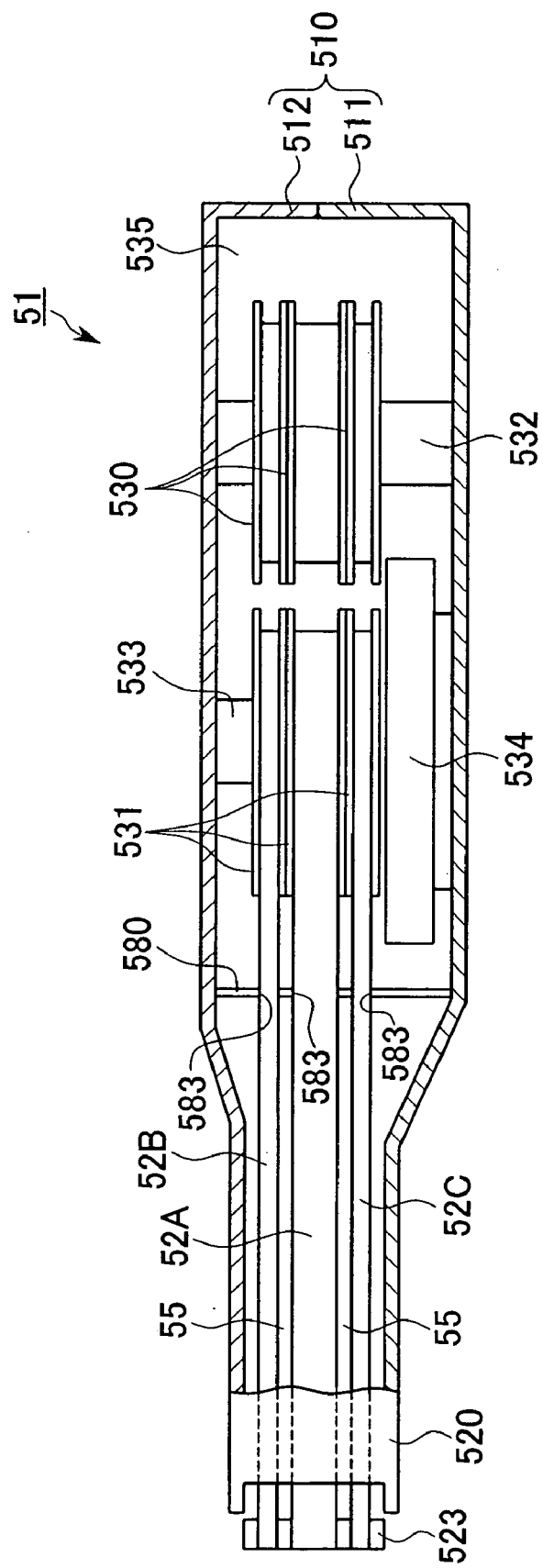
FIG. 85 is a sectional view showing the inside of the cleaning tool of FIGS. 81A and 81B.
Figure 102:
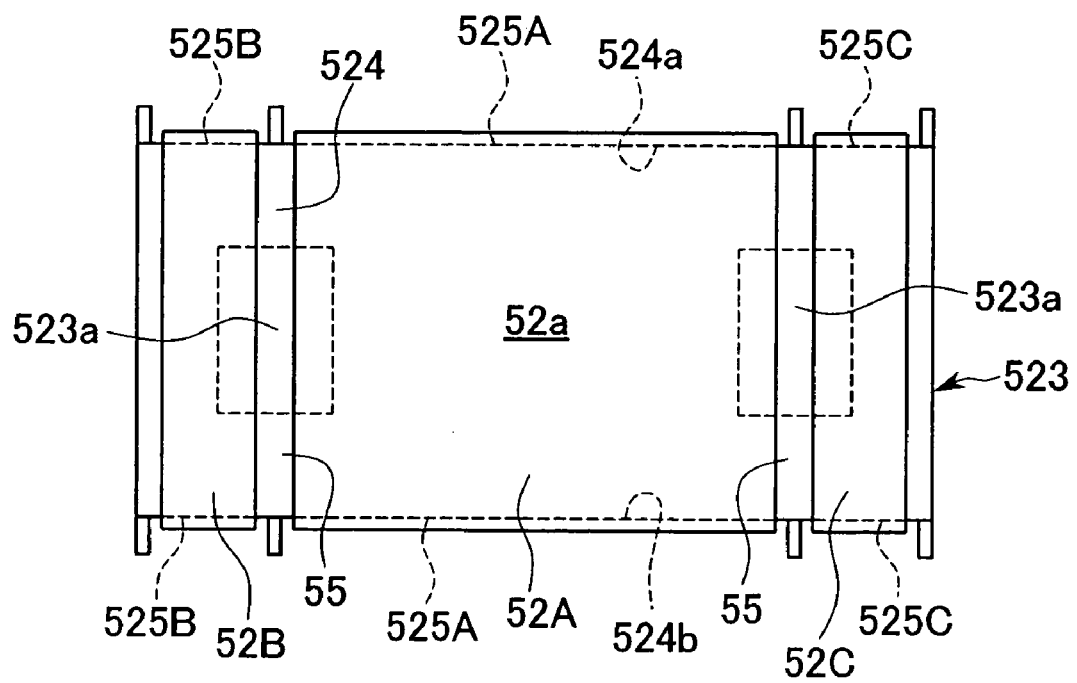
FIG. 102 is a front view showing the distal end face of the head member with the cleaning tape attached.

As shown in FIGS. 85 and 102, a total of three cleaning tapes (mutually separated tapes) are employed, with one, 52A, cleaning a central region E1 that is a portion positioned between the guide pin holes 561c and those 52B, 52C cleaning outside regions E2, E2 positioned outside the central region E1 via the guide pin holes 561c within the connection end face 561a of the optical connector shown in FIG. 99. Here, the widths of the cleaning tapes 52A, 52B, 52C are made to match the widths of the regions to be cleaned E1, E2. Here, the width of the cleaning tape 52A that cleans the central region. E1 is wider than the widths of the tapes 52B, 52C that clean the outside regions E2.

The cleaning tapes 52A to 52C (hereafter simply referred to at times as the tapes) are not particularly limited, and ones can be adopted in which a publicly known suitable cleaning fabric (unwoven or woven fabric) is processed into a tape shape. For example, those made from an extra-fine fiber such as polyester or nylon are exemplified. In addition, the structure is also generally one with a roughly fixed width.

Here, an embodiment having three tapes 52A, 52B, 52C is illustrated, but in the present invention the number of cleaning tapes is not particularly limited and may be one or more.

The cleaning tapes 52A, 52B, 52C are mutually separated tapes, and as shown in FIG. 102, there are gaps 55 between the cleaning tape 52A of the central portion and the cleaning tapes 52B, 52C of both sides. Thereby, even in the case of the optical connector 560 in which guide pins 565 to be inserted into the guide pin holes 561c protrude from the connection end face 561a, the guide pins 565 escape into the gaps 55 of the cleaning tapes 52A to 52C, and the central region E1 and the outside regions E2, E2 of the connection end face 561a can be efficiently cleaned simultaneously. That is, the gaps 55 function as protruding member escape portions.

Figure 82A:
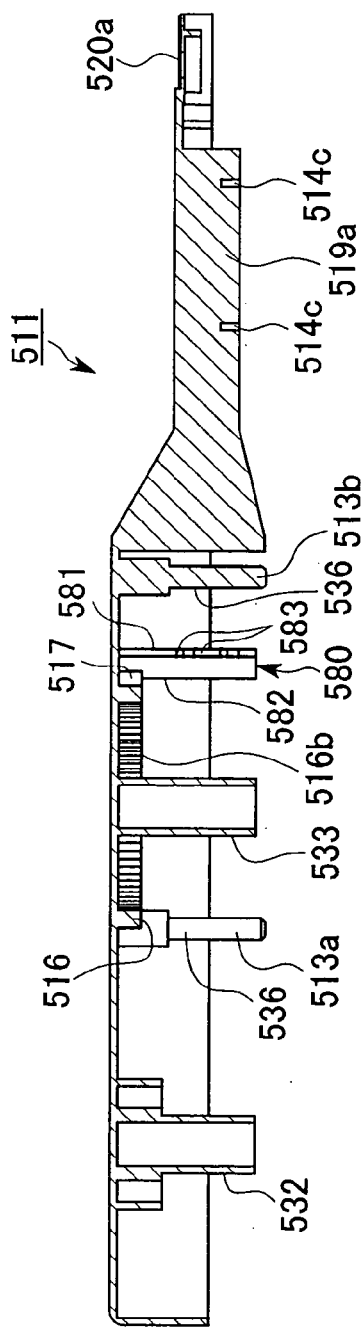
FIG. 82A is a sectional view along line II—II showing the second case half-body according to the cleaning tool of FIGS. 81A and 81B.
Figure 82B:
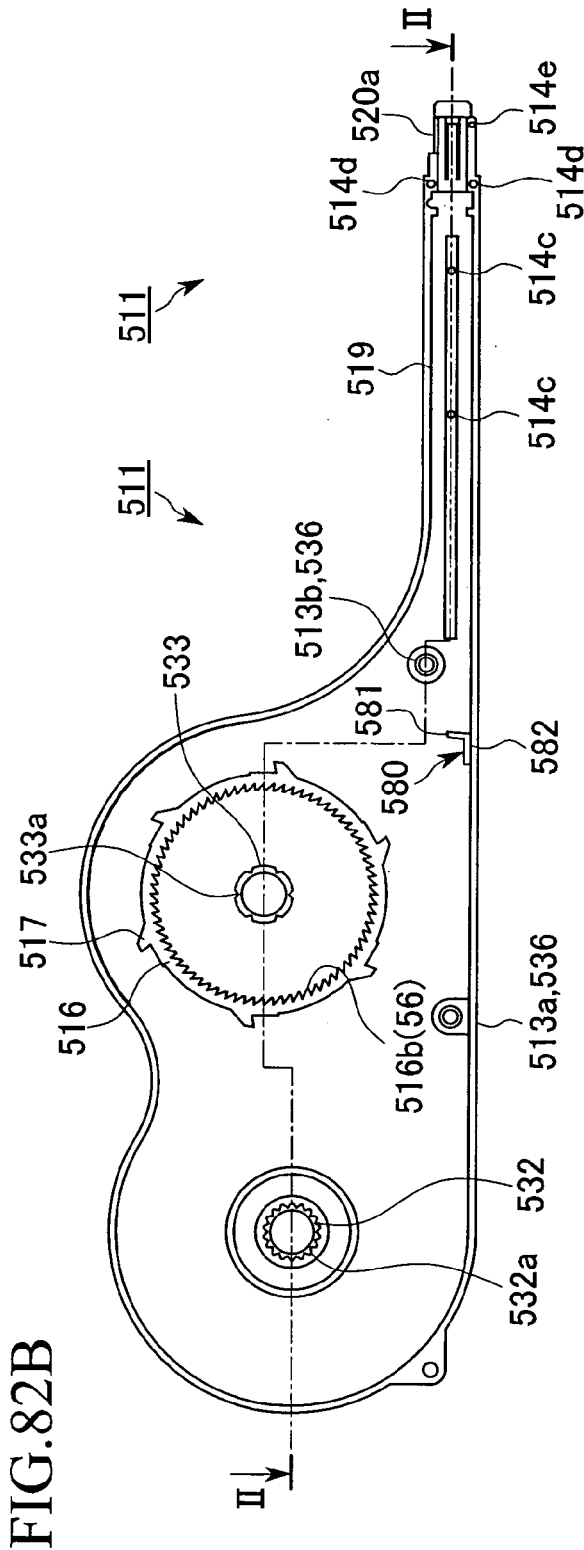
FIG. 82B is a front view thereof.
Figure 84:
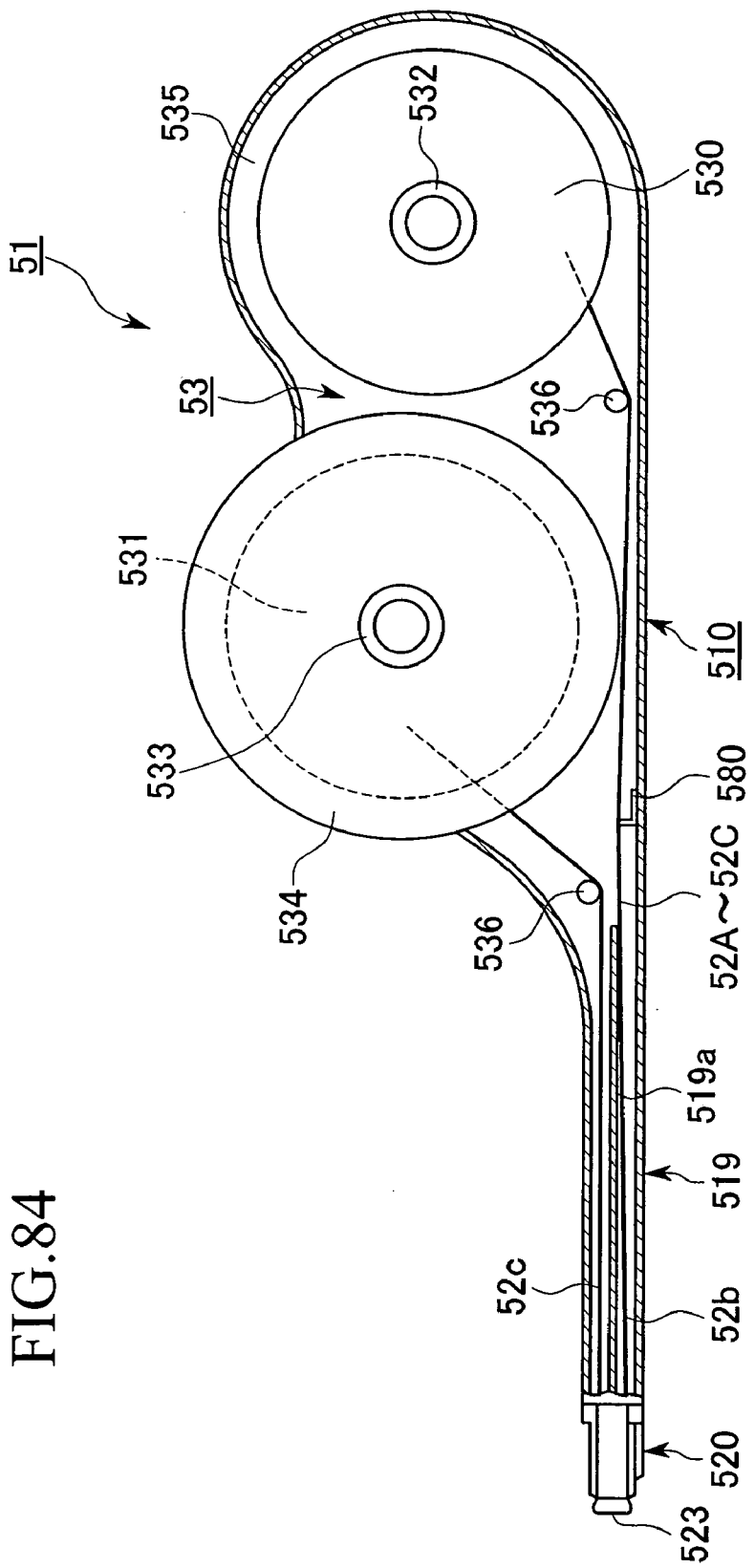
FIG. 84 is a sectional view showing the inside of the cleaning tool of FIGS. 81A and 81B.

As shown in FIGS. 82A, 82B and 84, a projecting wall 519a for reinforcing the narrow portion 519 is provided in the interior of the narrow portion 519 of the tool distal end portion. Since the path of the upstream side portion 52b of the cleaning tapes 52A to 52C that should be clean (hereafter referred to at times as the "upstream portion") heading from a supply reel 530 to the head member 523 and the path of the downstream side portion 52c of the cleaning tapes 52A to 52C that are soiled from wiping and cleaning (hereafter referred to at times as the "downstream portion") heading from the head member 523 toward a take-up reel 531 are partitioned by this projecting wall 519a, it exhibits the effect of suppressing migration of contaminants on the cleaning tapes 52A to 52C.

As shown in FIGS. 82A, 82B, 83A, 83B and 103, the insertion portion 520 is a two-split structure similar to the tool body 510, being formed by integration of insertion portion half-bodies 520a, 520b integrally formed with the case half-bodies 511, 512, respectively, accompanying the integration of the case half-bodies 511, 512.

Engaging recesses 521 for avoiding interference with the engaging claws of the elastic engaging pieces (described above) on the optical adaptor 570 when the insertion portion 520 is inserted in the optical adaptor 570 are formed on both sides in the width direction of the outer surface of the insertion portion 520. The engaging recesses 521 are not particularly necessary.

In addition, a key 522 to engage with a key groove 572a on the optical adaptor 570 is provided in a protruding manner on the insertion portion 520, whereby reverse insertion with respect to the optical adaptor 570 is blocked.

As shown in FIGS. 90A through 90D, 91, 95A, 95B, 96 and 102 and the like, a head composite body 54 having the head member 523 for causing the cleaning tape 52a to abut the connection end face 561a of the ferrule 561 is mounted at the distal end portion of the cleaning tool including the insertion portion 520.

The head composite body 54 is constituted to include the head member 523 having the distal end face 524 facing the connection end face 561a of the optical plug 560 to be cleaned during cleaning and a support mechanism 540 coupled to the side of a back face 527 of the head member 523 that is the side reverse to the distal end face 524 from the head member 523 and supports the head member 523.

The head composite body 54 is one in which the head member 523 and the support mechanism 540 are integrally formed, and can be manufactured from plastic such as polyoxymethylene (POM) using a suitable molding method.

The head composite body 54 is disposed between the upstream portion 52b of the cleaning tapes 52A to 52C that is the supply reel 530 side of the head member 523 and the downstream portion 52c of the cleaning tapes 52A to 52C that is the take-up reel 531 side of the head member 523. For this reason, the head composite body 54 does not inhibit feeding movement of the cleaning tapes 52A to 52C.

Figure 95A:
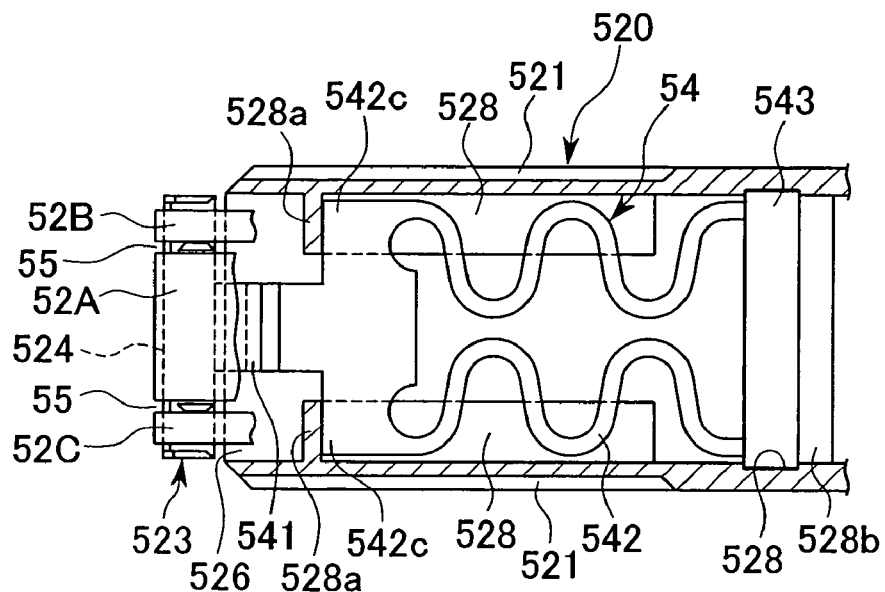
FIG. 95A is a plan sectional view of the tool distal end portion of the present cleaning tool.
Figure 95B:
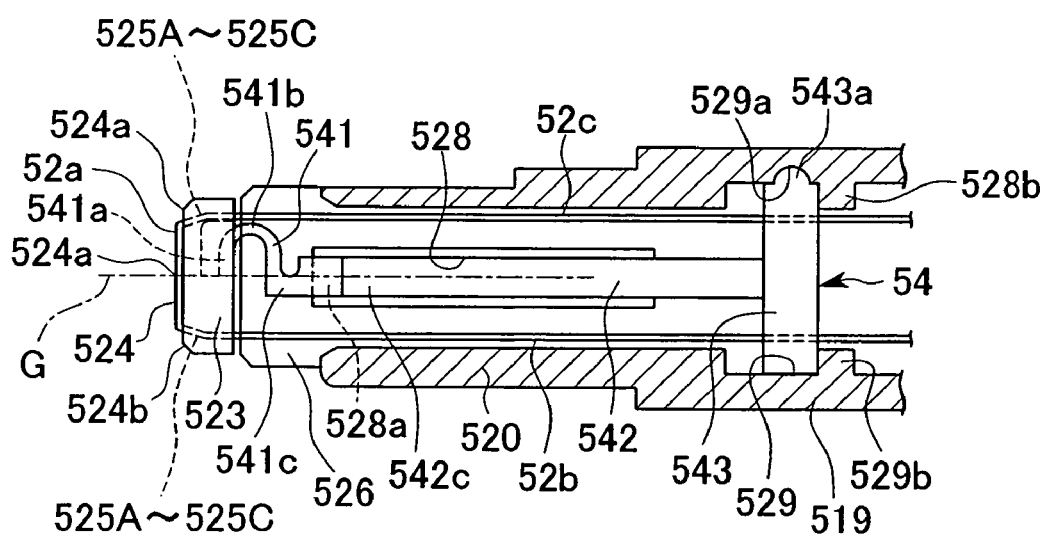
FIG. 95B is a front sectional view thereof.

As shown in FIGS. 95A, 95B and 102, the head member 523 has an approximately rectangular-shaped distal end face 524 and is able to effectively secure an abutting area with respect to the connection end face 561a of the optical plug 560. The distal end face 524 is provided at the insertion distal end (left side in FIGS. 95A, 95B) of the head member 523, and is exposed to the opening portion 526 of the insertion portion 520 distal end.

On the head member 523, a pair of guide pin insertion holes 523a are formed on both sides in the width direction of the insertion portion 520 as protruding member escape portions that can pass the protruding members (guide pins) 565 protruding from the connection end face 561a. The guide pin insertion holes 523a penetrate from the distal end face 524 of the head member 523 to the back face 527. Thereby, when the insertion portion 520 is inserted into the optical adaptor 570, interference between the head member 523 and the guide pins 565 can be avoided.

On the upstream side (here, the lower side in FIGS. 95B and 102) and the downstream side (here, the upper side in FIGS. 95B and 102) in the feeding direction of the cleaning tapes, guide grooves 525A, 525B, 525C to guide the feeding of the cleaning tapes 52A to 52C are provided on the head member 523 to oppose each other via the distal end face 524. These guide groves 525A, 525B, 525C function as a tape positioning mechanism.

Three pair of the guide grooves 525A, 525B, 525C are provided, corresponding respectively to the cleaning tapes 52A, 52B, 52C. The widths of the guide grooves 525A, 525B, 525C fit the widths of the cleaning tapes 52A, 52B, 52C. The cleaning tapes 52A, 52B, 52C are wrapped around the head member 523 by the guide grooves 525A, 525B, 525C on the upstream side and downstream side of the distal end face 524.

In this way, by disposing the cleaning tapes 52A to 52C in the guide grooves 525A, 525B, 525C, even when the head member 523 tilts, shifting of the positions of the cleaning tapes 52A to 52C and their coming off from the head member 523 is suppressed.

As shown in FIG. 102, on the distal end face 524 of the head member 523, the guide pin insertion holes 523a are disposed so as to open in the gaps 55 of the cleaning tapes 52A, 52B, 52C guided by the guide grooves 525A, 525B, 525C. The guide pins 565, 565 can thereby pass between the cleaning tapes 52A, 52B, 52C and be inserted in the guide pin insertion holes 523a, avoiding interference with the cleaning tapes 52A, 52B, 52C.

The support mechanism 540 has a tilting spring 541 protruding from the recess 527a formed in the back face 527 of the head member 523, a compression spring 542 coupled to the tilting spring 541, and a plate-shaped base portion 543 connected to the side of the compression spring 542 opposite the tilting spring 541.

The base portion 543 is fixed to mounting recesses 529 formed in the case of the cleaning tool (specifically, on the inner surface of the narrow portion 519 of the tool body 510).

The compression spring 542 functions as a coupling portion that expansively connects the tilting spring 541 and the base portion 543.

The shape and the like of the tilting spring 541 is not particularly limited, and as shown in FIGS. 95A, 95B, it is formed in a waveform having a plurality of rotational central axes 541a, 541b, 541c by means of bending curvature portions. These rotational central axes 541a, 541b, 541c all extend in the width direction of the insertion portion 520 (the direction perpendicular to the sheet of FIG. 95B).

At least one of the rotational central axes (here, 541b) is disposed in a position displaced in the thickness direction of the insertion portion 520 (vertical direction in FIG. 95B). It is in a twisted position (a positional relation of two straight lines in a space that neither intersect nor are parallel) with respect to a straight line G extending in the insertion direction (rightward in FIG. 95B) of the optical connector 560 from the center location 524c on the distal end face 524 of the head member 523.

The bending curvature portion 541b is rounded, so that even if the cleaning tape (downstream portion) 52c touches, there is no risk of it being damaged. In addition, even if the cleaning tape 52c touches the bending curvature portion 541b, it is the back face opposite the surface of the side that cleans the ferrule 561, and so there is no problem of migration of contaminants.

As shown in FIG. 95A, the compression spring 542 is a pair of waveform springs symmetrically disposed in the width direction (vertical direction in FIG. 95A) of the insertion portion 520. Corner portions 542c on the distal end thereof are housed in a pair of slide grooves 528 provided in the inner walls of both sides in the width direction of the insertion portion 520. The slide grooves 528 extend in the insertion and separation direction of the insertion portion 520 (horizontal direction in FIGS. 95A and 95B) and have end portion walls 528a that close the end portion of the distal end (left side in FIGS. 95A, 95B) of the insertion portion 520.

When a pushing pressure does not act on the distal end face 524 of the head member 523, the compression spring 542, by its own springing force, biases the corner portions 542c of the compression spring 542, causing them to abut the end portion walls 528a of the slide grooves 528. The corner portions 542c of the compression spring 542 are slidable in both directions along the slide grooves 528 by extension of the compression spring 542.

The base portion 543 is formed as a plate-shaped member so as to approximately plug the inner cross-section of the insertion portion 520. The base portion 543 is housed in the pair of mounting recesses 529 provided in a concave manner in opposition on both sides in the thickness direction of the narrow portion 519 of the tool distal end. The base portion 543 has an approximately semi-cylindrical fitting portion 543a that fits a fitting groove 529a formed in one of the mounting recesses 529.

When fitting together the case half-bodies 511, 512, by respectively housing the compression spring 542 in the slide grooves 528 and the base portion 543 in the mounting recesses 529, the compression spring 542 is compressed, and by the biasing force of the compression spring 542, the head composite body 54 is mounted between end portion walls 528a of the slide grooves 528 and a projecting wall 529b that protrudes on the rear-end side of the mounting recess 529.

The head composite body 54 is attached so that the fitting portion 543a fits into the fitting groove 529a.

Figure 90B:
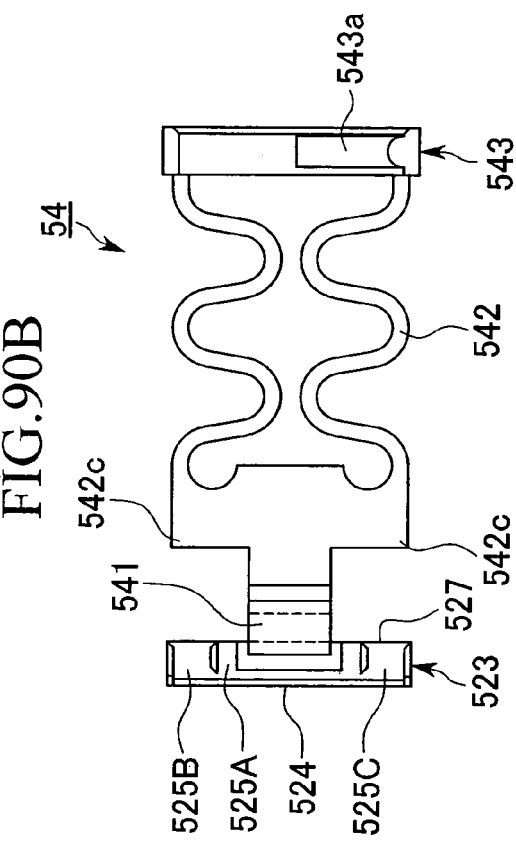
FIG. 90B is a plan view thereof.
Figure 90D:
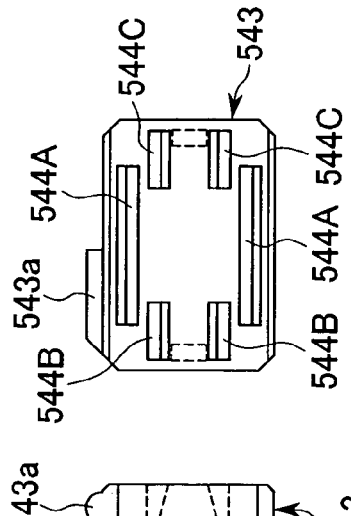
FIG. 90D is a right side view thereof.
Figure 90A:
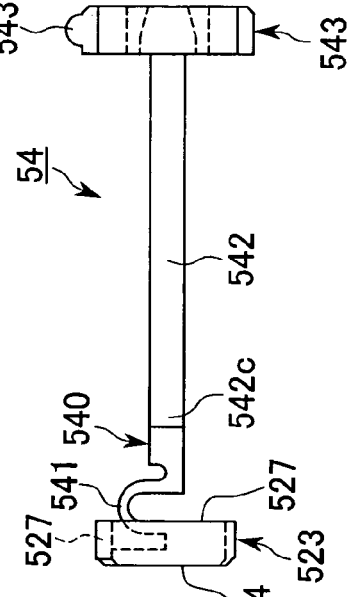
FIG. 90A is a front view of the tape abutting member of the optical connector cleaning tool of the eighth embodiment of the present invention.
Figure 90C:
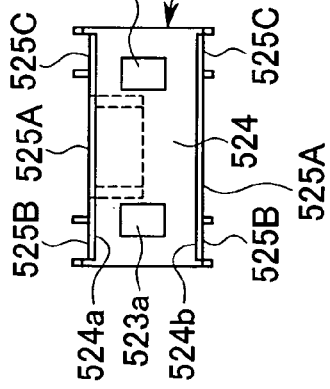
FIG. 90C is a left side view thereof.
Figure 91:
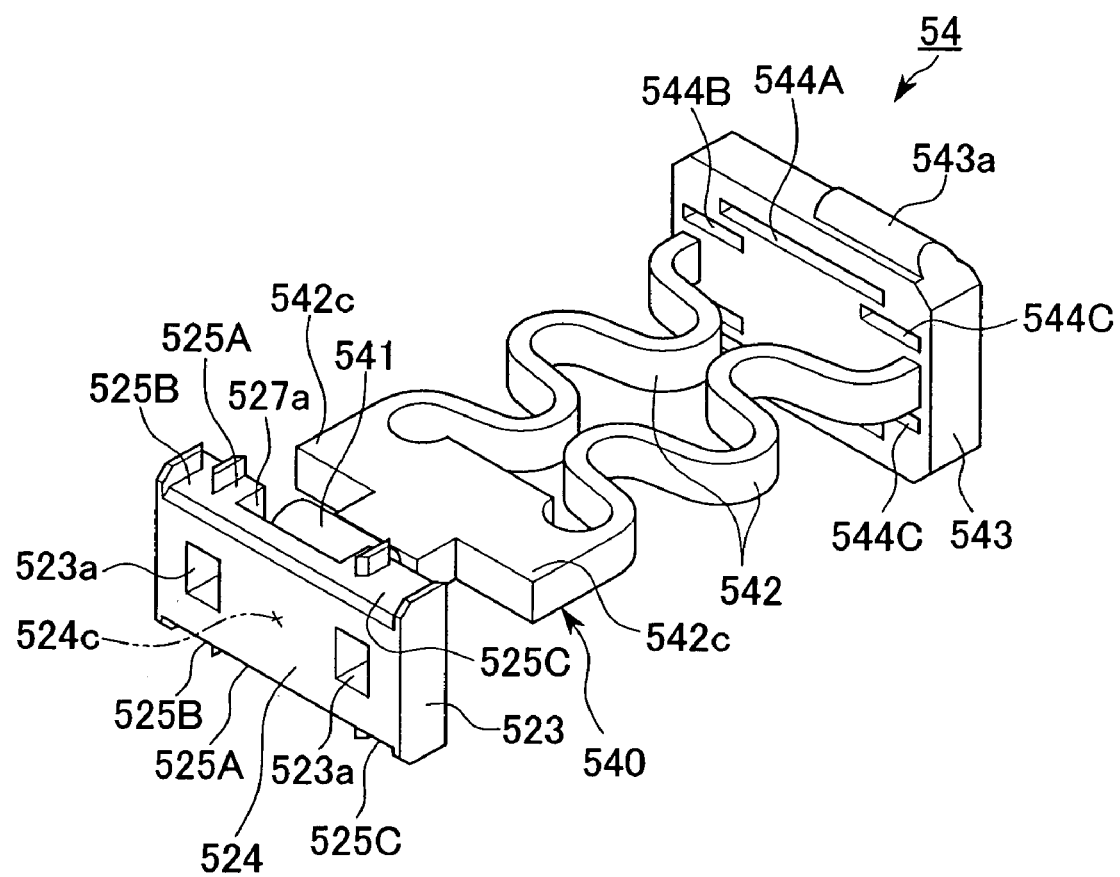
FIG. 91 is a perspective view of the tape abutting member shown in FIGS. 90A to 90D.

As shown in FIG. 90D and the like, long holes 544A, 544B, 544C through which the cleaning tapes are inserted are provided on the base portion 543. Here, three pair of the long holes 544A, 544B, 544C are provided, corresponding to the three cleaning tapes 52A, 52B, 52C. The upstream side tape 52b and the downstream side tape 52c of the head member 523 are inserted into each pair of the long holes 544A, 544B, 544C.

By inserting the cleaning tapes 52A, 52B, 52C into the long holes 544A, 544B, 544C, when assembling the cleaning tool 51, the cleaning tapes 52A to 52C do not come off the head composite body 54, leading to good attachment workability even when the cleaning tapes 52A, 52B, 52C are a plurality (here, three).

The long holes 544A, 544B, 544C are stepped in accordance with the thickness direction (vertical direction in FIG. 90D) of the insertion portion 520 instead of being arranged in a row in the width direction of the insertion portion 520. This is in order to be able to ensure that the dimensions of the long holes 544A, 544B, 544C in the width direction are sufficiently larger than the widths of the cleaning tapes 52A, 52B, 52C to be inserted without merging into each other.

Figure 96:
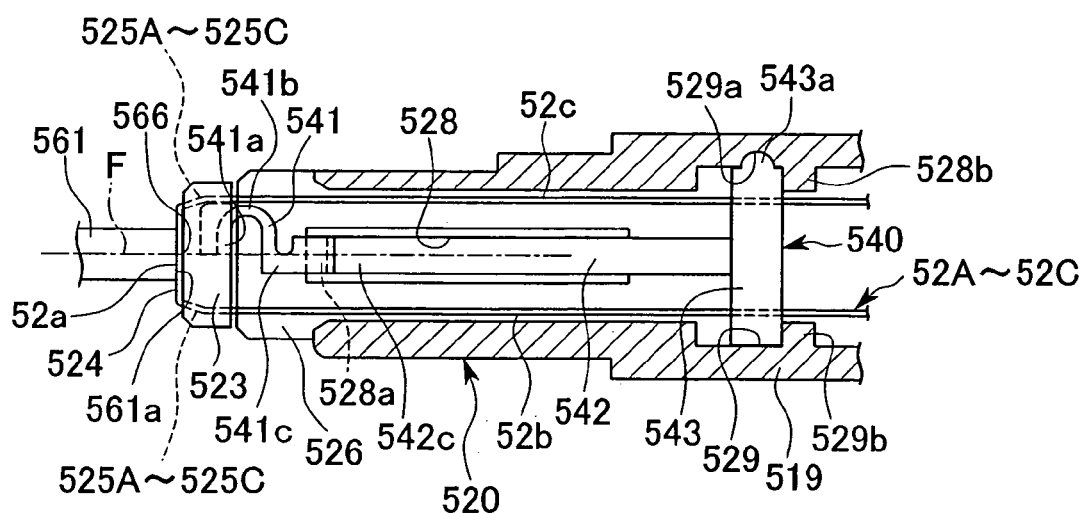
FIG. 96 is a sectional view showing an example of a possible state of the tape abutting mechanism of the preset cleaning tool.
Figure 97:
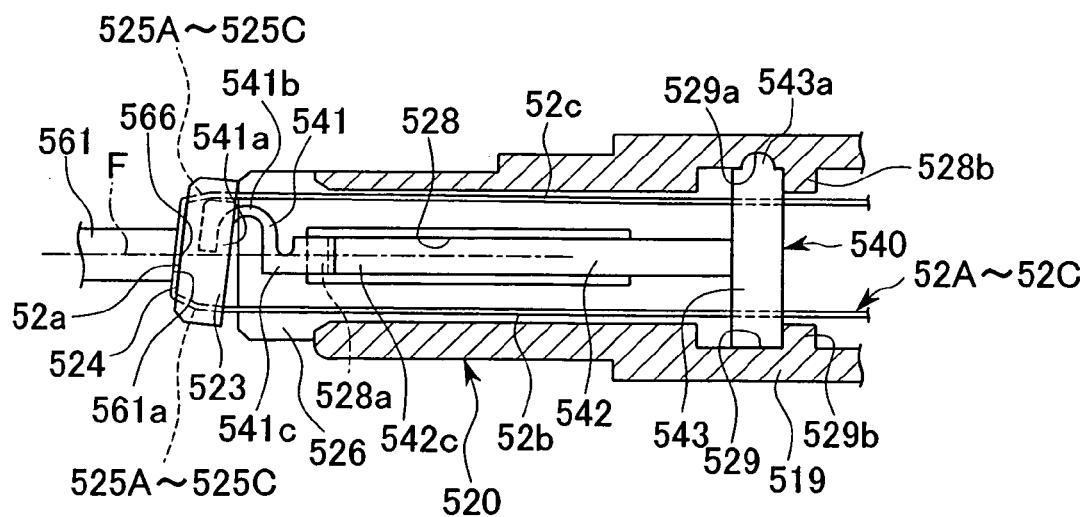
FIG. 97 is a sectional view showing another example of a possible state of the tape abutting mechanism of the preset cleaning tool.

As shown in FIGS. 96 and 97, the aforementioned head composite body 54 is constituted so that when a pushing pressure against the head member 523 is transmitted to the compression spring 542, the head member 523 is able to retreat in the separation direction (rightward in FIGS. 96 and 97) of the insertion portion 520.

FIG. 96 shows the case of the connection end face 561a of the optical plug 560 being perpendicularly polished with respect to the optical axis (longitudinal direction in FIG. 96). In addition, FIG. 97 shows the case of the connection end face 561a of the optical plug 560 being obliquely polished with respect to the optical axis.

In the case of the optical plug 560 having an obliquely polished connection end face 561a, as shown in FIG. 97, upon the application of a pushing pressure on the head member 523 that is uneven with the side of a top end edge 524a and the side of a bottom end edge 524b of the distal end face 524, the tilting spring 541 elastically deforms so that the distal end face 524 can tilt upward or downward (vertically in FIG. 97) in the thickness direction of the insertion portion. FIG. 97 shows the state of the head member 523 tilted upward.

Figure 98:
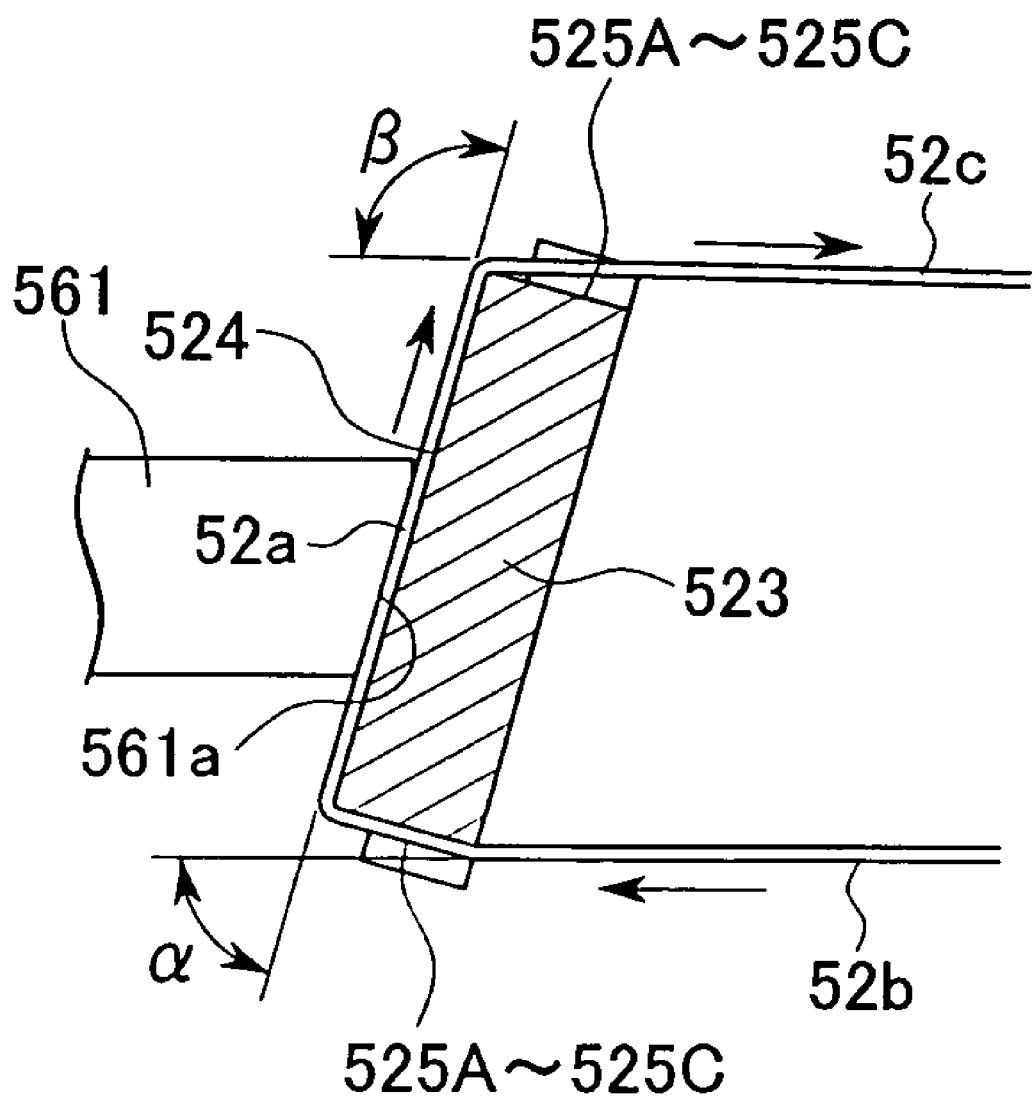
FIG. 98 is a sectional view showing another example of a possible state of the tape abutting mechanism of the preset cleaning tool.

As shown in FIGS. 97 and 98, in the case of the connection end face 561a of the optical plug 560 being one that is obliquely polished, when the distal end face 524 of the head member 523 faces and abuts the connection end face 561a of the optical plug 560, the angle (hereafter referred to on occasion as angle α) formed by the feeding direction of the upstream side cleaning tape 52b supplied to the head member 523 and the feeding direction of the cleaning tape 52a moving along the distal end face 524 of the head member 523 is an acute angle. Also, the angle (hereinafter referred to on occasion as angle β) formed by the feeding direction of the cleaning tape 52a moving along the distal end face 524 of the head member 523 and the feeding direction of the downstream side cleaning tape 52c sent away from the head member 523 is an obtuse angle. In other words, the aforementioned angle α is smaller than the aforementioned angle β (α<β).

In the cleaning tool 51 of the eighth embodiment, the relationship of the aforementioned angles α, β becoming α>β is prevented by engagement of a key and a key groove to prevent reverse insertion, such as engagement of the key 562a of the optical plug 560 and the key groove 572a of the optical adaptor 570, and engagement of the key 522 of the insertion portion 520 of the cleaning tool 51 and the key groove 572a of the optical adaptor 570.

In this way, by the aforementioned angle α becoming smaller than the aforementioned angle β (α<β), the cleaning tape contacts the guide grooves 525A to 525C of the head member 523 at the upstream side 52b of the distal end face 524, and is in a state raised from the guide grooves 525A to 525C of the head member 523 at the downstream side 52c. Because of this, when the cleaning tapes 52a to 52c are fed in the feeding direction (the direction shown by the straight arrows in FIG. 98), the head member 523 is rotated in the feeding direction of the cleaning tapes 52a to 52c by the friction between the upstream portion 52b of the cleaning tapes and the head member 523, which acts to press the cleaning tape 52a onto the connection end face 561a. In addition, at the downstream side of the distal end face 524, the friction between the cleaning tape 52c and the head member 523 is relatively less, and so the rotating action in the direction of pulling the head member 523 and the cleaning tape 52a away from the connection end face 561a is small. Accordingly, the cleaning tape 52a abuts the connection end face 561a well, and the cleaning efficiency of the connection end face 561a improves.

Moreover, as shown in FIGS. 96 and 97, when the connection end face 561a of the optical plug 560 is abutted on the distal end face 524 of the head member 523, the rotational axis line of the bending curvature portion 541b is in a twisted position (a positional relation of two straight lines in a space that neither intersect nor are parallel) with respect to a straight line F extending in the insertion direction (rightward in FIGS. 96 and 97) of the optical connector 560 from the center location 566 of the connection end face 561a of the optical plug 560.

Accordingly, when the head member 523 tilts, the center location 566 of the connection end face 561a of the optical plug 560 can be in a positional relation aligned with the center location 524c on the distal end face 524 of the head member 523, with no uneven contact, so that the pushing pressure onto the connection end face 561a acts sufficiently uniformly. Accordingly, the connection end face 561a can be uniformly cleaned by the cleaning tape.

In addition, the distance between the straight line F and the rotational axis line of the bending curvature portion 541b (rotational radius) is secured, the torque produced centered on the rotational central axis by the pushing pressure applied to the distal end face 524 of the head member 523 from the connection end face 561a is secured, thereby facilitating smooth rotation of the head member 523, and the distal end face 524 of the head member 523 easily follows the direction of the connection end face 561a.

Here, in the optical connector cleaning tool 51 of the present embodiment, as shown in FIGS. 84, 92, 93A, and 93B, a scraper 580 abuts the portion of the cleaning tape supplied to the head member 523 (upstream portion 52b of the tape). In the present embodiment, the scraper 580 is disposed in a position between the supply reel 530 and the head member 523 in the path of the cleaning tapes 52A to 52C.

Here, the scraper 580 is, for example, formed in a roughly L-shaped cross section, constituted from a base portion 582 integrated with the case of the tool body 510 and a protruding plate portion 581 provided in a protruding manner from the base portion 582 to the inner space of the case. The scraper 580 may be integrally resin molded with either one of the case half-bodies 511, 512, or it may be integrated with the case by bonding a separately molded component with the case half-bodies 511, 512.

Figure 92:
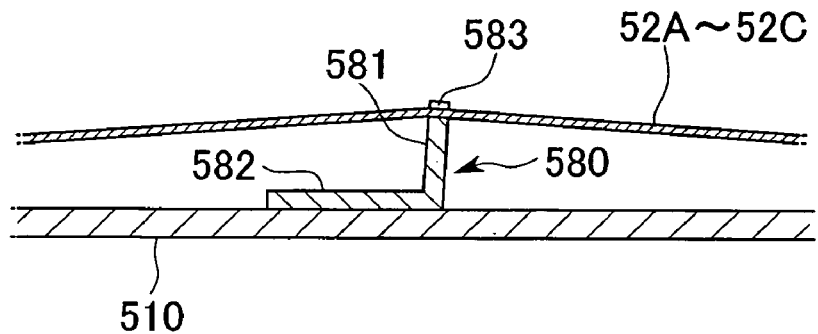
FIG. 92 is a partially enlarged sectional view of the vicinity of the scraper.

The direction in which protruding plate portion 581 of the scraper 580 protrudes from the base portion 582 is in the present embodiment slightly tilted to the downstream side with respect to the feeding direction of the cleaning tapes 52A to 52C (the direction heading from left to right in FIG. 92.) as shown in FIGS. 82B and 92. The protruding direction of the protruding plate portion 581 is not particularly limited, and it may tilt to the upstream side with respect to the feeding direction of the tapes 52A to 52C or be perpendicular to the feeding direction of the tapes 52A to 52C.

Figure 93A:
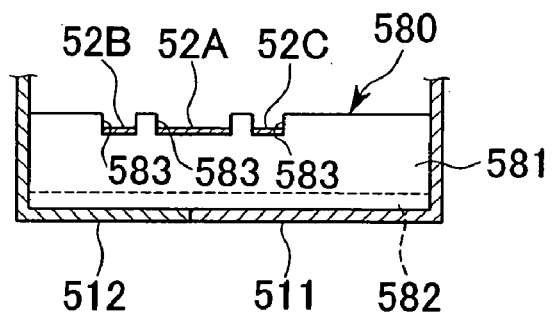
FIG. 93A is a partially enlarged view of the vicinity of the scraper showing an example of the scraper.

As shown in FIGS. 92 and 93A, guide grooves 583 that prevent shifting of the cleaning tapes 52A to 52C in the width direction are formed at the distal end portion of the protruding plate portion 581 of the scraper 580. Three guide grooves 583 are provided, corresponding to the cleaning tapes 52A, 52B, 52C. The widths of the guide grooves 583 match the widths of the cleaning tapes 52A, 52B, 52C. Thus, by guiding the cleaning tapes 52A to 52C with the guide grooves 583, shifting of the positions of the cleaning tapes 52A to 52C and their coming off from the scraper 580 is suppressed.

Figure 93B:
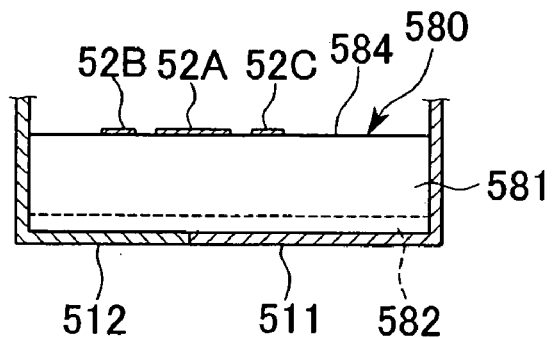
FIG. 93B is a partially enlarged view of the vicinity of the scraper showing a modification example of the scraper.

In the scraper 580, as shown in FIG. 93B, a distal end portion 584 of the protruding plate portion 581 that abuts the cleaning tapes 52A to 52C may be flat.

The distal end portion of the scraper 580 abuts the cleaning surface of the cleaning tapes 52A to 52C (the outside surface in the path of the tapes, the surface that abuts the connection end face 561a. In FIG. 92, the underside surface). In the state of causing the scraper 580 to abut the cleaning tape, as shown in FIGS. 84 and 92, the upstream portion 52b of the tape stretched between the head member 523 and the guide pin 536 is pushed slightly to the inside (upward in FIG. 92) of the tape path by the scraper 580. Thereby, the abutting force between the tape and the scraper 580 is secured, so that foreign matter adhering to the cleaning tape is scraped off by the scraper 580 during the feeding movement of the cleaning tapes 52A to 52C.

Figure 94D:
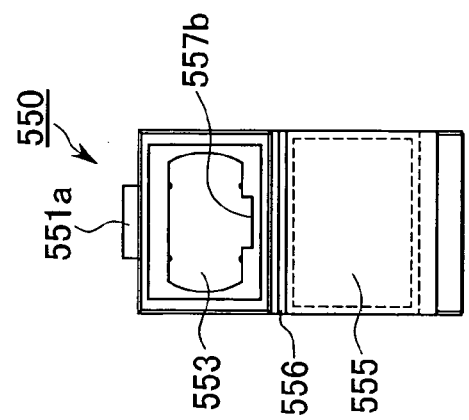
FIG. 94D is a right side view thereof.
Figure 94B:
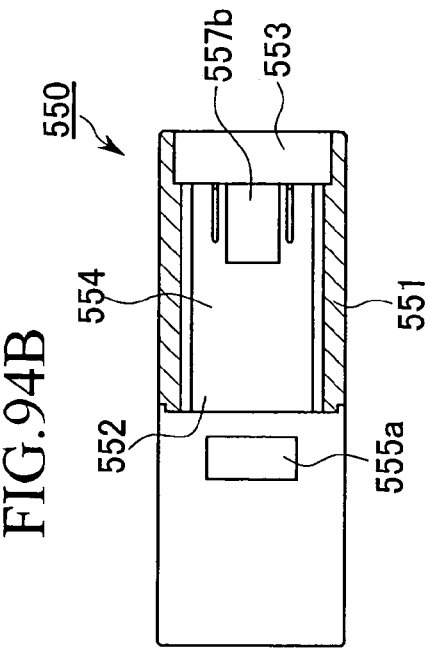
FIG. 94B is a plan view thereof.
Figure 94A:
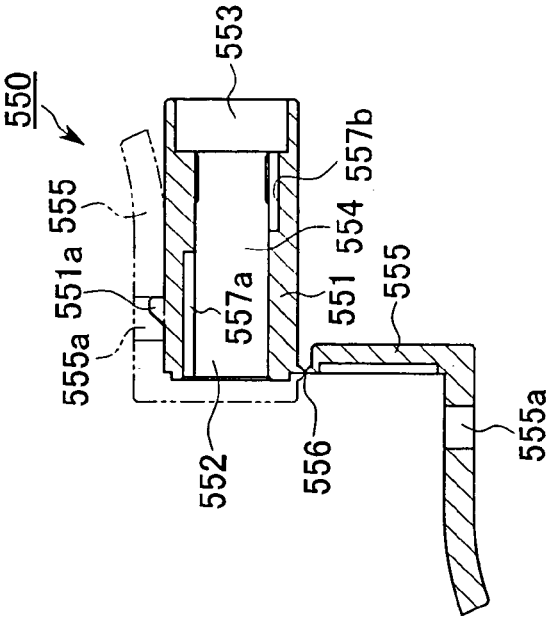
FIG. 94A is a front view of the guide cap of the present cleaning tool.
Figure 94C:
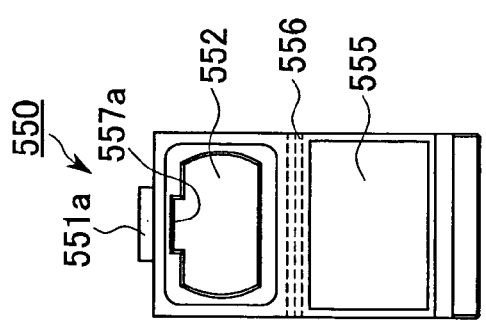
FIG. 94C is a left side view thereof.
Figure 100:
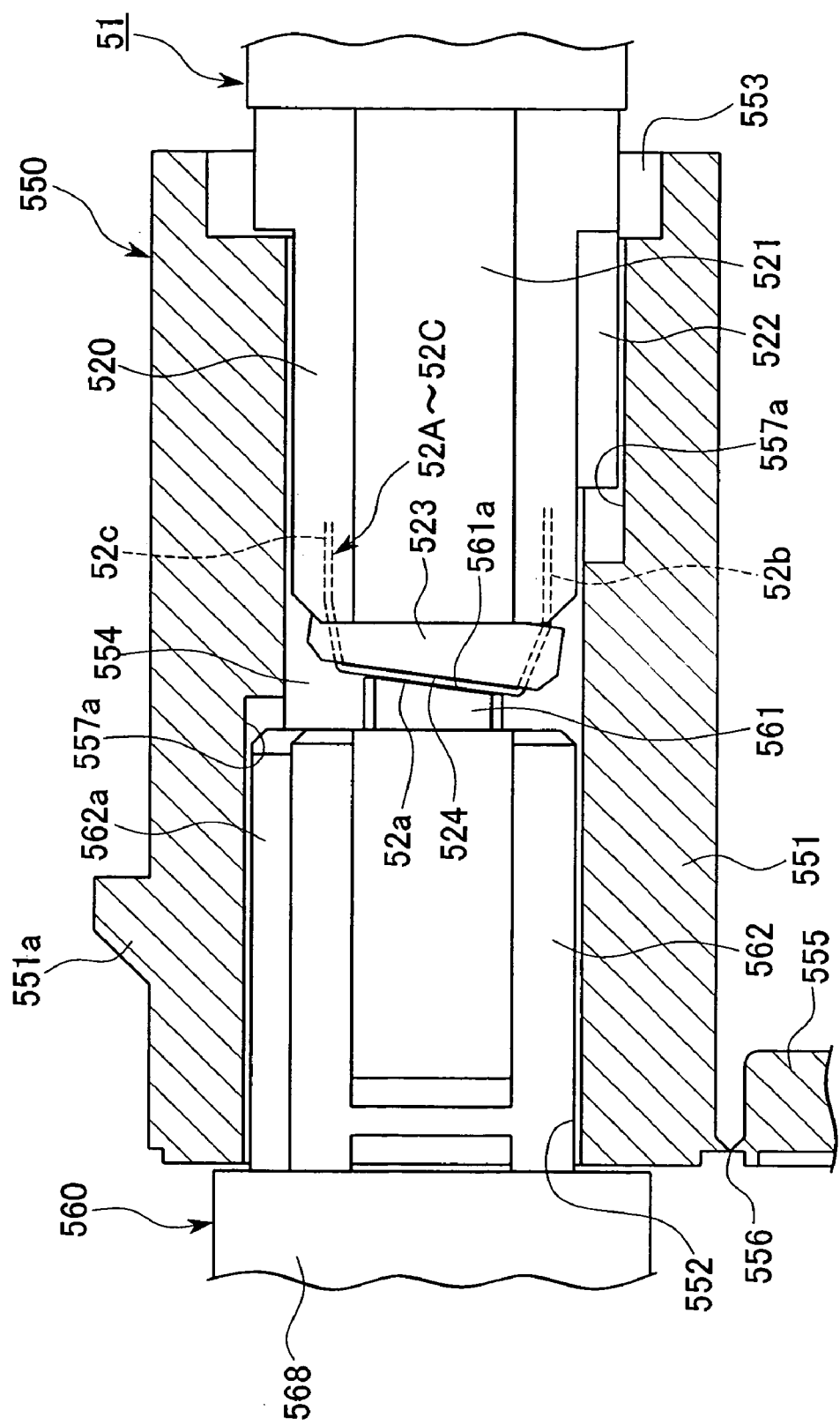
FIG. 100 is a sectional view showing an example of the state of the insertion portion of the present cleaning tool and the optical connector plug inserted in the guide cap.

As shown in FIGS. 94A to 94B and 100, a guide cap 550 has a guide body 551 formed in an approximately sleeve shape (tube shape) from plastic and the like and a lid 555 connected to one end of the guide body 551 by a hinge 556. A fitting hole 555a that fits a projection 551a provided in a protruding manner on the guide body 551 is formed in the lid 555, so that by flexing the hinge 556 to fit the fitting hole 555a of the lid 555 with the projection 551a on the guide body 551, the lid 555 can be maintained in a closed state.

The end of the guide body 551 on the lid 555 side has a plug insertion port 552 (first port) in which the optical plug 560 is inserted, and the other end opposite the plug insertion port 552 has an insertion portion insertion port 553 (second port) in which the insertion portion 520 of the cleaning tool 51 is inserted. The plug insertion port 552 and the insertion portion insertion port 553 are interconnected through an internal space 554 of the guide cap 550.

By insertion of the optical plug 560 from the plug insertion port 552 and insertion of the insertion portion 520 of the cleaning tool 51 from the insertion portion insertion port 553, the guide cap 550 can house the distal end portion of the optical plug 560 including the connection end face 561a and the insertion portion 520 of the cleaning tool 51 in the internal space 554 of the guide cap 550 in a state of facing each other.

A key groove 557a to fit a key 562a provided in a protruding manner on the outer surface of the housing 562 of the optical plug 560 is provided on an inner wall on the plug insertion port 552 side of the guide body 551. Also, a key groove 557b to fit a key 522 provided in a protruding manner on the outer surface of the insertion portion 520 of the cleaning tool 51 is provided on the inner wall of the insertion portion insertion port 553 side of the guide body 551.

For this reason, in the guide cap 550, when the orientation of the keys 562a, 522 and the key grooves 557a, 557b do not align, the optical plug 560 and the insertion portion 520 of the cleaning tool 51 cannot be inserted into the guide body 551. In the case of the connection end face 561a of the optical plug 560 being obliquely polished, errors of inserting the optical plug 560 in the guide cap 550 with its orientation in the thickness direction reversed (reverse insertion) are thereby prevented.

The guide cap 550 is detachably mounted on the insertion portion 520. More specifically, when cleaning of the optical plug 560 is not being carried out, the guide cap 550 can be in a state of the insertion portion 520 of the cleaning tool 51 inserted in the insertion portion insertion port 553. In addition, as shown by the chain double-dashed line in FIG. 94A, closing the lid 555 that covers up the plug insertion port 552 of the guide cap 550 can inhibit ingress of debris, dust and water and the like into the internal space 554 of the guide cap 550, thereby enabling the internal space 554 to be constantly maintained in a clean state.

As shown in FIGS. 84 and 85, a tape feeding mechanism (hereinafter referred to on occasion as "tape feeding mechanism 53") that feeds the cleaning tapes 52A to 52C is provided in a storage space 535 of the tool body 510 as a driving mechanism.

This tape feeding mechanism 53 is provided with the supply reel 530 wound with the cleaning tapes 52A to 52C, the take-up reel 531 that takes up and collects the cleaning tapes 52A to 52C after use, and an operation dial 534 that operates the feeding of the cleaning tapes 52A to 52C.

The supply reel 530, the take-up reel 531 and the operation dial 534 can be manufactured by forming from plastic such as polystyrene (PS) or polyoxymethylene (POM, polyacetal) with a mold.

On the inside (the side facing the storage space 535) of the first case half-body 511, a supply reel support shaft 532 on which the supply reel 530 is rotatably mounted and a take-up reel support shaft 533 on which the take-up reel 531 and the operation dial 534 are rotatably mounted are provided to protrude toward the second case half-body 512.

Here, the supply reel support shaft 532 and the take-up reel support shaft 533 are integrally formed with one case half-body 511. By fitting the distal ends of the support shafts 532, 533 into fitting holes 532a, 533a provided in the other case half-body 512, both case half-bodies 511, 512 are bridged in the storage space 535 to be able to hold the supply reel 530 and the take-up reel 531 without dropping them.

Between the supply reel 530 and the take-up reel 531, the cleaning tapes 52A to 52C are stretched in the storage space 535 along pin-shaped tape guides 536. Midway, they are wrapped around the head member 523 housed in the insertion portion 520. As shown in FIG. 82A, 82B, here the tape guides 536 are provided as the outer circumferential surface of the fitting pins 513a, 513b provided in a protruding manner from the first case half-body 511.

Ratchet grooves 532c, 533c extending in the axial direction of the reel support shafts 532, 533 are provided around the outer circumference of the supply reel support shaft 532 and the take-up reel support shaft 533. These ratchet grooves 532c, 533c can engage with a projection of a ratchet arm of the supply reel 530 and the take-up reel 531 described hereafter.

As shown in FIG. 85, the same number (here, three) of the supply reels 530 and the take-up reels 531 are provided as the number of tapes 52A, 52B, 52C. The reels 530, 531 are supported side by side by the supply reel support shaft 532 and the take-up reel support shaft 533, respectively.

Figure 88A:
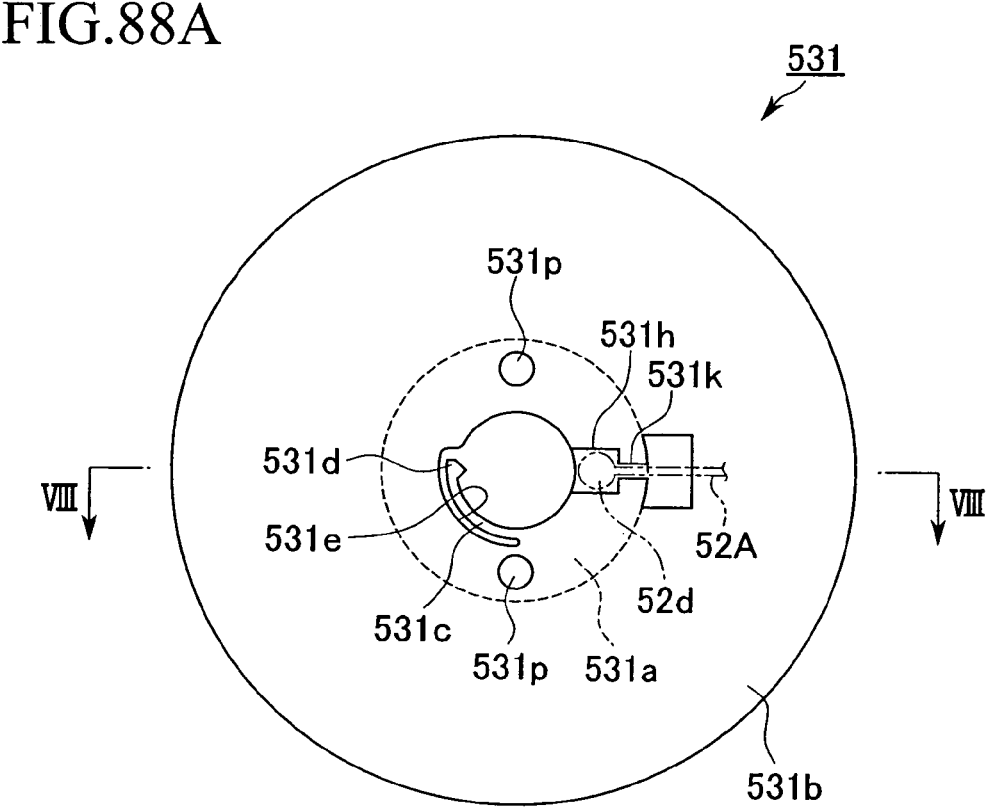
FIG. 88A is a front view showing an example of the supply reel and take-up reel of the present cleaning tool.
Figure 88B:
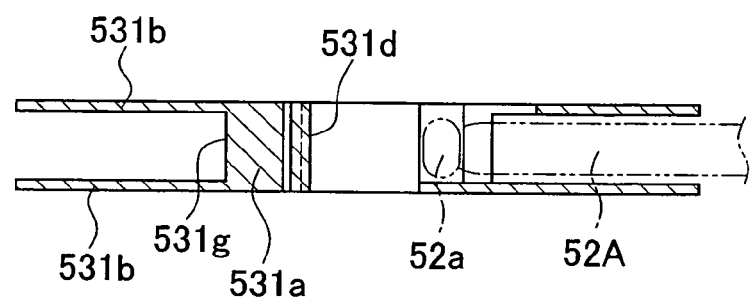
FIG. 88B is a sectional view along line VIII—VIII.
Figure 89:
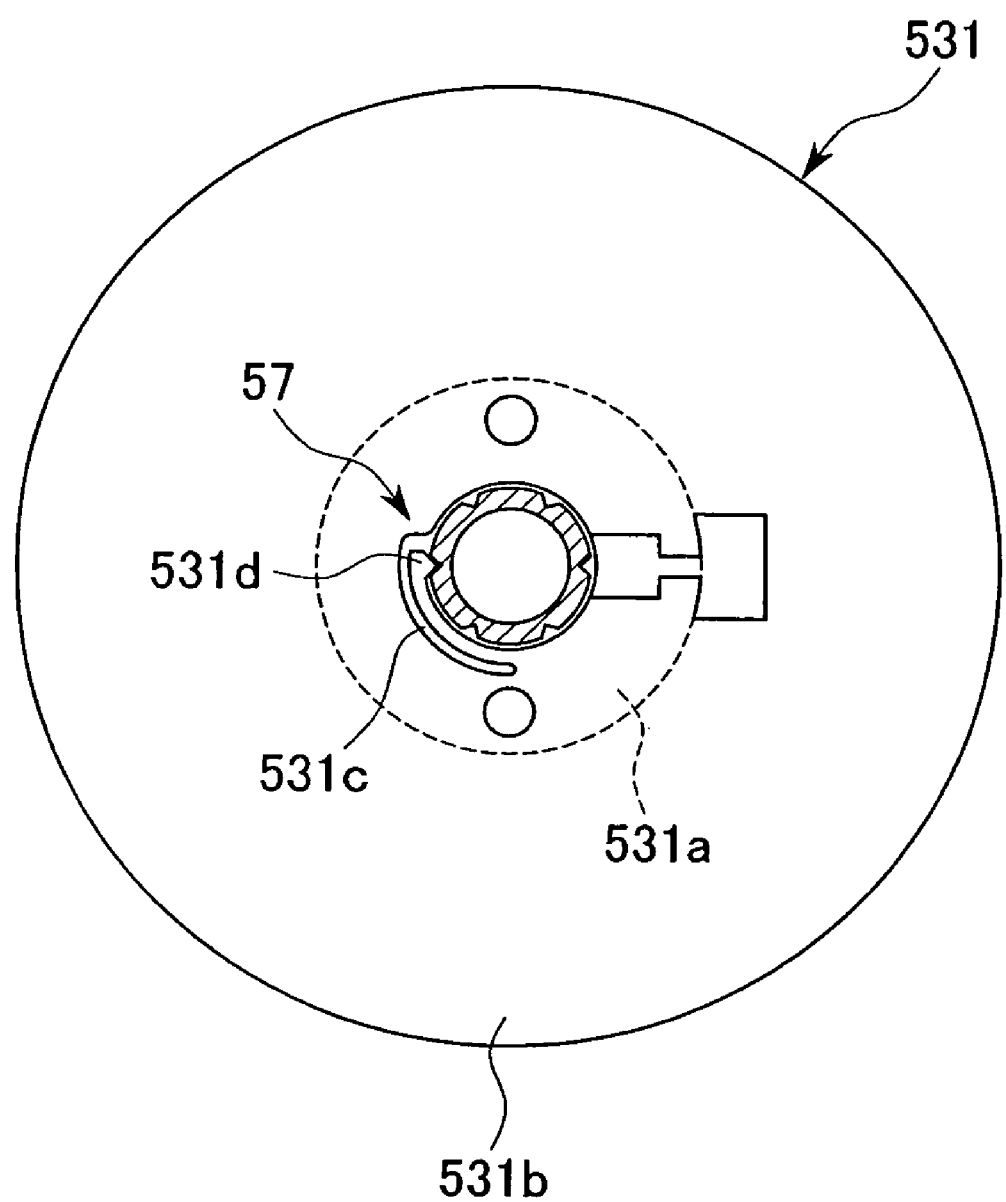
FIG. 89 is a partial sectional view showing the state of the supply reel and take-up reel shown in FIGS. 88A and 88B mounted on the support shaft.

FIGS. 88A, 88B and 89 show an example of the take-up reel 531 wound with the cleaning tape 52A. The take-up reel 531 is one in which a hollow cylindrical winding core portion 531a and side plate portions 531b, 531b formed on both ends of the winding core portion 531a are integrally formed from plastic or the like. One cleaning tape is wound around one take-up reel 531. The spacing between the two side plate portions 531b, 531b is set to match the width of the cleaning tape wound therearound.

An insertion hole 531h (through hole) that opens facing the outer circumferential surface 531g of the winding core portion 531a is formed in the winding core portion 531a, and the insertion hole 531h includes a narrow portion 531k. As a way of attaching the end portion of the cleaning tape to the take-up reel 531, there are no particular limitations, however, as shown in FIGS. 88A and 88B, one way is to form a bunched-up knot 52d at one end of the cleaning tape 52A inserted in the insertion hole 531h of the take-up reel 531 and prevent the knot 52d from being pulled out of the narrow portion 531k.

A ratchet arm 531c is formed on the inner surface of the winding core portion 531a of the take-up reel 531. An approximately semi-cylindrical projection 531d is formed at the distal end of the ratchet arm 531c facing the center in the radial direction of the take-up reel 531. A concave portion 531e is formed on the inner surface of the winding core portion 531a so as to accommodate the ratchet arm 531c. The ratchet arm 531c is able by elastic deformation to allow the projection 531d to oscillate in the radial direction of the take-up reel 531.

The projection 531d of the ratchet arm 531c engages with the ratchet grooves 533c provided around the periphery of the take-up reel support shaft 533 when the take-up reel is supported on the take-up reel support shaft 533. When the take-up reel 531 rotates, the projection 531d repeatedly engages and disengages with the ratchet grooves 533c due to elastic deformation of the ratchet arm 531c, thereby imparting rotation resistance to rotation of the take-up reel 531. As a result, a constant tension force is required for the feeding movement of the cleaning tape, and slippage of the take-up reel 531 is suppressed. More specifically, the ratchet arm 531c of the take-up reel 531 and the ratchet grooves 533c of the take-up reel support shaft 533 function as a rotation resistance imparting mechanism 57 that imparts rotation resistance to rotation of the take-up reel 531.

The constant tension force permitting the feeding movement of the cleaning tapes 52A to 52C is to an extent such that stretching of the cleaning tapes due to tensioning by the tape feeding mechanism 53 does not exert an adverse effect on cleaning, and such that the tapes cannot be fed just by swinging or carrying the cleaning tool 51.

The take-up reels 531 around which the cleaning tapes 52B, 52C are spooled have the same constitution as the take-up reel 531 for the cleaning tape 52A shown in FIGS. 88A and 88B, except for different spacing between their side plate portions 531b, 531b, and so their illustration is omitted.

Also, reels similar to the take-up reels 531 can be used as the supply reels 530.

Similarly to the take-up reels 531, a ratchet arm having a projection that engages with the ratchet grooves 532c provided around the periphery of the supply reel support shaft 532 is provided on the supply reels 530, and the aforementioned rotation resistance imparting mechanism is constituted.

Figure 86A:
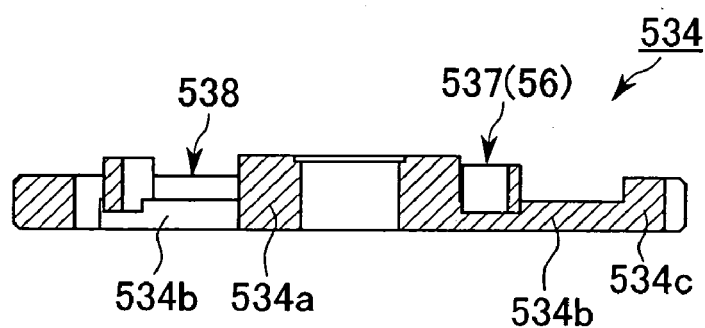
FIG. 86A is a sectional view along line VI—VI showing an example of the dial of the present cleaning tool.
Figure 86B:
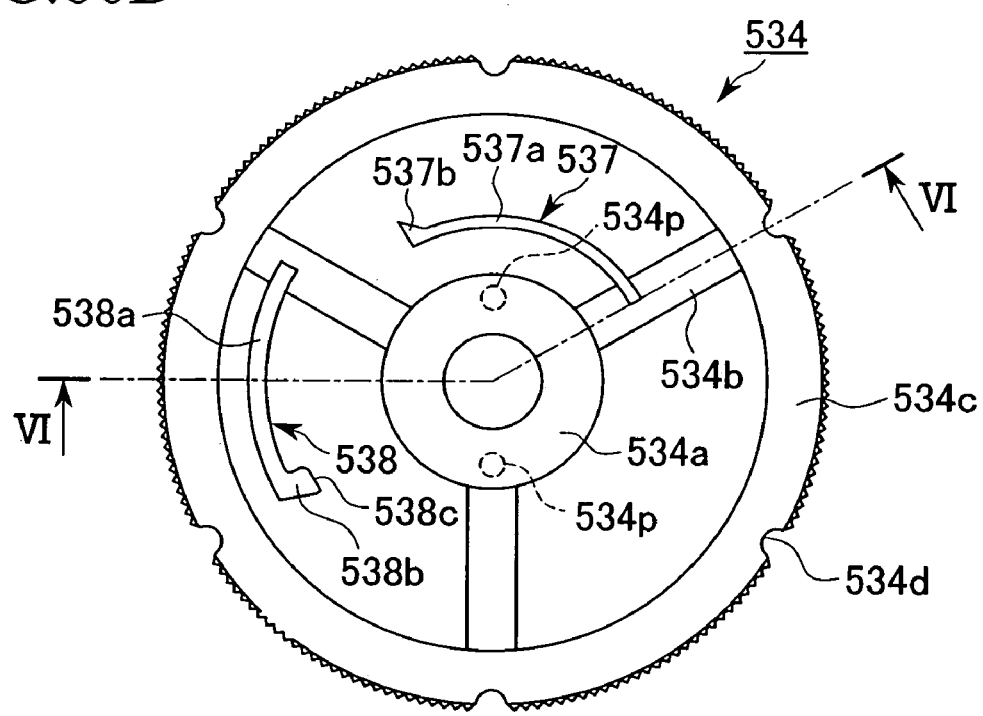
FIG. 86B is a front view thereof.
Figure 87:
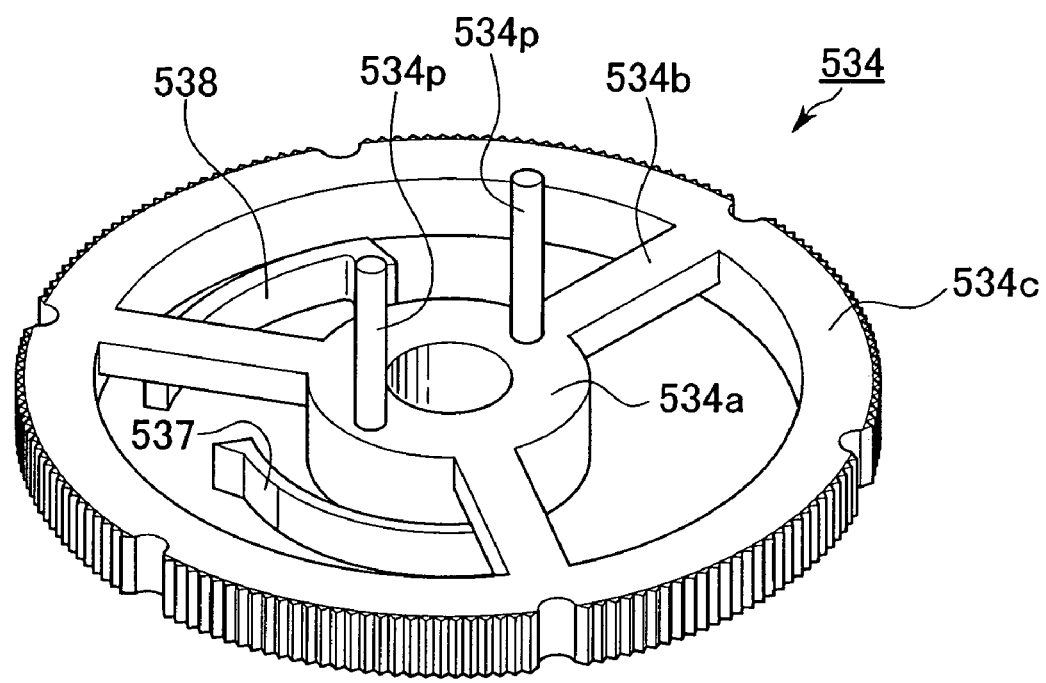
FIG. 87 is a perspective view of the dial of FIGS. 86A and 86B.

The operation dial 534 is mounted on the outer circumference of the take-up reel support shaft 533 so as to be concentric with the take-up reel 531. As shown in FIGS. 86A, 86B and 87, the operation dial 534 is one in which a hub portion 534a that is penetratingly installed in the take-up reel support shaft 533, a rim portion 534c that has a knurled surface on its periphery, and a plurality of spoke portions 534b connecting the hub port ion 534a and the rim portion 534c are integrally formed from plastic and the like. A ratchet arm 537 having an engaging claw 537b formed in a protruding manner on the distal end of an arm portion 537a extending in the circumferential direction of the operation dial 534 is provided on one of the plurality of spoke portions 534b. In addition, a hammer arm 538 having a hammerhead portion 538b formed in a protruding manner at the distal end of an arm portion 538a extending in the circumferential direction of the operation dial 534 is provided on another spoke portion 534b. The arm portions 537a, 538a of the ratchet arm 537 and the hammer arm 38 are elastically deformable.

Figure 81B:
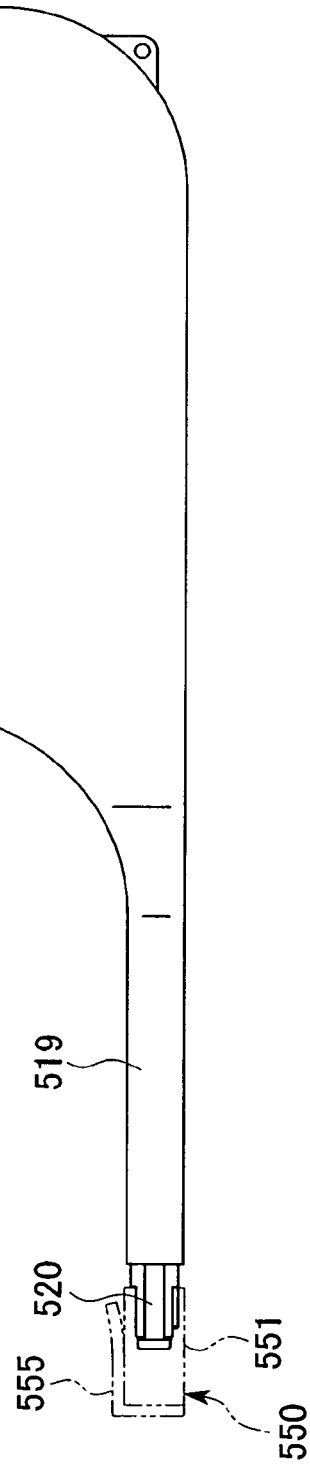
FIG. 81B is a front view thereof.

As shown in FIGS. 81A and 81B, a portion of the operation dial 534 is exposed to outside the tool body 510 from a window 511a provided on a side surface of the tool body 510.

The operation dial 534 and the take-up reel 531 are coupled so as to be integrated by fitting pins 534p formed on the operation dial into insertion holes 531p formed in the take-up reel 531.

The radius of the operation dial 534 is greater than the radius of the take-up reel 531. As a result, the length of the cleaning tapes 52A to 52C spooled onto the take-up reel 531 is smaller than the amount of operation of the operation dial 534 (displacement amount along the outer circumference of the operation dial 534) by just as much as the radial ratio. For this reason, very small feeding amounts of the cleaning tapes 52A to 52C can be easily achieved.

As shown in FIGS. 82A and 82B, the tape feeding mechanism 53 can be driven by operating the operation dial 534 by finger or the like to rotate it in the prescribed direction. More specifically, by rotation of the operation dial 534, the take-up reel 531 rotates to take up the cleaning tapes 52A to 52C, and the unused cleaning tapes 52A to 52C are unreeled from the supply reel 530 and fed. Since the operation dial 534 is open to the side surface of the tool body 510 from the window 511a, even if the cleaning tool 51 is held with one hand, the operation dial 534 can be easily operated by a finger of the hand holding the cleaning tool 51.

As shown in FIGS. 82A and 82B, an annular wall portion 516 is formed on the inner surface of the first case half-body 511, incorporating the take-up reel support shaft 532. A plurality of stranding projections 517 (six in FIGS. 82A and 82B) are formed at regular intervals along the periphery of the annular wall portion 516 on the outer circumference of the annular wall portion 516. Also, a plurality of ratchet teeth 516b are provided around the inner circumferential surface of the annular wall portion 516.

In the front view shown in FIGS. 82A and 82B and FIGS. 104A to 104D, the stranding projections 517 have inclined faces 517a forming an acute angle with an outer circumferential surface 516a of the annular wall portion 516. The inclined faces 517a are provided on the side of the stranding projections 517 facing the rotation direction of the take-up reel 531 (the counterclockwise rotation direction in FIGS. 104A to 104D).

Reverse rotation of the operation dial 534 is blocked by engagement of the engaging claw 537b of the ratchet arm 537 with the ratchet teeth 516b on the annular wall portion 516. More specifically, the ratchet teeth 516b and the ratchet arm 537 function as a reverse-feed blocking mechanism 56 to block reverse feeding of the cleaning tapes 52A to 52C (a reverse-rotation prevention mechanism to prevent reverse rotation of the take-up reel). Accordingly, the cleaning tapes 52A to 52C are stably fed in the prescribed direction, which can suppress slack in the cleaning tapes 52A to 52C.

Figure 104A:
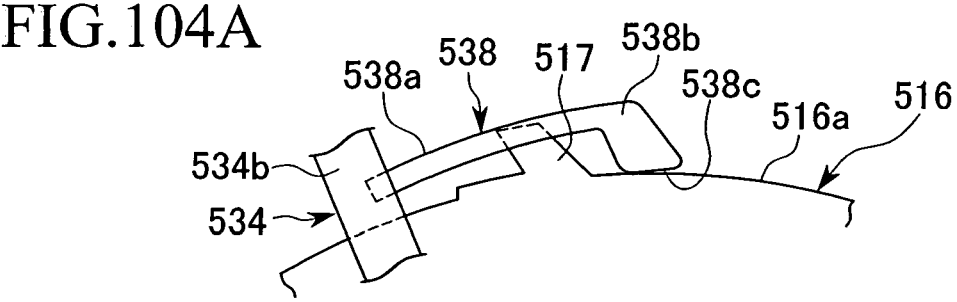
FIGS. 104A to 104D are drawings explaining the operation of the feeding amount notification mechanism according to the present cleaning tool.

In addition, in the state of the operation dial 534 mounted on the take-up reel support shaft 533, as shown in FIG. 104A, the hitting face 538c of the hammerhead portion 538b of the hammer arm 538 abuts the outer circumferential surface 516a of the annular wall portion 516.

Figure 104B:
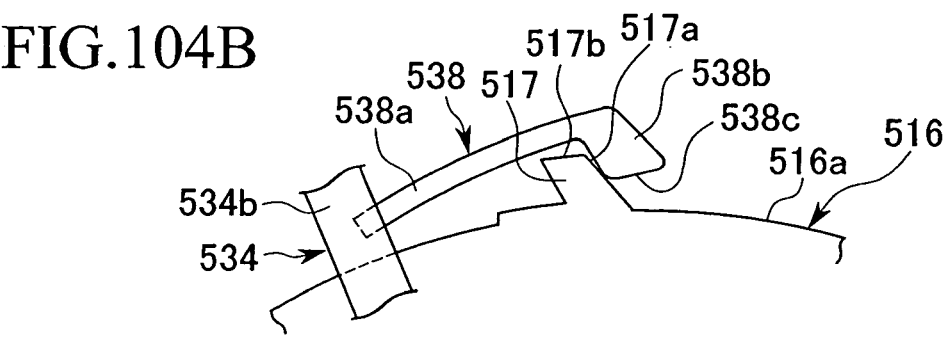
Figure 104C:
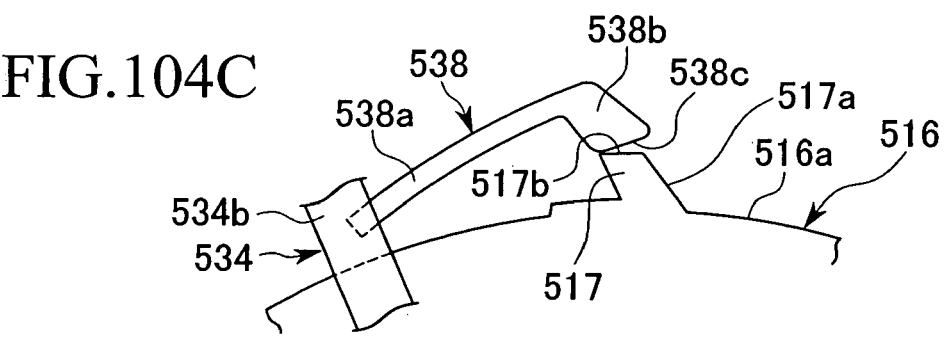
Figure 104D:
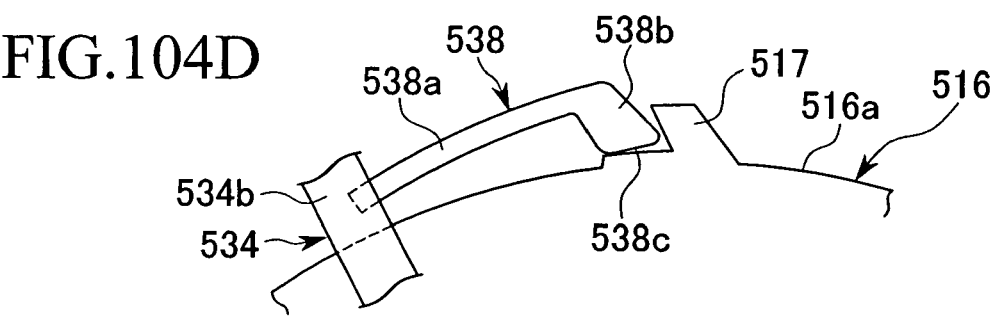

When the operation dial 534 rotates, as shown in FIGS. 104B and 104C, the hammerhead portion 538b rises to the top portion 517b along the inclined face 517a of the stranding projection 517. When the operation dial 534 further rotates, as shown in FIG. 104D, losing the support of the stranding projection 517, the hammer arm 538 swings down the hammerhead portion 538b by the springing force of the arm portion 538a toward the outer circumferential surface 516a of the annular wall portion 516, and the hitting face 538c of the hammerhead portion 538b collides with the outer circumferential surface 516a, producing a slapping sound. In this way, the operator can be notified of the feeding amount of the cleaning tapes 52A to 52C by the slapping sound produced each time the feeding amount of the cleaning tapes 52A to 52C reaches a fixed amount.

More specifically, in the cleaning tool 51 of the eight embodiment, a feeding amount notification mechanism that notifies the feeding amount of the cleaning tapes 52A to 52C is constituted from the stranding projections 517 of the annular wall portion 516 and the hammer arm 538 of the operation dial 534. Consequently, feeding only as much of the cleaning tapes 52A to 52C as required for cleaning is easy and reliable cleaning can be carried out, so that wasteful usage of the cleaning tapes can be suppressed.

The feeding amount of the cleaning tapes 52A to 52C corresponding to one slapping sound can be made to serve as the feeding amount required for one cleaning of an optical connector. In addition, multiple slapping sounds can be made to serve as the feeding amount corresponding to one cleaning of an optical connector. Operation is also possible by suitably changing the number of slapping sounds corresponding to one cleaning of an optical connector in accordance with the degree of dirtiness of the optical connector.

As an example of the method of using the cleaning tool 51, an example of the procedure of cleaning the connection end face 561a of the optical plug 560 housed in the optical adaptor 570 is explained.

As shown in FIG. 99, by inserting the insertion portion 520 of the cleaning tool 51 from the connector insertion port 571 of the optical adaptor 570, the insertion portion 520 enters the connector housing hole 572 as its outer surface is aligned by the inner walls 570a of the optical adaptor 570, whereby the cleaning tapes 52A to 52C are positioned to be abutted on an appropriate position (here, the optical fiber holes 561b and periphery thereof) of the connection end face 561a of the optical plug 560.

Even when the guide pins 565 protrude on the connection end face 561a of the optical plug 560, the guide pins 565 are housed in the guide pin insertion holes 523a provided on the head member 523, enabling the insertion portion 520 to be housed in the connector housing hole 572 without interference with the guide pins 565.

By rotating the operation dial 534 by a prescribed amount, the cleaning tapes 52A to 52C move in conjunction with the rotation of the take-up reel 531, and the connection end face 561a is wiped and cleaned by the cleaning tapes 52A to 52C, with contaminants such as debris, dust and oil adhering to the connection end face 561a being securely extracted by the cleaning tapes 52A to 52C.

Since extracted contaminants adhere to the cleaning tapes 52A to 52C and move in the direction to be taken up on take-up reel 531, the used cleaning tape (downstream portion) 52c is not exposed any more from the opening portion 526 of the insertion portion 520, and so there is no risk of the contaminants once again adhering to the connection end face 561a.

Accordingly, the connection end face 561a can be thoroughly cleaned.

After cleaning, the insertion portion 520 can be easily removed by pulling in the direction opposite to when inserting the cleaning tool 51 (disengagement direction).

Next, an example of the procedure of cleaning the connection end face 561a of the optical plug 560 outside the optical adaptor 570 is explained.

As shown in FIG. 100, by inserting the insertion portion 520 of the cleaning tool 51 in the insertion portion insertion port 553 and inserting the optical plug 560 into the plug insertion port 552 that is opened by removing the lid 555 of the guide cap 550, the outer surface of the housing 562 of the optical plug 560 advances into the internal space 554 of the guide cap 550 while being positioned by the internal walls of the guide cap 550. By pushing the optical plug 560 in this way, the cleaning tapes 52A to 52C are positioned to be abutted on an appropriate position (here, the optical fiber holes 561b and periphery thereof) of the connection end face 561a of the optical plug 560.

In this way, since butting of the connection end face 561a of the optical plug 560 and the abutting portion 52a of the cleaning tape of the insertion portion 520 is appropriately guided by the guide cap 550, cleaning of the connection end face 561a of the optical plug 560 in the guide cap 550 can be easily carried out similarly to the case of the connection end face 561a of the optical plug 560 in the aforementioned optical adaptor 570.

More specifically, according to the cleaning tool 51 of the eighth embodiment, the connection end face 561a of the optical plug 560 in the optical adaptor 570 can be cleaned in the state of being housed in the optical adaptor 570 and, by mounting the guide cap 550 on the insertion portion 520, the connection end face 561a of the optical plug 560 outside the optical adaptor 570 can also be cleaned. Since any optical plug can be cleaned by one type of cleaning tool, the number of articles required for cleaning work can be reduced.

By causing the scraper 580 to abut the cleaning surface of the cleaning tapes 52A to 52C, foreign matter adhering to the cleaning tapes 52A to 52C can be scraped off and removed by the scraper 580. As a result, since the connection end face of a ferrule can be cleaned with cleaning tape that is always clean, dirt on the connection end face can surely be removed.

Also, since the cleaning tape abutting the scraper 580 is guided by the guide grooves 583 formed at the distal end portion of the scraper 580, shifting in the width direction of the cleaning tapes is suppressed. Consequently, the scraper abuts the cleaning tapes with a more uniform abutting force, so that foreign matter adhering to the cleaning tapes can be more reliably scraped off.

With the slack prevention mechanism constituted from the reverse-feed blocking mechanism 56 that blocks reverse feeding of the cleaning tapes 52A to 52C and the rotation resistance imparting mechanism 57 that imparts rotation resistance to rotation of the reels 530, 531, even in the case of a plurality of cleaning tapes 52A to 52C, the cleaning tapes 52A to 52C can be stably fed in the prescribed direction, and fluctuations in the tape feeding amounts and the like can be suppressed. Accordingly, tape slack is prevented and constant cleaning conditions are maintained so that reliable wiping and cleaning can be carried out.

Preventing slack in the cleaning tapes 52A to 52C suppresses fluctuations in the feeding amount of the tapes and the pushing pressure of the tapes on the connection end face 561a. Accordingly, the connection end face 561a of the optical connector can be more reliably cleaned.

By closing the lid 555 of the guide cap 550 and attaching to the insertion portion 520, the guide cap 550 functions as a cap preventing exposure of the cleaning tapes 52A to 52C from the opening portion 526 of the insertion portion 520 when not in use (cleaning work), thereby preventing contamination of the interior of the guide cap 550 and the cleaning tapes 52A to 52C and the like during storage or transport of the cleaning tool 51.

Since the head member 523 is able to tilt with respect to the pushing pressure when the distal end face 524 abuts the connection end face 561a of the optical plug 560, even in the event of the ferrule 561 with a perpendicularly polished connection end face 561a as shown in FIG. 96 being abutted, and even in the event of the ferrule 561 with an obliquely polished connection end face 561a as shown in FIG. 97 being abutted, the direction of the distal end face 524 is aligned with the direction of the connection end face 561a, and the cleaning tape 52a on the distal end face 524 can be more uniformly and securely made to abut on the connection end face 561a. Also, if the operator holding the cleaning tool 51 happens to move slightly during cleaning, since the state of surface contact of the cleaning tapes 52A to 52C can be maintained by aligning the direction of the distal end face 524 of the head member 523 with the direction of the connection end face 561a of the ferrule 561 following the movement, the pushing pressure is not concentrated locally but acts more uniformly between the distal end face 524 of the head member 523 and the connection end face 561a of the ferrule 561, enabling the connection end face 561a to be reliably cleaned all over.

Due to the pushing pressure of the ferrule 561 of the optical plug 560, the compression spring 542 and the like elastically deforms, causing the head composite body 54 to recede in the direction opposite to the insertion direction, which can relax the pushing pressure of the ferrule 561 on the head member 523. Accordingly, when the head member 523 abuts the ferrule 561 by inserting the insertion portion 520 from the connector insertion port 571, the head member 523 can accommodate the pressure while relaxing the force from the ferrule 561 with the tilting spring 541 without the pressing force being directly applied strongly. Thereby, damage to the connection end face 561a and the optical fiber 563a end faces can be suppressed. In addition, even if the hands of the operator holding the cleaning tool 51 happen to move slightly during cleaning, the head member 523 alleviates the fluctuation in pushing pressure pressing the ferrule 561, inhibits the application of excessive pushing pressure to the connection end face 561a, and so can suppress damage to the connection end face 561a and the optical fiber 563a end faces. Also, dirt is inhibited from being pushed against the ferrule 561 and the like of the optical connector 560 side and becoming stuck thereon, enabling the dirt to be readily removed.

Since the amount of backward displacement of the distal end face 524 of the head member 523 can be secured by the compression spring 542, it can be adapted even to optical components such as optical plugs and optical transceivers with different optical reference planes, enabling cleaning with the position of the cleaning tape 52a aligned with the connection end face.

Since the distal end face 524 of the head member 523 in the head composite body 54 does not substantially displace vertically in the tilting direction thereof (vertical direction in FIGS. 96 and 97), the cleaning tape 52a not making good contact with the connection end face 561a due to shifting of the center locations of the connection end face 561a of the optical plug 560 and the distal end face 524 of the head member 523, and the abutting force of the connection end face 561a abutting the cleaning tape 52a becoming uneven is inhibited, thereby enabling more secure removal of contaminants on the connection end face 561a.

Since the insertion portion 520 is positioned by the connector housing hole 572 of the optical adaptor 570 during cleaning as well, wiping and cleaning of the connection end face 561a can be performed by the abutting portion 52a of the cleaning tape with a uniform pushing pressure without displacement. In addition, the insertion portion 520 can be supported in the optical adaptor 570 with an extremely light force, and so has excellent operability.

Since the cleaning tool of the eighth embodiment can be manufactured by assembling inflammable materials such as POM or PS without using metal components such as screws, it can be disposed of by incineration after use without disassembly.

The present invention based on the preferred eight embodiment was explained hereinabove, but the present invention is not limited to only the eighth embodiment and can be modified within a range that does not depart from the spirit of the present invention.

(1) As shown in FIGS. 96, 97 and 98, in the cleaning tool according to the eighth embodiment, the distal end face of the head portion is tiltable in the thickness direction (vertical direction in FIG. 90D, for example) of the insertion portion due to elastic deformation of a spring portion, but the present invention is not particularly limited to this. For example, the distal end face of the head portion may be tiltable in the width direction (for example, leftward and rightward in FIG. 90D) of the insertion portion.

Also, a constitution can be adopted that is tiltable in both the thickness direction and the width direction of the insertion portion. In this case, the direction of the head portion of the insertion portion and the direction of the connection end face of the ferrule can be brought into better alignment, thereby enabling better cleaning of the connection end face.

Moreover, similarly to the cleaning tool described above, when the head portion is one that is able to recede in a direction opposite the connection end face (separation direction), it preferably can make the pushing pressure applied to the ferrule appropriate.

(2) In the insertion portion, unit insertion portions which, by insertion into different connector housings, are to be positioned within the connector housing are formed at a plurality of locations in the protruding direction of the insertion portion, and the unit insertion portions of the insertion portion may be formed so as to be insertable in all connector housings capable of housing the unit insertion portions positioned relatively to the rear in the protruding direction of the insertion portion. With this kind of cleaning tool, the insertion portion can be inserted so as to be positioned with respect to different connector housings by the unit insertion portions, so that, using a single cleaning tool, cleaning of a connection end face of an optical connector in the connector housing can be carried out in compliance with a plurality of types and sizes of connector housing.

(3) The insertion portion can be constituted as one in which a plurality of kinds of insertion portions are exchangeable with respect to the tool body. This enables cleaning of the connection end face of an optical connector in a connector housing in compliance with the type and size of the connector housing just by changing the insertion portion without changing the tool body.

(4) The driving mechanism for feeding the tape (tape driving mechanism) is not limited to one that is manually driven, and may be made to be driven by power from a motor or spring and the like. Also, manual driving and driving by motive power can be made to be used in combination or be switchable as required.

(5) In the cleaning tool of the aforementioned eighth embodiment, the insertion portion is made to completely cover the cleaning tape, except for the opening formed at the distal end of the insertion portion, but is not necessarily limited thereto. If the cleaning tape is prevented from being contaminated by contact with the inner walls of the connector housing and the like when inserting the insertion portion in the connector housing, the shape or structure is not particularly limited, and does not necessarily need to be sleeve shaped.

(6) As the feeding amount notification mechanism, it is possible to adopt an optional mechanism to notify the amount of feeding of the cleaning tape by, for example, emitting a signal such as a sound or lighting/flashing of a lamp in accordance with the feeding amount of the cleaning tape, without limiting to the constitution of the eighth embodiment.

(7) The cleaning tool of the aforementioned eighth embodiment, as an optical component cleaning tool used for optical components such as optical fiber arrays, planar lightwave circuits and optical transceivers, can be used for cleaning the end face of an optical component at which the end face of a lightwave circuit (an optical fiber being possible) is disposed.

The optical fiber arrays may include one serving as an end face by its optical fibers being retained in one or a plurality of positioning grooves such as V-grooves positioned side by side that are formed on a substrate, the positioning grooves extending to at least one end of the substrate, and the end face of the optical fibers being arranged at one end of the substrate. Various constitutions are also known of optical components having planar lightwave circuits. According to the optical component cleaning tool of the present invention, even in the case of the end face of the optical component being disposed in a recess of a housing or the like, instead of the connection end face of the optical connector, the end face of another optical component, that is the end face the an optical fiber or the end face of a substrate or the like, can be cleaned by a cleaning tape wrapped around a head.

What is claimed is:

1. An optical connector cleaning tool that performs wiping and cleaning of a connection end face of an optical connector by movement of a cleaning member, comprising:
a tool body;
a driving mechanism that moves the cleaning member;
an insertion portion that protrudes from the tool body, with the cleaning member being disposed at the projected distal end from the tool body, and constituted to position the portion of the cleaning member disposed at the projected distal end so as to be able to abut the connection end face of the optical connector; and
a connector cleaning guide that is attached to the insertion portion, wherein
the connector cleaning guide includes a connector insertion port in which the optical connector to be inserted, an insertion portion insertion port in which the insertion portion is to be inserted, and a lid to cover the connector insertion port, and positions the connection end face of the optical connector inserted from the first port at a position to abut the cleaning member of the insertion portion.

2. The optical connector cleaning tool according to claim 1, wherein
the optical connector has at least one protruding member that protrudes from the connection end face, the cleaning member is a plurality of cleaning tapes, and the plurality of cleaning tapes are disposed side by side approximately parallel to each other, spaced to escape the protruding member.

3. An optical component cleaning tool that performs wiping and cleaning of an end face of an optical component optically connected by a connection housing by movement of a cleaning member, comprising:
a tool body;
a driving mechanism that moves the cleaning member;
an insertion portion that protrudes from the tool body, with the cleaning member disposed at the projected distal end from the tool body, being formed to be insertable in the connection housing in which the optical component is housed, and constituted to position the portion of the cleaning member disposed at the projected distal end so as to be able to abut the end face of the optical component by insertion in the connection housing; and
an optical component cleaning guide that has an optical component insertion port in which an optical component in the connection housing and an optical component to be optically connected are insertable, an insertion portion insertion port in which the insertion portion is insertable, and a lid to cover the optical component insertion port, and that positions the optical component and the insertion portion, and causes the cleaning member and the end face of the optical component to abut facing each other.

4. An optical component cleaning guide that positions an optical component and a cleaning member that cleans an end face of the optical component, wherein
the cleaning member is provided in an optical component cleaning tool having an on-board driving mechanism that moves the cleaning member;
the optical component cleaning tool comprises a tool body and an insertion portion that protrudes from the tool body, with the cleaning member being disposed at the projected distal end from the tool body, being formed to be insertable in the connection housing in which the optical component is housed, and constituted to position the portion of the cleaning member disposed at the projected distal end so as to be able to abut the end face of the optical component by insertion in the connection housing; and the optical component cleaning guide has an optical component insertion port in which an optical component to be cleaned is insertable, an insertion portion insertion port in which the insertion portion of the optical component cleaning tool is insertable, and a lid to cover the optical component insertion port, and positions the optical component and the insertion portion, and is constituted to so as to cause the cleaning member and the end face of the optical component to abut facing each other.

5. An optical connector cleaning tool that performs wiping and cleaning of a connection end face of an optical connector in a connector housing by feeding movement of a cleaning tape, comprising
a tool body;
an insertion portion protruding from the tool body and formed to be insertable in the connector housing,
a take-up reel that spools the cleaning tape;
a supply reel that reels out the cleaning tape;
a reverse rotation prevention mechanism that prevents reverse rotation of the take-up reel; and
a rotation resistance imparting mechanism that imparts rotation resistance to rotation of the supply reel,
wherein a head portion that has an abutting face for securing at its distal end an abutting area with respect to the connection end face, with a portion of the cleaning tape drawn from the tool body to the insertion portion being wrapped along the abutting face, is provided in the insertion portion,
in the cleaning tape, a contact cleaning portion pressed against the connection end face of the optical connector by the head portion is disposed in a plurality, side by side, via protruding member escape portions that avoid protruding members protruded from the connection end face of the optical connector and extend in parallel along the lengthwise direction of the cleaning tape, and
the reverse rotation prevention mechanism and the rotation resistance imparting mechanism constitute a slack prevention mechanism that prevents slack in the cleaning tape.

6. The optical connector cleaning tool according to claim 5, wherein
concave portions for avoiding interference between the head portion and protruding members that protrude from the connection end face when the insertion portion is inserted in the connector housing are set recessed from the abutting face of the head portion, and
a tape positioning mechanism that positions the portion of the cleaning tape moved along the abutting face of the head portion so that the protrusion member escape portions correspond to the concave portions is provided in the insertion portion.

7. An optical connector cleaning tool that performs wiping and cleaning of a connection end face of an optical connector in a connector housing by movement of a tape, comprising:
a tool body;
an insertion portion protruding from the tool body and formed to be insertable in the connector housing,
a supply reel wound with the tape,
a take-up reel that spools and collects the tape after use being rotatably mounted in the tool body;
a head portion that has an abutting face for securing at its distal end an abutting area with respect to the connection end face, with tape supplied from the supply reel being wrapped along the abutting face, provided in the insertion portion;

a head tilting mechanism constituted so as to allow tilting of the head portion with respect to a pushing force on the head portion; and
guide grooves that is formed in the head portion to prevent shifting of the tape in the width direction in at least one of the upstream side and downstream side with respect to the abutting face in the travel direction of the tape.

8. The optical connector cleaning tool according to claim 7, wherein
concave portions for avoiding interference between the head portion and protruding members that protrude from the connection end face when the insertion portion is inserted in the connector housing are set recessed from the abutting face of the head portion, and
the tape guided by the guide grooves is constituted to allow insertion of the protruding members into the concave portions.

9. An optical connector cleaning tool that performs wiping and cleaning of a connection end face of an optical connector by movement of a cleaning tape, comprising:
a tool body;
an insertion portion protruding from the tool body and formed to be insertable in a connector housing for housing and connecting the optical connector,
a head member for securing at its distal end face an abutting area of the cleaning tape with respect to the connection end face being disposed in the insertion portion; and
a support mechanism supporting the head member and having a plurality of rotational axes that allow rotational movement of the head member, wherein
at least one of the rotational axes, is in a twisted position with respect to a straight line extending in the insertion direction of the optical connector from the center location of the connection end face of the optical connector when the connection end face of the optical connector is abutted against the distal end face of the head member.

10. The optical connector cleaning tool according to claim 9, wherein
the support mechanism includes a waveform spring having a plurality of bending curvature portions.

11. The optical connector cleaning tool according to claim 9, wherein
the optical connector is one whose connection end face is obliquely polished, and when the distal end face of the head member of the optical connector cleaning tool faces the connection end face of the optical connector, a first angle formed by the feeding direction of the cleaning tape supplied to the head member and the feeding direction of the cleaning tape moving along the distal end face of the head member is smaller than a second angle formed by the feeding direction of the cleaning tape moving along the distal end face of the head member and the feeding direction of the cleaning tape being sent away from the head member.

12. The optical connector cleaning tool according to claim 9, wherein the support mechanism includes a tilting spring protruding from a recess formed in a back face of the head member, a waveform compression spring coupled to the tilting spring, and a base portion connected to the waveform compression spring at a side opposite to the tilting spring.

13. An optical component cleaning tool that performs wiping and cleaning of an end face of an optical component by movement of a cleaning tape, comprising:

a tool body;

an insertion portion protruding from the tool body and formed to be insertable in a housing that houses the optical component, a head member for securing at its distal end face an abutting area of the cleaning tape with respect to the connection end face being disposed in the insertion portion; and a support mechanism supporting the head member and having a plurality of rotational axes that allow rotational movement of the head member, wherein at least one of the rotational axes is in a twisted position with respect to a straight line extending in the insertion direction of the optical component from the center location of the end face of the optical component when the end face of the optical component is abutted against the distal end face of the head member.

14. The optical component cleaning tool according to claim 13, wherein the support mechanism includes a tilting spring protruding from a recess formed in a back face of the head member, a waveform compression spring coupled to the tilting spring, and a base portion connected to the waveform compression spring at a side opposite to the tilting spring.

15. An optical component cleaning tool that performs wiping and cleaning of an end face of an optical component by movement of a cleaning tape, comprising:

a tool body and an insertion portion protruding from the tool body and formed to be insertable in a housing that houses the optical component, a head member for securing at its distal end face an abutting area of the cleaning tape with respect to the connection end face being disposed in the insertion portion, and a scraper for removing foreign matter adhering to the cleaning tape abutting a portion of the cleaning tape supplied to the head member.

16. An optical connector cleaning tool that performs wiping and cleaning of a connection end face of an optical connector that is connected by a connector housing by movement of a cleaning member, comprising;

a tool body;

a driving mechanism that moves the cleaning member;

an insertion portion that protrudes from the tool body, with the cleaning member disposed at the projected distal end from the tool body, being formed to be insertable in the connector housing in which the optical connector is housed, and constituted to position the portion of the cleaning member disposed at the projected distal end so as to be able to abut the connection end face of the optical connector by insertion in the connector housing; and a connector cleaning guide having a first port in which an optical connector to be connected with an optical connector housed in a connector housing is insertable, a second port in which the insertion portion is insertable, and a lid to cover the first port, positioning the optical connector and the insertion portion, and causing the cleaning member and the connection end face of the optical connector to abut facing each other.

\* \* \* \* \*